США011030854B2

(12) United States Patent
Alderucci et al.

(10) Patent No.: US 11,030,854 B2
(45) Date of Patent: Jun. 8, 2021

(54) GAME WITH CHANCE ELEMENT AND TAX INDICATOR

(71) Applicant: CFPH, LLC, New York, NY (US)

(72) Inventors: Dean P. Alderucci, Westport, CT (US); Geoffrey M. Gelman, Brooklyn, NY (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 16/677,802

(22) Filed: Nov. 8, 2019

(65) Prior Publication Data

US 2020/0143633 A1 May 7, 2020

Related U.S. Application Data

(63) Continuation of application No. 13/540,128, filed on Jul. 2, 2012, now abandoned, which is a continuation of application No. 11/871,403, filed on Oct. 12, 2007, now Pat. No. 8,210,931.

(51) Int. Cl.
*G07F 17/32* (2006.01)
*G06Q 20/20* (2012.01)
*G06Q 40/00* (2012.01)

(52) U.S. Cl.
CPC ....... *G07F 17/3244* (2013.01); *G06Q 20/207* (2013.01); *G06Q 40/123* (2013.12); *G07F 17/32* (2013.01); *G07F 17/3227* (2013.01)

(58) Field of Classification Search
CPC ............ G07F 17/3227; G07F 17/3244; G06Q 20/207; G06Q 40/123
See application file for complete search history.

(56) References Cited

U.S. PATENT DOCUMENTS

| 4,515,367 | A | 5/1985 | Howard |
| 4,836,553 | A | 6/1989 | Suttle et al. |
| 4,861,041 | A | 8/1989 | Jones et al. |
| 5,000,453 | A | 3/1991 | Stevens et al. |
| 5,022,653 | A | 6/1991 | Suttle et al. |
| 5,326,104 | A | 7/1994 | Pease et al. |
| 5,356,140 | A | 10/1994 | Dabrowski et al. |
| 5,437,451 | A | 8/1995 | Fulton |
| 5,505,461 | A | 4/1996 | Bell et al. |
| 5,732,950 | A | 3/1998 | Moody |
| 5,810,663 | A | 9/1998 | Bochichio et al. |
| 5,816,914 | A | 10/1998 | Wichinsky |
| 5,816,915 | A | 10/1998 | Kadlic |
| 5,820,460 | A | 10/1998 | Fulton |
| 5,823,873 | A | 10/1998 | Moody |
| 5,868,619 | A | 2/1999 | Wood et al. |
| 5,941,769 | A | 8/1999 | Order |
| 6,007,066 | A | 12/1999 | Moody |

(Continued)

FOREIGN PATENT DOCUMENTS

| WO | WO 01/54091 | 7/2001 |
| WO | WO 05/082011 | 9/2005 |

OTHER PUBLICATIONS

U.S. Appl. No. 61/921,409, filed Dec. 28, 2013, Amaitis et al.

(Continued)

*Primary Examiner* — James S. McClellan

(57) ABSTRACT

In various embodiments a player of a gaming device or mobile gaming device is presented with an indication of a payout amount less any taxes that would be owed for the payout.

20 Claims, 53 Drawing Sheets

(56) References Cited

U.S. PATENT DOCUMENTS

| | | | |
|---|---|---|---|
| 6,048,267 | A | 4/2000 | Wichinsky |
| 6,050,568 | A | 4/2000 | Hachquet |
| 6,093,103 | A | 7/2000 | McCrea, Jr. |
| 6,098,085 | A | 8/2000 | Blonder et al. |
| 6,098,985 | A | 8/2000 | Moody |
| 6,129,357 | A | 10/2000 | Wichinsky |
| 6,132,311 | A | 10/2000 | Williams |
| 6,159,095 | A | 12/2000 | Frohm et al. |
| 6,299,536 | B1 | 10/2001 | Hill |
| 6,312,333 | B1 | 11/2001 | Acres |
| 6,435,509 | B2 | 8/2002 | Wichinsky |
| 6,474,645 | B2 | 11/2002 | Tarantino |
| 6,579,181 | B2 | 6/2003 | Soltys et al. |
| 6,585,587 | B2 | 7/2003 | Falciglia |
| 6,612,927 | B1 | 9/2003 | Slomiany et al. |
| 6,666,768 | B1 | 12/2003 | Akers |
| 6,669,198 | B2 | 12/2003 | Wichinsky |
| 6,837,791 | B1 | 1/2005 | McNutt et al. |
| 6,846,238 | B2 | 1/2005 | Wells |
| 7,114,718 | B2 | 10/2006 | Grauzer et al. |
| 7,137,629 | B2 | 11/2006 | Chapman |
| 7,137,630 | B2 | 11/2006 | Yurkins |
| 7,416,186 | B2 | 8/2008 | Walker et al. |
| 7,559,838 | B2 | 7/2009 | Walker et al. |
| 7,597,327 | B2 | 10/2009 | Dodge |
| 7,704,136 | B2 | 4/2010 | Shackleford et al. |
| 7,707,093 | B2 | 4/2010 | O'Shaughnessy et al. |
| 7,740,533 | B2 | 6/2010 | Walker et al. |
| 7,771,271 | B2 | 8/2010 | Walker et al. |
| 8,210,931 | B2 | 7/2012 | Alderucci et al. |
| 1,423,146 | A1 | 3/2014 | Singleton et al. |
| 8,814,645 | B1 | 8/2014 | Hanson |
| 9,697,697 | B2 | 7/2017 | Singleton et al. |
| 9,905,078 | B2 | 2/2018 | Amaitis |
| 2001/0015528 | A1 | 8/2001 | Wichinsky |
| 2002/0082076 | A1 | 6/2002 | Roser et al. |
| 2002/0111815 | A1 | 8/2002 | Smith |
| 2002/0132657 | A1 | 9/2002 | Matthiesen |
| 2002/0149153 | A1 | 10/2002 | Wichinsky |
| 2002/0183105 | A1 | 12/2002 | Cannon |
| 2002/0185816 | A1 | 12/2002 | Moody et al. |
| 2002/0187822 | A1 | 12/2002 | Falciglia, Sr. |
| 2003/0003997 | A1 | 1/2003 | Vuong et al. |
| 2003/0022719 | A1 | 1/2003 | Donald et al. |
| 2003/0207705 | A1 | 11/2003 | Falciglia, Sr. |
| 2004/0053663 | A1 | 3/2004 | Paulsen et al. |
| 2004/0110554 | A1 | 6/2004 | Bromfield |
| 2004/0229671 | A1 | 11/2004 | Stronach et al. |
| 2004/0242319 | A1 | 12/2004 | Walker et al. |
| 2005/0012269 | A1 | 1/2005 | Grauzer et al. |
| 2005/0153774 | A1 | 7/2005 | Okada |
| 2005/0170884 | A1 | 8/2005 | Okada |
| 2005/0261053 | A1* | 11/2005 | Walker ............... G07F 17/3262 463/20 |
| 2006/0205494 | A1* | 9/2006 | Fujimoto ............ G07F 17/3241 463/29 |
| 2007/0099696 | A1 | 5/2007 | Nguyen et al. |
| 2008/0039189 | A1 | 2/2008 | Walker et al. |
| 2008/0070700 | A1 | 3/2008 | Inamura |
| 2008/0076570 | A1 | 3/2008 | Johnson |
| 2008/0076572 | A1* | 3/2008 | Nguyen ............... G07F 17/3269 463/42 |
| 2008/0188278 | A1 | 8/2008 | Paulsen et al. |
| 2008/0200251 | A1 | 8/2008 | Alderucci |
| 2008/0242392 | A1 | 10/2008 | Inamura |
| 2009/0061975 | A1 | 3/2009 | Ditchev |
| 2009/0069087 | A1 | 3/2009 | Kelly |
| 2009/0170596 | A1* | 7/2009 | Gagner ................ G07F 17/32 463/25 |
| 2009/0176558 | A1 | 7/2009 | Englman et al. |
| 2009/0239631 | A1 | 9/2009 | Aoki |
| 2010/0105459 | A1 | 4/2010 | Miller |
| 2011/0095480 | A1 | 4/2011 | Berman et al. |
| 2012/0122555 | A1 | 5/2012 | Schneider |
| 2012/0190433 | A1 | 7/2012 | Rowe |
| 2012/0322526 | A1 | 12/2012 | Berman et al. |
| 2013/0116038 | A1 | 5/2013 | Alderucci et al. |
| 2014/0038681 | A1 | 2/2014 | Paulsen et al. |
| 2015/0187176 | A1 | 7/2015 | Amaitis |
| 2015/0213688 | A1 | 7/2015 | Hanson |
| 2016/0292964 | A1 | 10/2016 | Flaherty |
| 2017/0301189 | A1 | 10/2017 | Singleton et al. |
| 2018/0130290 | A1 | 5/2018 | Lyons |
| 2018/0190071 | A1 | 7/2018 | Amaitis et al. |

OTHER PUBLICATIONS

U.S. Appl. No. 61/936,792, filed Feb. 6, 2014, Hanson.

"The Proof is in the Papers" Documenting gambling losses for tax purposes. Casino Player Magazine by Frank Sutherland, CPA https://web.archive.org/web/20010306063334/http://www.casinoplayer.com/archive/9603cp/taxes.html. Retrieved Oct. 30, 2015.

PCT International Search Report and Written Opinion for Application No. PCT/US2008/079476; dated Dec. 8, 2008; 10 pages.

* cited by examiner

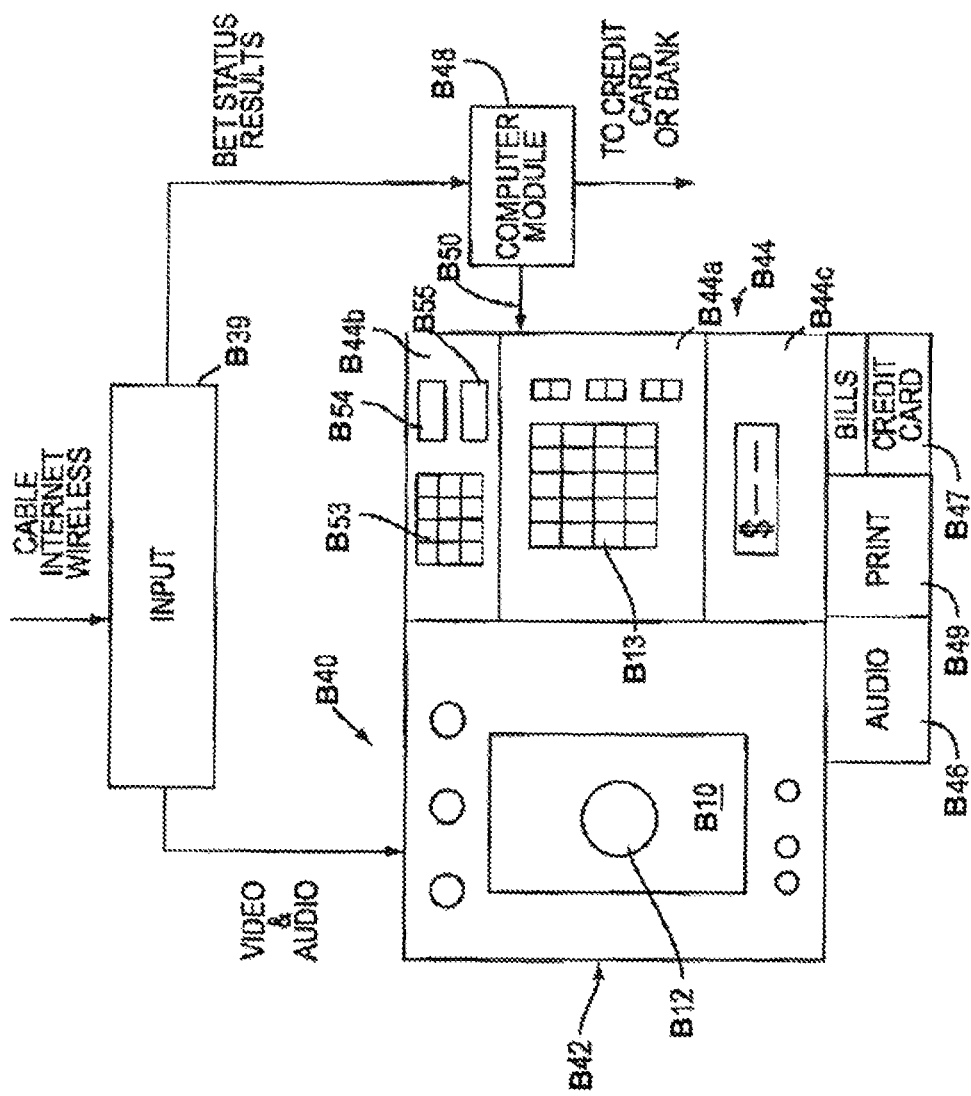

FIGURE 37
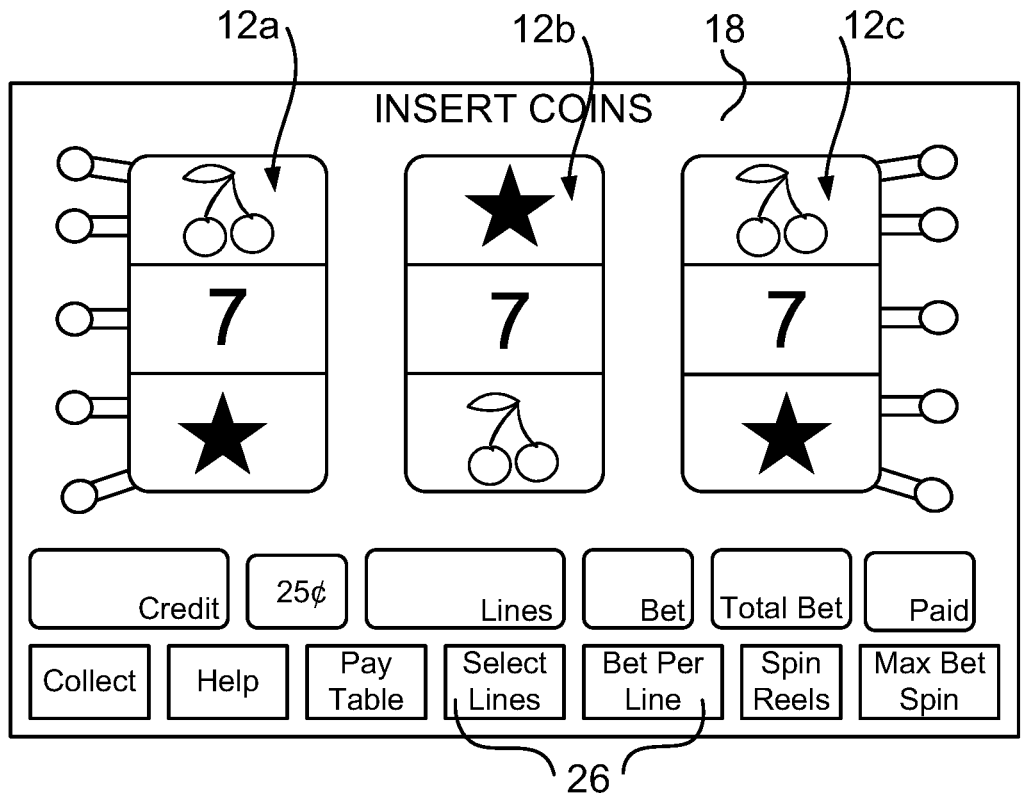
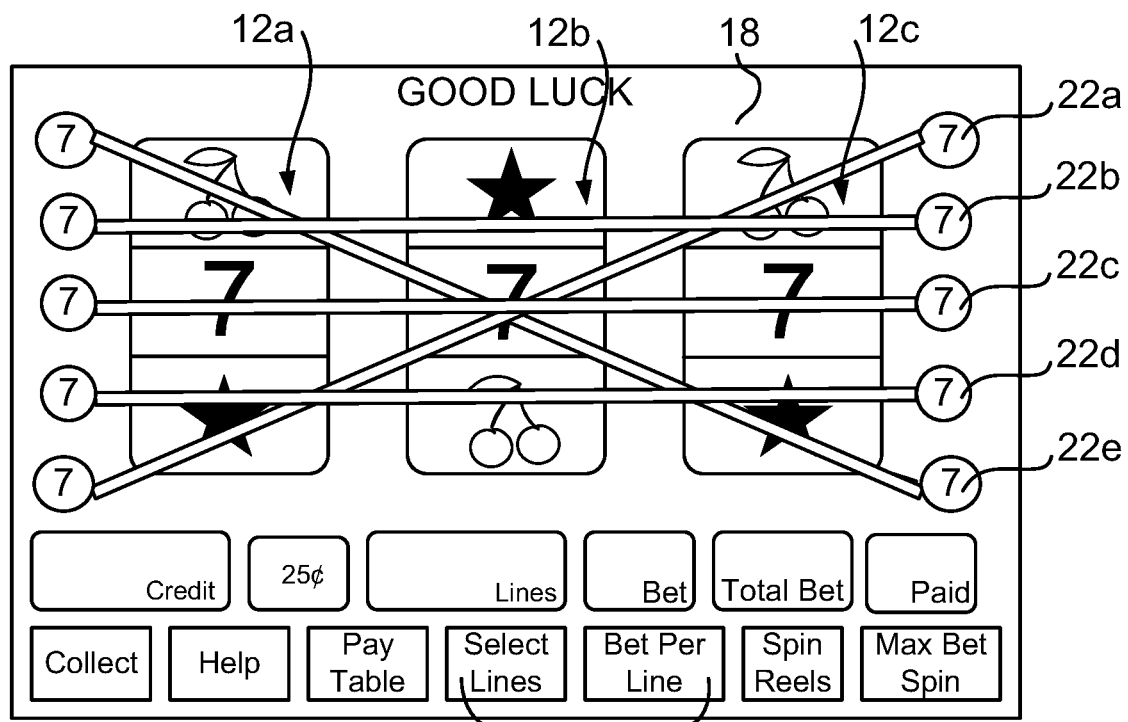
FIGURE 38

FIGURE 39
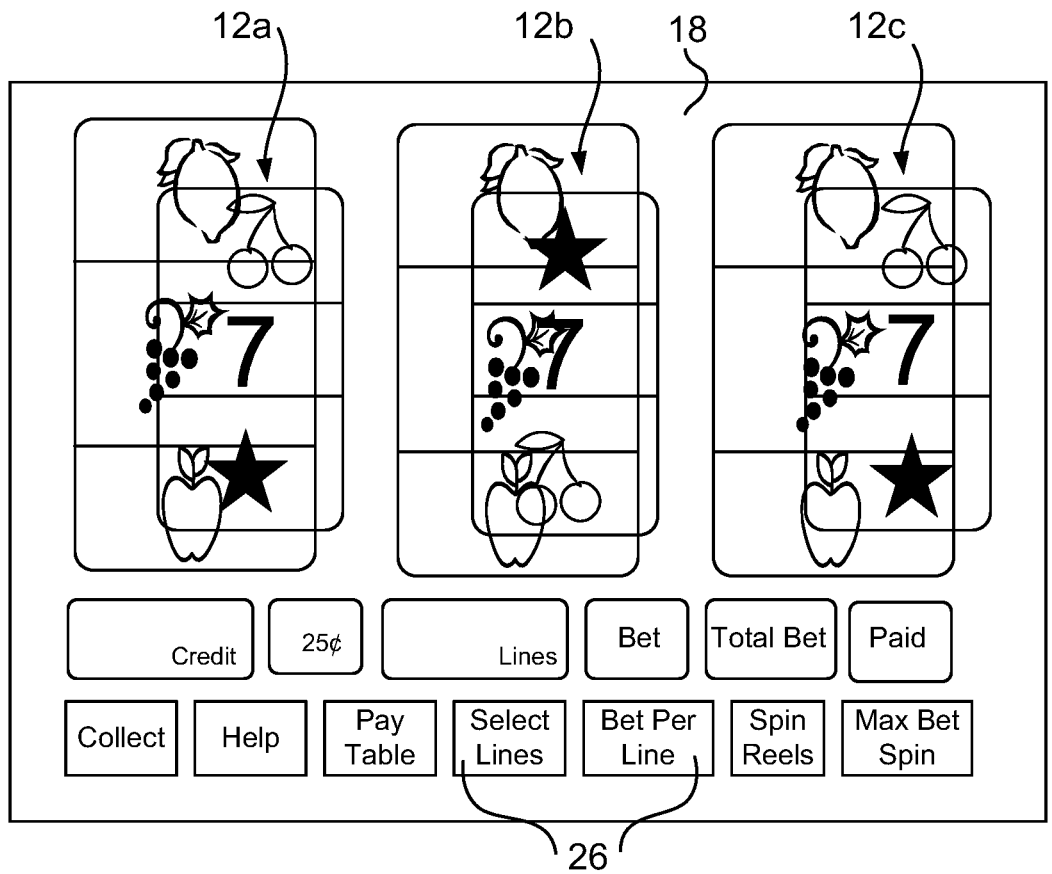
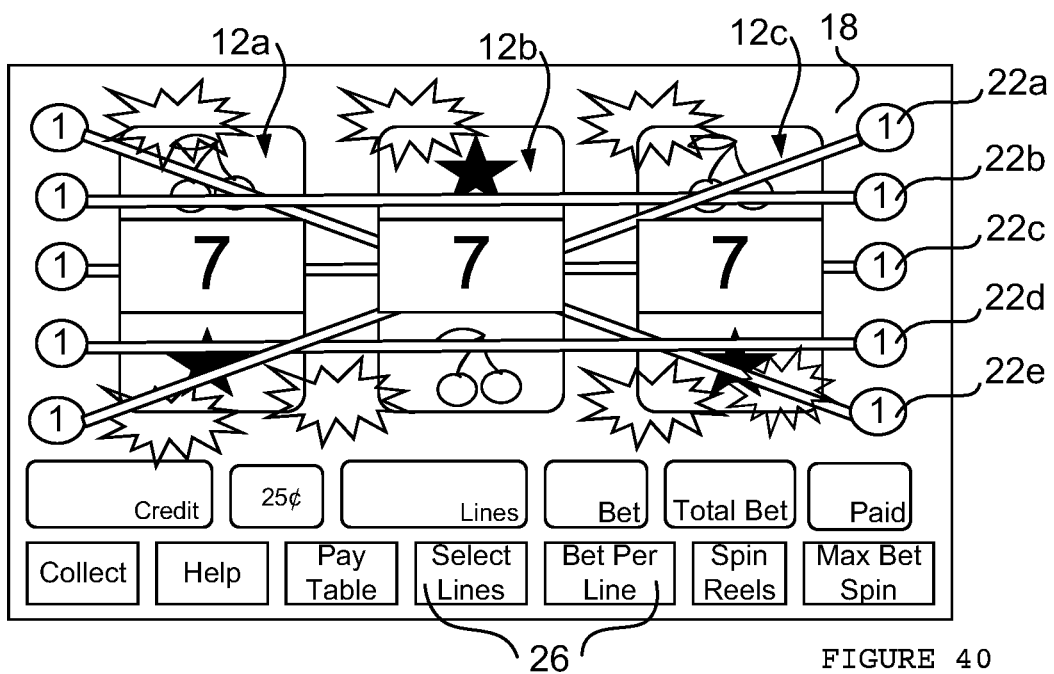
FIGURE 40

GAME WITH CHANCE ELEMENT AND TAX INDICATOR

CROSS-REFERENCE TO RELATED APPLICATIONS

This patent application is a continuation application of U.S. patent application Ser. No. 13/540,128, filed Jul. 2, 2012, which is a continuation of U.S. patent application Ser. No. 11/871,403 filed Oct. 12, 2007 (now U.S. Pat. No. 8,210,931), the disclosures of which are hereby incorporated by reference herein in their entireties.

BRIEF DESCRIPTION OF THE FIGURES

FIG. 3 is a schematic diagram of a terminal, computer or TV type of display.

FIG. 37 shows a superimposed video image with instructional information prompting the player to insert coins or play credits, according to some embodiments.

FIG. 38 shows a superimposed video image depicting the activated pay lines and the number of wagered credits per pay line, according to some embodiments.

FIG. 39 shows a superimposed video image depicting the pay table in response to a command by the player (e.g., by pressing a "Pay Table" key on the button panel), according to some embodiments.

FIG. 40 shows a superimposed video image highlighting the winning combination(s) (e.g., "7," "7," "7") and its associated pay line and depicting the award for that winning combination, according to some embodiments.

FIG. 51 shows an IRS form W-2G according to some embodiments.

FIG. 52 shows an IRS form W-8BEN according to some embodiments.

Figure 53:
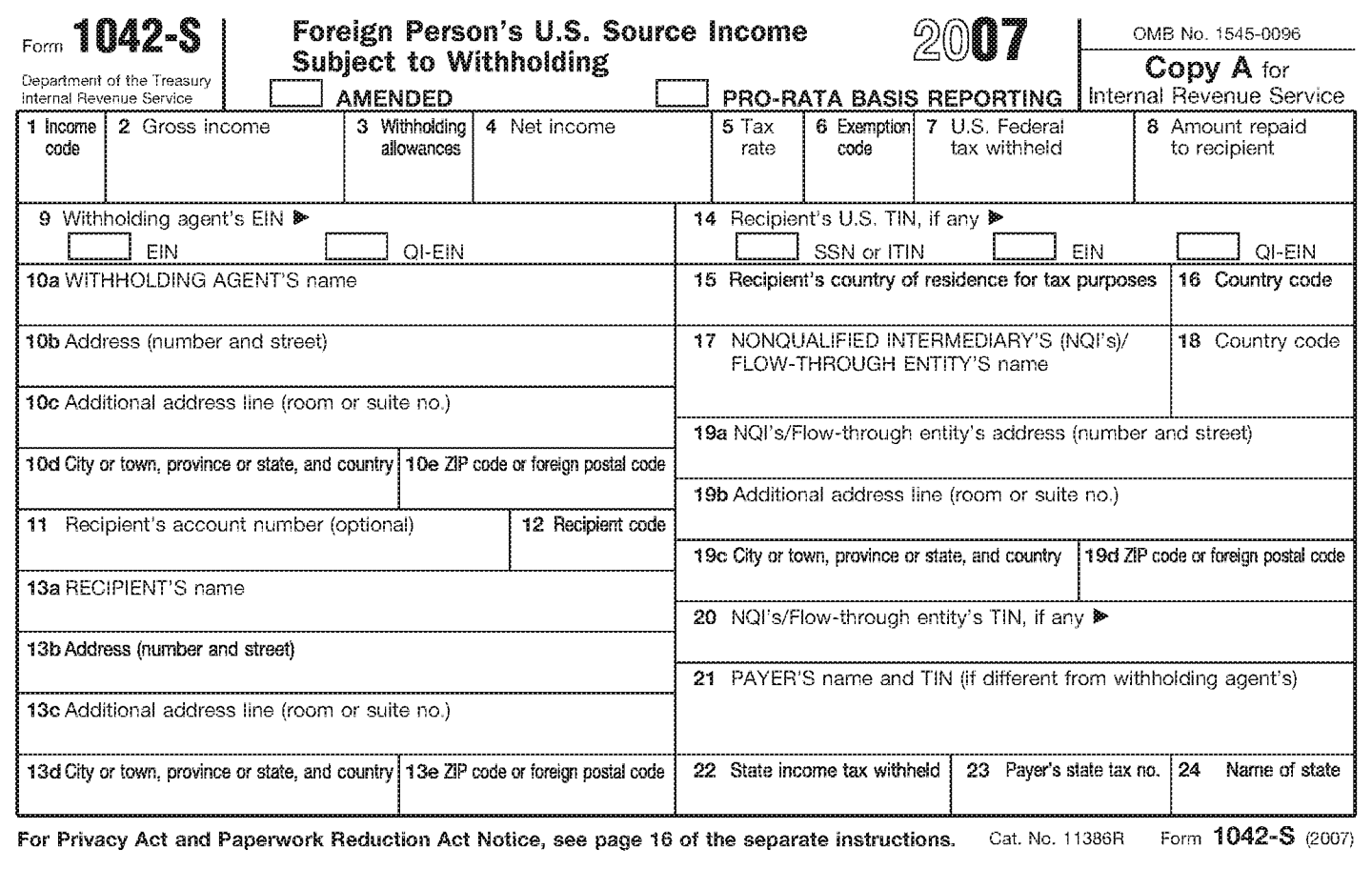

FIG. 53 shows an IRS form 1042-S according to some embodiments.

Figure 54:
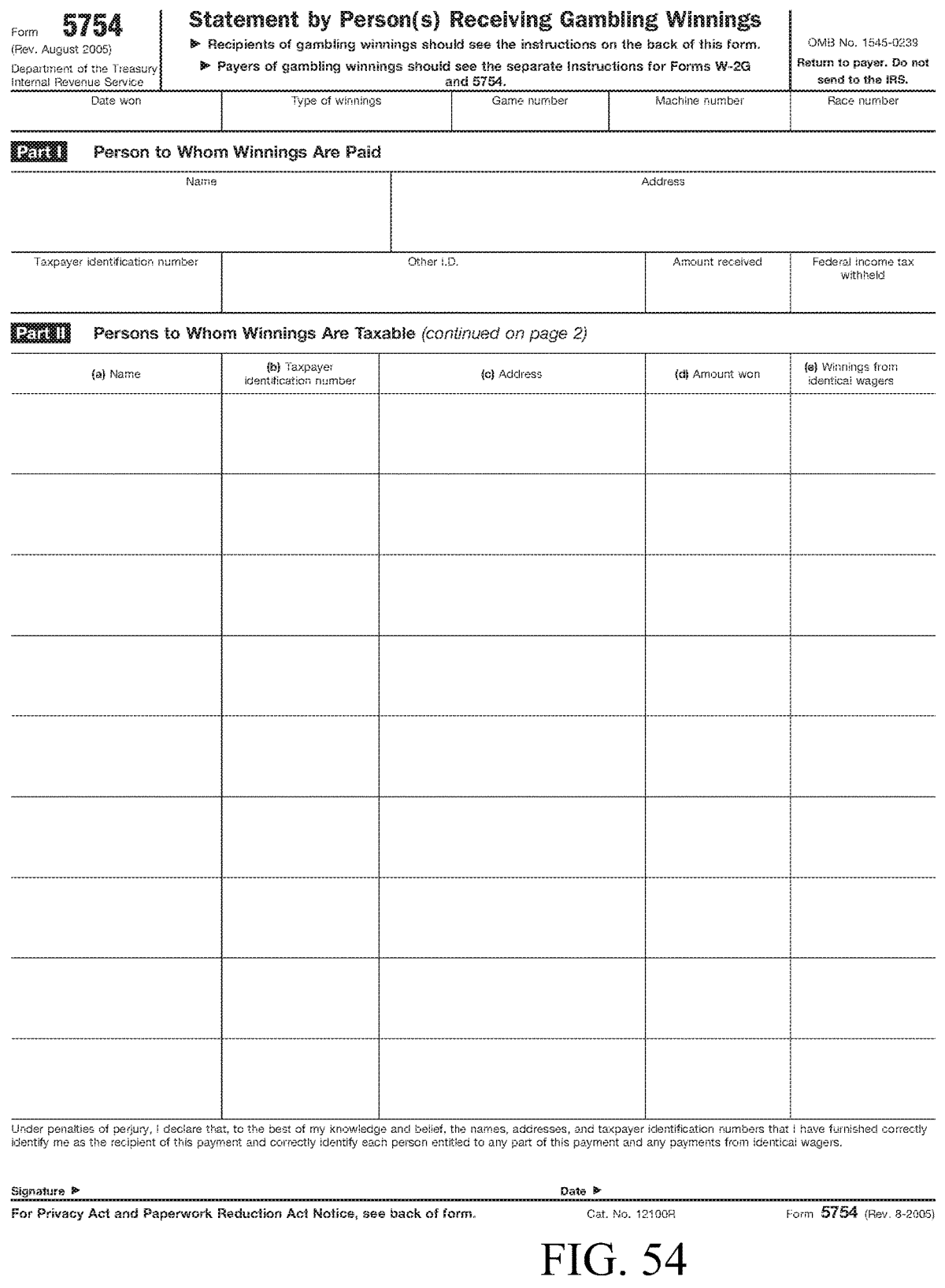

FIG. 54 shows an IRS form 5754 according to some embodiments.

DETAILED DESCRIPTION

Tracking Card

Figure 1:
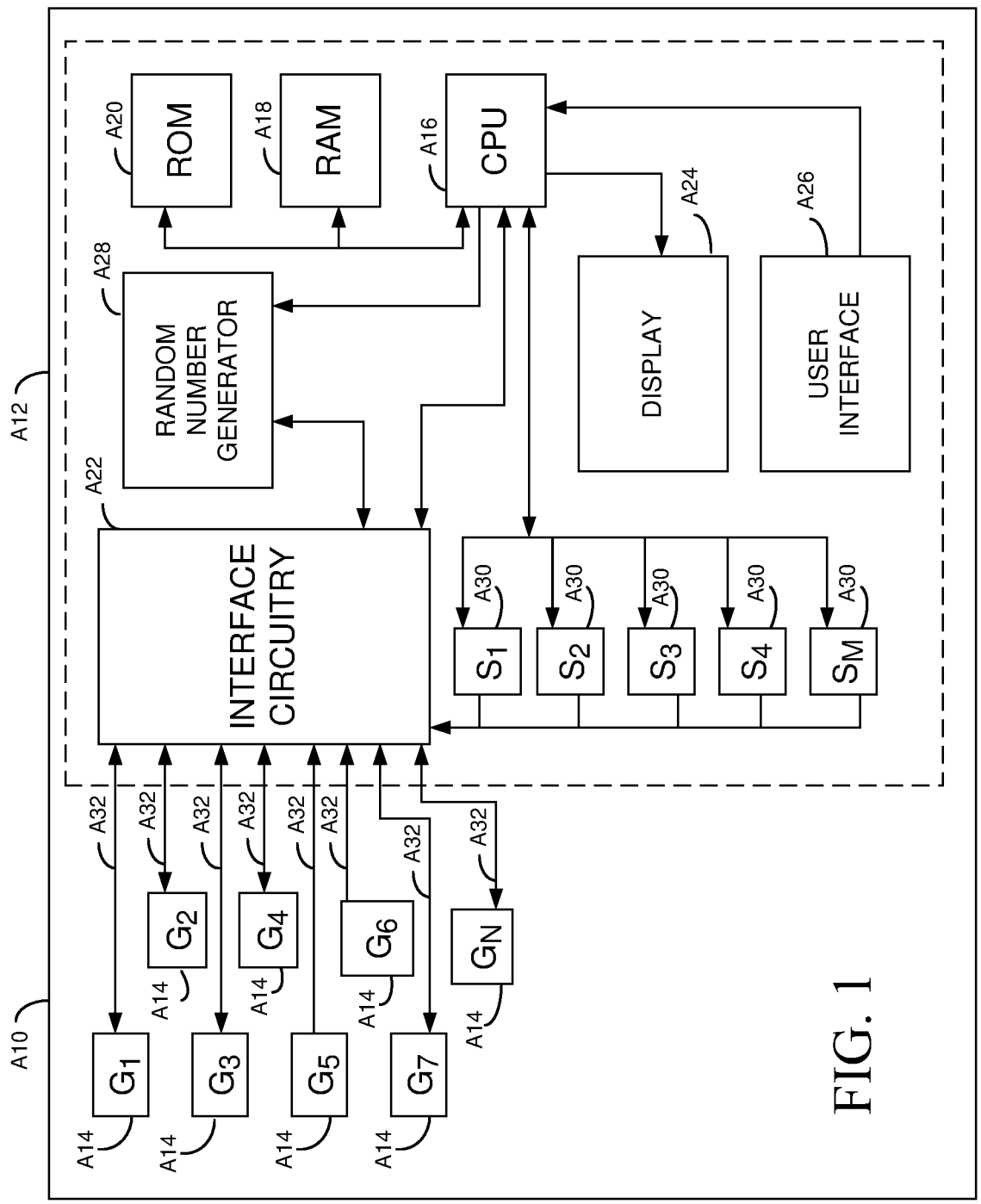
FIG. 1 shows a block diagram of interactive gaming system A10 according to various embodiments.

A player tracking card may include a thin plastic card bearing information about a player. The card may include a magnetic stripe, radio frequency identification tag, bar code, or other means of storing and/or communicating information. A player tracking card may also include printed information. Information stored on a player tracking card may include: (a) a player name; (b) a player age; (c) a player status (e.g., a player tracking card may indicate that a player has gold level status); (d) a player identifier (e.g., a unique identification code that is known or understood to signify the player); and/or any other pertinent information. A player tracking card may further include designs and logos, such as casino logos.

A player tracking card may be used in conjunction with a loyalty or rewards program. A player may use the player tracking card to identify himself, such as to a slot machine or to a dealer at a gaming table. Having provided a means of identification, the player may now receive credit for games played, for amounts wagered, for amounts won, or for any other metric of play or performance. For example, a player may receive two points for every dollar wagered. These points may be credited to a loyalty or rewards account of the player. The points may be comp points. The points may ultimately be redeemed by the player for a benefit, such as a free meal or free night's stay at a casino hotel.

A player tracking card may allow a casino or other party to track the activities of a player. For example, every time a player provides his player tracking card to a gaming device, to a dealer, or to another party, information about the player may be transmitted via a network (e.g., a casino network) to a casino server or other computer. The location of the player may be inferred from the location of the device or gaming table from which information from the tracking card was received. Further, when a player engages in gaming activities or other activities, his tracking card may remain inserted into a gaming device, in the possession of a dealer, or otherwise in contact with a casino network. The player's gaming activities or other activities may thereby be tracked, recorded, and associated with the player. Over time, a casino may use the information gleaned from the player tracking card and player tracking system to build a profile of the player. The casino may use this profile to make marketing offers to the player. For example, the casino may send a marketing pamphlet to the player reminding the player to visit the casino at the same time of year that he had previously visited.

A player tracking card may be made of various materials, e.g., materials other than plastic. A player tracking card may take many shapes or forms. A player tracking card may be rectangular, hexagonal, octagonal, three-dimensional, or may take any other form. A player tracking card may be incorporated into another device, such as into a mobile gaming device. For example, a mobile gaming device may contain a radio frequency identification (RFID) tag storing information about a player. A player may then bring the mobile gaming device near to an RFID reader in order to allow himself to be identified (e.g., by a gaming device).

House Edge, House Advantage

"House edge" and "house advantage" may refer to an amount that the house is expected to retain, on average, per unit bet by the player. Depending on circumstances, the house edge may be expressed as a percentage, as a dollar value, as a decimal fraction, or in any other applicable form. For example, a house edge of 5% may indicate that the house can expect to retain 5 cents on average per dollar bet by a player. It should be noted that a statement of a house edge does not imply that the house will necessarily retain the stated amount of a player's bet on each game. The house edge, rather, refers to an expectation or average. For example, suppose a player bets $1 on a game in which he has a 45% chance of winning $2, and a 55% chance of winning nothing. The house edge may be calculated as $(0.55*(\$1-\$0)+0.45*(\$1-\$2))/\$1=10\%$. Thus, the house may expect to win 10 cents per dollar wagered by the player.

Pay-Line

As used herein, the terms "pay-line" and "pay line" may include a region or set of positions in physical space such that symbols falling within the region or positions would determine an outcome and/or a payout of a game. For example, a mechanical reel slot machine may include an opaque surface with a horizontal transparent region (e.g., a viewing window) in the middle. The reels of the slot machine may spin behind the opaque surface. Symbols lying on the reels of the slot machine may only be visible through the transparent region of the surface. At the end of a game, the reels may come to rest with certain symbols visible through the transparent region. For example, one symbol on each reel may be visible through the transparent region. The visible symbols may define the outcome and the payout of the game. The transparent region may thus define a pay-line. Only symbols just behind the transparent region contribute to the outcome of the game. A pay-line may include a region or set of positions in an electronic game as well. For example, a pay-line may include a particular region on a liquid crystal display screen of a gaming device.

As an illustrative example, a gaming device may include an area where nine symbols may be visible at one time. The symbols may be arranged in a three by three grid. For convenience, the nine places on the grid where symbols may be visible may be referred to by a column reference (a, b, c) and a row reference (1, 2, 3). Thus, for example, the center of the grid may be referred to as "b2", the lower left as "a1", and so on. In various embodiments, a first pay-line may be defined by the region consisting of a2, b2, and c2. In various embodiments, a second pay-line may be defined by the region consisting of a1, b1, and c1. In various embodiments, a third pay-line may be defined by the region consisting of a3, b3, and c3. In various embodiments, a fourth pay-line may be defined by the region consisting of a3, b2, and c1. In various embodiments, a fifth pay-line may be defined by the region consisting of a1, b2, and c3. It will be appreciated that other pay-lines may be defined. Further, pay-lines may be defined that include more than three grid areas or less than three grid areas.

In various embodiments, a pay-line may include an inactive pay-line. Symbols or indicia which fall on an inactive pay-line may not contribute to a player's payout. For example, prior to the playing and completion of a game, a player may choose a pay-line to activate. The player's choice may be automatically determined based on the amount of the player's wager. For example, a first credit bet by a player may always activate a first pay-line. A second credit bet by a player may always activate a second pay-line, and so on. In any event, the player may not activate all possible pay-lines in a game. Thus, at completion of the game, symbols may still rest on an inactive pay-line. However, the player's wins or losses may be unaffected by the outcome formed from such symbols.

In various embodiments, two or more pay-lines may have overlapping regions. For example, a symbol that falls in a particular region may contribute to three different pay-lines.

In various embodiments, a pay-line may be defined conceptually or virtually without any physical manifestation. For example, a pay-line may be defined to include the first three symbols generated by a random process, even if such symbols are never displayed. For example, a computer may simulate a game, determine an outcome, and pay a player based on the outcome, without ever actually displaying the symbols in the outcome.

Payout

As used herein, the term "payout" may include any payment, prize, or other benefit due to a player as a result of a game the player has played. In various embodiments, a payout may be determined based on an outcome received by the player in a game. Different outcomes may be associated with different payouts. For example, a royal flush outcome in video poker may have an associated payout of 800 credits, while a two-pair outcome in video poker may have an associated payout of 2 credits.

In various embodiments, a payout may be zero. For example, if a player busts in a game of blackjack, his payout may be zero. In various embodiments, a payout may be negative. If a player receives a negative payout, the player may owe money, e.g., to the casino operating the game just completed by the player.

In various embodiments, a player's payout may be determined based on his bet amount. For example, of two players who receive the same outcome in the same game, the player who bet more may receive the greater payout. In various embodiments, the term "payout ratio" may refer to a ratio of an amount bet to an amount of a payout. For example, a payout ratio of 100 may indicate that a player receives 100 times his bet in the form of a payout. By posting or publishing a payout ratio for an outcome, a player may figure out what his payout would be if he were to achieve that outcome for various different bet amounts.

In various embodiments, a payout may be awarded in physical or tangible form. For example, a payout may be provided in the form of coins or gambling tokens that the player can grab and hold in his hand. In various embodiments, a payout may be provided in the form of credits or other stored value. When a player receives a payout in credits, the player may be able to receive his payout in tangible form through further steps, such as through pressing a "cash out" button on his gaming device, or through approaching a casino desk and asking for his In some embodiments, a payout may include an amount paid based on a single outcome. For example, a player may receive a payout of six credits for achieving a flush in a game of video poker. In various embodiments, payout may include an amount paid based on a plurality of outcomes. For example, a player may play three simultaneous hands of video poker. The first hand may result in a flush with a payout of six credits, the second hand may result in a straight with a payout of four credits, and the third hand may result in a pair with a payout of one credit. The payout may thus be eleven credits for the plurality of outcomes. In various embodiments, a payout may include an amount paid for a complete game.

In various embodiments, a payout may include an amount actually due to a player, e.g., for having won a game. In various embodiments, a payout may include an amount that would be due to a player should a particular result or outcome occur. Thus, in various embodiments, a payout may be referred to in the abstract even when no player has actually won the payout.

Payout Table, Pay-Out Table, Pay Out Table, Pay Table, Paytable

As used herein the terms "payout table", "pay-out table", "pay out table", "pay table" and "paytable" may include a display, listing, or other indication of payouts, payments, or prizes that a player may win for each of one or more possible outcomes in a game. For example, a payout table may contain two columns. The first column may list possible outcomes that can be achieved in a game (e.g., "bar-bar-bar", "cherry-cherry-cherry"). The second column may list payouts that are associated with outcomes listed in the first column. For example, next to "bar-bar-bar" may be listed a payout of 100. Next to "cherry-cherry-cherry" may be listed a payout of 20. In various embodiments, a payout table may include several different payouts for each possible outcome. The particular payout applicable to an outcome may depend on other factors, such as the number of coins bet by a player. For example, upon receiving an outcome of "bar-bar-bar" in a game, a player may receive a payout of 100 if he has bet 1 coin, and a payout of 200 if he has bet two coins. In various embodiments, a payout table may refer to a set of associations between outcomes and payouts, even if such associations are never printed or displayed. For example, a computer memory may include a data structure which associates outcomes of a game with payouts. However, a list of associations may never be displayed to a player. In various embodiments, a payout table may include a formula or algorithm for deriving a payout based on an outcome of a game. For example, a payout table may indicate that a payout is 5 times the number of cherries symbols achieved in a game.

Outcome

As used herein, the term "outcome" may include a set of symbols or indicia which may be obtained (e.g., randomly generated; e.g., selected by a player) in a game (e.g., in a wagering game), and which may determine a course or direction in the game and/or which may determine a payment or prize to be awarded from the game. The term "outcome" may, in various embodiments, refer both to symbols and indicia and to the payment or prize awarded in a game. The term "outcome" may, in various embodiments, refer to the prize or payment awarded in a game. In various embodiments, multiple outcomes may occur during a game. For example, in a slot machine game, each activated pay-line may feature a different outcome. Further, in various embodiments, a game may include a succession of outcomes. For example, in a game of video poker, an initial set of five cards dealt to a player may constitute a first outcome. The final hand of cards obtained by the player after discarding cards from the initial set of five cards may constitute a second outcome. In various embodiments, the aggregate effect of several outcomes in a game may itself constitute an outcome. For example, in a slot machine game, a player may activate three pay-lines and may thereby receive three outcomes. Payouts associated with the three outcomes may be 2 coins, 5 coins, and 3 coins. Thus, the aggregate outcome of the game may be that the player receives a payout of 10 coins. Examples of outcomes include: (a) a set of symbols achieved across the pay-line of a reel slot machine; (b) a set of cards dealt in a game of poker; (c) a set of cards dealt in a game of blackjack; (d) a player hand in a game of blackjack; (e) a player hand in combination with a dealer hand in blackjack (i.e., an outcome in a game of blackjack may include cards received by a player and cards received by a dealer); (f) a number rolled in a game of craps; (g) a series of numbers rolled in a game of craps (e.g., in a game of craps, an outcome may include the entire series of numbers rolled between the time a player made a bet and the time the player was paid for his bet or lost his bet); (g) a set of numbers generated in a game of keno; (h) a prize amount revealed in a bonus round; and so on.

Gaming History (of a Player)

The gaming history of a player may include outcomes, results, and other events that have occurred in a player's games in the past. The gaming history of a player may include information about the following:

The last outcome achieved
The last X outcomes achieved
Any games, events, results, or outcomes that have occurred in the last hour
Any games, events, results, or outcomes that have occurred in the X period of time
Any games, events, results, or outcomes that have occurred in a player's trip, including any aggregate results of the player's trip (e.g., total winnings for the trip)
The player's gross winnings
The player's net winnings
Outcomes, net winnings, gross winnings, or any other statistic achieved over the player's lifetime
An amount of a buy in (e.g., an amount of money initially brought to a table by a player)
An amount of a cash out (e.g., an amount of a money with which a player leaves a gaming device, gaming table or gaming session)
Jackpots won by the player
The largest payouts received
Current credit balance
Amounts wagered per game
Which games were played
Playing strategies
Number of pay-lines
Rate of play
Number of games played
Number of games played in last X period of time
Preferred gaming device
Gaming device that gave the player the most favorable results
Game opponents
Dealers played against
Comps awarded This information may be stored in a computer database, in a paper file, or in other storage.

Tax Period

In various embodiments, the term "tax period" may refer to a period of time for which taxes are calculated. The period of time may represent a calendar year, for example.

W2G, W-2G

As used herein, the terms "W2G" and "W-2G" may refer to a form on which gambling winnings are reported to the Internal Revenue Service. For example, a player who has just won a jackpot in a casino may be required to fill out a W2G form before he can receive payment. The W2G may be used to report identifying information about a winner as well as an amount won.

Form 5754

As used herein, the term "form 5754" may refer to a form on which gambling winnings that have been won by a group or pool of people are reported to the Internal Revenue Service. For example, if five people jointly purchase a lottery ticket and win, a form 5754 may be filled out which identifies each of the five people, as well as the portion of the lottery win which will be received by each of the five people.

Form 1042-S

As used herein, the terms "form 1042-S" or "form 1042S" may refer to a form on which payments made to non-resident aliens are reported.

Form W-8 BEN

As used herein, the terms "form W-8 BEN" and "form W-8BEN" may refer to a form which is submitted to the Internal Revenue Service and which identifies the submitter as a non-resident alien.

W2G Requirements

In various embodiments, a player may be taxed for winnings received via gaming. For example, players may be taxed for winnings from slot machines, video poker machines, and from other gaming devices. Players may be taxed for winnings from sports bets, from horse races, from dog races, or from bets on other contests. In various embodiments, players may be taxed for any winnings.

In various embodiments, players may be legally required to report winnings from gaming on income tax returns. Players may be required to report such winnings on income tax returns filed with federal, state, and/or local governments.

In various embodiments, players may engage in gaming activities anonymously. For example, players may win money from games without ever providing their names or identities to anyone. Thus, players may have an incentive not to report winnings to government authorities so as to avoid having to pay taxes on the winnings. Players may reason that since no one knows who they are, no one will be able to prove that they have won money.

In various embodiments, players who are owed payout or other monies may be required to provide identifying information before the players can receive such payouts. For example, a player who has just won a jackpot may be required to disclose to a casino employee identifying information before the casino will pay the jackpot to the player. The player may thereupon provide the casino with, for example, his name and social security number in order to receive the jackpot. The casino may, in turn, report the player's identity and the amount won by the player to one or more governmental authorities.

Traditionally, various forms have been used for disclosing information about players to government authorities. Such information disclosed may include player identifying information as well as amounts won by the player.

1. TAX INDICATORS In various embodiments, a player may be provided with various indication of the tax implications of his play. The player may be provided with indications, for example, of what a payout would be after taxes, of what his current tax liability is, of a good strategy to use to minimize taxes, and so on.

1.1. OVERLAY OF PAYTABLE WITH TAXES OVER PAYTABLE WITHOUT TAXES In various embodiments, a player may be presented with a pay table. For example, a gaming device may include a printed sign or a display device showing a pay table. The pay table may be, for example, a list of outcomes and corresponding payout amounts. In various embodiments, a player may be presented with a first pay table that shows payouts before taxes. In various embodiments, a player may be presented with a second pay table that shows payouts after taxes. In various embodiments, the two pay tables may be shown near each other, in the same place (e.g., one is shown at a time in a given place), as part of the same pay table, or in any other relationship to one another. For example, a single pay table may list for each outcome a gross payout and then a payout after taxes. In various embodiments, several different items may be listed. For example, for each outcome in a pay table, a gross payout may be listed, a payout after taxes for an American may be listed, a payout after taxes for a non-American may be listed, a payout after taxes for a particular state may be listed, and any other payouts may be listed. For example, a particular outcome in the pay table may be "7-7-7". Next to the outcome may be listed a payout of 10,000 under a "Gross Payout" column, a payout of 7,800 under a "US Citizens" column, and a payout of 7000 under a "Foreign Nationals" column. The units may represent dollars, for example. Payouts other than gross payouts may represent: (a) the gross payout after taxes have been withheld; (b) the gross payout less a tax liability stemming from the payout; (c) the gross payout after taxes have been paid; and/or any other function of the gross payout; and/or any other amount.

1.1.1. TOGGLE BETWEEN ONE PAYTABLE AND THE OTHER In various embodiments, a display of a payout table may switch from showing one payout table to another. The two payout tables shown may represent gross payouts and payouts after tax implications. For example, a first payout table shown may show gross payouts. A second payout table shown may show the same payouts, but after taxes have been deducted. In various embodiments, the two payout tables may be shown in alternation. In various embodiments, a player may provide instructions to switch from one payout to another. The player may indicate such instructions, for example, by pressing a button on a stationary gaming device, or by touching a screen on a mobile gaming device. When a player provides an instruction, a payout table may switch from one that displays gross payouts to one that displays payouts after taxes. When the player provides another instruction, the display may switch back, and so on. In various embodiments, three or more payout tables may be available for display. The player may provide instructions to show a first, second, third etc. For example, the player may press a number on a keypad of his mobile gaming device in order to cause the mobile gaming device to display a payout table corresponding to that number. In some embodiments, the player may press a button instructing a stationary gaming device or mobile gaming device to display the next payout table. Thus, for example, a gaming device may display first a payout table with gross payouts. If the player presses a particular button once, the gaming device may switch and display a second payout table with payouts after taxes have been deducted for American citizens. If the player presses the particular button again, the gaming device may switch and display a third payout table with payouts after taxes have been deducted for foreign nationals. In various embodiments, a display or other indication of payout tables may switch between one payout table and another automatically. For example, every second, the payouts displayed may switch either from gross to post-tax payouts, or the other way around. In this way, a player may stare for a few moments at the display area for the payout tables and may in that time see both the gross payouts and the after tax payouts. In various embodiments, a casino attendant or other casino employee may wish to switch which payout table is displayed, e.g., at a stationary gaming device. For example, a casino attendant may possess a special key which he can insert into a gaming device. By turning the key, the casino attendant may be able to switch a display from a display of a payout table of gross winnings to a display of a payout table of winnings after taxes, or vice versa. In various embodiments, a casino attendant may simply insert a key and may then be able to access special functions of the gaming device. For example, after the key has been inserted, special menus may appear which allow the casino attendant to change a payout table, for example. In various embodiments, a casino attendant may be in possession of a special code. The casino attendant may enter the code into a gaming device, e.g., using a numerical keypad on the gaming device, and may thereby change a payout table which is displayed, or may perform other special functions at the gaming device which are not available to general players. In various embodiments, instructions to change a payout table may be transmitted from a central server to a gaming device. For example, a central server may transmit instructions to a gaming device to switch the display of a payout table from displaying gross payouts to displaying payouts after taxes.

1.1.2. SHOW POST TAX HOLD PERCENTAGE In various embodiments, a gaming device may indicate a hold percentage, payout percentage, and/or house edge that accounts for taxes. For example, suppose that a player would expect to lose 5% of each bet, on average, before taxes are accounted for. Suppose the top payout in a game is $2000, and that 30% of that payout would be withheld if the payout is won. Suppose further that the probability of occurrence of the top payout is 1/20,000. Suppose further that no other payouts would generate a tax liability. Due to this tax liability, the player can expect to lose an additional 30%×$2000×1/20,000, which equates to 3 cents, per game play. Thus, if the player is betting a dollar per game, the player could now expect to lose 8% of each bet, on average, after taxes. In various embodiments, a gaming device may indicate an after-tax hold percentage, after tax payout percentage, and/or after house edge in addition to indicating the same pre-tax. In various embodiments, the after tax payout percentage, hold percentage, and/or house edge may be indicated for a gaming device or for a mobile gaming device. In various embodiments, the after tax payout percentage, hold percentage, and/or house edge may be indicated in some other forum. For example, an after tax hold percentage for a gaming device may be published on the Internet or may be presented on a general information screen in a casino.

1.1.2.1. DEPENDING ON YOUR TAX PROFILE

In various embodiments, a payout percentage, hold percentage, and/or house edge may be shown to a player which depends on the player's particular circumstances (e.g., on the player's particular standing with respect to tax laws). For example, if the player is a U.S. citizen, the player may be presented with a first payout percentage, whereas if the player is a foreign national, the player may be presented with a second payout percentage. In various embodiments, a player may enter into a gaming device or mobile gaming device information which is pertinent to his tax status. For example, the player may press one of several buttons to indicate his particular tax status. Once the player has entered information pertinent to his tax status (e.g., his nationality), then the gaming device and/or mobile gaming device may present to the player a payout percentage, hold percentage and/or house edge which is determined based on the player's tax status.

1.1.3. INDICATOR OF WHAT MODE THE SLOT MACHINE IS IN (SHOWING PRE OR POST TAX PAYOUTS)

In various embodiments, a gaming device may show information related to payouts. The information may depend on whether the payouts are considered before or after taxes. For example, it may be possible for the same gaming device to show a payout table which represent payouts either before or after taxes. Thus, in various embodiments, a gaming device or mobile gaming device may provide an indication of whether payout information shown is based on pre-tax payouts or post-tax payouts. By receiving an indication, such as a visual or auditory cue, a player may better recognize what payout table or other payout table he is viewing at the moment.

1.1.3.1. GREEN OR RED DEPENDING ON MODE

In various embodiments, gaming device and/or mobile gaming device may display a different color depending on whether information related to payouts is based on pre-tax payouts or post-tax payouts. The color displayed may be a background color, a color of a display screen, a color of light emitting diodes on the gaming device, a color of neon lights on the gaming device, or the color of anything else displayed on the gaming device. In various embodiments, if a large portion of the gaming device displays or emits a certain color, then it may be more obvious to a player which pay table he is viewing (e.g., pre-tax versus post-tax). For example, a gaming device may display the color red as a background color when a pre-tax payout table is shown, while the gaming device may display the color green as a background color when a post-tax payout table is shown. In various embodiments, any color schemes or visual cues may be used to indicate the nature of a given payout table or of a given set of payout information that is being displayed. For example, a first set of visual cues may be displayed when pre-tax payout information is displayed, while a second set of visual cues may be displayed when post-tax payout information is displayed. In various embodiments, a number that represents a payout may be displayed in a different font or color depending on whether the number represents a pre-tax payout or a post-tax payout. For example, a number may be displayed in green if it represents a pre-tax payout while the number may be displayed in red if it represents a post-tax payout.

1.1.3.2. AUDIO INDICATOR

In various embodiments, a gaming device may emit different audio effects depending on that nature of payout information shown. For example, the gaming device may emit a first tone if a payout table is shown with pre-tax payouts, while the gaming device may emit a second tone if a payout table is shown with post-tax payouts. As will be appreciated, any two differing audio tracks may correspond to two different payout tables, or to two different sets of payout related information (e.g., pre-tax payouts versus post-tax payouts).

1.2. CHANGING THE PAYOUT TABLE FOR NEW LAWS

From time to time, tax laws may change. Thus, in various embodiments, a payout table that represents payouts after taxes may be changed so as to fall into alignment with new tax laws. In various embodiments, new tax laws may be determined. Such laws may be determined, for example, by the counsel of a gaming establishment. The counsel or another casino employee may then enter descriptions of the new laws into the central server. The casino attendant may, for example, interact with a program which asks leading questions so as to discern the new tax laws. The program may ask to whom new laws are applicable. Possible answers may include U.S. citizens, foreign nationals, residents of a particular state, residents of a particular city, people within a particular income bracket, and so on. The program may then ask for threshold payouts above which winnings must be reported to governmental authorities. For example, the program may ask the casino attendant to enter a dollar figure such that any payouts above that dollar figure must be reported. An exemplary dollar figure would be 1500, for example. The program may then ask about how much will be withheld in taxes. For example, the program may ask for the percentage that will be withheld from a player for a payout. An exemplary withholding percentage may be 28%. The program may ask various other questions. The program may have default answers that are based on prior tax laws. The casino attendant need only change those default answers that have changed in the laws.

In various embodiments, a central authority, such as a distributor of software used by casino central server, may update the software periodically to reflect changes in tax laws. The updated software my provide to a central server that has been using the old software. Thus, a central server may receive automatic updates of tax laws.

In various embodiments, once tax laws have been updated with a central server, the central server may instruct one or more gaming devices to alter their payout tables. The central server may calculate a new payout table for a gaming device based on the new tax laws, for example. The central server may then transmit an indication of the new payout table to one or more gaming devices where that payout table is used. For example, suppose a change in tax laws requires that 40% of the payout be withheld for payouts over $1500 be withheld, whereas the prior tax laws required that only 30% of the payout be withheld for payouts over $1500. Suppose further that a particular gaming device has a top payout of $2000, with the next highest payout being $1000. For this top payout, the payout after withholdings will change from $1400 (i.e., $2000−30%×$2000) to $1200 (i.e., $2000−40%×$2000). Thus, the central server may instruct this particular gaming device to change its display of an after-tax payout table.

1.3. PAYOUT TABLE THAT CASINO REPORTS, VERSUS PAYOUT TABLE THAT YOU OWE TAXES FOR In various embodiments, a first payout table may show amounts a player will receive after any withholdings made by the casino for tax purposes. A second payout table may show amounts a player will receive less any amounts the player will owe in taxes. The difference between the first payout table and the second payout table may be due to the fact that the casino may not withhold all the taxes that will be owed by the player. Thus, the second payout table may feature at least one payout which is lower than the corresponding payout shown in the first payout able. For example, in the first payout table, the payout for the outcome "bar-bar-bar" may be 10. Thus, the first payout table may indicate that if the player achieves an outcome of "bar-bar-bar", the player will be paid 10 coins from the gaming device. The second payout table may show a payout of 7 for the outcome "bar-bar-bar". The number 7 may indicate that the player's payout less any tax liability stemming from the payout will be 7 coins. The player may actually be paid 10 coins, but may subsequently be responsible for paying three of those coins in taxes.

1.4. SHOW CURRENT STATUS In various embodiments, a player may be shown information pertaining to his current tax status. For example, as a player engages in a game play at a gaming device or at a mobile gaming device, the player may be shown information pertaining to his tax status. The player may also be shown information pertaining to his tax status at any other time or in any other location. For example, the player may have an account with a casino. The player may log in to his account from a remote computer (e.g., from his home computer) and view information about his tax status. The player may also view information from a hotel TV, from a kiosk, or from any other place.

1.4.1. CURRENT WINS AND LOSSES In various embodiments, a player may view information about his current wins and losses. Information about a player's current wins and losses may be stored on a casino server. For example, as long as a player has his player tracking card or player rewards card inserted into a gaming device, the casino server may track the player's wins and losses during player at the gaming device. Similarly, a player may be recognized by a mobile gaming device. For example, the player may be required to supply biometric information or other identifying information in order to be allowed to play on a mobile gaming device. Thus, the mobile gaming device may recognize the player and may track the player's wins and losses during play. Information about the player's wins and losses may be uploaded to a casino server. In some embodiments, the player may play anonymously. That is, for example, a player may engage in play at a gaming device without having provided any identifying information. The players' wins and losses may still be tracked for his playing session, but may not be tallied together with other wins and losses the player has generated, e.g., at other gaming devices. In various embodiments, a player may view information about his wins and losses. The information may be downloaded from a casino server, for example, where the information has been stored. The information may then be presented to the player at his gaming device, mobile gaming device, computer terminal, or at any other location. The player may also be presented with win and loss information in audio format. For example, the player may call up a particular phone number, enter identifying information, e.g., a password, and thereby here a computer generated voice that provides him with win and loss information.

A player may view win and loss information as it pertains to his current tax situation. In some embodiments, the player may view wins or losses accumulated since the beginning of the year. Thus, for example, the player may be told that he has won $1250 since the beginning of the year. In another example, the player may be told that he has lost $300 since the beginning of the year. In various embodiments, a player may be informed of his winnings and losses obtained only within a certain jurisdiction. For example, the only winnings and losses relevant to taxes paid in a particular city may be those winnings and losses obtained in that city. The same may apply for a particular state, country, or other geographic region.

In various embodiments, the player may view win and loss information only for taxable games. For example, a player might participate in a game which is run for charitable purposes. The player's winnings from the game may not be subject to taxes. Thus, in some embodiments, a player may view win and loss information only for taxable games.

1.4.2. CURRENT TAX BURDEN In some embodiments, a player may view information about his current tax liabilities. In some embodiments, a player may view information about his current tax liabilities with respect to gaming activities. A player may be shown a number which represents the amount of taxes he owes. In some embodiments, a player may be shown separate numbers for taxes he owes to different governmental entities. For example, the player may be shown a first number representing how much he owes in taxes to the Federal government, and a second number representing how much he owes in taxes to a state government.

1.4.2.1. NEGATIVE TAX BURDEN In some embodiments, a player may have no tax burden. In some embodiments, a player may have sustained losses that can be used to offset future winnings for tax purposes. In such case, a player may effectively have a negative tax liability. Thus, in some embodiments, a player's tax liability may be shown as a negative. The negative tax liability may mean that the player may sustain winnings in the future without owing additional taxes.

1.4.2.2. DEPENDENT ON PLAYER INFORMATION In some embodiments, a player's current tax burden or tax liability may be dependent on the player characteristics. For example, a player's tax burden may be dependent on his country of origin, his citizenship status, his income, his marital status, his number of children, his home ownership status, or on any of a number of other factors. Thus, in some embodiments, a gaming device and/or the central server may calculate a tax burden for a player which is dependent on information about the player. The information may have been supplied in advance by the player, such as when the player first opened up an account with the casino. The information may be supplied by the player at the time he requests information about his tax burden. For example, the player may select an option on a mobile gaming device that he is playing asking for his tax burden to be displayed. The mobile gaming device may thereupon ask the player to supply additional information, such as information about his location or residence and his income. The player may then supply the information. The mobile gaming device may transmit the information the central server. The central server may then calculate a current tax burden for the player. The central server may then transmit an indication of the current tax burden to the mobile gaming device. The mobile gaming device may then display the current tax burden.

1.4.2.3. PROJECTED TAX BURDEN In various embodiments, a gaming device, mobile gaming device, or other device may display or present a projected tax burden for a player. The projected tax burden may take into account a player's historical rate of play, a historical strategy used, amounts wagered, frequency of visits to a casino, and any other historical information about a player. A casino server may derive a projected tax burden by extrapolating historical information into the future. For example, the casino server may assume that the player will wager the same total amount per month for the rest of the year as he has already since the beginning of the year. The casino server may further assume that the player will use the same strategy that he had been using since the beginning of the year (e.g., that the player will continue to use basic strategy in blackjack if he has been using such strategy since the beginning of the year). In various embodiments, a central server or other device may extrapolate forward a player's rate of winning. For example, if the player has won $1000 in the first three months of a year, the central server may assume that the player will also win $1000 in each subsequent quarter of the year. Thus, the central server may assume that the player will have won a total of $4000 by the end of the year. In various embodiments, a casino may extrapolate forward a player's rate of play, but may assume statistically average game results. Thus, for example, a casino may assume that a player will lose an amount equal to the house edge on every subsequent game played in the year. If the player is expected to play different games with varied house edges, then the casino may assume that the player will lose an amount per game equal to an average or weighted average of the house edges from the different games. In various embodiments, a player may be shown a current tax burden. In various embodiments, a player may be shown a projected tax burden. In various embodiments, a player may be shown both of a current and projected tax burden. In various embodiments, a player may be allowed to enter his own assumptions about future play characteristics. For example, the player may enter that he assumes will win an aggregate of $2000 over the rest of the year. The player may then be presented with what his tax burden would be assuming his assumptions hold true.

1.4.3. TAXES APPLICABLE TO YOU In various embodiments, absent any particular information received about a player, the central server may assume a set of default characteristics about a player. The central server may, accordingly, present a tax burden that would be borne by a default or typical player with the winnings and losses known to the central server. The central server may assume, in one example, that a default or typical player is an American citizen living in California. Of course, other default assumptions are possible, and may be dependent on the location of the casino. For example, a casino in New Jersey may assume that the default or typical player is from New Jersey, whereas a casino in Las Vegas may assume that the typical player is from California.

1.5. SUGGEST TAX EFFICIENT BETS In various embodiments, a casino server, gaming device, mobile gaming device, or other device or other entity (e.g., a casino attendant) may suggest a bet or a strategy to a player based on the player's current tax status, circumstances and/or situation. For example, the same bet may have different consequences depending on whether a player has accumulated net losses or net wins for the year.

1.5.1. BET MORE IF YOU ARE LOSING BECAUSE WINNINGS ARE "TAX FREE" In various embodiments, a gaming device, mobile gaming device, or other device or entity may suggest the player make a particular bet only if the player has accumulated net losses for a tax period. For example, if the player has lost money gambling since the beginning of the year, the player's gaming device may suggest that the player increase his bet size. The rationale may be that, having accumulated losses, the player's subsequent wins will be "tax free". In other words, the player has already accumulated losses which will offset future winnings, thus the player may stand to win more with each bet than he would if he had accumulated winnings for the tax period. In various embodiments, a gaming device (or other device or entity) may suggest to a player a bet that is of a particular size (e.g., a bet of $2), a bet that is a particular function of the bet size of a prior bet (e.g., the gaming device may suggest that the player double the amount of his previous bet or of his typical bet), a bet with a likely payout that would still not put the player ahead for the tax period (e.g., the gaming device may suggest a bet with a maximum payout of $1000 if the player's losses for the year so far are only $1000), and/or any other bet or type of bet.

In various embodiments, a central server, gaming device, or other entity may not know for sure what a player's tax situation is. For example, a gaming device may know about a player's wins and losses for the session at the gaming device, but the gaming device may now know whether the player has accumulated wins or losses at other gaming devices, at other casinos, and/or in other ways unknown to the gaming device. Therefore, in some embodiments, a gaming device may ask a player to provide information which would indicate that player's tax status. In some embodiments, the gaming device may assume that the information about which it is aware represents all information necessary to accurately portray the player's tax status. For example, the gaming device may assume that losses accumulated by the player in the casino where the gaming device resides represent all losses accumulated by the player in any gaming venue.

- 1.5.1.1. THERE IS A THRESHOLD. E.G., SUGGEST INCREASING BETS ONLY IF LOSSES ARE LESS THAN $500 In various embodiments, a gaming device, mobile gaming device, or other entity may suggest that a player increase his bets only if the player's accumulated losses are greater than a certain threshold. For example, a gaming device may suggest that a player increase his bets only if the player has lost more than $500 in a taxable period.

1.5.2. GOOD TIMES TO MAKE SUGGESTIONS OR OFFERS In various embodiments, a gaming device, mobile gaming device, casino server, or other entity may make betting suggestions for a player at particular times. A gaming device (or other entity) may suggest a new bet or betting strategy when a player's results for the year switch from net winnings to net losses, or vice versa. A gaming device may suggest a new bet or betting strategy when a player switches games. For example, a gaming device may suggest that a player reduce his bet if a top payout is higher in the new game, so as to reduce the chances of immediately turning accumulated losses into accumulated wins and thereby generating tax liabilities.

1.6. PITCH SOMETHING IN A FAVORABLE WAY. In some embodiments, a player's current tax status or situation may be presented to the player in a favorable light. In some embodiments, a player may have accumulated winnings but may have had some of his winnings withheld for tax purposes. The casino may then pitch to the player that the player stands to receive some of his withheld money back in the event that he loses. Thus, for example, suppose that a player has won $10,000 but has had $2800 withheld. The player may thus have a remaining balance of funds or casino credits of $7200. The casino may pitch to the player that the player may lose the entirety of his current balance, but still have money remaining. For example, the casino may tell the player that he can lose $7200, but still have $2016 left. Thus, a player may be encouraged to engage in further gaming activities when he is ahead, because, in the unfortunate event he loses, he will still be returned some of his withheld tax money.

1.7. POINT YOUR MOBILE GAMING DEVICE AT A GAMING DEVICE TO SEE THE AFTER TAX PAYOUTS In various embodiments, a player may view alternate payout tables for a gaming device using the player's own mobile gaming device. For example, to view an after-tax payout table of a gaming device, the player may point a mobile gaming device at the gaming device. The mobile gaming device may exchange information with the gaming device. For example, the mobile gaming device and the gaming device may transmit information back and forth using infrared signals. The mobile gaming device may download information about the gaming device's payout table. The mobile gaming device may then calculate an after-tax payout table for the player, and may display such a table. The mobile gaming device may, in particular, calculate an after-tax payout table based on information the player has previously provided to the mobile gaming device (e.g., information about the player's nationality or place or residence). In various embodiments, a stationary gaming device, the casino server, or some other entity may calculate the after-tax payout before it is transmitted to the player.

1.8. DISCLAIMER, DO NOT TAKE THIS TAX ADVICE AS LEGAL ADVICE In various embodiments, a casino may suggest bets to make, betting strategies to employ, or other strategies to use so as to gain advantage from a player's current tax situation. In various embodiments, the casino may wish to provide a disclaimer to the effect that the suggestions do not constitute legal advice. In various embodiments, a casino may provide a disclaimer with one or more of the following points: (a) suggestions provided do not constitute legal advice; (b) suggestions provided to not constitute financial advice; (c) it is recommended that a player consult an accountant; (d) it is recommended that a player consult a financial professional; (e) it is recommended that a player consult a tax professional; (f) it is recommended that a player consult a lawyer; (g) suggestions given to the player are based only on information known about the player—it is recommended that the player take into account additional information if he knows about it; and any other points. A disclaimer may be presented to the player in conjunction with a betting suggestion. For example, a gaming device may display in text on a display screen a betting suggestion as well as a disclaimer.

2. TAX ESCROW ACCOUNTS In various embodiments, certain monies may be withheld from a player for tax purposes. The money may be held in escrow in case the money needs to be paid in taxes. However, the money may be returned to the player later in case the player turns out to be a money loser for the year. In various embodiments, a statistically large enough amount of money may be kept in an escrow account on behalf of the player in order to cover his anticipated tax liabilities. The anticipated tax liabilities may take into account the player's patterns of play and the amount of time left in the year. For example, even if the player is well ahead for the year already, it may be projected that the player will lose money by the end of the year since the player tends to play very frequently and since the game odds are generally against the player. In various embodiments, enough money may be kept in escrow to cover the player's tax liabilities with 80% certainty, or with some other predefined percentage certainty. For example, $1000 may be kept in escrow on behalf of the player if it is anticipated that, with the player's current play patterns, the player has an 80% chance of owing $1000 or less based on his gaming winnings. In various embodiments, as a player's fortunes change, more money may be withheld from the player into the escrow account, or money may be returned to the player from his escrow account. For example, if there is $1000 in escrow from a player, but the player's losses have exceeded $5000, then most of the money may be returned to the player because it may be anticipated that the player is unlikely to have a tax liability for the year. In various embodiments, money may be withheld from the player and added to the escrow account, or returned to the player from the escrow account every game. For example, if a player wins a game, then some of the player's winnings may be withheld and put into the escrow account. However, if the player loses, then some of the money in the escrow account may be returned to him. In various embodiments, at the end of a year, or at the end of some other tax period, money in a player's escrow account may be automatically provided to the Internal Revenue Service or to some other governmental authority. Any money remaining in the escrow account may be returned to the player.

3. TURBOTAX In various embodiments, software may assist a player in preparing tax returns based on the player's gaming results. In various embodiments, the software may be an add-on module to an existing tax preparation software package, such as TurboTax. In various embodiments, the software may be a standalone module. In various embodiments, the software may provide a player with a series of prompts. The prompts may ask the player various questions. The prompts may ask the player to enter various information.

Environment According to Some Embodiments a. In various embodiments, the Nevada Gaming Control Board (NGCB) and casino policy may allow electronic capture and storage of Internal Revenue Service (IRS) forms and a player signature.

b. In various embodiments, an image of a player signature may be used to generate a signature on a document. For example, an image of a player signature may be electronically copied onto an image of an IRS document.

c. In various embodiments, a casino, casino server, gaming device, mobile gaming device, or other entity may generate required IRS forms from player information and the image of the player's signature. In various embodiments, such form generation may be allowable by both the NGCB and casino operators.

Gaming System According to Some Embodiments a. In various embodiments, a gaming system may determine whether or not a win has been achieved.

b. In various embodiments, a gaming system may have functionality to determine whether a win is considered an event that would require a player to fill out a form, such as an IRS form.

c. In various embodiments, a gaming system may include functionality to determine a player's alien status.

d. In various embodiments, a gaming system may include functionality to determine the proper withholding percentage of a win based on a player's alien status, determine required tax forms that must be filled out, and withhold the proper amount if required (e.g., by tax laws).

e. In various embodiments, a gaming system may include functionality to store tax forms.

f. In various embodiments, a gaming system may include functionality to capture and store signed W-2G and 1042-S forms.

g. In various embodiments, a gaming system may include functionality to electronically file W-2G and 1042-S forms.

h. In various embodiments, a gaming system may include database tables to support the functionalities described above.

Figure 51:
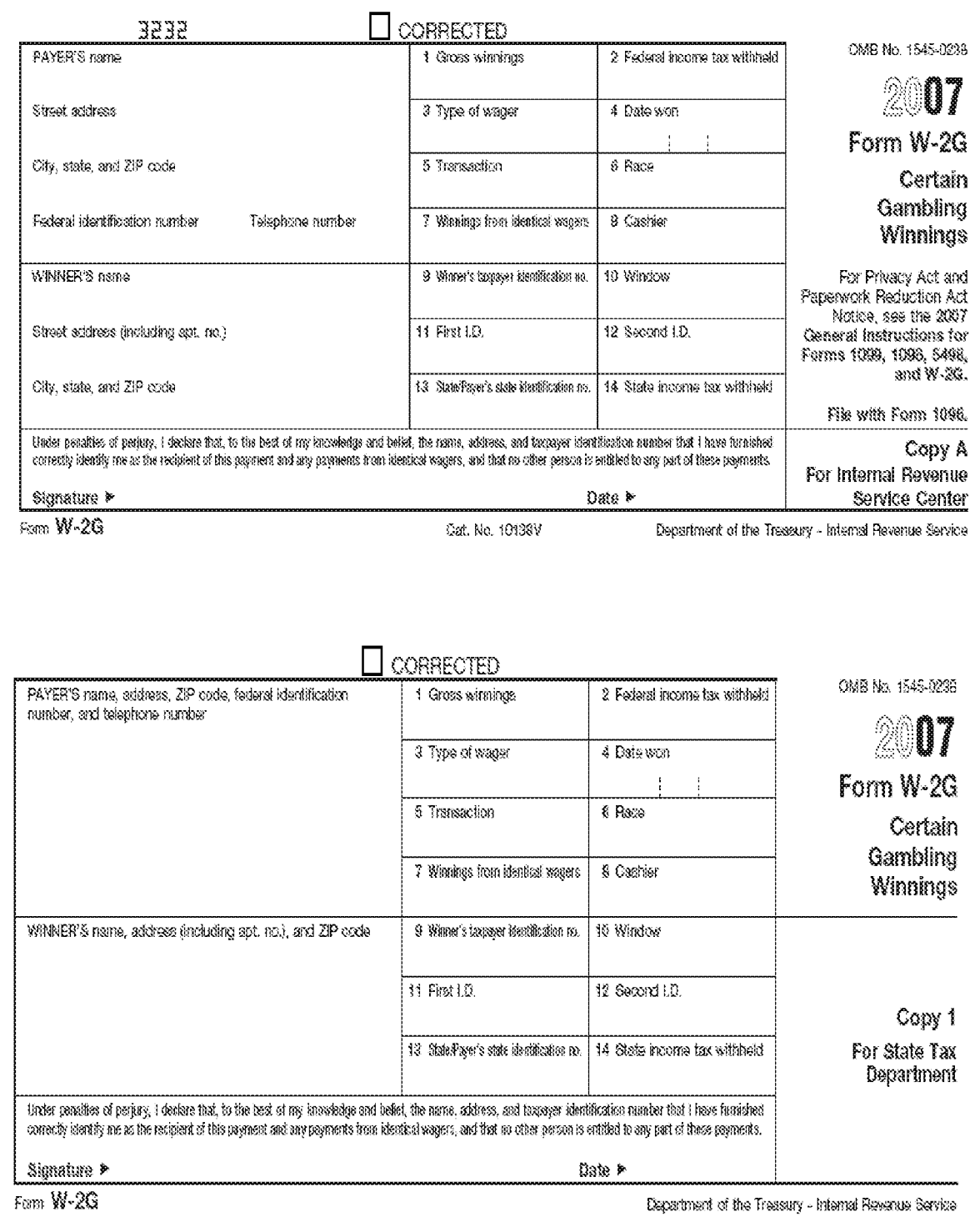

Process According to Some Embodiments a. In various embodiments, a player may be required to fill out and sign a W-2G Form when he registers if he is a US citizen. FIG. 51 shows the W-2G form according to some embodiments.

b. In various embodiments, a player may be required to fill out a W-8 BEN and 1042-S when he registers if he is a non US resident alien but a citizen of a country with Tax Treaty agreement with the US. FIG. 52 shows the W-8BEN form according to some embodiments. FIG. 53 shows the 1042-S form according to some embodiments.

c. In various embodiments, a player may be required to fill out a 1042-S when he registers if he is a non US resident alien and a citizen of a country with no Tax Treaty agreement with the US FIG. 53 shows the 1042-S form according to some embodiments.

d. In various embodiments, a gaming system may include screens, tabs, or areas with player information which include forms. The individual forms may be viewable in by the player, by a casino employee, by a system administrator, or by another party as appropriate.

e. In various embodiments, a gaming system may dynamically populate form fields using pertinent player information and signature, win information, and payer (casino) information from a database when any of the forms are viewed.

f. In various embodiments, a gaming system may send W2G or 1042-S copies to players via their preferred contact method. The system may use a postal address as the default if a player doesn't have an e-mail address on file.

g. In various embodiments, a gaming system may trigger the filling out of a W2G form when a player wins an amount equal to or greater than $1,200.00, or any other appropriate threshold.

h. In various embodiments, a gaming system may institute a withholding rate of 28% on a US resident alien player if he did not fill out and sign a W-2G Form during registration. The gaming system may also withhold a portion of winnings if the player did fill out a W-2G form but did not furnish his Social Security Number or Tax Identification Number. In various embodiments, the gaming system may institute instructions and procedures detailed on Forms W-2G and 5754.

i. In various embodiments, a gaming system may institute a withholding rate of 30% on a non US resident alien player and a bona fide citizen of a country with no US Tax Treaty agreement. This withholding may apply whether the player refused to fill out and sign a 1042-S form. If the player refuses to fill out or sign the form then the form may be filled out by a casino employee and the appropriate amount may be withheld. In various embodiments, the gaming system may also require the player to fill out and sign form 1042-S. In various embodiments, the gaming system may institute instructions and procedures found on form W-8BEN.

j. In various embodiments, a gaming system may determine whether or not player is a non US resident alien and a bona fide resident of a country with a tax treaty with the U.S. Countries with a tax treaty may include: Austria; the Czech Republic; Denmark; Finland; France; Germany; Hungary; Ireland; Italy; Japan; Latvia; Lithuania; Luxembourg; the Netherlands; the Russian Federation; the Slovak Republic; Slovenia; South Africa; Spain; Sweden; Tunisia; Turkey; Ukraine; and the United Kingdom. However, in various embodiments, the gaming system may institute a withholding rate of 30% if the player does not have a W-8BEN Form filled out and signed on file or if he refuses to fill out and sign one when the event (e.g., a large winning event) occurs. In various embodiments, the gaming system may also require that a 1042-S form is filled out and signed by the player. In various embodiments, the gaming system may institute instructions and procedures found on form W-8BEN.

The following are embodiments, not claims:

A. A method comprising:
  determining a potential outcome of a game;
  determining a first payout corresponding to the outcome;
  determining a tax rate (e.g., 30%; e.g., 35%);
  determining a second payout corresponding to the outcome, in which the second payout is determined based on the first payout and the tax rate;
  displaying the first payout at a particular location at a first time; and
  displaying the second payout at the particular location at a second time. For example, a gaming device may alternate between displaying the first payout and displaying the second payout.

B. The method of embodiment A in which determining a potential outcome of a game includes determining three symbols that may line up across a pay-line of a gaming device (e.g., "cherry-cherry-cherry").

C. The method of embodiment A in which determining a first payout corresponding to the outcome includes determining a first amount that will be owed by a casino should the outcome arise in the game. For example, the casino may owe 100 should the outcome arise in the game. The casino does not necessarily owe all 100 to a player, however. Instead, the casino may owe a portion of the 100 to the player and a portion of the 100 to the Internal Revenue Service or to some other governmental authority.

D. The method of embodiment A in which determining a tax rate includes determining a percentage of the first payout that will be owed to a governmental authority should the outcome arise in the game (e.g., 30%; e.g., 28%; e.g., 35%).

E. The method of embodiment A in which determining a second payout includes determining a second payout corresponding to the outcome, in which the second payout is determined as the difference between the first payout and the product of the first payout and the tax rate. For example, if the first payout is 100 and the tax rate is 30%, then the second payout may be 100−30%×100, or 70.

F. The method of embodiment A in which the second payout represents an amount that a player will actually receive should the outcome arise in the game. For example, the portion of the first payout that the player does not receive may instead by paid to a governmental authority.

G. The method of embodiment A in which displaying the second payout at the particular location at a second time includes displaying the second payout at the particular location at a time other than at the first time.

H. The method of embodiment A further including:
  receiving, after displaying the first payout, an instruction from a player to display the second payout; and
  displaying, in response to the received instruction, the second payout at the particular location at the second time. For example, a player may provide an instruction to display payouts after taxes. Thus, a gaming device may switch from displaying payouts before taxes to displaying payouts after taxes.

I. The method of embodiment A further including,
  displaying a first color scheme at the first time; and
  displaying a second color scheme at the second time. For example, a gaming device may show a background color of green when displaying the first payout, and a background color of red when displaying the second payout.

J. The method of embodiment A further including determining information about a player, in which determining a tax rate includes determining a tax rate based on the information about the player.

K. The method of embodiment A in which determining information about a player includes determining at least one of: (a) the player's nationality; (b) the player's residence status; (c) the player's citizenship; (d) the player's home address; (e) the player's home state; (f) the player's home city; (g) the player's home county; (h) the player's income; (i) the player's age; (j) the player's accumulated wins and losses over a particular period of time; and (k) the player's home country.

L. The method of embodiment J in which determining information about a player includes:
  determining a home country of the player; and
  determining whether the home country of the player participates in a tax treaty with the United States.

M. The method of embodiment J in which determining information about a player includes accessing a database containing information previously provided by the player. For example, the player may have previously provided information about himself when checking into a casino hotel or when signing up for a player tracking card.

N. The method of embodiment J in which determining information about a player includes:
  presenting a message to the player asking for information about the player; and
  receiving from the player an indication of information about the player. For example, a gaming device may display a message asking a player for information about himself. The player may enter information about himself using a keypad of the gaming device, for example.

O. A method comprising:
  determining a gaming history of a player;
  determining an amount of taxes owed by the player based on the gaming history of the player;
  presenting to the player an indication of the amount of taxes;
  determining a course of action for the player to take based on at least one of the gaming history of the player and the amount of taxes; and
  presenting to the player the course of action.

P. The method of embodiment O in which determining a gaming history of the player includes determining an accumulated amount of money won for a tax period. For example, determining a gaming history of a player may include determining how much the player has won since January first of the current year.

Q. The method of embodiment O in which determining a gaming history of the player includes determining an accumulated amount of money lost for a tax period.

R. The method of embodiment O in which determining a course of action for the player to take based on at least one of the gaming history of the player and the amount of taxes includes determining a first bet size for the player if the amount of taxes is a first amount, and determining a second bet size for the player if the amount of taxes is a second amount. For example, a gaming device may determine that a player should bet $1 if the amount of taxes is 0, but $2 if the amount of taxes is $300.

S. The method of embodiment O in which determining a course of action for the player to take based on at least one of the gaming history of the player and the amount of taxes includes determining a first bet size for the player if the gaming history of the player shows the player has accumulated net winnings for a tax period, and determining a second bet size for the player if the gaming history of the player shows the player has accumulated net losses for the tax period. For example, a gaming device may determine that a player should bet $1 if the player has net winning, but $2 if player has net losses.

T. The method of embodiment O further including presenting to the player a disclaimer in conjunction with presenting the course of action. The disclaimer may, for example explain that any suggestions as to a bet size are not to be construed as legal device.

The following sections I-X provide a guide to interpreting the present application.

I. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

II. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

III. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way. Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth☐, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function. Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Various Embodiments

Game in the Different Environments

In various embodiments, a gaming system provides a platform for rapid play of card games, for maintenance of proper odds in games, for more easy viewing of the gaming experience by a player, for remote playing by a player, for allowing players to play each other when the players are not near each other, and for other benefits.

In various embodiments, a computerized gaming system manipulates electronic representations of cards. The gaming system may randomly determine an order of cards, using e.g., pseudo random algorithms. The gaming system may then deal cards to one or more players by sequentially dealing the cards to one or more players and/or to a house or dealer. Depending on the game, players may make one or more bets. Bets may be keyed in using any of a number of possible interfaces, such as buttons, touch screens, computer mice, trackballs, and so on. Depending on the game, players may make one or more decisions in a game, including decisions concerning whether to be dealt another card, whether to fold, whether to split their hands, or whether to make any other appropriate decision. Players may make decisions using any number of interfaces, such as using computer mice, buttons, touch screens, trackballs, or any other interfaces.

In various embodiments, a computer system reshuffles cards after each game, or after a small number of games. The reshuffling may be performed electronically, and so may occur near instantaneously. This may save time over a shuffling process that would be performed with a physical deck of cards.

Reshuffling a deck of cards after each game may ensure that odds in each game remain constant or relatively constant. For example, if cards are reshuffled after every game, then counting strategies used in blackjack or other card games may be rendered less effective or completely ineffective.

In various embodiments, cards numbered 1 through 6, or equivalently labeled, for example are used to play a game of craps or to play another dice game. For example, in a game of craps, a "roll" is simulated with the deal of two cards. As will be appreciated, each roll of the dice is considered to be an independent, random event. However, with a deck of cards used to conduct a game of dice, one could in principle make a prediction as to the next deal based on previous cards dealt. This is because each card dealt alters the composition of the remaining deck by depleting the deck of one card, now known.

A computerized system according to various embodiments may allow games using cards to more closely simulate games using dice. The computerized system may do this, in some embodiments, by frequently reshuffling electronic decks, so that new cards dealt are independent of prior cards dealt, just as new rolls of dice would be independent of prior rolls of dice.

Infinite Deck of Cards

A computerized system may also simulate an infinite deck or a very large deck of cards. An infinite deck or very large deck may be impractical with respect to a physical deck of cards. To simulate an infinite deck of cards, a computer system may deal a randomly chosen card when required. However, after each card is dealt, the computer may make no change to its selection process, e.g., the computer may make no assumptions that a deck of remaining cards has been depleted. Thus, the computer may, on the next card, deal the exact same card that it had previously dealt. As will be appreciated, there may be other ways of simulating an infinite deck. When an infinite deck is used, the odds of certain cards being dealt do not depend on what cards have previously been dealt. Thus, an infinite deck may be used to closely simulate a game of dice.

Magnification A computer system for playing card games according to various embodiments, features a zoom or magnification option. A player can press a button to increase the size of cards displayed on his screen. The player may further touch particular cards on a touch screen, or otherwise indicate such cards. The cards that a player has indicated may expand in terms of their display size on a display screen, so that they are more easily visible to a player. The player may also reduce the size of cards or other items displayed, e.g., so as to increase his field of the game. For example, where a player is playing against multiple opponents, the player may shrink the view of an individual opponent's cards so as to be able to see all opponents' cards at once on the same display screen.

In various embodiments, a game may be played at a physical gaming table. The table may include a felt tabletop with markings, chip racks, seats, positions for players and positions for dealers. However, some players at the table may be visually challenged and unable to see cards, bets, or other items at the table. According to some embodiments, a camera or other imaging device may capture an image of the table. The image may be displayed on a monitor or other display screen proximate to the player. The player may be able to change the magnification of the image by zooming in or zooming out. Thus, a visually impaired player may still be able to follow the action at a table my referring to a display screen where he can magnify an image of the display screen.

Simultaneity

In various embodiments, a computer system is designed to allow simultaneous actions or decisions by players in a game. In some embodiments, players compete against one another in a card game using the rules of blackjack, for example. Players bet and raise each other by putting money into a pot. The winning player is the player who has a hand with the point total closest to 21 without exceeding 21. In some embodiments, games can be played with different maximum point totals, e.g., with 22 as a maximum point total. In any event, in such a game, a first player may derive an advantage by delaying a decision to hit or stand until he has seen whether or not another player has chosen to hit or stand. Thus, to prevent any one player from deriving an advantage, game rules may dictate that all players in game should make a particular decision (e.g., a hit/stand decision) simultaneously, or at least without knowledge of other players' hit stand decisions.

In various embodiments, a computer system may receive decisions from multiple players in a game. As the computer system receives each decision, the computer system may store the decision in a computer memory. The computer may track how many player decisions have been received. When all player decisions have been received, the computer system may reveal all decisions to all players, such as by showing the words "hit" or "stand" on a diagram representing player positions at a virtual table and/or by showing the actual cards.

In various embodiments, each player in a game may be prompted to make a decision in turn with the decision not being made known or only partially known to other players. For example, a player may make a hit decision, with the resulting card being shown only to that player. Alternatively, the player may make the hit decision, with the resulting card being shown only to that player but with other players receiving an indication of the decision. In either case, another player may then be prompted to make a hit decision, either having no or only limited knowledge of the pervious hit decision (i.e., when an indication of the decision was at least provided). At some later time, such as at the end of the game, for example, all cards may then be made visible to all players.

In a similar fashion, in various embodiments a computer system may allow simultaneous bets to be placed. For example, all players in a game may simultaneously make the decision to bet or not and when all player decisions have been received, reveal all decisions/bet amounts to all players. Thereafter, a player(s) that entered a lesser amount than another may be prompted to fold or enter an additional bet such that all players have entered an equal amount, for example. In this way, no one player can gain an advantage by watching others bet before making his decision to bet.

People Don't Touch Cards

In traditional games of blackjack, it may not be desirable to allow players to touch cards. When players touch cards, there is a risk that the players will mark the cards or even replace the cards with card that are more to their benefit. In traditional games of blackjack, cards are dealt face up, so there is no particular need for a player to touch a card, because the player can see everything he needs to know about the card without touching it. However, if cards were dealt face down, a player may be unable to see the card without touching it.

Computer systems according to various embodiments allow certain cards to be visible only to an individual player, and not his opponents, while still making it unnecessary for a player to touch his cards. A computer system according to various embodiments allows players to play blackjack against one another, for example. Each player is dealt at least one card which he is privileged to know, but which no other player knows. The system allows players to play at remote devices, terminals, computers, mobile gaming devices, or other interfaces. Since the players are separate from one another, cards can be displayed on a first player's terminal without risk that the cards would be visible to other players. A given player's terminal may display some of the cards belonging to other players, but not all cards belonging to other players. For example, in a game of blackjack, each player may begin with a hand in which one card is private (visible only to that player) and in which one card is public (visible to all players) and/or may receive a hit that is kept private (visible only to that player) or public (visible to all players). At some later time, such as at the end of the game, for example, all cards may then be made visible to all players.

Interface screens used with the computer system may thus display cards for players to see privately, without the necessity of players touching cards.

In some embodiments, a physical table, such as a blackjack table, may include display screens. However, the screens may be viewable from only a very narrow viewing range, e.g., due to barriers placed along the sides of the display screen.

Such screens may also allow players to privately view cards without the necessity of having them touch cards.

In various embodiments, any device that includes a display (e.g., a mobile gaming device; e.g., a slot machine; e.g., a personal computer) may display some or all cards dealt in a game. For example, a mobile gaming device may display not only the cards dealt to a particular player, but may also display cards dealt to all other players. For instance, in the early phases of a game, a player may be able to see only the cards in his own hand. However, at the end of a game, a central server may transmit to all player devices an indication of all cards that had been dealt to all players in the game. Each player device may then display the cards of every player in the game. In this way, a player may be able to verify for himself why he won or why he lost, since he may be able to compare the value of his hand with the value of the other players' hands.

Table without Walls

A traditional craps table has one or more walls or barriers. The dice can be thrown against the wall to ensure the randomness of the throw. The wall further prevents the dice from escaping the confines of the table surface. In various embodiments, a game of craps, or another dice game is played at a table without walls and/or without confinement of any kind. Cards are used at the table in place of dice. Cards are dealt from a deck consisting of only cards numbered 1 through 6. Since the cards are not thrown like dice, confinement for cards may be unnecessary. Therefore, various embodiments may include a table for craps without walls. The table may include standard felt markings, such as areas for a pass line bet, a come bet, a don't pass bet, odds bets, and other standard areas. However, the table may lack walls.

Mobile Gaming

In various embodiments, players may play blackjack versus one another using a mobile gaming devices. Players may each carry a handheld gaming device (i.e., mobile gaming device). Each mobile gaming device may be in communication with a central server. A player may use his mobile gaming device to enter decisions in a game. Decisions may include indications of amounts to bet, indications of whether to hit or stand, etc. A mobile gaming device may have buttons corresponding to one or more possible decisions. For example, there may be a "hit" button, "stand" button, a "double down" button, and other buttons appropriate to blackjack. The mobile gaming device may transmit the decisions made by players to the central server. The central server may shuffle cards using an electronic shuffling algorithm. The central server may use other algorithms for determining what cards should be dealt to what players. The central server may then transmit to each mobile gaming device an indication of cards that have been dealt. At the end of the game, the central server may reference a set of game rules (e.g., game rules that are stored in computer memory), in order to determine a game winner. The central server may then provide an indication to each participating player of the game winner. The central server may also reveal hidden cards for one or more players, and transmit an indication of such cards to other players.

The central server may maintain an account associated with a player. The account may comprise one or more records stored in a database. The records may be stored in computer memory. A player account may include information, such as a name of a player, an address of a player, any other identifying information about a player, and/or any other information about a player. The account may further include information about a monetary balance, a balance of casino credits, or any other balance of value. Thus, the account may store a record of how much money belongs to a player. In various embodiments, when a player indicates a bet or wager, such as at a mobile gaming device, the server may deduct the amount of the bet or wager from the player's account. In various embodiments, when the player wins money, the money won may be added back to the player's account.

In various embodiments, a player device, such as a mobile gaming device, personal computer, standalone slot machine, or other device, may prompt a player to take an action in a game. For example, a mobile gaming device may display text prompting the player to either hit or stand in a game of blackjack. A player device may prompt a player to make a bet. For example, a player device may prompt a player to decide whether to bet the pass-line or the don't-pass-line in a game of craps. As another example, a player device may prompt a player to decide how much to bet in a game. A central server may initiate prompt messages, and transmit such messages to a player device, at which time the player devices may display the prompts. In some embodiments, a player device may initiate prompts, e.g., when logic stored within the device determines that a prompt must be shown to encourage a player to take action and move a game along.

In various embodiments, a player may play craps or another dice game using a mobile gaming device. The mobile gaming device may present cards to a player in place of dice. The cards may be numbered 1-6. On a given roll, the central server may determine two cards from a randomly shuffled deck of cards. The central server may then transmit an indication of such cards to the mobile gaming device of the player. The player may indicate bets through the mobile gaming device. The player may press a button on the mobile gaming device indicating a desire to make a new roll (e.g., in the event that a game has not ended).

Motion Control

In various embodiments, a mobile gaming device may include one or more motion sensors. For example, the mobile gaming device may include an accelerometer or gyroscope. The mobile gaming device may include one or more location or positioning devices, such as a Global Positioning System sensor. Logic contained within the mobile gaming device or within the server may differentiate position sensor readings in order to detect motion.

A player may move the mobile gaming device in order to indicate decision in a game. Sensors within the mobile gaming device may pick up the motion of the mobile gaming device. Logic within the mobile gaming device or within the central server may interpret the motions as commands to be used in a game. The motions may be interpreted as commands to make a bet, to bet a certain amount, to raise, to fold, to call, to check, to hit, to stand, to double down, to bet the pass-line, to bet don't pass, or to make any other type of bet in any game, or to take any other action in any game.

Blackjack Motion Control

In various embodiments, a player may use a mobile gaming device to play in a game of blackjack. In various embodiments, the player may compete against other players. In traditional games of blackjack, a player might indicate a decision with a tapping motion. For example, in traditional games of blackjack the player may tap the table twice in order to indicate a decision to hit. In various embodiments, a player using a mobile gaming device to play blackjack may shake the mobile gaming device twice in an up-and-down motion.

Card Dice Motion Control

In various embodiments, a player may make a motion with a mobile gaming device as if he is rolling the dice. For example, the player may shake the mobile gaming device from side to side as if he is cradling dice in his hands and rolling them around in his hands. Then, the player may make a large sweeping motion with the mobile gaming device as if actually rolling dice onto a table. The mobile gaming device may deal one or more cards (e.g., from a deck of cards numbered 1-6) upon detecting the player's sweeping motion.

Internet

In various embodiments, players may participate in games over a network. Thus, in various embodiments, a computer system may include a central server in communication over a network with one or more player devices. Player devices may include mobile gaming device, personal computers, slot machines, or other devices. The network may be a wireless network or a wired network. The network may be the Internet. In various embodiments, players may participate in games via personal computers while communicating over the Internet with the central server. As with mobile gaming devices, the central server may receive commands and instructions from player devices, may determine cards dealt, may calculate winners and losers, and may credit and debit player accounts as appropriate.

Standalone Slot Machine.

In various embodiments, a player may participate in a game, such as a game of blackjack or a game of dice using cards in place of dice, at a standalone gaming device. A standalone gaming device may include a fixed device, such as a slot machine, video poker machine, video keno machine, bingo machine, or other device. The gaming device may be networked to other gaming devices. For example, a number of gaming devices may be linked to the same central server. Thus, as with mobile gaming device and personal computers, a central server may facilitate gaming competition among players at different standalone devices.

In some embodiments, a player may play a game of blackjack according to various embodiments by himself at a standalone gaming device. The gaming device may simulate "virtual players" who are in competition with the player. Thus, the real, or human player may play against e.g., six virtual players in a game of blackjack. Each of the real and virtual players may make bets and make decisions in the game. The winner may be determined based on which of the players is closest to 21 without having folded and without having exceeded 21. If it is the real player who has won, then the amount in the pot may be credited to the real player's account, paid out in cash to the player, or otherwise provided to the player. If it is a virtual player who has won, then the house may keep any money from the pot.

A player may play dice games at a standalone device. The standalone device may deal cards that are numbered 1-6, so as to simulate rolls of dice. The player may win or lose according the rules of the applicable dice game, e.g., craps.

Deck Sorting Device

In various embodiments, a deck with only cards 1-6 may be formed from another deck, such as from a standard 52 card deck or such as from a plurality of such decks. The card deck may be formed using a card sorter. According to some embodiments, in operation, the card sorter may receive a deck containing the cards 1-6 as well as other cards, (e.g., 7, 8, 9, 10, J, Q, K). The card sorter may form two decks from this. The first deck may include cards numbered 1-6, and the second deck may contain all other cards. The two decks may be separated, such as into two different stacks or heaps of cards.

A card sorter may include an optical reader or scanner for reading card faces. The card sorter may further include a processor and memory. The processor and memory may be formed from semiconductors or from any other materials. The processor may be a standard Intel processor, or any other processor.

Non-Computer Embodiments

In various embodiments, where applicable, embodiments described herein may also be practiced without a computer system. For example, players may play blackjack against one another using physical cards and physical chips for betting. Players may also play craps or other dice games using a physical deck of cards, where such cards have been numbered 1-6.

In general, like reference numerals in different figures do not necessarily refer to the same item. Reference numerals below, until otherwise specified, refer only to FIGS. 1 through 21.

Architecture of a System According to Various Embodiments

Referring to FIG. 1, there is shown a block diagram of interactive gaming system A10 according to various embodiments. System A10 comprises controller A12 and a plurality of gaming devices or machines $G_1, G_2, G_3, \ldots G_N$ (collectively referred to herein as "gaming machines A14"). Each gaming machine A14 has a wagering game that such as a multi-spinning reel type wagering game, e.g. video slot machines. Each gaming machine A14 includes at least one display screen for viewing the player's results as well as other player's results. If the wagering game is a video slot machine, then the display screen can be used to view the wagering game. Controller A12 is linked to and controls gaming machines A14. Controller A12 includes central processing unit ("CPU") A16, random access memory A18, read-only-memory A20, programmable interface circuitry A22, display A24, user interface A26, random number generator A28, and one or more servers $S_1, S_2, S_3, \ldots S_M$ (collectively referred to herein as "servers" A30. Each server A30 is assigned to handle a specific number of gaming machines A14. Interface circuitry A22 includes multiplexing circuitry. However, it is to be understood that this multiplexing circuitry can be replaced with address/data bus and suitable decoders within each gaming machine A14. System A10 further includes communication links A32. Communication links A32 electronically link controller A12 with gaming machines A14. Random number generator A28 is in communication with and controls gaming machines A14, via interface circuitry A22, such that gaming machines A14 have totally impartial, random outputs as a function of stimuli provided by random number generator A28. Each of the gaming machines A14 are provided with an enabling means such as a push button, joy stick, video-game pad arm or "touch screen" to activate and thus play the wagering game.

Referring to FIG. 1, programmable interface circuitry A22 may be programmed to effect data communication between gaming machines A14 and controller A12 when machines A14 and controller A12 are arranged in different configurations. In various embodiments, controller A12 is located in one particular location and each gaming machine A14 is located at an internet location. In another embodiment, controller A12 and gaming machines A14 are located in the same physical location, e.g. within the same casino. When each gaming machine A14 is located at an internet location, each gaming machine A14 generally comprises the players personal computer and the appropriate software. In various embodiments, the player downloads software made available on the internet by servers A30. The software enables the player to communicate with controller A12 and to play the wagering game and the desired theme game.

When system A10 is configured such that gaming machines A14 are located at remote sites that are linked to the internet, the display screen of each player's personal computer is programmed to initially display the interior of a casino. The player can scroll using the keyboard or mouse to "move about the casino". In one embodiment, the players personal computer and software are configured to provide "sounds" of a typical casino environment. The "casino" displayed on the display screen includes a plurality of groups or banks of slot machines. Each group of slot machines is associated with a particular theme game. Indicia are provided to identify which group of slot machines is associated with a particular theme game. Each slot machine is associated with an icon representing a chair or stool. When the player decides to play a slot machine that is associated with a particular theme game, he or she uses a computer mouse to "click" on the "chair icon" in front of a slot machine that is part of the bank of gaming machine associated with the desired theme game. System A10 then "tags" that particular chair with the players name or alias that he or she uses on-line. The pre-programmed computer then provides a particular screen configuration that corresponds to the selected theme game. This is discussed in detail below.

System A10 can be controlled by a software program that effects implementation of the steps of the processes according to various embodiments. Thus, it is to be understood that system A10 can have any one of a variety of configurations, as described above, and that interface circuitry A22 can be configured by CPU A16 to handle data transfer between controller A12 and gaming machines A14 in a manner that is compatible with any of the particular configurations discussed above. It is also to be understood that controller A12, as described above, is just one example of a suitable controller and that other suitable controller architecture can also be used.

Gaming system A10, according to various embodiments, can be played by one or more players. Some of the theme games are configured so that a plurality of players playing at a particular bank of gaming machines can play as a group. If a group of players are playing gaming system A10, the group of players are referred to as a "Group". In some embodiments, games may be configured in manner such that the players play against each other instead as a group. In various embodiments, the system allows all players to communicate with one another via e-mail while simultaneously playing the wagering games.

Remote Participation in a Live Casino Game

Various embodiments pertain to the playing of casino table type games such as roulette, dice and cards, from remote locations while viewing actual games being played at a casino or similar location.

One of the games played in a casino is roulette. This game is played at a table around which a number of players sit or stand and bet by placing chips on a betting grid of numbers in blocks, intersections of blocks, black and red plays and odd and even number selections. A wheel is spun and a ball falls into a numbered pocket as the wheel stops thereby determining the winner of the game who is paid off at various odds depending upon the type of bet placed. Such a game is played at casinos throughout the world. There is usually a considerable amount of interest and excitement around the table as the game is played.

The game of roulette is also played via the Internet. Here there is a computer generated simulation of the roulette table betting grid and spinning wheel. This type of game originates from any location capable of housing the computer and having the necessary telecommunication connections. The player can play the game for fun only or make wagers over the Internet such as by establishing and using a credit card account. The Internet and other telecommunication media may permit playing roulette from any location in the world having the necessary equipment.

A similar situation exists with other casino table games such as blackjack, dice and baccarat. In each of these games players place bets on a table and there is player interaction as the game is played as well as reaction in the crowd watching.

In various embodiments, a player establishes an information link with a casino from an interface station including a video monitor and keypad. In response to the player's entry of financial account information, the casino establishes an information line with the players financial institution. The casino assigns the player to a gaming table at which a "live" game is occurring, transmitting all images of game play and instructions to the player. The player transmits bet and game play information to the casino. Because of the open line between the casino and players financial institution, bets are checked, winnings paid, and losses debited.

Various embodiments include a system and method for playing a roulette game in an interactive manner at a site remote from the actual casino table while still having a view of and experiencing the live casino action where the game is being played. In accordance with various embodiments a camera follows a game that is being played at a roulette table in a casino. A microphone can also pick up the sound of the players at the table and the game play.

In some embodiments, terminals are provided at various locations in the casino remote from the table. The terminals are connected to a distribution device that provides the necessary communication between the players at the remote terminals and the game being played at the casino table.

A remote terminal accepts cash or credit cards to set up an account for the player. The remote terminal displays a picture (video) of the actual casino table where the game is being played. The remote terminal also contains its own computer (microprocessor) that has various functions. Among these are the generation and display of an electronic representation of the table betting grid, this display also having a touch type keypad in some embodiments. The player at the terminal uses the keypad and electronically places a bet on the computer representation of the table betting grid under the casino (house) roulette rules in the normal manner. He also uses the touchpad to select the amount of the bet to be placed. The remote terminal microprocessor is programmed with the required information of odds to pay off when the player makes a winning bet.

At the casino table the croupier conducts the game in the normal manner. At a given time, normally just before or when the ball is placed in the spinning wheel, no more bets are accepted. This is signaled to the computers at the remote terminals which locks out the players at these terminals from placing any more bets. The players at the remote terminals can watch the actual game play at the casino table and the reactions of the players. When the ball drops in the wheel pocket and the game at the casino is finished, the player sees the winning number result. The result also is also made available electronically at the remote terminals.

In various embodiments, the remote terminal microprocessor maintains the terminal player account balance information. Upon the result of the game winning number being transmitted to the remote terminal, the terminal microprocessor make a calculation against the bet made. If the bet was a loss, then the amount of the bet is subtracted from the players account. If the bet was a win, the amount of the win is calculated at the usual casino odds, or at some other odds as set, and the appropriate amount of the win is credited to the player's account.

Various embodiments pertain to players who are not at the casino and, effectively, can be located anywhere in the world. Here, the game being played at the casino is followed by the camera and the picture of the game play and results are transmitted via telecommunications to remote locations. The transmission mode can be the Internet, satellite or other wired or wireless communication system, to players who play the roulette games using devices such as personal computers or modalities such as a TV set connected to the Internet with control boxes such as offered by WEBTV or AOLTV. The devices can be either of stationary type or of the portable type which can communicate by wireless. A program can be installed in or downloaded to the remote player's device that has the features of the previously described casino remote terminal, such as betting odds calculation, generation and display of a betting grid, placing a bet on the grid, etc.

In the remote player embodiments, the game being played at the casino may be viewed and the game play sounds heard by the player at the remote location. The player maintains an account preferably at his own device that can have access to a central computer such as at a bank or credit card company in communication with the player's device. The player follows the table game by viewing the transmission from the camera. When a game is completed at the casino the result is transmitted and the player's computer makes the necessary win and loss calculations based upon the result of the game and this is entered in the player's account at his device.

In some embodiments, a player who is not at the casino table experiences the actual table play and crowd response and is able to make wagers without having to be physically present at the game table in the casino. The results of a bet are computed at the location of the player and the player is presented with a running total of his account so he can see the results of his wager and monitor the amount wagered.

Various embodiments pertain to games played at a table such as blackjack, dice, baccarat and similar games.

Various embodiments may allow players to play roulette and other casino table type games at remote locations while following an actual game that is being played at a casino table and using the results of the casino game to determine betting results.

Various embodiments provide a system and method for playing roulette and other casino table type games in which a player at a terminal or other device remote from a game played at a casino game table follows the game at the casino table, in which the player uses a computer located at the terminal or device to place bets, and in which computations are made of the winnings and losses as the actual game is played.

Various embodiments provide a method and system for viewing a roulette or other table game played at a casino from a remote location from which bets are made and wins and losses are adjusted against an account balance of the remote player.

Figure 2:
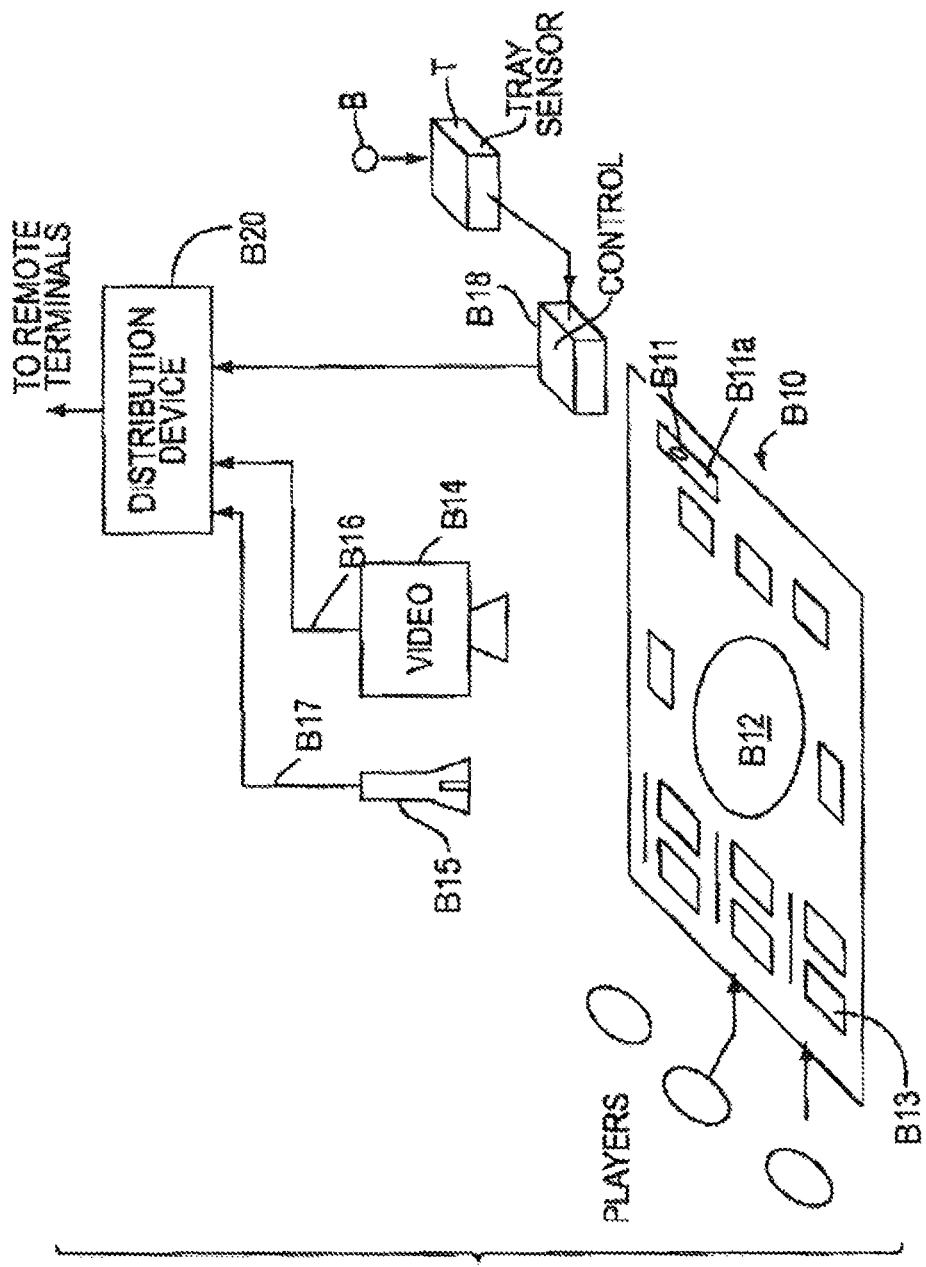
FIG. 2 is a schematic diagram of a roulette table in a casino with associated video camera and other parts of the system in schematic form.

FIG. 2 shows a conventional roulette table B10 that is in common use at a casino. While various embodiments are described relative to a roulette table its principles are applicable to other table games such as blackjack, dice and baccarat. The table has the usual wheel B12 that is manually spun by a croupier into which a ball B11 is dropped at the beginning of the game. The ball B11 is usually placed in a tray B11a during the time it is not in use. A betting grid B13 is on the table, the grid containing the usual format of squares or rectangles with a number in each and other bet areas such as odd/even number, and red/black. A number of players stand or sit around the table. A player makes a bet by placing one or more chips of a given denomination on a number, intersection of corners, on red/black, etc.

Shown located above the table is a video camera B14, such as a video camera that is of the full color type. The camera B14 can be hidden, as are many cameras in a casino used for surveillance purposes, or can be a stand alone visible type if, for example, the presence of the remote play feature is to be advertised. The camera field of view may be limited to the hands of the players as they place bets on the table and may not show the faces of the players. This may be done to maintain privacy. A microphone B16 is also placed adjacent the table to pick up the "crowd noise" of the players. The microphone can be directional to pick up the sound of the spinning wheel and ball.

The output cable B16 of the camera B14 and the output cable B17 of the microphone B15 are shown. These are connected to a distribution device B20 at a suitable location that includes the type of broadcast facility that is to be used for the system. For example, if the game is to be used only with remote terminals at the casino, then there would be a type of a closed circuit TV system. If the camera and audio output is to be broadcast over the Internet, then there would be a suitable transmitter such as by "streaming video" and "streaming audio". If broadcast is to be by satellite then there would be communication such as by digital transmission.

Also associated with the table B10 is a control box B18. This is to be used to indicate specific events of a game during its play, such as start of a game and the close of betting for a game, that is, betting status signals. The control box B18 can be actuated in a suitable manner, such as manually actuated by the croupier, voice actuated and actuated at a remote location such as by an operator at a central location that monitors play at a table. In some embodiments, the control box B18 can be associated with physical devices such as, for example, a tray T in which the game ball B is placed and which has a micro switch or other type of sensor. Placing the ball in the tray triggers a signal that indicates the start of betting for a new game and removing the ball from the tray to place it in the wheel triggers a signal that the betting for the game is terminated. The close of betting also can be indicated by a motion detector or the video camera each for sensing start of spinning of the wheel and opening of betting for a new game by sensing the wheel stopping its rotation. These betting status signals are transmitted via the distribution device B20 to the remote terminals.

FIG. 3 shows a remote terminal B40 for use at a casino or other location. The terminal B40 has an input section B39 that receives the video and data signals originating from the table. Terminal B40 includes a video display B42 which receives the video pictures of the table B10 action broadcast from the casino camera B14. There is also an audio module B46 that has a speaker and suitable volume control to play the sounds picked up from the casino table by the microphone and other audio information, as described below. The picture of the game being played at the table and the table sound are features that add to more realism for the player who is playing the game remote from the casino table.

Terminal B40 also includes a computer module B48 which has a microprocessor and a memory. The computer module preferably is of the type that makes the terminal B40 self-contained. That is, it has an application program that can generate various displays, perform the necessary computation for the odds of playing a game, and for keeping a running account of the wins and losses of the player. The terminal computer module B48 receives the betting result and betting status data type signals produced at the table B10.

Remote terminal B40 also includes a display B44 which basically comprises three sections. The display B44 is controlled by the terminal computer module B48 and a connecting communication line B50 between the two is shown. The display B44 essentially is an electronic table having features that corresponds to the actual casino table.

The display B44 has a section B44a that displays a computer module B48 generated simulation of the table betting grid. This section also can display other information such as the odds for various bets and bet combinations. The latter type of information can be displayed continuously or only on demand.

The second section B44b of the display B44 is a touch type screen that has a numeric keypad B53 with the usual 0-9 numbers, a touch type Enter key B54 and a display window B55 that displays data that has been entered. As part of a menu on the touch screen B44b is a set of keys for the selection of the type of bet, that is, straight number, combination of numbers, red/black and odd/even. The third section B44c displays the account balance of the player. All of the sections of the display B44 are generated and controlled by the terminal computer module B48.

The terminal B40 audio module B46 also interacts with the computer module B48. The audio module can be used to provide information to help the player place his bets. For example, it can give messages to the effect that a new game is starting, direct a player to place a bet on grid number(s), and indicate that betting is closed. Instead of the audio messages, the messages can be displayed on any one of the sections of display B44 and there can be a combination of audio and visual messages.

A bill acceptor B47 is also part of the terminal B40. Here the player inserts bills of currency to build up credits in his/her account. The bill acceptor accepts currency of the type used at the casino or other type and of one or more denominations. As the player inserts one or more bills into the acceptor to open his account, the value is displayed in the display section B44c. The acceptor B47 also can be replaced by a credit card reader or one can be provided in addition to the acceptor. The remote terminal B40 also has an internal printer B49. When the player completes play at the terminal, he can request a printout of his account which is provided by the printer B49. This can be presented to a cashier at the casino to be redeemed for cash or chips when there is a positive balance. If the player is playing via a credit card, he can request from the terminal that winnings in his account as stored in the computer module B48 be electronically credited to his credit card account at a credit card company or bank. A player can obtain cash from a credit card, such as from an ATM machine.

In the operation of a remote terminal B40 for a new player, the player inserts bills into the acceptor B47 or uses a credit card. This opens the terminal and the amount of the account is displayed on section B44c. The player then selects a preferred bet amount, that is, the base amount of a bet such as would correspond to a chip. For example, if a player opens an account for $100 and a preferred bet amount of $5, he would have the equivalent of 20 $5 chips if actually playing at the casino table. A stack or stacks of electronic chips of the proper amount and values can be displayed such as on the electronic betting grid section B44a. The value of a chip can be any amount, for example, even as small as 25 cents. The small betting amounts usually are not permitted at the casino table which often has a minimum bet of $5 or $10. The remote terminals expand the customer base and the amount that the casino owner or game operator can make during game play.

The player views the play in process at the casino table on the video display B42 and can play along with the play at the casino. The video display B42 preferably is left on at all times to attempt to induce play at a terminal.

The player is advised that a new game is to start and to place his bet. The start of a new game message, either audio or visual, is triggered from the control box B18 associated with the casino table. For example, as the ball B11 is placed in the tray B11a at the casino table or the spinning of the wheel stops, the distribution device at the casino broadcasts this to the remote terminals. The player enters his bet via the touch screen B44b. That is, the player selects whether it is a straight number, combination or other type of bet. Different types of bets can be made, like playing at the casino table. At the time of placing a bet the player can consult the betting grid in display section B44a. Instead of a touch type screen section B44b to designate the number(s) or other type of bet, numbers can be selected by a computer mouse point and click arrangement on the electronic grid table B44a. This is of use particularly where the terminal is a PC or other device that is off the casino physical site. In a PC or similar device, a part of the display screen can be used for the video display and another part for the computer generated functions, such as the betting grid. In a device using an AOLTV or WEBTV converter box or similar device the display screen of a television screen would be similarly divided.

The type of bet selected is displayed in window B55. The player enters the number or grid intersection numbers if the bet is a combination. This is also displayed in window B55. The number, intersection, red/black or odd/even bet also is displayed on the electronic betting grid section B44a. The player then enters the amount of the bet which also is displayed in window B55. The amount of the bet also can be displayed on the betting grid section B44a such as by showing the stacking of the electronic chip or chips of the selected amount at the proper location of the grid. The chips that are bet are removed from the player's purchased stack of electronic chips.

The complete bet is displayed in window B55. If it is acceptable, the player touching the Enter key B54. If not acceptable, the bet is cancelled by touching a key on the keypad B53, such as the star key, or a special Cancel key provided in section B44b. At this time the bet data is entered in the memory of the terminal computer module B48. If a mouse is used, there would be a point and click at an Enter or cancel box displayed on the screen.

The player can place additional bets for the game until a signal originating from the control box B18 at the casino game table, such as by removing the ball B11 from the tray B11a or the start of the wheel spinning, indicates that the betting is closed for the present game. The computer B48 at the remote terminal is locked out from accepting any more bets. This can be indicated to the player at the remote terminal by one or both of an audio and computer generated visible message. During the time allotted for making bets the player at the terminal can watch the action of the players and the bets placed at the casino table B10.

The game is played at the casino table B10 and the players at both the casino and at the remote terminals watch the wheel spinning and the ball dropping. The sounds at the table also are broadcast to the players at the remote terminals. The game result, that is, the winning number of the pocket into which the ball dropped and its color, is sent from the casino distribution device B20 to the individual remote terminals. The computer module B48 at a remote terminal B40 uses the game result and the bet(s) placed information to compute whether there was a loss or a win. If a loss, the computer subtracts the amount of the bet from the player's account. If there was a win, the remote terminal computer module B48 computes the amount of the win in accordance with the odds of the type and the amount of the bet. That is, each of straight number and number combination have different odds and red/black and odd/even have the same odds but different from the number type bets. The computer B48 has a program that provides for this calculation. The calculated win amount is then credited to the player's account. The account amount is displayed in the display section B44c.

As can be seen, a player at a location remote from the actual casino table can follow an actual game and can experience much of the actual casino player reaction and sounds. This makes the remote player's participation in playing much more realistic and interesting.

The foregoing description is based on a standard casino setting, such as found in Nevada and New Jersey U.S.A. It also applies to private casinos. That is, a religious or veterans organization holds a gambling night. The roulette table and camera would be brought to the location of the organization as well as remote terminals and communication apparatus. The remote terminals can be placed throughout the location for those who like to play alone or to handle any overflow.

Various embodiments are described relative to a roulette table but have application to other casino table play type games. For example, there can be a dice table at the casino which has the camera and microphone described above. Here, the remote terminal would have a video display of the casino dice table and a compute generated representation of the table. The player at the remote terminal places a bet and plays along with the player at the casino. Here also, appropriate betting status signals are sent to the remote terminals to designate the opening and closing of betting, placing additional bets and results of the game. As before, a program in the remote terminal computer module calculates the winning based on house or other odds and credits this to the remote terminal player's account. Losses are subtracted.

The remote terminal video display of actual game content is also applicable to card games such as blackjack, poker and baccarat.

A separate remote terminal can be provided for each type of game or a single universal terminal can be provided for two or more of the table games.

Specific features of the various embodiments are shown in one or more of the drawings for convenience only, as each feature may be combined with other features in accordance with various embodiments. Alternative embodiments will be recognized by those skilled in the art and are intended to be included within the scope of the claims. Accordingly, the above description should be construed as illustrative and not limiting.

CASINO with On-Line Presence

Figure 4A:
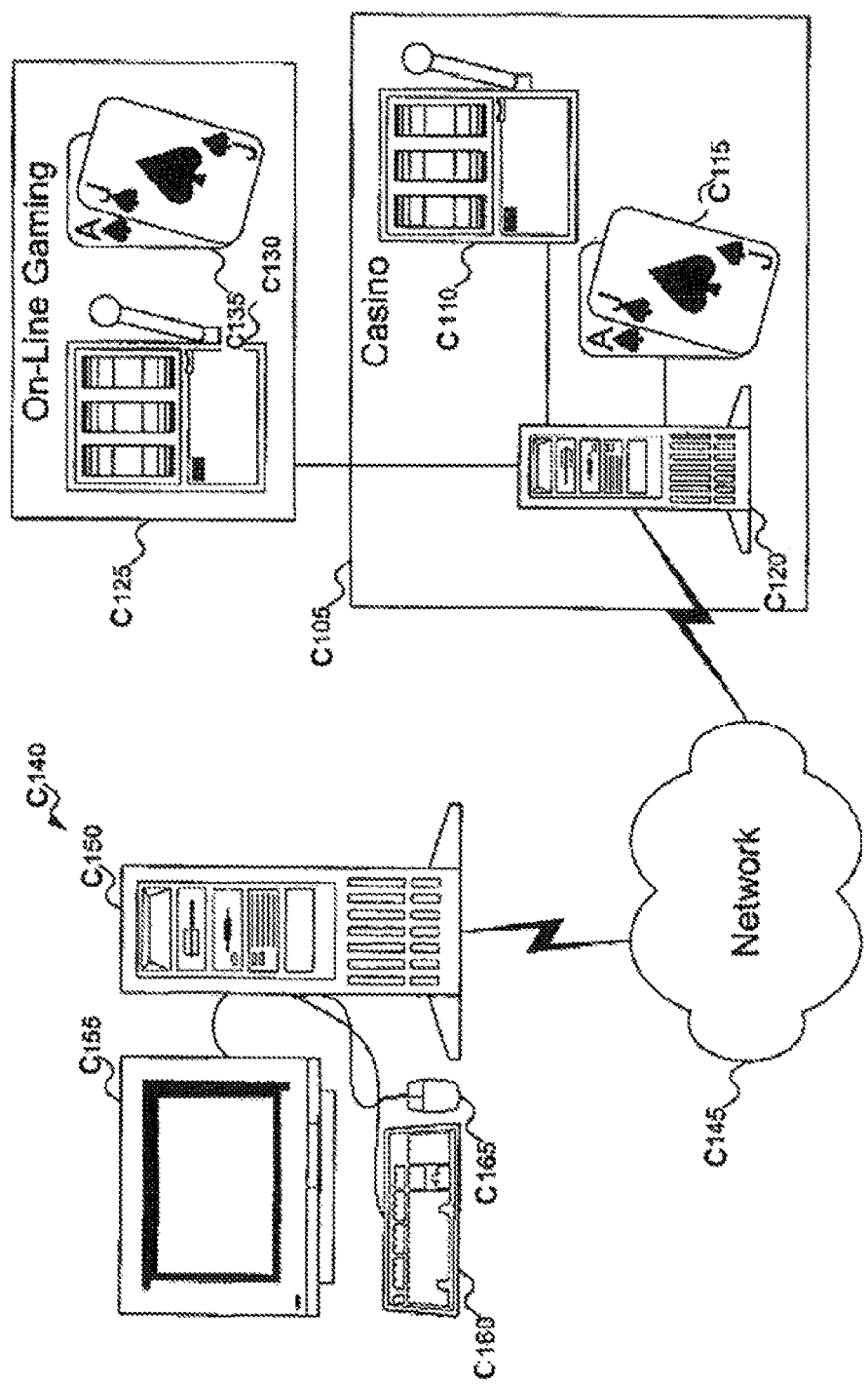
FIG. 4A shows a casino offering both in-house and on-line (over a network) gaming, according to various embodiments.

FIG. 4A shows a casino offering both in-house and on-line (over a network) gaming, according to various embodiments. In FIG. 4A, casino C105 includes various gaming devices, such as slot machine C110 and blackjack C115. (A person skilled in the art will recognize other games casino C105 might offer.) Casino C105 also includes server C120, which tracks a player's activity within the casino. Thus, as the player uses slot machine C110 or blackjack table C115, the players coin-in, winnings, etc. is all tracked via server C120. The tracked data can be stored locally on server C120, or it can be stored in a secure server offsite (see FIG. 5 below). In addition, server C120, although shown as physically within the confines of casino C105, can be located outside casino C105.

Casino C105 also offers on-line gaming web site C125. Web site C125 offers Internet gaming similar to that offered in-house at casino C105, but without using the physical devices available in-house. For example, web site C125 might offer on-line versions of slot machine game C130 or blackjack game C135. The credits used by the player in Internet gaming can come from any desired source. For example, the player can input a credit card number to web site C125, which then issues the player a number of credits in exchange for a charge to the players credit card. Or the player can use credits associated with the player's account. Systems for transferring credits from a players account to a gaming device are described in U.S. patent application Ser. No. 09/134,285, filed Aug. 14, 1998, and U.S. patent application Ser. No. 09/694,065, filed Nov. 19, 2000, which are hereby incorporated by reference. A person skilled in the art will recognize how the systems can be modified to transfer credits to a web site offering Internet gaming.

To use web site C125, a user connects to web site C125 from a computer, such as computer system C140, across network C145. Computer system C140 conventionally includes computer C145, monitor C150, keyboard C155, and mouse C160. A person skilled in the art will recognize that although computer system C140 is shown as a desktop personal computer, other types of computers are contemplated in various embodiments. For example, computer system C140 can also be an Internet appliance, with monitor C150, keyboard C155, and mouse C160 integrated into the housing of computer C145. Computer system C140 can also take other forms: for example, a personal digital assistant (PDA) or other handheld device, or even a cellular telephone. Optional equipment not shown as part of computer system C140 in FIG. 4A are other input/output devices, such as a printer. Also not shown in FIG. 4A are the conventional internal components of computer system C140: e.g., a central processing unit, memory, file system, etc. Similarly, network C145 can be any variety of network, such as a local area network (LAN), wide area network (WAN), wireless network, or global network (such as the Internet), among others. Network C145 can also be any combination of the above networks used to connect computer system C140 and web site C125.

Figure 4B:
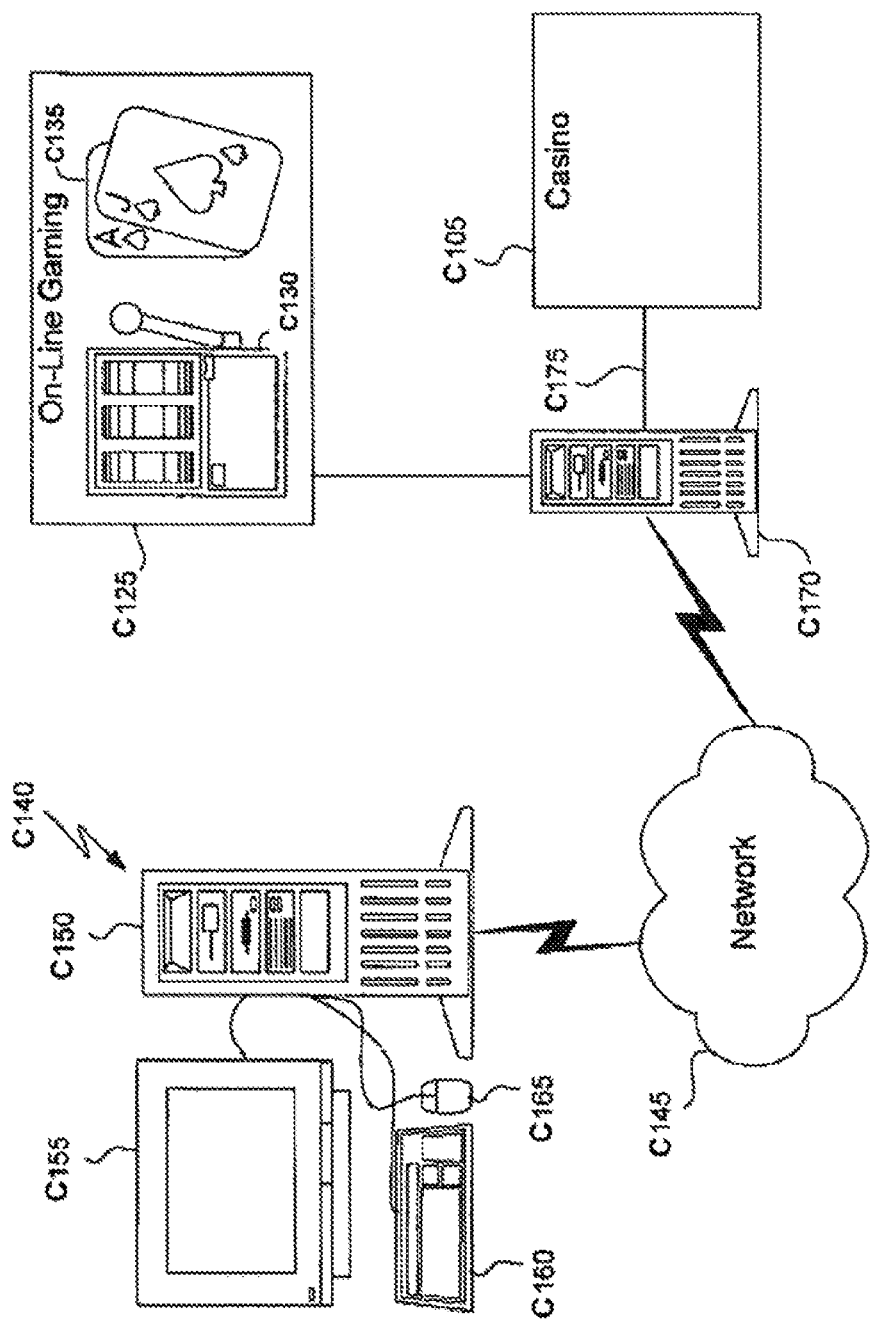
FIG. 4B shows a casino according to some embodiments.

Although FIG. 4A shows web site C125 as being stored on server C120 within casino C105, a person skilled in the art will recognize that web site C125 can be stored on other servers. Similarly, web site C125 can be accessible through server C105 or can be totally separate, so that connecting to web site C125 does not require a path through server C120. For example, FIG. 4B shows an alternative embodiment. In FIG. 4B, web site C125 is hosted by server C150, which is separate from casino C105. Server C150 can be owned by casino C105, but physically separate from server C120. In this embodiment, where server C150 and server C120 are separate devices, typically server C150 does not store any player tracking information, which is preferably stored on server C120. Server C150 can also be located in a different environment, outside casino C105. Or server C150 can be a third party server, operated by a third party instead of casino C105 (but perhaps with direction from casino C105). A person skilled in the art will recognize other possible variations.

Even if casino C105 does not own or operate server C150, casino C105 will want to be able to track the player's activity on web site C125. To enable this tracking, server C150 can report the player's activities to casino C150. Connection C155 enables server C150 to report a player's activities to casino C105. A person skilled in the art will recognize that connection C155 does not have to be a direct physical connection. Instead, server C150 can connect to casino C105 via network C145.

Although FIGS. 4A and 4B show web site C125 as providing the on-line equivalent of gaming in-house at the casino, web site C125 can provide other forms of entertainment to players. For example, rather than playing for money, web site C125 can offer players a play-for-fun site. In this configuration, when players use web site C125, they are not risking their own money. Nevertheless, casino C105 might want to track the player's activities, to reward the player for loyalty. For example, the player might earn points that are redeemable at the casino. Thus, even though the casino does not directly profit from the player's activities, there is an indirect profit motive, as the player will eventually visit the casino to redeem the points accrued, and hopefully spend money gambling at the casino. In addition, if the casino offers multiple web sites to players, some of the web sites can be configured for on-line gaming, and others can be configured for play-for-fun.

Figure 5:
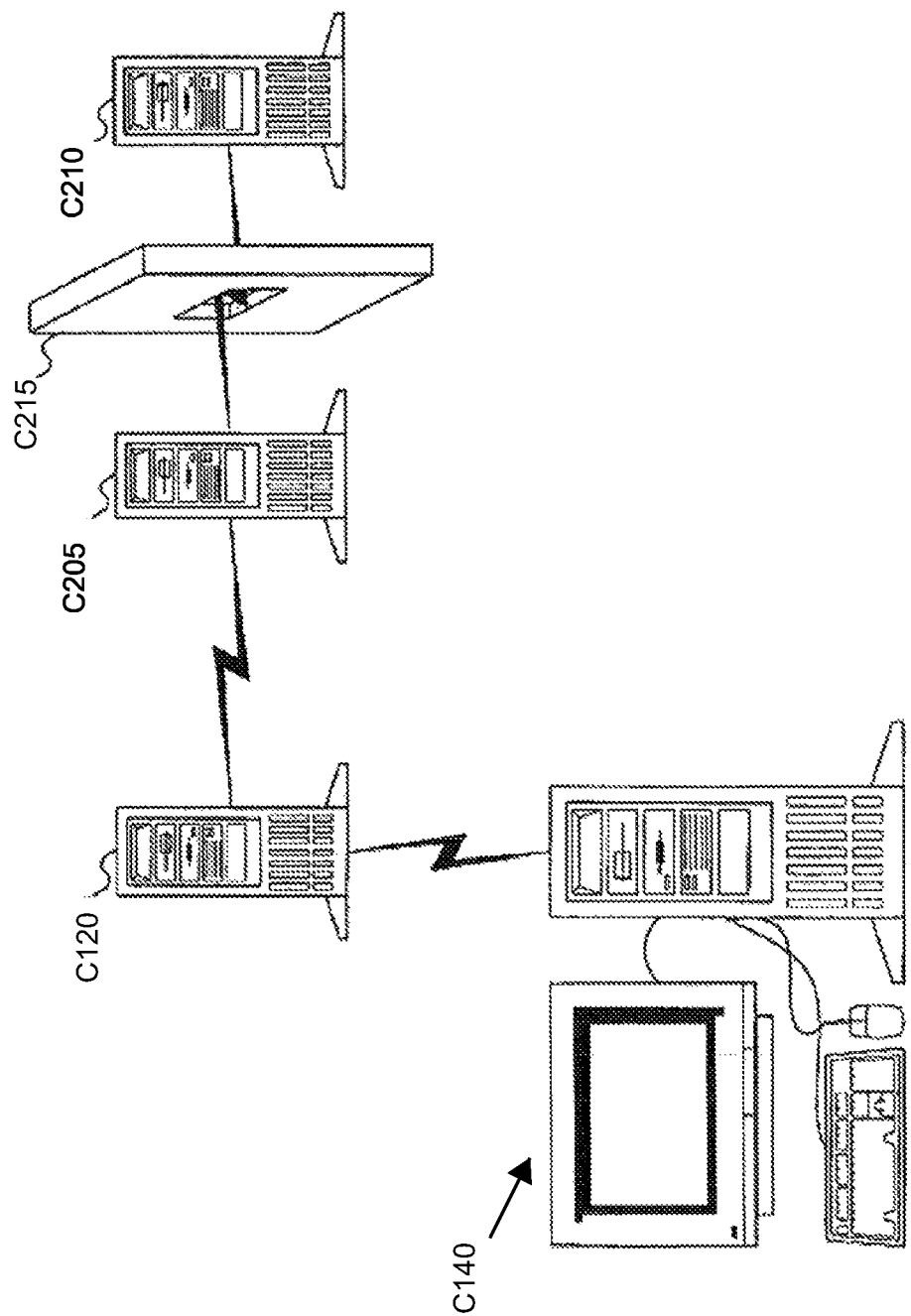
FIG. 5 shows a player communicating through the server of the casino of FIG. 4A, according to some embodiments.

Returning to FIG. 4A, as the player plays in-house at casino C105, playing for example slot machine C110 or blackjack table C115, information about the player's activity is tracked. Similarly, as the player plays on-line at web site C125, playing for example slot machine game C130 or blackjack game C135, information about the player's activity is tracked. In some embodiments, the combined data is stored offsite in a secure server (as shown in FIG. 5 below). In a second embodiment the combined data is stored in server C120. Regardless of where the data is stored, the combined data gives the casino more information about the player that it might otherwise have had.

Although FIGS. 4A and 4B only show a single casino, a person skilled in the art will recognize that various embodiments may include multiple casino properties. For example, a single web site can track on-line gaming activity for players registered with more than one casino property. In addition, a single casino can have more than one web site (hosted on one or more servers, all of which can be distinct from server C120), with player tracking data being reported to server C120. A person skilled in the art will recognize other possible variations.

FIG. 5 shows a player communicating through the server of the casino of FIG. 4A, according to some embodiments. In FIG. 5, computer system 140 is shown communicating with server C120. Server C120, in turn communicates with ASP server C205, which in turn communicates with secure server C210 behind firewall C215. Secure server C210 can be used to store sensitive data: for example, a player tracking data storing data about a player's activities and his personal information, among other possibilities.

ASP server C205 is responsible for managing secure communications between server C120 and secure server C210. In a preferred embodiment, server C120 sends eXtensible Markup Language (XML) requests to ASP server C205, which is the only device permitted to access secure server C210 behind firewall C215. But a person skilled in the art will recognize that server C120 can communicate with ASP server C205 other than by using XML. By having secure server C210 communicate with ASP server C205 rather than secure server C210, sensitive data can be kept secure on secure server C210 but still accessible from outside firewall C210 if the request is transmitted in the correct manner. ASP server C205 can then communicate with secure server C210 to obtain the response to the requests, which can be securely transmitted back to server C120, preferably using XML. Server C120 can then transform the XML response into HyperText Markup Language (HTML) using an eXtensible Stylesheet Language (XSL) Transformation (XSLT). The resulting HTML can then be displayed to the player on computer system C140.

Communication between server C120 and ASP server C205 may be encrypted. Any encryption scheme can be used: the Secure Sockets Layer (SSL) encryption protocol used on the Internet is a standard that can be applied to encrypt the communication. Similarly, communication between ASP server C205 and secure server C210 is preferably encrypted.

As an example of how the communications scheme of FIG. 5 can be used, consider the situation in which the player wants to update his personal information. (In this example, encrypted communications are not described, but a person skilled in the art will recognize how to introduce encrypted communications into the example.) Since personal information is sensitive (the player would not want it publicly available), the data would be stored on secure server C210, behind firewall C215. So, using server C120 the player can request to view his player data. (It is assumed at this point that the player has identified himself to the system.) The browser request made of server C120 is translated into an XML request of ASP server C205, which is forwarded to secure server C210. Secure server C210 responds with the personal information, which is formed into XML and forwarded to server C120. Server C120 uses XSLT to transform the XML data into an HTML page, which can then be presented to the user. Using a form, the player can update his personal data. XML form data can then be posted to ASP server C205, which can update the database on secure server C210. ASP server C205 sends an XML confirmation message back to server C120, which again uses XSLT to transform the XML confirmation message into HTML, which can be presented to the user.

Registering a Player

Figure 6:
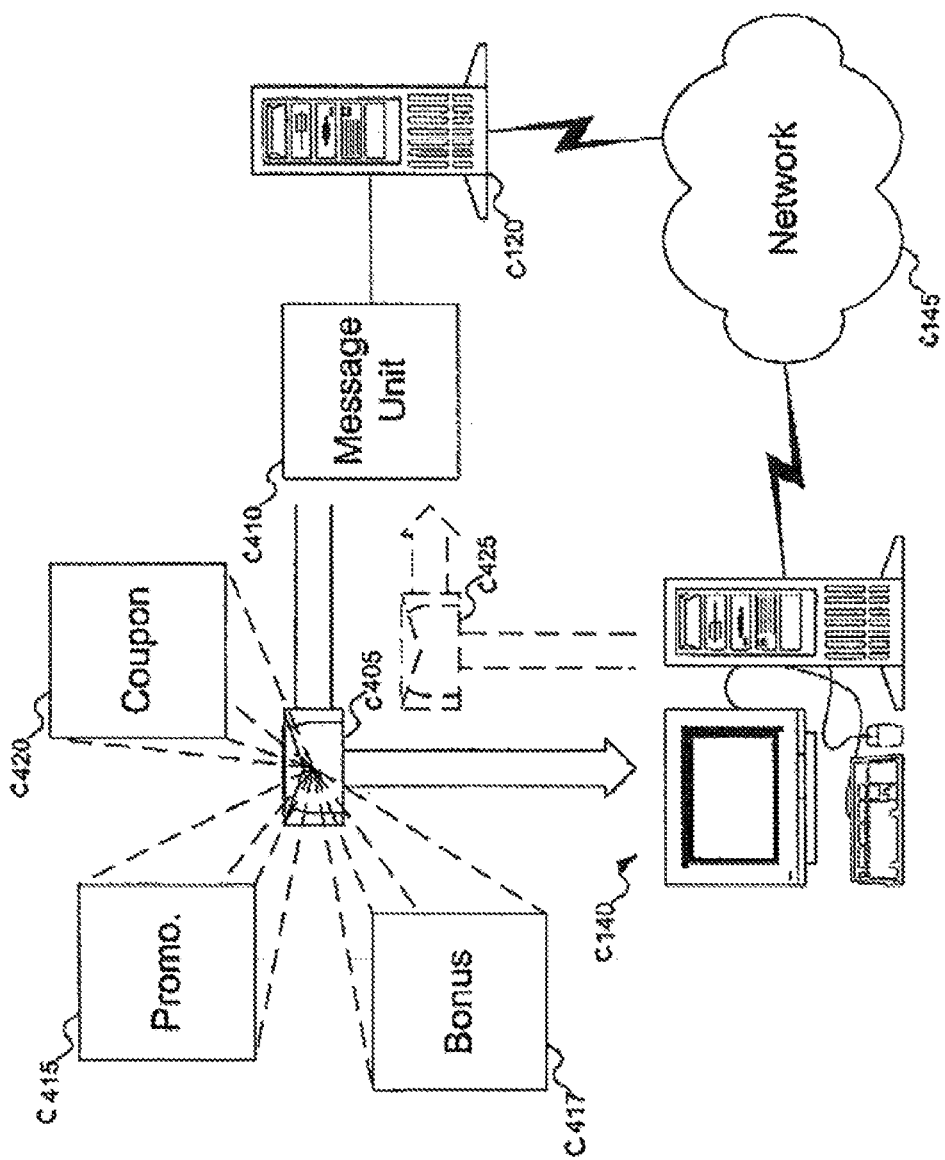
FIG. 6 shows the casino of FIG. 4A delivering a benefit to the player, according to some embodiments.
Figure 7:
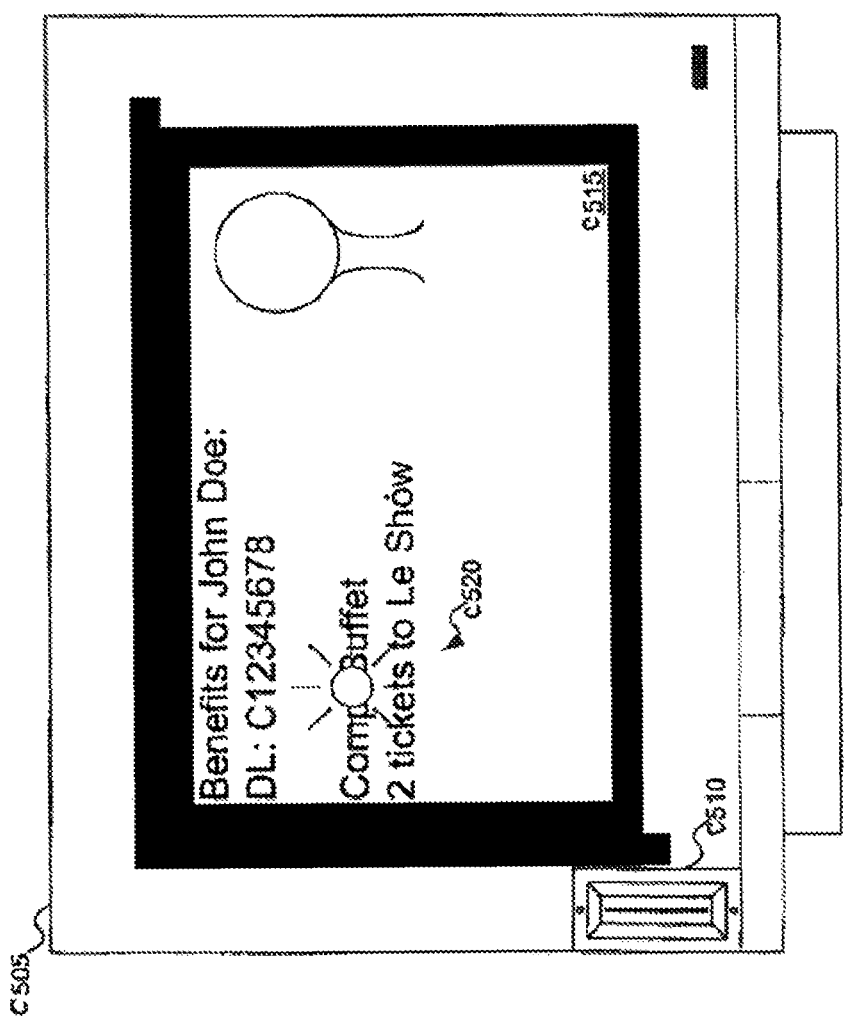
FIG. 7 shows a display used by the casino of FIG. 4A to verify electronically that a player is entitled to a benefit, according to some embodiments.

Of course, before a player can receive a benefit according to FIGS. 6 and 7, the player must be registered with the casino. The most traditional way for a player to register with the system is to have the player come in to the casino to register. A casino employee enters player data (either from a form prepared by the player or live as the player provides the data) into a computer and gives the player a player card. Then, when the player uses the player card at any gaming device, the system can track the player's activity. The player card can also have a number imprinted on it that is unique to that player card: the player can then use that number to identify himself for on-line gaming.

Instead of having players come to the casino in person to register an account, there are other ways in which players can be registered with the system. For example, the player can fill out an electronic form, over the Internet. The player can then be mailed the player card, and/or can be issued electronically an identification number that can be used for on-line gaming.

Other ways can also be used to register the player. For example, software exists that allow the Internet Protocol (IP) address of a computer to be located geographically. Using such software, a player can be located without having to type any information. When the player first sets up his account, the system can determine the players location based on his IP address. But IP addresses identify computers, not persons: it is not possible to determine who is using the computer from the IP address. Further, if IP addresses are dynamically assigned, they do not even uniquely identify a computer.

Instead of assigning the player an identification number, an existing ID for the player can be used. For example, each state assigns persons in the state a unique drivers license number. The combination of the issuing state and the ID number can uniquely identify a player. The player can input this information to the system, and the system can forward the information to a third party database. The third party database can then return information about the player. The combination of issuing state and ID number can be used both to obtain information about a player for registration purposes (in setting up the players account) and for identification purposes (for using the account).

In various embodiments, a combination of methods is used to register a player. First, the IP address of the computer is checked to determine the players location. Then the player is prompted for his ID number and issuing agency. The ID number and issuing agency are forwarded to the third party database, both to verify the player's location as determined by IP address and to obtain player demographic information.

If the player's location is verified, the account is registered using the player's IP address, ID number, and issuing agency. But if the player's location is not verified, then the player is requested to telephone the casino or come in personally, and have a casino employee register the player's account.

Setting Player Preferences

Various embodiments provide a gaming machine that may be customized according to one or more player preferences. A player may view and modify player preferences stored in a player preference account as preference account information. The preference account information may include but is not limited to loyalty point account information, loyalty point account settings, promotional opportunities, preferred games, preferred game features for the preferred games, preferred gaming machine settings, preferred bonus games, preferred service options and preferred progressive games. The preference account information may be stored in a plurality of preference accounts on a preference account server. Using a preference account interface which may be compatible with a web-browser, a player may be able to view and modify preference account information stored on the preference account server from a number of remote devices such as a gaming machine, a home computer, a hotel room video interface and a casino kiosk.

Collusion Detection

It will be appreciated that the game of poker is a mixed game, combining elements of both chance and skill or strategy. It is known for two or more players in a poker game to co-ordinate their respective playing strategies in order to gain an advantage over the remaining players in the game, thereby destroying the fairness of the game.

Some embodiments will be described with particular reference to a system for detecting and controlling collusion in a game of poker. However, this application is not to be construed as limiting, in various embodiments.

Figure 8:
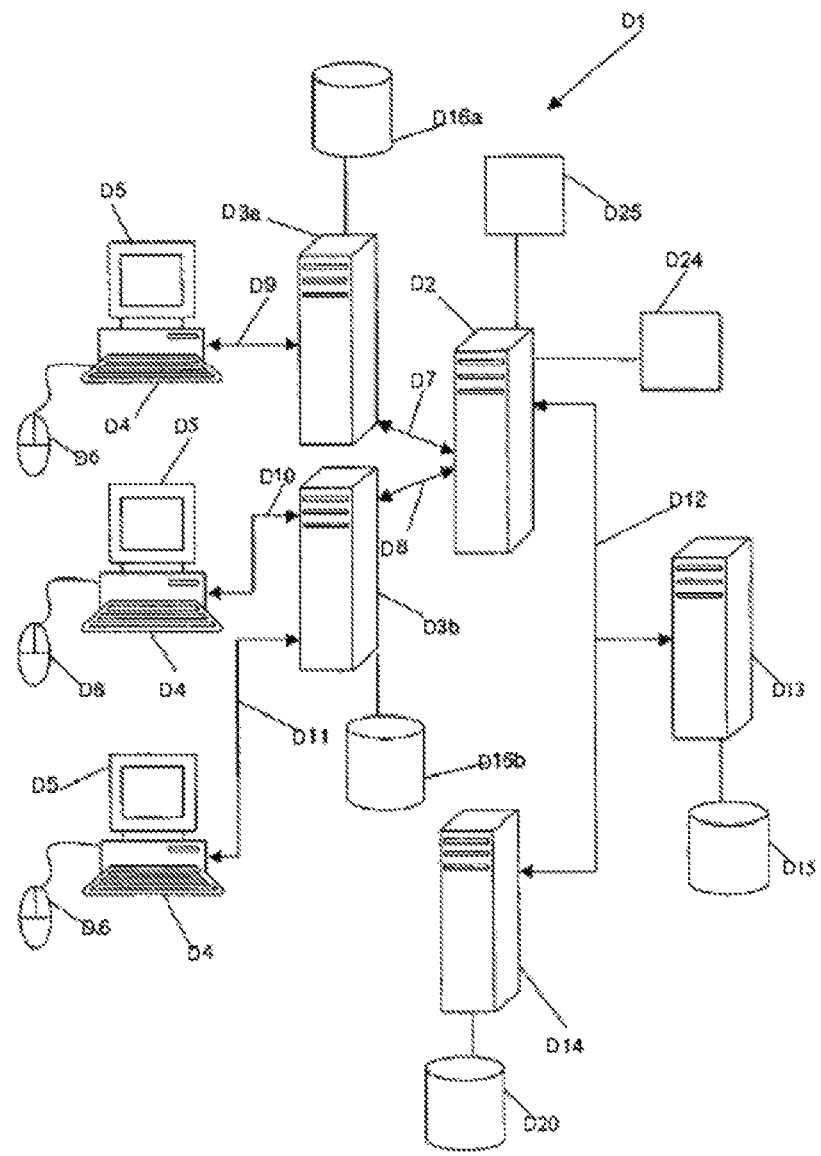
FIG. 8 shows a system for detecting and controlling collusion in a game, according to some embodiments.

Referring to FIG. 8, a system for detecting and controlling collusion in a game of poker is indicted generally by reference numeral (D1). The system (D1) includes a gaming server (D2) and a number of portals (D3a, D3b) in the form of websites on the World Wide Web of the Internet. In this embodiment, each one of the portal websites is an online casino website hosted on a corresponding casino web server (not shown). For convenience, various embodiments will be described with particular reference to only two such online casino websites (D3a, D3b). Each one of the casino websites (D3a, D3b) is accessible by one or more would-be poker players (not shown). Each would-be poker player accesses a casino website by means of a corresponding Internet-enabled computer workstation having a display (D5) and an associated pointing device (D6), such a mouse or, alternatively, a touchpad. In this embodiment, casino website (D3a) is shown as having one computer workstation (D4) logically connected thereto, whereas casino website (D3b) is shown as being logically connected to two such computer workstations. It will be appreciated by those skilled in the art that such online casino websites (D3a, D3b) can be logically connected to any number of computer workstations (D4) simultaneously, which number is physically limited only by considerations of processing power and Internet access bandwidth.

The system (D1) includes, further an administration facility (D13) in the form of an application web server, which is communicable with the gaming server (D2) along a communication channel (D12). The detailed operation of the application web server (D13) will be outlined in the description that follows. The system (D1) also includes a collusion detection server (D14) that is communicable with the gaming server (D2) along the communication channel (D12).

The gaming server (D2), the online casino web servers (not shown) corresponding to the online casino websites (D3a, D3b), the computer workstations (D4), the application web server (D13) and the collusion detection server (D14) are capable of communicating with each other by means of an open communication channel that is, in this embodiment, the Internet. Although the Internet is a single packet-switched communication network, it represented in FIG. 8, for convenience, as separate logical communication channels (D7, D8, D9, D10, D11 and D12).

The application web server (D13) maintains a clearing account facility (D15) that has a clearing account corresponding to each one of the casino websites (D3a, D3b). Analogously, each online casino web server (D3a, D3b) includes a corresponding credit account facility (D16a, D16b) with a credit account corresponding to each player who participates in the game of poker through one of the computer workstations (D4). In the illustrated embodiment, the credit account facility (D16a) therefore has one player account associated with it, while credit account facility (D16b) has two associated player credit accounts.

The gaming server (D2) operates under control of a stored program capable of enabling a predetermined maximum number, say 8, of players to participate in an instance of the game of poker. When the number of players reaches this predetermined maximum number, the stored program causes a further instance of the game to be initiated, the new instance also being capable of accommodating a further 8 players. In addition, the stored program initiates different instances of the game for each one of a number of different levels of play that are, in this embodiment, $1/$2, $2/$4, $5/$10, $10/$20, $20/$40, fixed limit games over $20/$40, and pot limit games. In this manner the gaming server is capable, under stored program control, of spawning as many separate instances of the game as required in order to accommodate the requirement of a pool of players who desire to play the game at different levels of play, in groups of a maximum of 8. Each instance of the game spawned in this manner is treated as totally independent of the other instances.

The online casino websites (D3a, D3b) enable a player desiring to join the game to request, by means of one of the computer workstations (D4), participation in the game and, once admitted to a particular instance of the game, to place a wager on a turn of that instance. Each participating player is presented with an identical graphical user interface (GUI) on the display (D5) of his respective computer workstation (D4) by the stored program in the gaming server (D2). The GUI presents to the player a suitable display of a poker game (not shown) with appropriate icons that enable the player to make his own desired game play decisions and to monitor the progress of the game by viewing the game play decisions of the other participating players in the same instance of the game.

Figure 9:
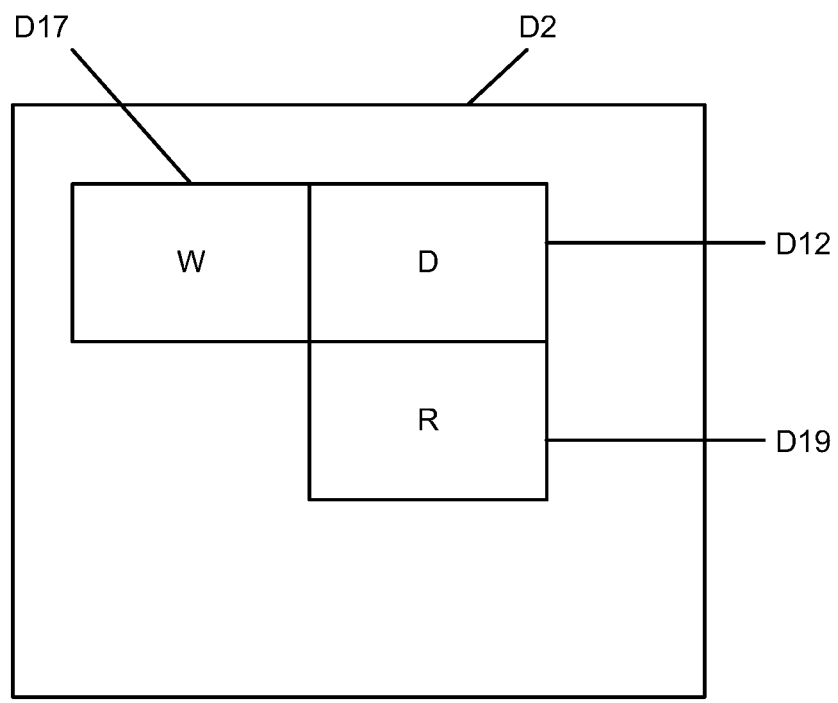
FIG. 9 is a functional representation of a stored software program of the application web server of FIG. 8, according to some embodiments.

As shown in FIG. 9, the stored program also provides a wagering means (D17) operable by any participating player to place a wager on a turn of the game, as well as a discrimination means (D18) capable of determining whether any wager placed by any one of the participating players on the turn of the instance of the game of poker is successful or unsuccessful. The stored program in the gaming server (D2) also maintains a dynamic register (D19) of all players admitted to, and actively participating in, all the spawned instances of the poker from time to time, together with data representative of a corresponding portal (D3a, D3b) through which each participating player accessed the game. The dynamic register (D19) also contains data representative of an instance of the game in which the player is participating. The application web server (D13) also settles the wagers of the participating players after completion of every turn of all instances of the game.

In use, a player wishing to participate in the game of poker uses a computer workstation (D4) to access an online casino website (D3a, D3b) of his choice. The player is presented with an icon (not shown) on the GUI on his computer workstation (D4), which the user can activate in order to request participation in the poker game at a desired level of play. The user's request for participation is passed by the online casino website (D3a, D3b) to the gaming server (D2), which adjudicates and processes the request in the following manner: 1. if all existing instances of the poker game at the desired level of play are currently being played by 8 players, the existing instances of the game are all fully occupied and the would-be player cannot be admitted. The user is notified of the situation and is prompted to join a waiting list of would-be players; 2. if any one of the existing instances of the poker game at the desired level of play does have a vacancy, the would-be player is removed from the waiting list and admitted to that instance of the game and an appropriate GUI is presented to the newly-admitted player to allow him to play the game and to place wagers thereon; 3. the register of active participating players is updated to include the details of the newly-admitted player, together with data representative of the online casino website (D3a or D3b) from which the player was admitted to the game, as well as the particular instance of the game to which he has been admitted; 4. when the waiting list of would-be players at any particular level of play has grown sufficiently large, say 4 or 5, the gaming server spawns a new instance of the game at that level of play to accommodate the would-be players in the waiting list, and the list is flushed; and 5. the register of active participating players is updated to include the details of all the newly-admitted players in the newly-spawned instance of the game, together with data representative of an online casino website (D3a or D3b) from which the players were admitted to the game, as well as the particular instance of the game to which the players have been admitted.

Any player is able to leave the instance of the poker game in which he is participating at any time upon completion of a turn of that instance of the game. When a participating player leaves an instance of the poker game, the players departure results in the following actions: 1. the GUI corresponding to the poker game on the computer workstation is replaced by one allowing the player to select another casino game to play; 2. the departing players details are removed from the register of active participating players; and 3. the remaining instances of the game are analyzed in order to collapse any sparsely populated instances of the game and to consolidate the participating players in these instances into a single more densely-populated instance of the game.

The participating players in any instance of the game utilize the wagering means (D17) to place wagers from time to time on a turn of the poker game and to effect playing decisions required during the progress of the turn, as described above. Once the turn of the game has been completed, the discrimination means (D18) determines which of the players is the winner of the turn and the application web server (D13) settles the wagers placed by the participating players on that turn of the instance of the game, as follows: 1. the gaming server (D2) notifies an online casino website (D3a, D3b) associated with each player who has made a wager on the turn of the game. Each online casino website (D3a, D3b) then debits the individual credit account of its associated player by an amount equivalent to the magnitude of that player's wager; 2. the clearing account of an online casino website (D3a, D3b) associated with each player who has made a wager on the turn of the game is then debited by an amount equivalent to the magnitude of that player's corresponding wager; 3. the clearing account of an online casino website (D3a, D3b) associated with the player who has made the successful wager on the turn of the game is credited by an amount equivalent to the total of all the wagers inclusive of the successful wager; and 4. the gaming server (D2) also notifies the online casino website (D3a, D3b) associated with the successful player and that online casino website credits the individual credit account of the successful player by an amount equivalent to the total of all the wagers inclusive of the successful wager.

It is anticipated that the wagers placed by the participating players in the game will be made with credit purchased by such players prior to their participation in the game. For this purpose each online casino (D3a, D3b) includes credit-dispensing means (not shown) capable of dispensing credit to any player who wishes to participate in the poker game. The player may purchase credit by means of conventional credit or debit card payment facilities that are well known in the art and that will not be described here in detail. Whenever a player purchases credit from the credit dispensing means, the corresponding online casino (D3a, D3b) credits that player's credit account with an amount equivalent to the quantity of credit purchased by the player.

In various embodiments, the application server (D13) withholds a portion of the total of all the wagers on each turn of the game as a rake for the benefit of the operator of the gaming server (D2) and the online casino websites (D3a, D3b). A portion of the rake is credited to the clearing account of each of the online casinos (D3a, D3b) as a function of the proportion of players participating in the turn of the instance of the game through that particular casino website. In this variation of the embodiment, the clearing account of the casino (D3a or D3b) associated with the player who has made a successful wager on the turn of the game is credited with an amount equivalent to the total of all the wagers inclusive of the successful wager, less the amount of the rake. Analogously, the credit account of the player who has made the successful wager is credited by an amount equivalent to the total of all the wagers, inclusive of the successful wager, less the rake.

The collusion detection server (D14) maintains a recording means in the form of a collusion detection database (D20), the function of which will be described in greater detail below. The collusion detection server (D14) operates under control of a stored program capable of logging the playing history of each player who participates an instance of the game of poker at some time. The playing history includes an amount wagered on each turn of the game in which the player has participated, as well as a corresponding outcome of the wager. The outcome of the wager is taken to be a profit made on the wager, if successful, and an amount of the wager that is forfeited by the player if the wager is unsuccessful. In this particular embodiment, the outcome of the successful wager is thus the total of all the wagers by the participating players in the turn of the instance of the game of poker, less the amount wagered by the winning player, less the amount of the rake. The logged information is recorded in the collusion detection database (D20).

Figure 10:
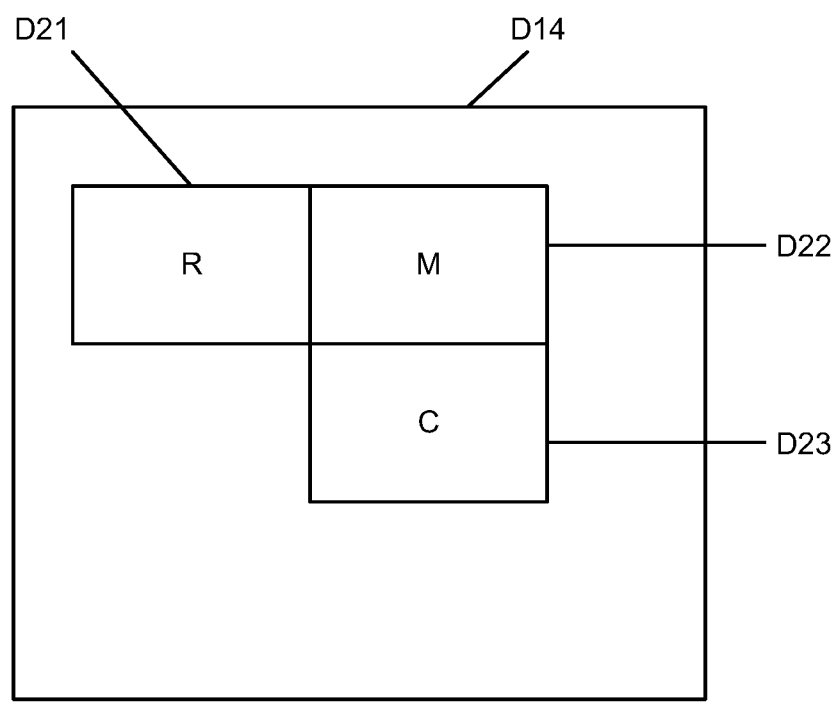
FIG. 10 is a functional representation of a stored software program of the collusion detection server of FIG. 8, according to some embodiments.

As shown in FIG. 10, the stored program in the collusion detection server (D14) provides a ranking facility (D21) that is operable to derive from the logged playing history of each player, a corresponding primary statistic. A player's primary statistic is re-calculated by the ranking facility (D21) each time the player's playing history is updated with the outcome of a further turn of the game in which the player has participated. The derived primary statistic is stored in the collusion detection database (D20). The primary statistic is a player's win/loss ratio over all turns played by the player, which is calculated as: win .times./.times. loss .times. .times. (all .times. .times. hands .times. .times. played)=Units+/−na where: Units+/−=sum of the outcomes of all the wagers; and na=number of hands played by the player.

The stored program in the collusion detection server (D14) also provides a monitoring means (D22) for continuously monitoring the primary statistic of any player in the collusion detection database (D20). The monitoring means (D21) generates an output in the form of a flag when the primary statistic of any player changes by more than a predetermined threshold. Such a change indicates a change in that player's pattern of play and this may serve as an indicator of possible collusion by that player that is worthy of further investigation. In order to minimize the possibility of generating spurious flags, the ranking facility (D21) derives the primary statistic for a player once a playing history exceeding 300 turns of the game has been logged in the collusion detection server (D14). It is anticipated that a particular player's win/loss ratio will differ according to a level at which the game is played, the player being more cautious when playing the game at a high level. For this reason, the ranking facility (D21) computes a primary statistic for each player for each level at which the game may be played. In this instance, the levels of play are: games up to $1/$2, games from $2/$4 to $5/$10, games from $10/$20 to $20/$40, fixed limit games over $20/$40, Pot Limit games, and No Limit games. Thus a primary statistic for a particular level of play will only be derived by the ranking facility (D21) when a playing history of 300 turns of the game has been logged for that particular level of play.

The stored program in the collusion detection server (D14) also provides a control facility (D23) that acts on the flag generated by the monitoring means (D21) by suspending the corresponding player from further participation in the game of poker.

The ranking facility (D21) also computes a number of secondary statistics relating to each player. When the primary statistic has a positive value, indicating a winning player, a first secondary statistic is a breakdown of that player's winnings from the other players in the instance of the game. If an inordinate percentage of that player's winnings is derived from one or more other players, the monitoring means (D22) generates a flag. Such a skewed pattern of winnings is a further indicator of possible collusion by the winning player.

A further secondary statistic, which is computed when the primary statistic for a player is negative, indicating a losing player, is a breakdown of that player's losses to the other players in the instance of the game. If an inordinate percentage of that player's losses are made to one or more other players, the monitoring means (D22) generates a flag.

A still further secondary statistic is computed as: raises with/without a Raising Hand=R/RH where: R=total number of raises; and RH=number of raising hands.

Each game play decision by a player to raise a prior wager is analyzed by an analysis facility (D24) connected to the gaming server (D2). The analysis facility (D24) evaluates whether the game play decision was optimal in the light of the cards in the players hand. A ratio close to 1 indicates that the player is raising correctly. A ratio significantly greater than 1 means that the player is raising too often with hands that are not adjudged to be raising hands. This indicates that the player is a poor player, or a colluder, and a flag is raised by the monitoring means (D22).

As a yet further statistic, a player's losses arising from all raises are broken down and analyzed. An inordinately high proportion of losses to one or more other participating players causes the monitoring means (D22) to raise a flag.

It is anticipated that the two previous secondary statistics can be advantageously employed to quickly analyze a new participating player. With a logged playing history of only 20 or 30 turns of the game, these secondary statistics will be accurate enough to enable the monitoring means (D22) to raise a flag, when required.

Sports Betting

Various embodiments provide a system and method for conducting sports and event betting. According to one aspect, the ease of using a network (e.g., the Internet, cellular, and/or other type of network) is combined with sports and event betting at a land-based casino. Thus, sport and other types of event betting are improved, as betting is more convenient to the bettor.

According to one embodiment, a bettor may sign onto a website (e.g., through the Internet and/or other type of network) to place a bet on any sports or other event including professional and college football, soccer, baseball, basketball, auto racing, and ice hockey, as well as cricket, rugby, and various sports tournaments including the NCAA Men's and Women's Basketball Championships and World Cup Soccer. Other events upon which a bet may be placed include any type of event, such as, for example, choosing the winner of a reality television show (e.g., the Survivor reality show), when the first person lands on Mars, or the winner of the next United States Presidential election.

According to one embodiment, a website (e.g., made available through the Internet or other type of network) includes a listing of all the possible bets that may be made. According to another embodiment, the bettor may then select the wagers to be made on-line and register the wagers to be made with the casino. One advantage of this is especially apparent for complicated or multiple selection events that may involve multiple selections of events to occur. For instance, a bet involving the entire NCAA Men's Basketball Championship Tournament which has 63 games and 64 teams is a complicated bet that may require multiple event selections. In another example, choosing a fantasy league team (e.g. for the National Football League (NFL)) may have as many as 30 team members or positions and as many as 60 choices for each position, further complicating the wagering process. However, such traditional wagers were limited to being placed in the gaming establishment by the bettor. According to one aspect, the bettor is permitted to arrange the bet outside of the gaming establishment, and to make payment for the bet in a legal manner.

According to various embodiments, a bettor may propose a bet for the website operator to consider. According to various embodiments, a registration number is issued by the website operator if the bet is accepted. According to various embodiments, the bettor then proceeds to the land-based casino running the website and pays for the registered bet. According to various embodiments, by permitting the bettor to making the actual payment for the wager at the land-based casino, legal issues with Internet betting in the United States are reduced or eliminated. This method is believed to provide convenience to the bettor because the bettor can determine and place their bet(s) prior to going to the casino. Further, such a method may provide additional foot traffic for the casinos to enhance play of their other games, as bettors are required to travel to the casino to make payment.

Figure 17:
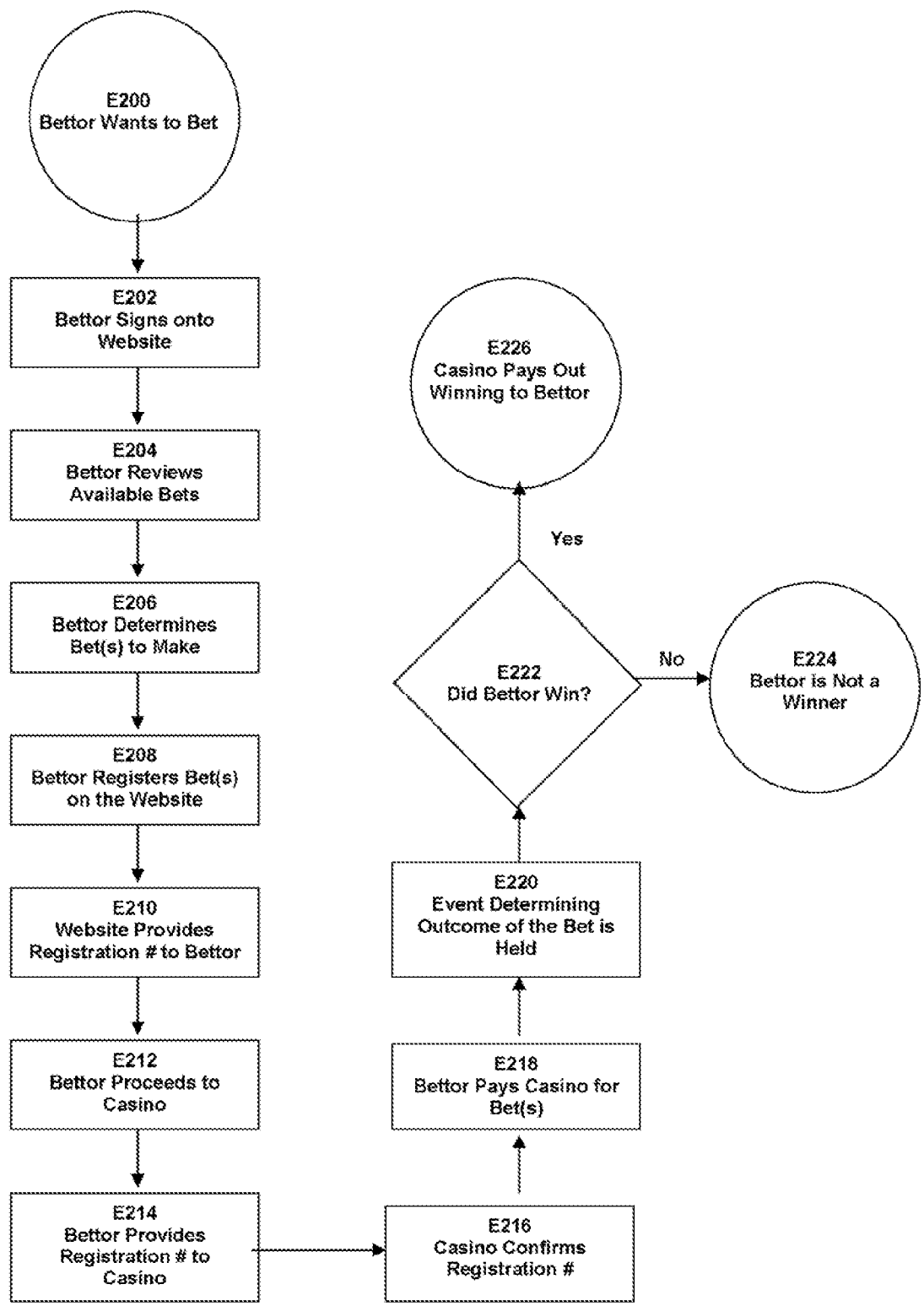
FIG. 17 is a diagram showing a flow chart of a process for placing a sports bet according to some embodiments.

FIG. 17 shows one example process for conducting sports and event betting according to various embodiments. At block E200, process E230 begins with a bettor determining that he or she wants to place a bet on a sports or other event. At block E202, the bettor signs onto a website or other resource accessible through a communication network. In one example system, the player accesses a website that includes an interface (e.g., a graphical user interface (GUI)) in which the player may log onto for security. Further, the player may be permitted to access account information and/or information specific to the bettor. This interface may be used to access the website or Internet, or may be any other interface (e.g., an interface used to access a download website used for downloading betting software). The interface may be, for example, an HTML, Java, or other type interface.

At block E204, the bettor reviews the available bets on the website. According to some embodiments, the website may list all or some of the possible bets that may be made. The possible bets that may be shown may be determined according to the bettor's account or betting profile (e.g., possible football bets will not be shown to a bettor not interested in football). Available bets may also be shown based on the historical betting behavior of the bettor.

Odds shown for a possible bet may be set or may be variable depending upon when the bet is registered or when the bet is paid for. For example, a bet on the winner of the Major League Baseball World Series may have 6:1 odds after the regular season and before the baseball playoffs start, 1:1 odds just before the World Series starts, and 1:4 odds after the third game of the Series. For this example, the odds of the registered bet may be determined at the time the bet is registered or at the time the bet is paid for. If the odds for a registered bet are determined at the time the bet is registered, the land-based casino may require payment for the registered bet within a specified time period (e.g. one minute, one hour, one day, one week, one month, etc.) and this specified time period may shorten as the sports or other event approaches.

At block E206, the bettor determines the bet(s) to make and at block E208, the bettor registers the bet(s). For instance, the bets may be registered on a website (e.g., through a communication network including the Internet, cellular network, etc.). The bettor may make a bet listed on the website. Alternatively or in addition to the offered bets that are listed, the player may propose a bet not on the website. For instance, in the case where a bet is not listed on the website, the bettor may state the specific event that is being bet on and the bettor or the website operator may determine the odds to be given to the bettor for the bet.

When the website operator accepts the bet, the website may provide a registration, transaction, or confirmation number to the bettor for the bet(s) at block E210. The bettor then proceeds to the land-based casino at block E212 for payment. For instance, the bettor may proceed to a cashier, a kiosk, or other means available for paying for the bet(s) at the casino or other legal gambling jurisdiction. At block E214, the bettor provides the bet registration number to the casino, the casino confirms the registration number at block E216. At block E218, the bettor pays the casino for the bet(s), and the bettor may obtain a betting slip showing the bet(s) placed and the odds on the bet(s).

At block E220, the event is held that determines the outcome of the bet and the casino determines if the bettor is a winner at block E222. If the bettor is a winner, the casino then pays out the winnings to the bettor at block E226. To receive the winnings, a bettor may be required to return to the casino.

At block E220, it is possible that the bettor may need to make more picks on the same bet. For example, a bettor may need to make more picks for second and other additional rounds of a multiple round tournament based upon the previous round's results. Such a tournament may include, for example, the FIFA World Cup in soccer or the NCAA Men's Basketball Championship. In such a tournament, it is possible that a bettor may need to make all picks for all rounds before placing the bet.

When paying for a registered bet, a bettor may pay, for instance, using money, loyalty points, combination thereof, or any other payment method. In particular, a bettor may pay using money by debit card, credit card, check, cash or from an account credit either with the gaming operator or an affiliated organization. Alternatively or in addition to other payment methods, a bettor may pay using loyalty points from an account held either by the gaming operator or by an affiliated organization. Loyalty points may be obtained from any type of organization but are generally associated with loyalty programs such as frequent flier programs for airlines, frequent stay programs for hotels or frequent visitor programs for casinos. The bettor may pay in person (e.g., by using a cashier) or by other methods within the casino including telephone, handheld device, or kiosk. Payment may be in any form that is legal in the particular jurisdiction.

The computer system or game operator may automatically determine when a bettor is a winner. Such a result may be automatically authenticated and verified by the computer system. In this instance, the computer system may then notify the bettor that he or she has won and what the winnings are. Notification of winning to a bettor may occur by mail, e-mail, computer web or network, telephone, television, pager, fax, kiosk or any other method.

After a winner is authenticated and verified, the computer system may then notify all bettors of the win. Additionally, the computer system may display the winning bet, the bettor's identity or the payout.

A bettor may also be able to replay or review a past bets using an audio-enabled or video-enabled device. For instance, a kiosk, telephone having a display, television, computer or handheld device may be used to view past bets. By accessing a selected bet in the computer system, a game player may be able to see the event outcome, the bet odds, and the payout.

In one embodiment, a computer system may be used to operate most acts of the betting operation, including taking, registering, and paying out bets. For instance, computer system(s) used to perform betting functions according to one embodiment may include single or multiple computer systems, one or more of which may include a supercomputer, a minicomputer, a mainframe computer, or a personal computer. A computer system used to run-the betting operation may also include any combination of computer system types that cooperate to accomplish system-level tasks. Multiple computer systems may also be used to run one or more betting operations. The computer system also may include input or output devices, displays, or storage units to facilitate the betting operation. It should be appreciated that any computer system or systems may be used, and various embodiments are not limited to any number, type, or configuration of computer systems.

Figure 13:
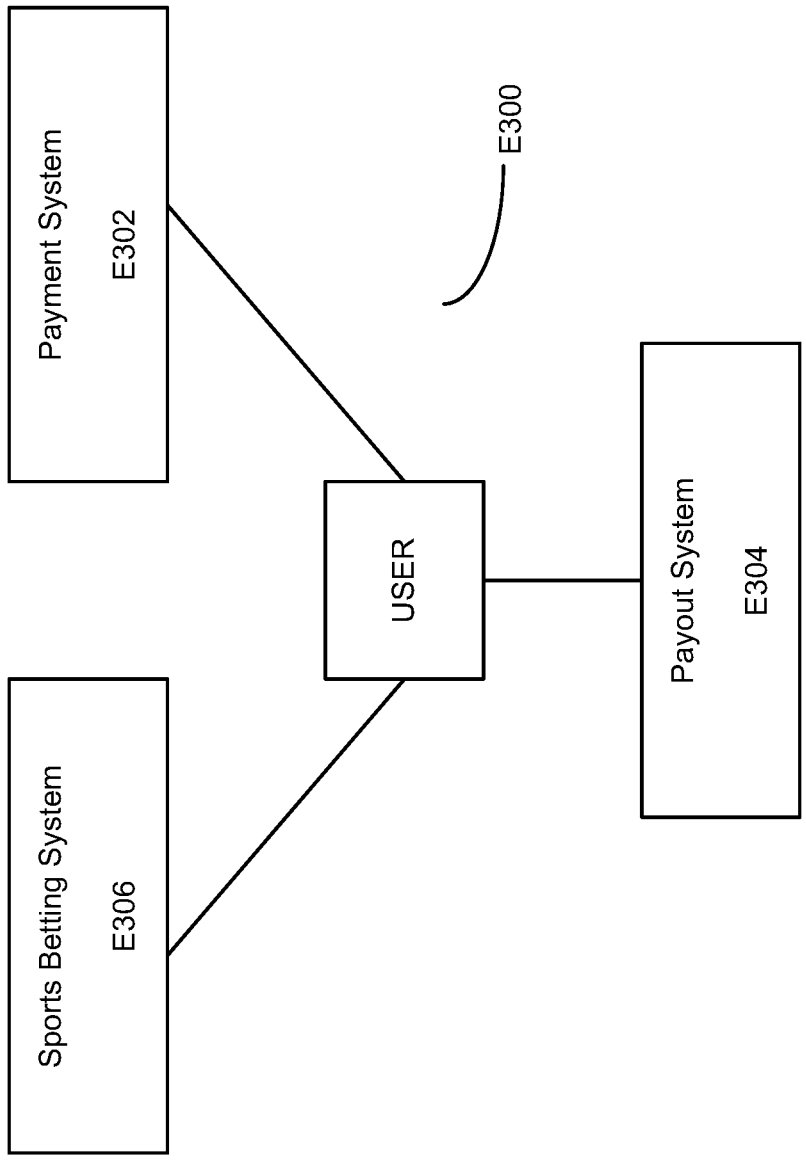
FIG. 13 is a diagram showing components of the sports betting computer according to some embodiments.
Figure 14:
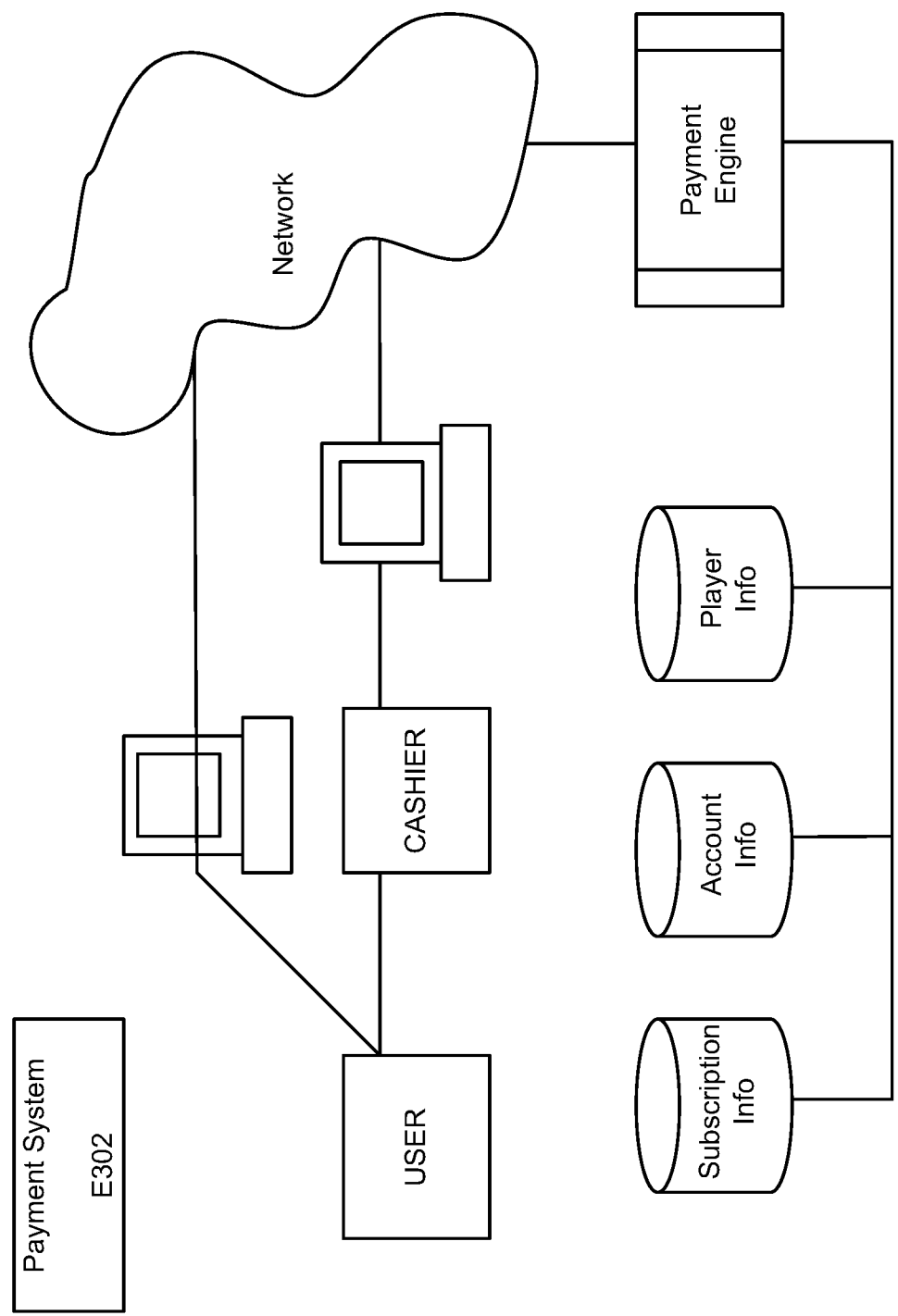
FIG. 14 is a diagram showing components of a payment subsystem according to some embodiments.

A computer system (e.g., system E300) that executes the betting operation according to various embodiments may include, for example, one or more component systems (e.g., systems E302, E304, and/or E306 as shown in FIG. 13). One system component (e.g., payment system E302) may handle payment by bettors. Another system component (e.g., sports betting system E306) may handle taking and registering bets for one or more events, including sporting event. Yet another system (e.g., payout system E304) may handle making payouts to players. Such a betting system may also be connected (e.g., by direct line or network) to other computer systems including systems for handling casino or hotel loyalty programs, reservations, in-room television viewing, gambling floor kiosks, or other systems. Connections to other computer systems may be performed using one or more of the system components described below.

A payment component (e.g., system E302) may include one or more of a number of well-known systems. For example, a bettor may be able to pay for a bet through a casino cashier, kiosk or other means that is connected to the payment computer system through an interface. In the computer, data may be stored in a database that is stored in the memory of a computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Examples of UIs that may be implemented with various embodiments include a graphical user interface (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Bettor information may also be entered into a payment system component. Bettor information that may be input includes name, address, telephone number and age, and payment information may include a credit or debit card number or loyalty account information. Based upon the payment information, the call center representative may verify that the payment information is valid and that enough credit or funds is available for the player's bet(s).

Various pay systems and one or more user interfaces may be located on computer systems coupled by a network with the computer system(s) storing data having bettor, account and subscription information. As used herein, a "network" or a "communications network" is a group of two or more devices interconnected by one or more segments of transmission media or active communications equipment on which communications may be exchanged between the devices.

The above examples are merely illustrative embodiments of a payment system component. It should be appreciated that such an illustrative embodiment is not intended to be limiting in scope, as any of numerous other implementations of the pay system, for example, variations for on-site casino payment, are possible and are intended to fall within the scope of various embodiments. For example, the payment system may include using pay-per-view systems associated with interactive television in a casino hotel or the pay engine may additionally deliver a receipt to the player by either e-mail or mail. None of the claims set forth below are intended to be limited to any particular implementation of a pay system unless such claim includes a limitation explicitly reciting a particular implementation.

Figure 15:
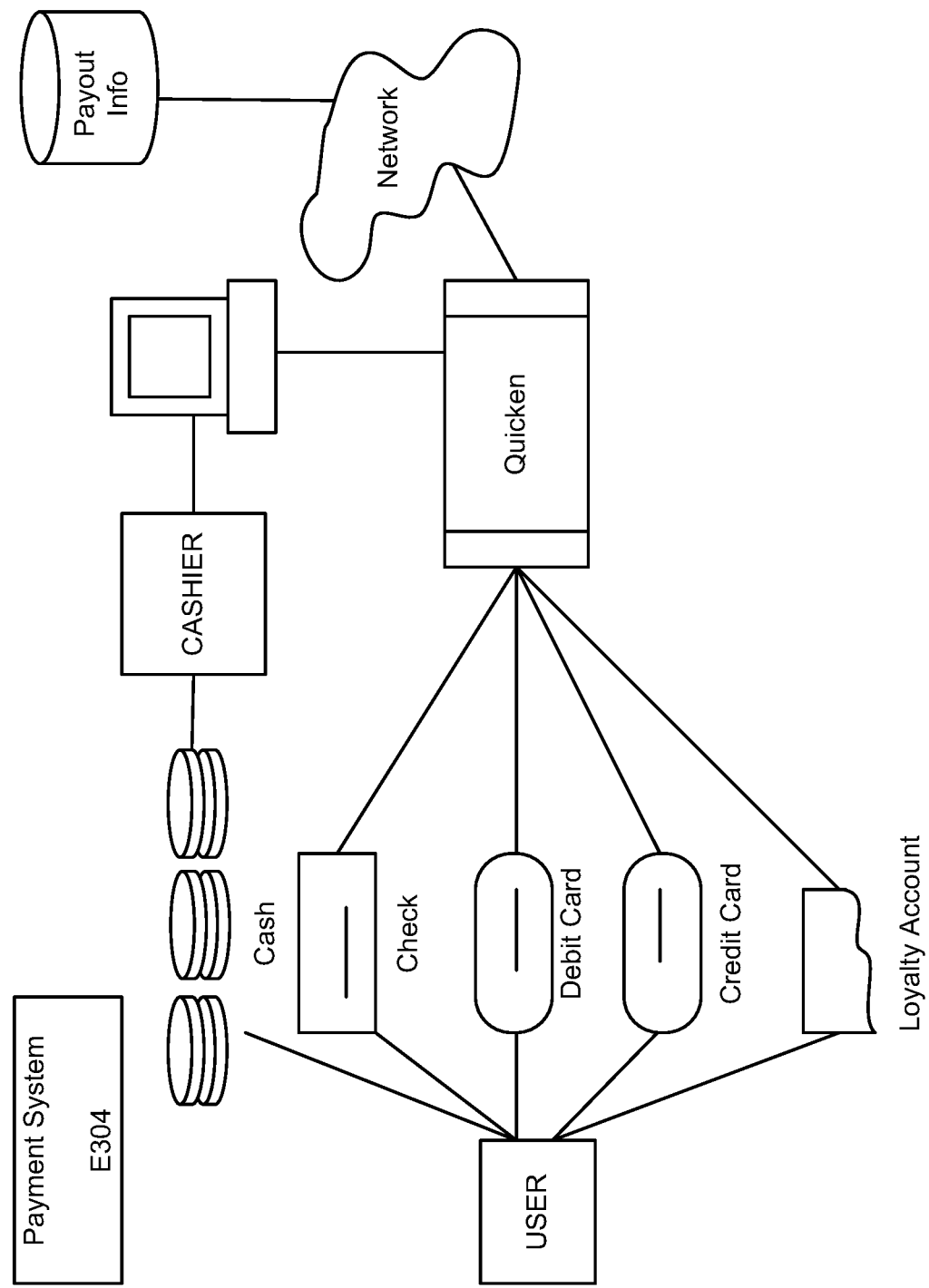
FIG. 15 is a diagram showing components of a payout subsystem according to some embodiments.

Payout systems (e.g., system E304) are also well known. Any of a number of standard systems or payout engines for making payouts for winning may be used according to various embodiments as shown in FIG. 15. For example, a standard application programming interface such as 'Quicken' (available commercially from Intuit Inc., Mountain View, Calif., USA) may be used to write and mail checks or credit a debit card, credit card (if legal in the jurisdiction of play) or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of the payout system. Such an illustrative embodiment is not intended to be limiting in scope, as any of numerous other implementations of the payout system, for example, variations of online payout, are possible and are intended to fall within the scope of various embodiments. Additionally, a cashier may also have access to payout information using a user interface to the payout data structure through a network; the cashier then makes a payment to the winning player based upon the accessed information.

Figure 16:
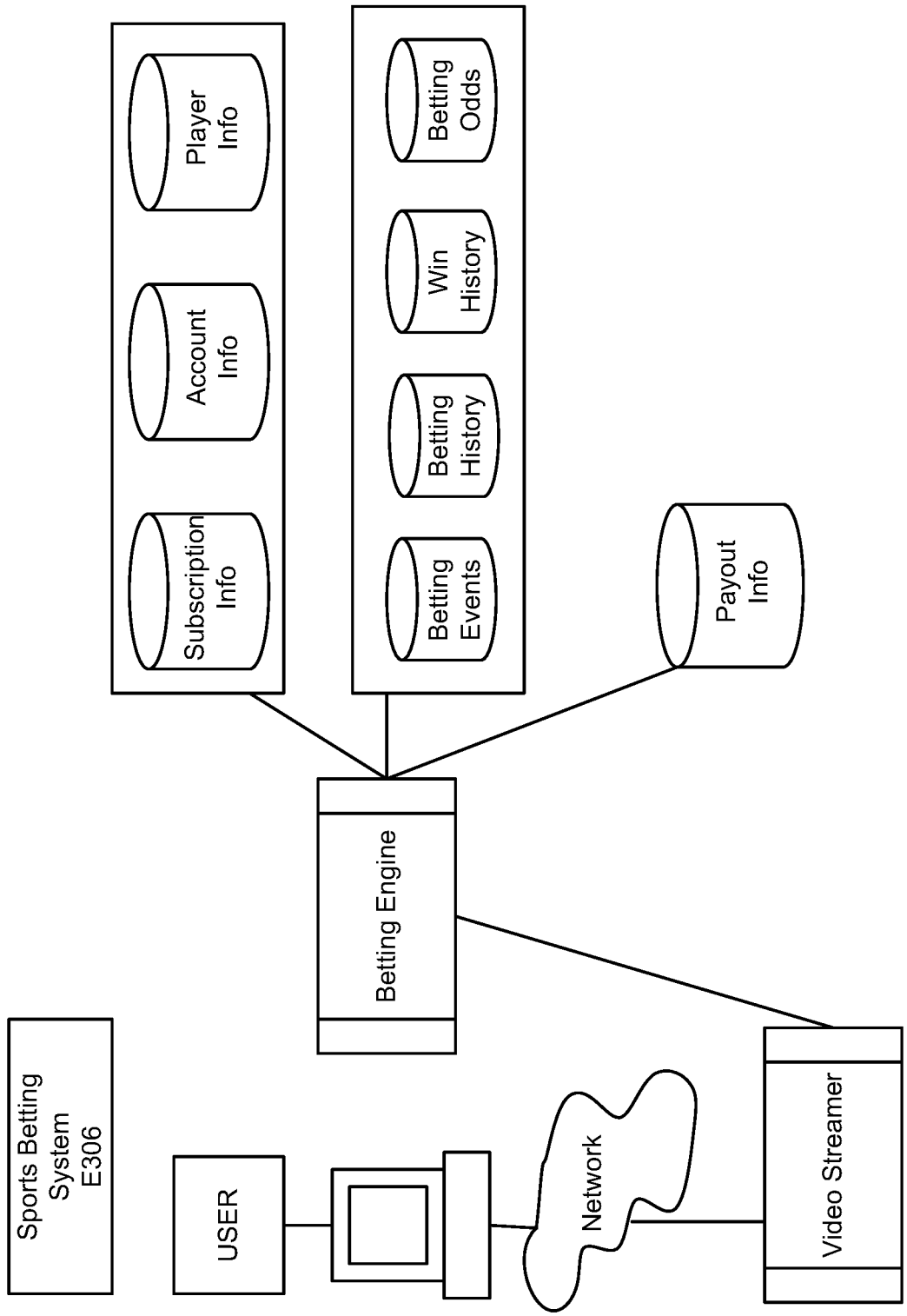
FIG. 16 is a diagram showing components of a sports betting subsystem according to some embodiments.

A sports and event betting system (e.g., system E306 as shown in FIG. 16) according to various embodiments may comprise of a number of components for performing specific functions. These components may include, for example, storage means that store data structures having information relating to betting events and odds. For example, such information may include event date, time, and location, bettor's betting and win history, and event odds and their dependence upon time of payment. A sports and event betting system may also include components to access payment and payout data structures.

The sports and event betting system may also include a betting engine. A betting engine may perform, for example, some functions according to process E230 shown in FIG. 17 and described above. It should be appreciated that the betting process E230 may include more or less acts as shown in FIG. 17, and that various embodiments are not limited to any particular number of order of acts (e.g., the order illustrated in FIG. 17) as the acts may be performed in other orders, may include additional acts and one or more of the acts of process E230 may be performed in series or in parallel to one or more other acts, or parts thereof. For example, blocks E214 and E218, or parts thereof, may be performed together, and act E216 may be performed at any point after block E214 (including after block E218) of process E230.

Process E230 is merely an illustrative embodiment of a method for performing sports or event betting. Such an illustrative embodiment is not intended to be limiting in scope, as any of numerous other implementations for performing sports or event betting may be employed. None of the claims set forth below are intended to be limited to any particular implementation of a method of sports or event betting, unless such claim includes a limitation explicitly reciting a particular implementation.

Process E230, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the various embodiments discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects.

It should be appreciated that any single component or collection of multiple components of a computer system, for example, the computer system described below in relation to FIG. 11, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the event betting system may include a software component (e.g., a driver) that streams video via a broadband, satellite or wireless medium to a user interface. If the game is played completely automatically, the user interface may be merely a video terminal including television with no user input means. Viewing access may be controlled by standard methods for conditional access including using set top box addresses, telephone numbers or internet protocol (IP) addresses.

The above is merely an illustrative embodiment of a sports and event betting system. Such an illustrative embodiment is not intended to be limiting in scope, as any of numerous other implementations of a sports and event betting system, for example, variations of conditional access, are possible and are intended to fall within the scope of various embodiments. None of the claims set forth below are intended to be limited to any particular implementation of a sports and event betting system unless such claim includes a limitation explicitly reciting a particular implementation.

System E300, and components thereof such as the payment, payout and betting engines, may be implemented using software (e.g., C, C#, C++, Java, or a combination thereof), hardware (e.g., one or more application-specific integrated circuits, processors or other hardware), firmware (e.g., electrically-programmed memory) or any combination thereof. One or more of the components of 300 may reside on a single system (e.g., the payment subsystem), or one or more components may reside on separate, discrete systems.

Further, each component may be distributed across multiple systems, and one or more of the systems may be interconnected.

Further, on each of the one or more systems that include one or more components of E300, each of the components may reside in one or more locations on the system. For example, different portions of the components of E300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System E300 may be implemented on a computer system described below in relation to FIGS. 11 and 12.

System E300 is merely an illustrative embodiment of the game system. Such an illustrative embodiment is not intended to be limiting in scope, as any of numerous other implementations of the sports and event betting system, for example, variations of system E300, are possible and are intended to fall within the scope of various embodiments. For example, interactive television may also be used to view the available bets. None of the claims set forth below are intended to be limited to any particular implementation of the betting system unless such claim includes a limitation explicitly reciting a particular implementation.

Various embodiments may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments. Further, the software design system may be located on a single computer or may be distributed among a plurality of computers attached by a communications network.

Figure 11:
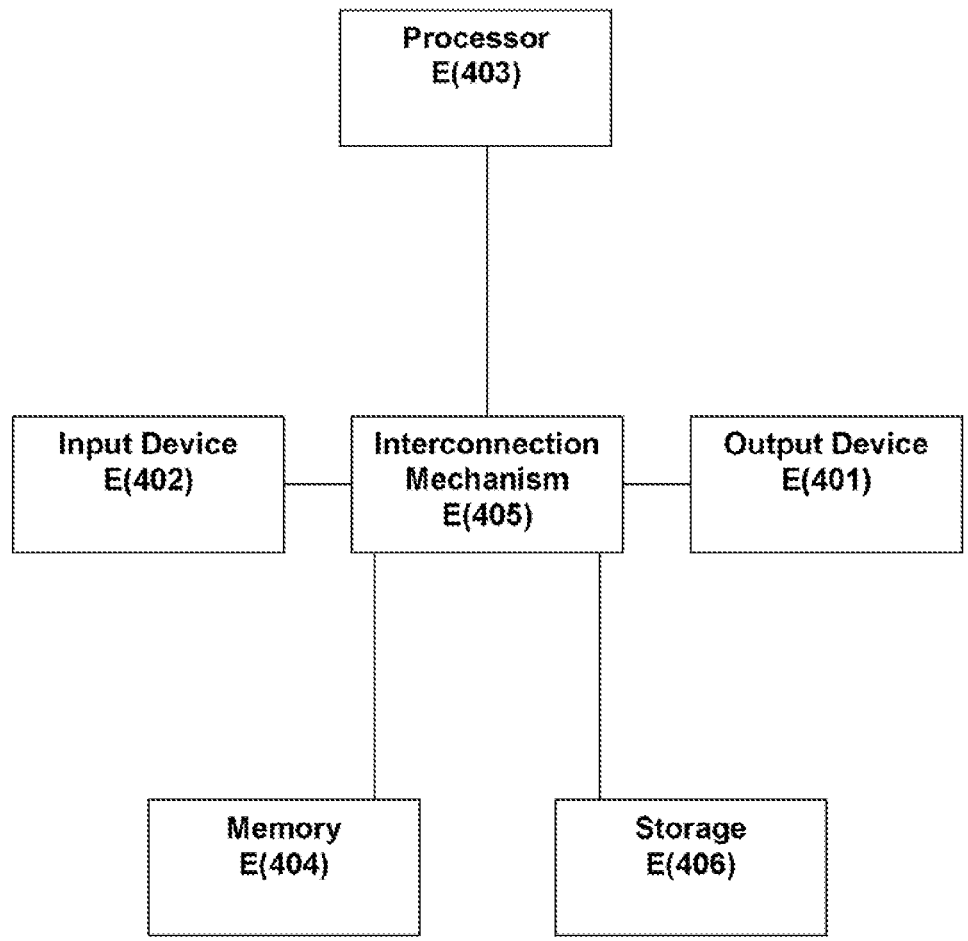
FIG. 11 is a block diagram of a general-purpose computer system upon which various embodiments may be implemented.

For example, various embodiments may be implemented as specialized software executing in a general-purpose computer system E400 such as that shown in FIG. 11. The computer system E400 may include a processor E403 connected to one or more memory devices E404, such as a disk drive, memory, or other device for storing data. Memory E404 is typically used for storing programs and data during operation of the computer system E400. Components of computer system E400 may be coupled by an interconnection mechanism E405, which may include one or more busses (e.g., between components that are integrated within a same machine) and/or a network (e.g., between components that reside on separate discrete machines). The interconnection mechanism E405 enables communications (e.g., data, instructions) to be exchanged between system components of system E400. Computer system E400 also includes one or more input devices E402, for example, a keyboard, mouse, trackball, microphone, touch screen, and one or more output devices E401, for example, a printing device, display screen, or speaker. In addition, computer system E400 may contain one or more interfaces (not shown) that connect computer system E400 to a communication network (in addition or as an alternative to the interconnection mechanism E405.

Figure 12:
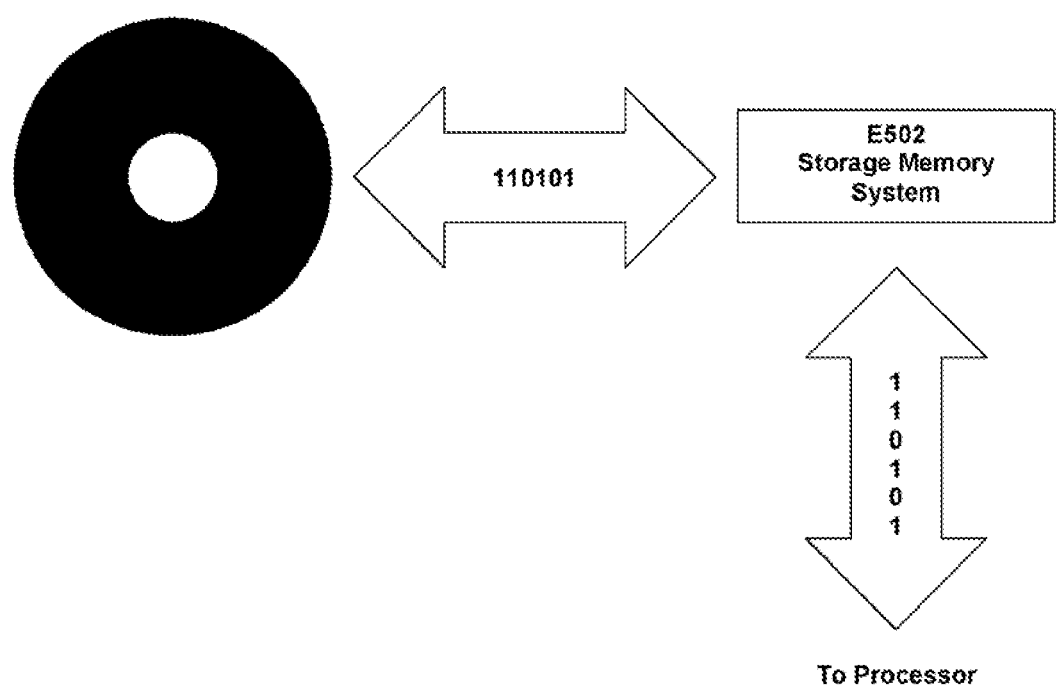
FIG. 12 is a block diagram of a computer data storage system with which various embodiments may be practiced.

The storage system E406, shown in greater detail in FIG. 12, typically includes a computer readable and writeable nonvolatile recording medium E501 in which signals are stored that define a program to be executed by the processor or information stored on or in the medium E501 to be processed by the program. The medium may, for example, be a disk or flash memory. Typically, in operation, the processor causes data to be read from the nonvolatile recording medium E501 into another memory E502 that allows for faster access to the information by the processor than does the medium E501. This memory E502 is typically a volatile, random access memory such as a dynamic random access memory (DRAM) or static memory (SRAM). It may be located in storage system 406, as shown, or in memory system E404, not shown. The processor E403 generally manipulates the data within the integrated circuit memory E404, E502 and then copies the data to the medium E501 after processing is completed. A variety of mechanisms are known for managing data movement between the medium E501 and the integrated circuit memory element E404, E502. Various embodiments are not limited to a particular memory system E404 or storage system E406.

The computer system may include specially-programmed, special-purpose hardware, for example, an application-specific integrated circuit (ASIC). Various features or aspects may be implemented in software, hardware or firmware, or any combination thereof. Further, such methods, acts, systems, system elements and components thereof may be implemented as part of the computer system described above or as an independent component.

Although computer system E400 is shown by way of example as one type of computer system upon which various embodiments may be practiced, it should be appreciated that embodiments are not limited to being implemented on the computer system as shown in FIG. 11. Various embodiments may be practiced on one or more computers having a different architecture or components that that shown in FIG. 11.

Computer system E400 may be a general-purpose computer system that is programmable using a high-level computer programming language. Computer system E400 may be also implemented using specially programmed, special purpose hardware. In computer system E400, processor E403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that various embodiments not limited to a particular computer system platform, processor, operating system, or network. Also, it should be apparent to those skilled in the art that various embodiments are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various embodiments may be distributed among one or more computer systems configured to provide a service (e.g., servers) to one or more client computers, or to perform an overall task as part of a distributed system. For example, various embodiments may be performed on a client-server system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP).

It should be appreciated that various embodiments are not limited to executing on any particular system or group of systems. Also, it should be appreciated that various embodiments are not limited to any particular distributed architecture, network, or communication protocol. Various embodiments may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various embodiments may be implemented in a non-programmed environment (e.g., documents created in HTML, XML or other format that, when viewed in a window of a browser program, render aspects of a graphical-user interface (GUI) or perform other functions). Various embodiments may be implemented as programmed or non-programmed elements, or any combination thereof.

Having now described some illustrative embodiments, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the various embodiments. In particular, although many of the examples presented herein involve specific combinations of method acts or system elements, it should be understood that those acts and those elements may be combined in other ways to accomplish the same objectives.

Verifying to the Player that Events were Random

Various embodiments may provide a means for verifying the integrity and authenticity of a sequence of random events used in an online casino game.

Various embodiments may provide a method of using a pre-generated sequence of random events to play an online casino game.

Various embodiments may provide a method of sending a pre-generated sequence of random events to a user in an encrypted and/or digested form so that the user cannot forecast the sequence of random events in the online casino game.

Various embodiments may provide a method for providing the user with an encryption key and the original random events sequence at the end of a game session to decrypt and verify the pre-generated random events sequence by comparing the stored random events sequence with the original random events sequence and thereby authenticate the random events sequence used in the online casino game.

Various embodiments may provide a method of sending a pre-generated sequence of random events to a user so that the user may reassemble the random events after a game session is completed.

Various embodiments provide a method of authenticating a pre-generated random events sequence in an online casino game. In a preferred embodiment, a user establishes communication with an online casino to request a game session. The user requests a game to play on the online casino from a list of available games such as blackjack, roulette, craps, etc. Once the user completes the selection of the game, the online casino receives the request and initiates the game session. For each game, there is a certain number and type of estimated random events that will be required to play the game session to completion, or end the game session at the discretion of the user. Each random event represents an action that would occur at a real casino, such as drawing a card or rolling dice. The online casino is equipped with a random number generator which pre-generates an estimated number of random events and places the random events into a random events sequence. The random events sequence is coded into an encrypted sequence and then transmitted to the user who stores the encrypted sequence until a game verification stage. For the step of encoding, the random events sequence may also be converted into a digital digest and transmitted to the user, or first encrypted and then converted into a digital digest and transmitted to the user.

At this stage in the game session, the user cannot interpret the pre-generated encrypted random events sequence the user receives from the online casino, and the online casino does not have to be concerned about the user being able to unfairly forecast the sequence of random events in the future. The user then commences playing the specified game by requesting random events from the online casino. The online casino receives these requests from the user and responds by sending the user the next number drawn sequentially from the pre-generated random events sequence. Events from the random sequence are consumed by the online casino during the game session. The user records all random events received from the online casino. Once the number of random events in the pre-generated sequence have been exhausted or the user indicates an intent to terminate the game session, the online casino communicates a "Game is Over to the user and the game ends.

The online casino then sends the user an encryption key for game verification to prove the integrity of the game. The encryption key allows the user to decode the encrypted random events sequence that was previously transmitted to the user at the beginning of the game session. The user decodes the encrypted random events sequence and the decoded random events sequence is compared to the record the user kept of the random events sequence sent by the online casino. If the sequences are identical, then the random events sequence was not altered or tampered with by the online casino during the game session. If the random event sequence recorded by the user and the random events sequence presented by the online casino are different, the verification fails. The user then communicates the failure to the online casino and an appropriate action is taken.

The game session may also be played with more than one user. The online casino may send the same encrypted sequence, which is pre-generated, to each participant allowing them to recompile their individual random events sequences into the original pre-generated random events sequences and compare it with the random events sequences sent by the online casino for verification purposes.

Various embodiments will now be described with reference to FIGS. 18 to 21, which in general disclose a method for ensuring the authenticity and integrity of online games, and more specifically a method of authenticating a pre-generated random events sequence in an online casino game.

Figure 18:
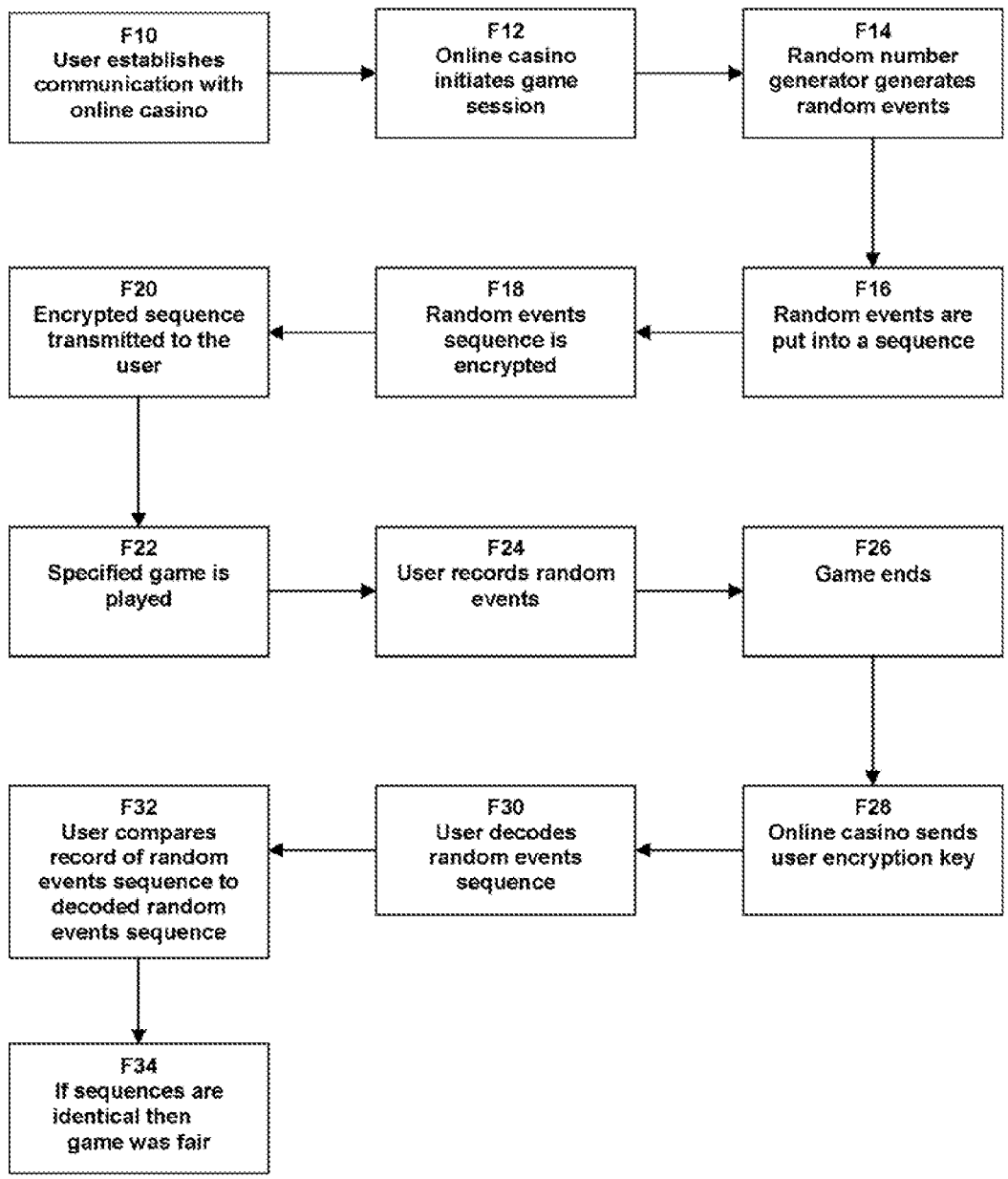
FIG. 18 is a schematic view of a method of authenticating a pre-generated random events sequence in an online casino game, according to various embodiments.

Referring to FIG. 18, in a preferred embodiment, a user establishes communication with an online casino F10 to request a game session which is the equivalent of one game in an actual casino. The user possesses the necessary computer, client game software and any other basic materials and hardware needed to establish communication with the online casino. The online casino may be a single computer acting as a game server or several computers where databases and processors are in different locations. The user requests a game to play on the online casino during the game session by selecting from a list of available games. A list of typical games to play during the game session may include one of the following games: blackjack, roulette, craps, baccarat, slot machine, lottery, sports betting and poker. It is understood that various embodiments are not limited to these games and may include games not included in the above list.

Once the user completes the selection of the game and communicates the game selected to the online casino, the online casino receives the request and initiates the game session F12. For each game, there is a certain number and type of estimated random events that will be required to play the game session to completion, or end the game session at the discretion of the user. Each random event represents an action that would occur at a real casino, such as drawing a card or rolling dice. For example, in the game of blackjack, the type of random events which occur during the game is the action of drawing cards. The number of random events in one game session will typically not exceed 10,000 events. Events from the random sequence are consumed by the online casino during the game session. The online casino is equipped with a random number generator which pre-generates the random events F14.

Figure 19:
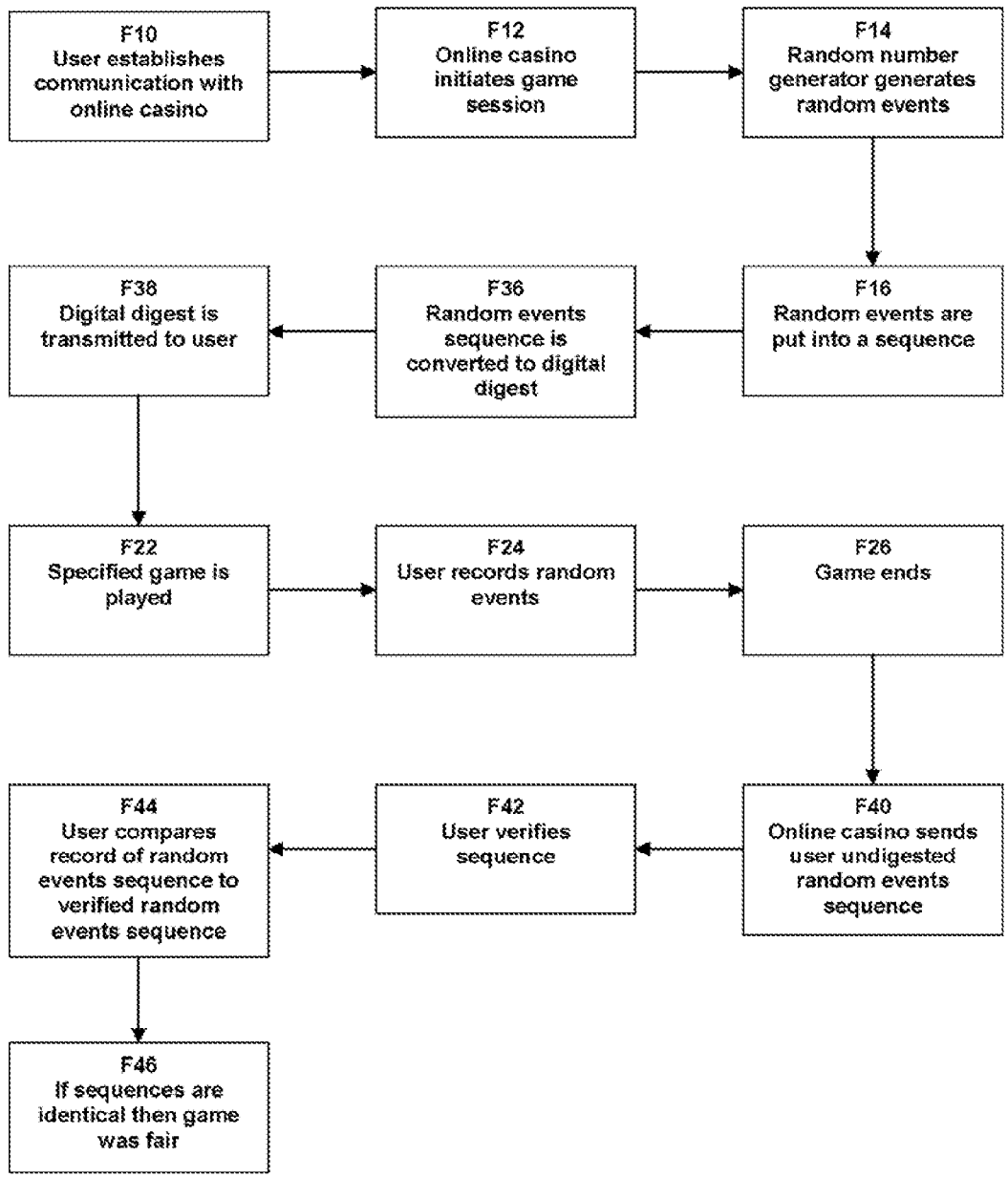
FIG. 19 is a schematic view of a method of authenticating a pre-generated random events sequence which is converted into a digital digest, according to various embodiments.
Figure 20:
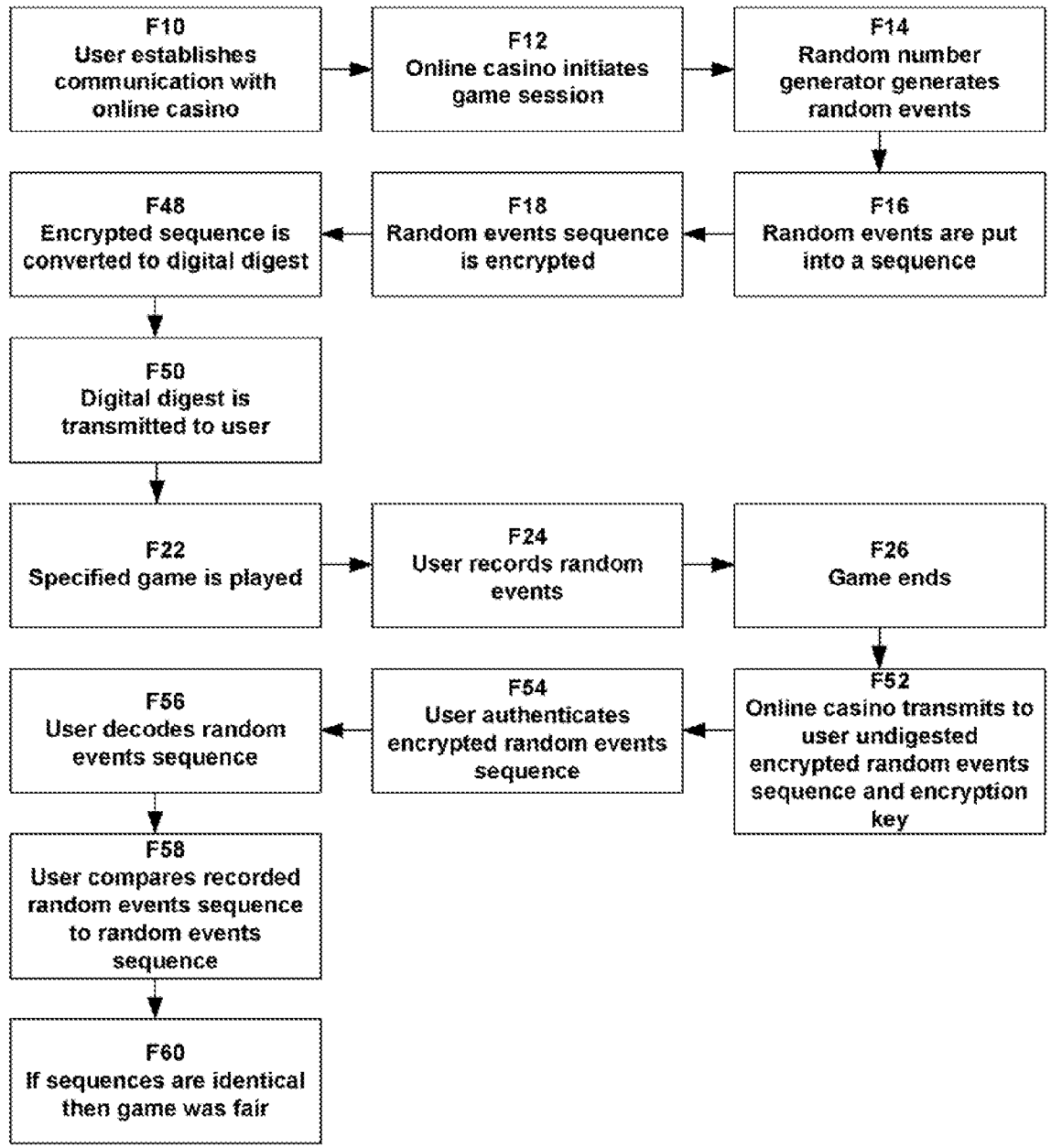
FIG. 20 is a schematic view of a method of authenticating a pre-generated random events sequence which is encrypted and converted into a digital digest, according to various embodiments.

The online casino generates an estimated number of random events and places the random events into a random events sequence F16 which is a set of random events generated for the game session. The random events sequence is coded into an encrypted sequence F18 and then transmitted to the user F20 who stores the encrypted sequence until a game verification stage. The method used to encrypt the random events sequence may be any well known encryption method used in the art. As shown in FIGS. 19 and 20, respectively, for the step of encoding, the random events sequence may also be converted into a digital digest and transmitted to the user, or first encrypted and then converted into a digital digest and transmitted to the user, as described below.

Referring again to FIG. 18, at this stage in the game session, the user cannot interpret the pre-generated encrypted sequence and the online casino does not have to be concerned about the user unfairly predicting the sequence of random events in the future. The user then commences playing the specified game F22 by requesting random events from the online casino. The online casino receives these requests from the user and responds by sending the user the next number drawn sequentially from the pre-generated random events sequence. The user records all random events F24 received from the online casino. It is understood that the user may record the random events manually, as a function of the client game software or other well know methods for recording. Once the number of random events in the pre-generated sequence have been exhausted or the user indicates an intent to terminate the game session, the online casino communicates a "Game is Over to the user and the game ends F26.

The online casino then sends the user an encryption key F28 for game verification to prove the integrity of the game. The encryption key allows the user to decode the encrypted random events sequence that was transmitted to the user at the beginning of the game session. The user decodes the encrypted random events sequence F30 and the decoded random events sequence is compared to the record F32 the user kept of the random events sequence sent by the online casino at the commencement of the game session. It is understood that the user may compare the record the random events manually, as a function of the client game software or other well know methods for recording. If the sequences are identical, then the game was fair F34 and the random events sequence was not altered or tampered with during the game session. If the verification fails, the user communicates the failure to the online casino and an appropriate action is taken.

As shown in FIG. 17, the online casino may also encode the pre-generated random events sequence using a digital digest at the encoding step. The online casino converts the random events sequence into the digital digest F36 before transmitting the digital digest to the user F38. The specified game is played F22. The user records the random events F24 during the game session. Once the game ends F26, the online casino sends the user an undigested random events sequence F40. The user then verifies the authenticity of the random events sequence F42 sent by the online casino by converting the undigested random events sequence into the digital digest, and comparing this digital digest with the digital digest sent by the casino at the commencement of the game. For the verification to succeed, the two digital digests should be identical. Once the random events sequence sent by the online casino is thus verified, the user proceeds with verifying the random events sequence F44 sent by the online casino during the game session by comparing the verified undigested random events sequence sent by the casino at the end of the game with the random events sequences kept by the user. For the verification to succeed, the two random events sequences must be identical. Similarly, the comparison can be carried out by the user manually or by the client software. If the sequences are identical, then the game was fair F46 and the random events sequence was not altered or tampered with during the game session. If the verification fails, the user communicates the failure to the online casino and an appropriate action is taken.

Referring to FIG. 20, the online casino may also encode the pre-generated random events sequence by first encrypting and then converting the encoded sequence into a digital digest to complete the encoding step. The online casino encrypts the random events sequence and then converts it into the digital digest F48 before transmitting it to the user F50. The specified game is played F22. The user records the random events F24 during the game session. Once the game ends F26, the online casino transmits to the user an undigested random events sequence in its encrypted form. The online casino also transmits to the user an encryption key F52. The user first authenticates the encrypted random events sequence by converting it into a digital digest, and then comparing it to the digital digest F54 sent at the commencement of the game session. The random events sequence is then decoded F56 and compared to the record the user kept of the random events sequence sent by the online casino F58. The user may carry out the comparison manually or by the client game software. For the verification to succeed, the sequences must be identical. If the sequences are identical, then the game was fair F60 and the random events sequence was not altered or tampered with during the game session. If the verification fails, the user communicates the failure to the online casino and an appropriate action is taken.

Using the above method, the user may be confident that the random events sequence was generated without fraudulent action or knowledge of the online casino since the encrypted sequence was pre-generated and sent to the user prior to beginning of the game session, eliminating any chance for the online casino to modify the sequence of events, and thus the game, in response to the user's actions or steps during the game session.

Figure 21:
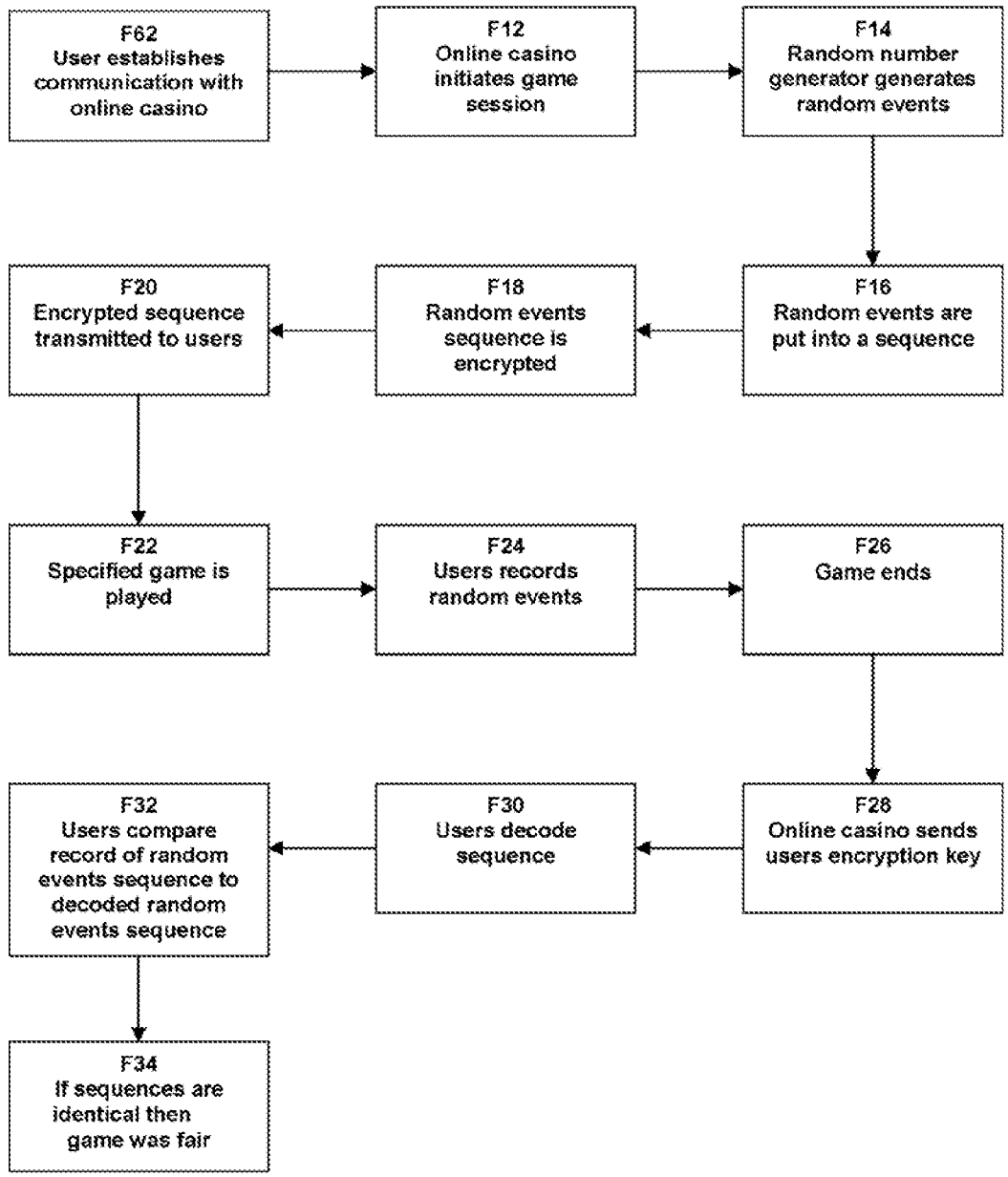
FIG. 21 is a schematic view of a method of authenticating a pre-generated random events sequence in a multiple-player game, according to various embodiments.

Referring to FIG. 21, the game session may be played with more than one user F62. The online casino may send the same encrypted sequence, which is pre-generated, to each participant (i.e. the encrypted sequence represents the same deck of cards). Each user must have access to the sequence of random events received by other users during the game session. At the end of the game session, the users then collectively compare the sequence of random events received to the sequence of random events that the online casino transmitted at the beginning of the game session to ensure that the sequence was not altered.

Although embodiments for ensuring the authenticity and integrity of online games are described above, it is to be understood that the features described may be used with any electronic game or technology requiring authentication of a random events sequence. Thus, the features and embodiments described above are not to be construed as limiting.

Teams

Various embodiments relate to a computerized system that facilitates team play of card gaming. The computerized system includes at least a first computer for use by a first participant associated with a first team; a second computer for use by a second participant associated with a second team; a third computer for use by a third participant associated with the first team; and a fourth computer for use by a fourth participant associated with the second team. A computer network links the first and second computers to each other for allowing the first and second participants to compete against each other for team points in a first set of card gaming. Likewise, the computer network also links the third and fourth computers to each other for allowing the third and fourth participants to compete against each other for team points in a second set of card gaming. A central server computer coupled to the computer network coordinates the first, second, third and fourth computers, and tallies together team points earned by participants of each team to compute an overall team score for each team. Preferably, the central server computer also computes the team points earned individually by each of the first, second, third, and fourth participants. The aforementioned computer network may be in the form of a local area network, assuming that the aforementioned computers are located relatively close to each other, as within a casino. Alternatively, the aforementioned computer network may be the internet in the case wherein one or more of such computers are located remotely from the others.

INCORPORATION BY REFERENCE

The following are incorporated by reference herein:
U.S. Pat. No. 6,375,568;
U.S. Pat. No. 6,575,834;
U.S. Pat. No. 5,800,268;
US patent application publication 20070015587;
U.S. Pat. No. 6,319,125;
U.S. Pat. No. 5,655,961;
US Patent application publication 20060194633;
US patent application publication 20060189381;
US patent application publication 20060172803;
US patent application publication 20060094497; and
US patent application publication 20060089189.

Mobile Games

Reference numerals below, until otherwise specified, refer only to FIGS. 22 through 34.

In various embodiments, a distributed gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, golf, etc. Events can also include such things that do not normally involve wagering. Such events may include, without limitation, political elections, entertainment industry awards, and box office performance of movies. Gaming can also include non-wagering games and events. Gaming can also include lotteries or lottery-type activities such as state and interstate lotteries. These can include all forms of number-selection lotteries, "scratch-off" lotteries, and other lottery contests. The gaming system may be implemented over a communications network such as a cellular network or a private wireless and/or wireline network. Examples of the latter include WiFi and WiMax networks. In some embodiments, the gaming system communications network is entirely independent of the Internet. In some embodiments, the gaming system operation makes minimal use of the Internet, such that only information for which there are no security issues is transmitted via the Internet and/or such that information may be encrypted. In various embodiments, the communications network enables players to participate in gaming from remote locations (e.g., outside of the gaming area of a casino). Also, the system may enable players to be mobile during participation in the gaming activities. In various embodiments, the system has a location verification or determination feature, which is operable to permit or disallow gaming from the remote location depending upon whether or not the location meets one or more criteria. The criterion may be, for example, whether the location is within a pre-defined area in which gaming is permitted by law.

Figure 22:
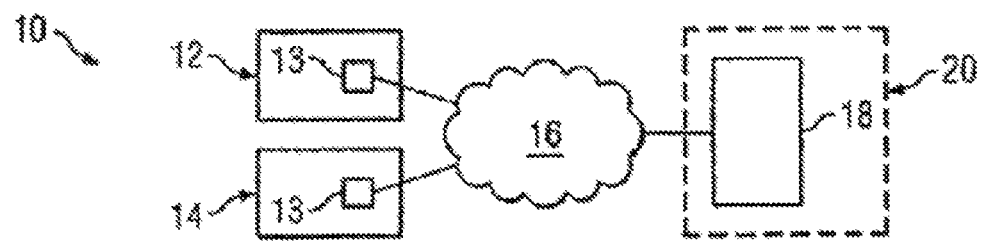
FIG. 22 shows a gaming system according to some embodiments.

As shown in FIG. 22, for example, gaming system 10 may include at least one user 12. The system may include additional users such that there is at least a first user 12 and a second user 14. Multiple users may access a first gaming system 10, while other multiple users access a second gaming system (not shown) in communication with first gaming system 10. Users 12 and 14 may access system 10 by way of a gaming communication device 13. Gaming communication device 13 may comprise any suitable device for transmitting and receiving electronic communications. Examples of such devices include, without limitation, mobile phones, personal data assistants (PDAs), computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 may be flexible, however, and computer 18 may reside adjacent to or remote from the domain of gaming service provider 20. Various embodiments may not include a gaming service provider. The computer 18 and/or gaming service provider 20 may reside within, adjacent to, or remote from a gaming provider (not shown in FIG. 22). The gaming service provider may be an actual controller of games, such as a casino.

As an example, a gaming service provider may be located on the grounds of a casino and the computer 18 may be physically within the geographic boundaries of the gaming service provider. As discussed, however, other possibilities exist for remote location of the computer 18 and the gaming service provider 20. Computer 18 may function as a gaming server. Additional computers (not expressly shown) may function as database management computers and redundant servers, for example.

In various embodiments, software resides on both the gaming communication device 13 and the computer 18. Software resident on gaming communication device 13 may be operable to present information corresponding to gaming activities (including gambling and non-gambling activities discussed herein) to the user. The information may include, without limitation, graphical representations of objects associated with the activities, and presentation of options related to the activities and selectable by the user. The gaming communication device software may also be operable to receive data from the computer and data input by the user. Software resident on the computer may be able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are also contemplated. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc.

In some embodiments, the communication of gaming information takes place without involvement of the Internet. However, in some embodiments, a portion of the gaming information may be transmitted over the Internet. Also, some or all of the gaming information may be transmitted partially over an Internet communications path. In some embodiments, some information is transmitted entirely or partially over the Internet, but the information is either not gaming information or is gaming information that does not need to be maintained secretly. For instance, data that causes a graphical representation of a table game on the users gaming communication device might be transmitted at least partially over the Internet, while wagering information transmitted by the user might be transmitted entirely over a non-Internet communications network.

Figure 23:
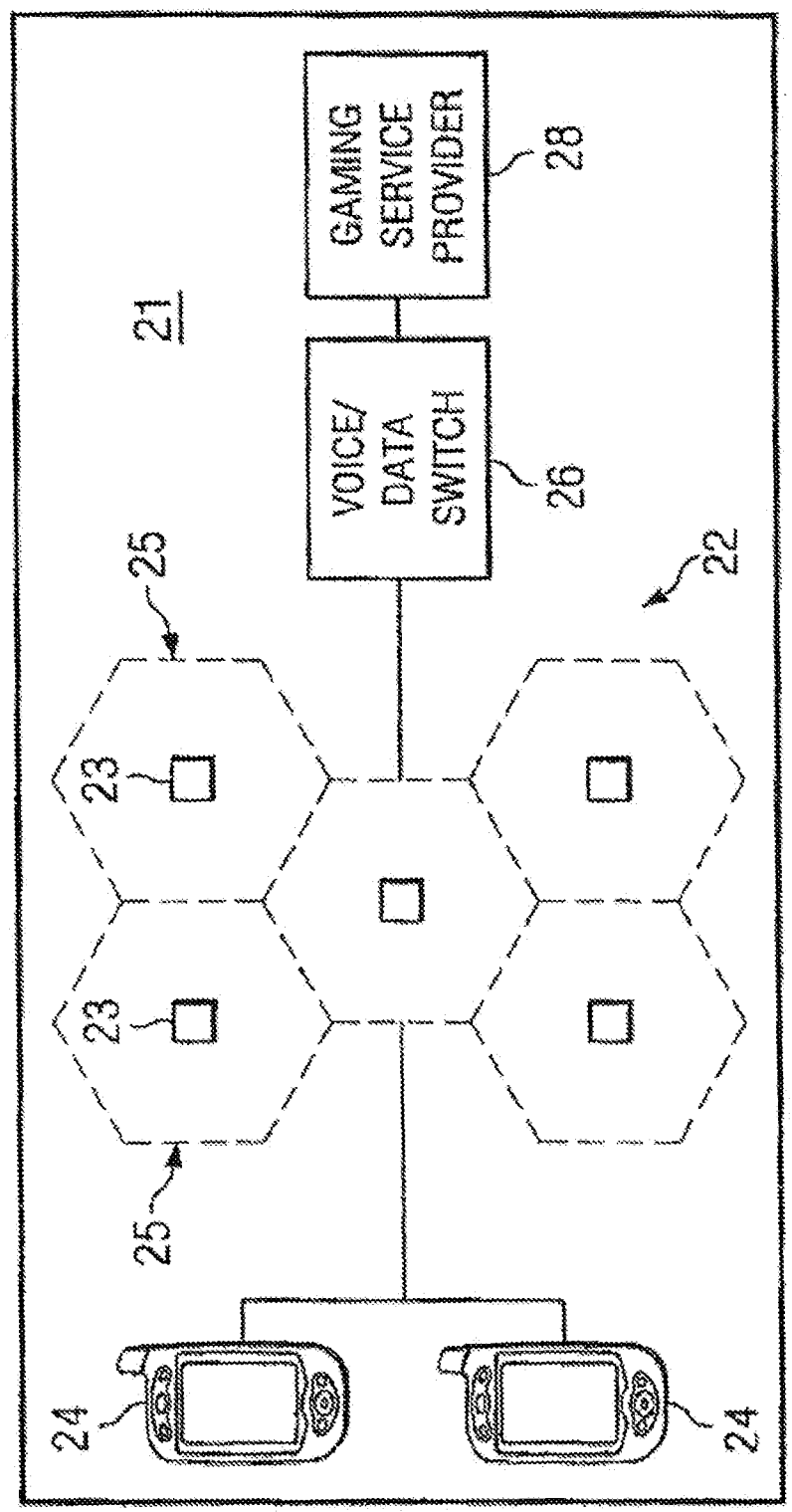
FIG. 23 shows a communications network according to some embodiments.

According to some embodiments, as shown in FIG. 23 for example, the communications network comprises a cellular network 22. Cellular network 22 comprises a plurality of base stations 23, each of which has a corresponding coverage area 25. Base station technology is generally known and the base stations may be of any type found in a typical cellular network. The base stations may have coverage areas that overlap. Further, the coverage areas may be sectorized or non-sectorized. The network also includes mobile stations 24, which function as the gaming communication devices used by users to access the gaming system and participate in the activities available on the gaming system. Users are connected to the network of base stations via transmission and reception of radio signals. The communications network also includes at least one voice/data switch, which may be connected to the wireless portion of the network via a dedicated, secure landline. The communications network may also include a gaming service provider, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the gaming system by way of mobile stations which are in communication with, and thus part of, the communications network. The mobile station may be any electronic communication device that is operable in connection with the network as described. For example, in this particular embodiment, the mobile station may comprise a cellular telephone.

In various embodiments, in the case of a cellular network for example, the gaming system is enabled through the use of a private label carrier network. Each base station is programmed by the cellular carrier to send and receive private secure voice and/or data transmissions to and from mobile station handsets. The handsets may be pre-programmed with both gaming software and the carriers authentication software. The base stations communicate via private T1 lines to a switch. A gaming service provider leases a private T1 or T3 line, which routes the calls back to gaming servers controlled by the gaming service provider. Encryption can be installed on the telephones if required by a gaming regulation authority, such as a gaming commission.

The cellular network may be a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices may not be allowed to "connect" to the Internet. This ensures a high level of certainty that bets/wagers originate and terminate within the boundaries of the gaming jurisdiction and the "private" wireless system cannot be circumvented or bypassed. Although in some embodiments some data and/or voice traffic may be communicated at least partially over the Internet, the communication path may not include the Internet in other embodiments. Alternatively, in some embodiments, certain non-gaming information may be transported over a path which includes the Internet, while other information relating to the gaming activities of the system is transported on a path that does not include the Internet.

Figure 24:
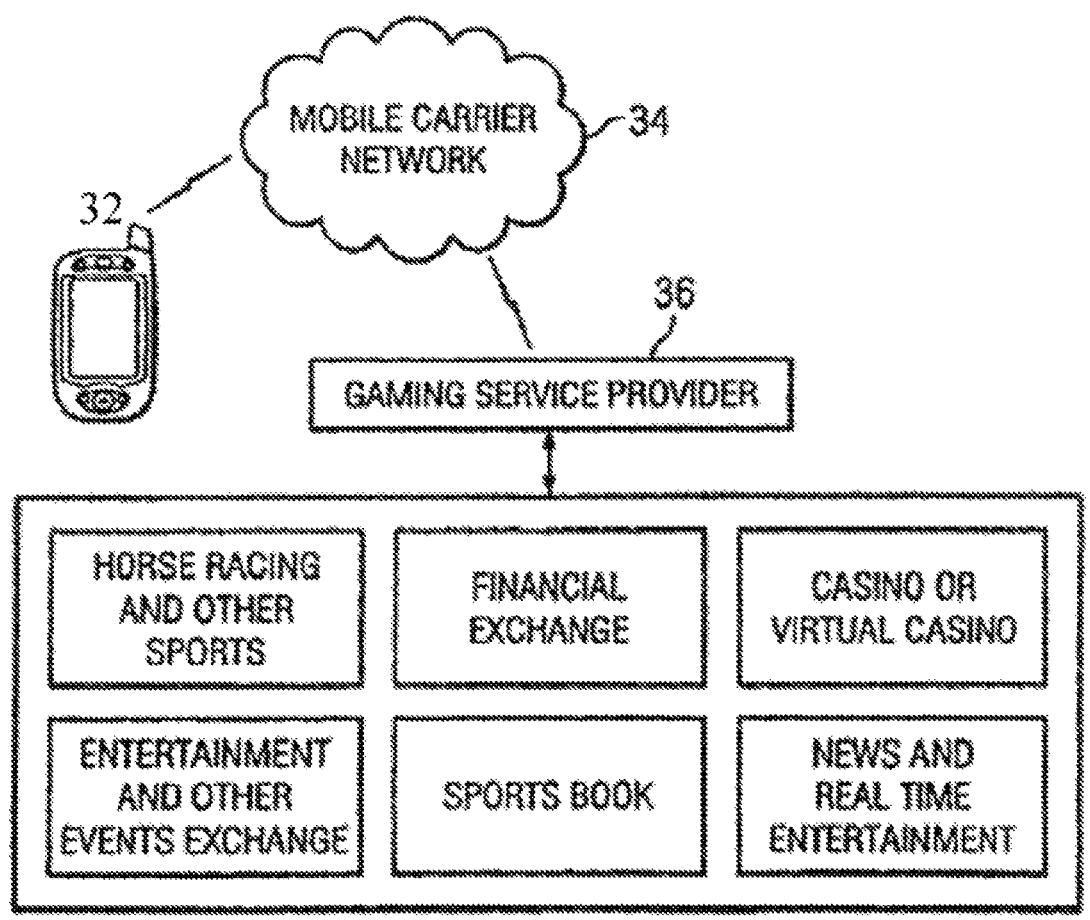
FIG. 24 shows a gaming service provider in communication with a gaming communication device according to some embodiments.

As shown in FIG. 24, a gaming communication device 32 is in communication with a gaming service provider over a network 34. The gaming service provider preferably has one or more servers, on which are resident various gaming and other applications. As shown in FIG. 24, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential activities.

Figure 25:
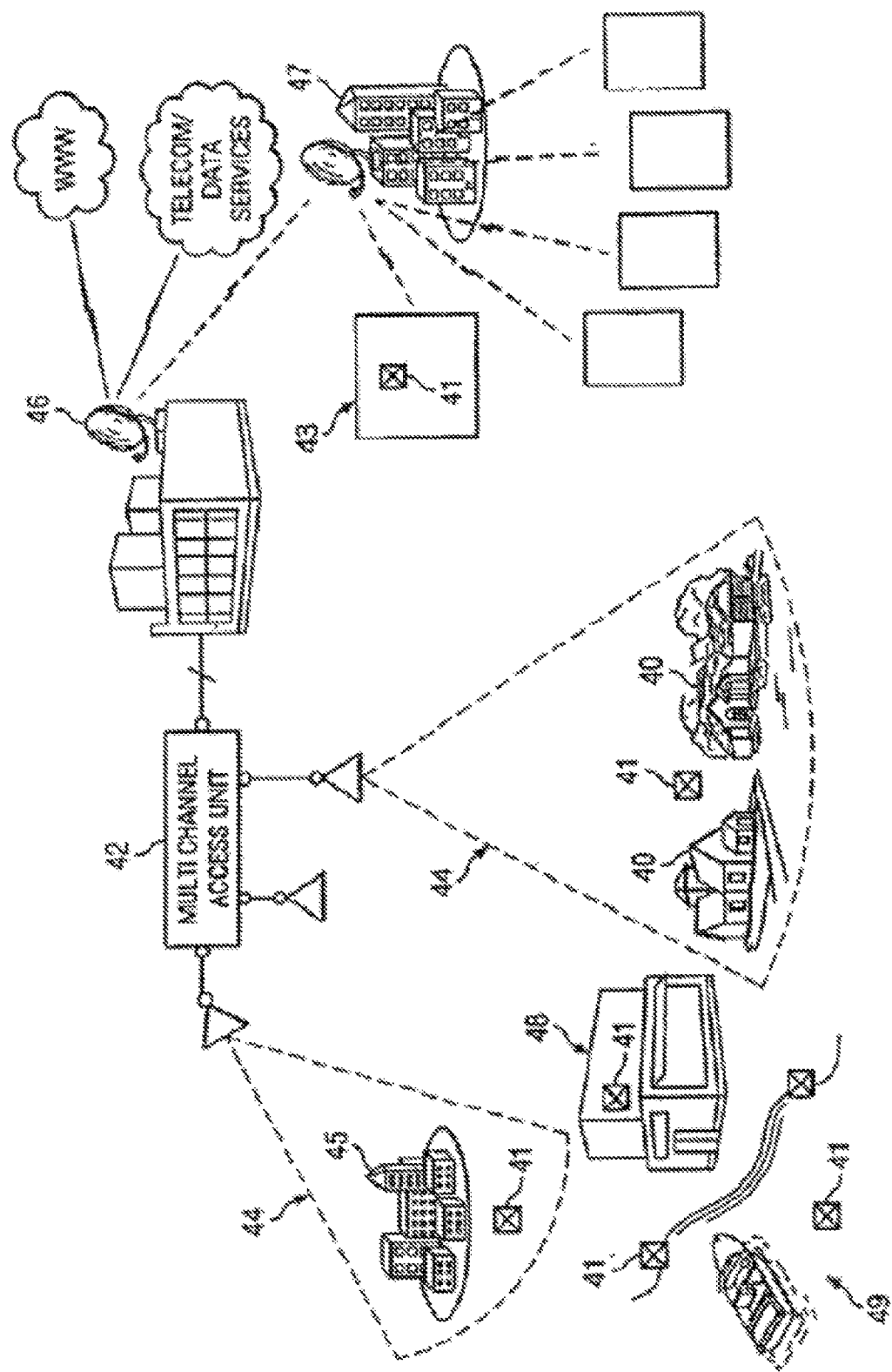
FIG. 25 shows a communications network according to some embodiments.

In another embodiment, as shown in FIG. 25, for example, the communications network comprises a private wireless network. The private wireless network may include, for example, an 802.11x (WiFi) network technology to cover "Game Spots" or "Entertainment Spots." In FIG. 25, various WiFi networks are indicated as networks 41. Networks 41 may use other communications protocols to provide a private wireless network including, but not limited to, 802.16x (WiMax) technology. Further, networks 41 may be interconnected. Also, a gaming system may comprise a combination of networks as depicted in FIG. 25. For example, there is shown a combination of private wireless networks 16, a cellular network comprising a multi-channel access unit or sectorized base station 42, and a satellite network comprising one or more satellites 46.

With respect to the private wireless network, because the technology may cover small areas and provide very high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote gaming areas 43. The configuration of the overall gaming system depicted in FIG. 25 is intended only as an example and may be modified to suit various embodiments.

In some embodiments, the system architecture for the gaming system includes:
(1) a wireless LAN (Local Access Network) component, which consists of mostly 802.11x (WiFi) and/or 802.16x WiMax technologies; robust security and authentication software; gaming software; mobile carrier approved handsets with Windows® or Symbian® operating systems integrated within; and
　(a) CDMA-technology that is secure for over-the-air data protection;
　(b) at least two layers of user authentication, (that provided by the mobile carrier and that provided by the gaming service provider);
　(c) compulsory tunneling (static routing) to gaming servers;
　(d) end-to-end encryption at the application layer; and
　(e) state-of-the-art firewall and DMZ technologies;

(2) an MWAN (Metropolitan Wireless Access Network), which consists of licensed and license-exempt, point-to-point links, as well as licensed and license-exempt, point-to-multi-point technologies;
(3) private MAN (Metropolitan Access Network) T1 and T3 lines to provide connectivity where wireless services cannot reach; and
(4) redundant private-line communications from the mobile switch back to the gaming server.

Each of the "Game Spots" or "Entertainment Spots" is preferably connected via the MWAN/MAN back to central and redundant game servers. For accessing the private wireless networks 41, the gaming communication devices may be WiFi- or WiMax-enabled PDAs or mini-laptops, and do not have to be managed by a third-party partner.

In various embodiments, the gaming system includes a location verification feature, which is operable to permit or disable gaming from a remote location depending upon whether or not the location meets one or more criteria. A criterion may be, for example, whether the location is within a pre-defined area in which gaming is permitted by law. As another example, a criterion may be whether the location is in a no-gaming zone, such as a school. The location verification technology used in the system may include, without limitation, "network-based" and/or "satellite-based" technology. Network-based technology may include such technologies as multilateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In some embodiments, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 26:
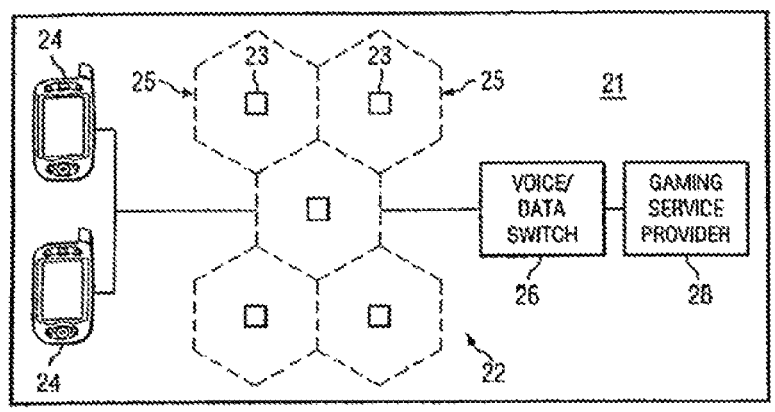
FIG. 26 shows a gaming system according to some embodiments.

As shown in FIG. 26, the gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the gaming system, the geo-fence 57 ensures that no gaming communication devices outside jurisdiction 58, such as device 54, are permitted access.

Geo-fencing may not specify location. Rather, it may ensure that a mobile station is within certain boundaries. For instance, geo-fencing may be used to ensure that a mobile station beyond state lines does not access the gaming system. Triangulation on the other hand may specify a pinpoint, or near-pinpoint, location. For example, as shown in FIG. 26, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with various embodiments meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In various embodiments, location verification is accomplished using channel address checking or location verification using some other identifying number or piece of information indicative of which network or portion of a network is being accessed by the gaming communication device. Assuming the usage of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In a some embodiments, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. In various embodiments, the gaming service provider either maintains, or has access to, a database that maps the various possible worldwide mobile network identifying numbers to geographic areas. Various embodiments contemplate using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In various embodiments, when the user connects his mobile telephone to the gaming server, the gaming server draws the network identifying information and communicates that information to the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example).

An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

Figure 27:
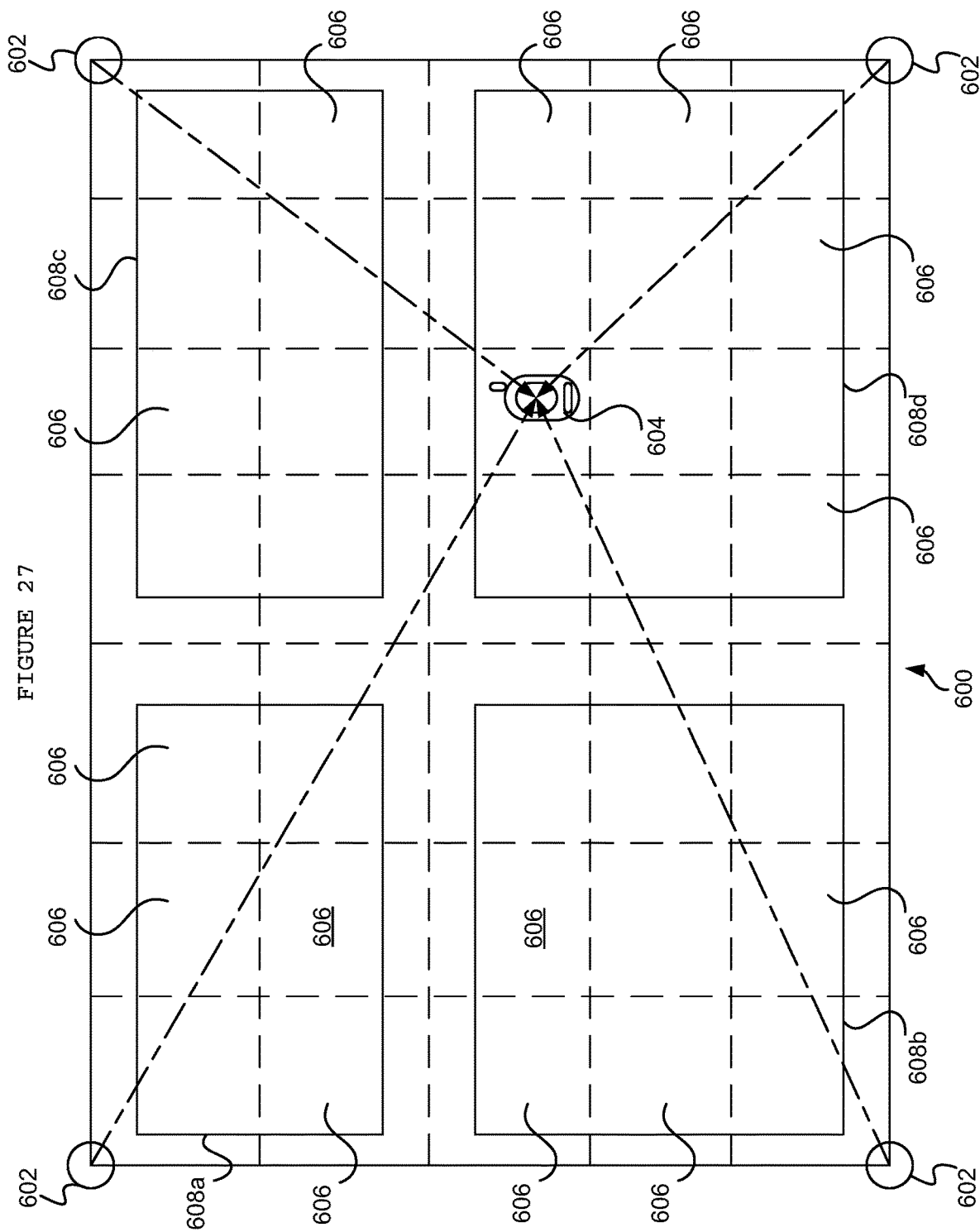
FIG. 27 shows a wireless gaming system according to some embodiments.
Figure 28:
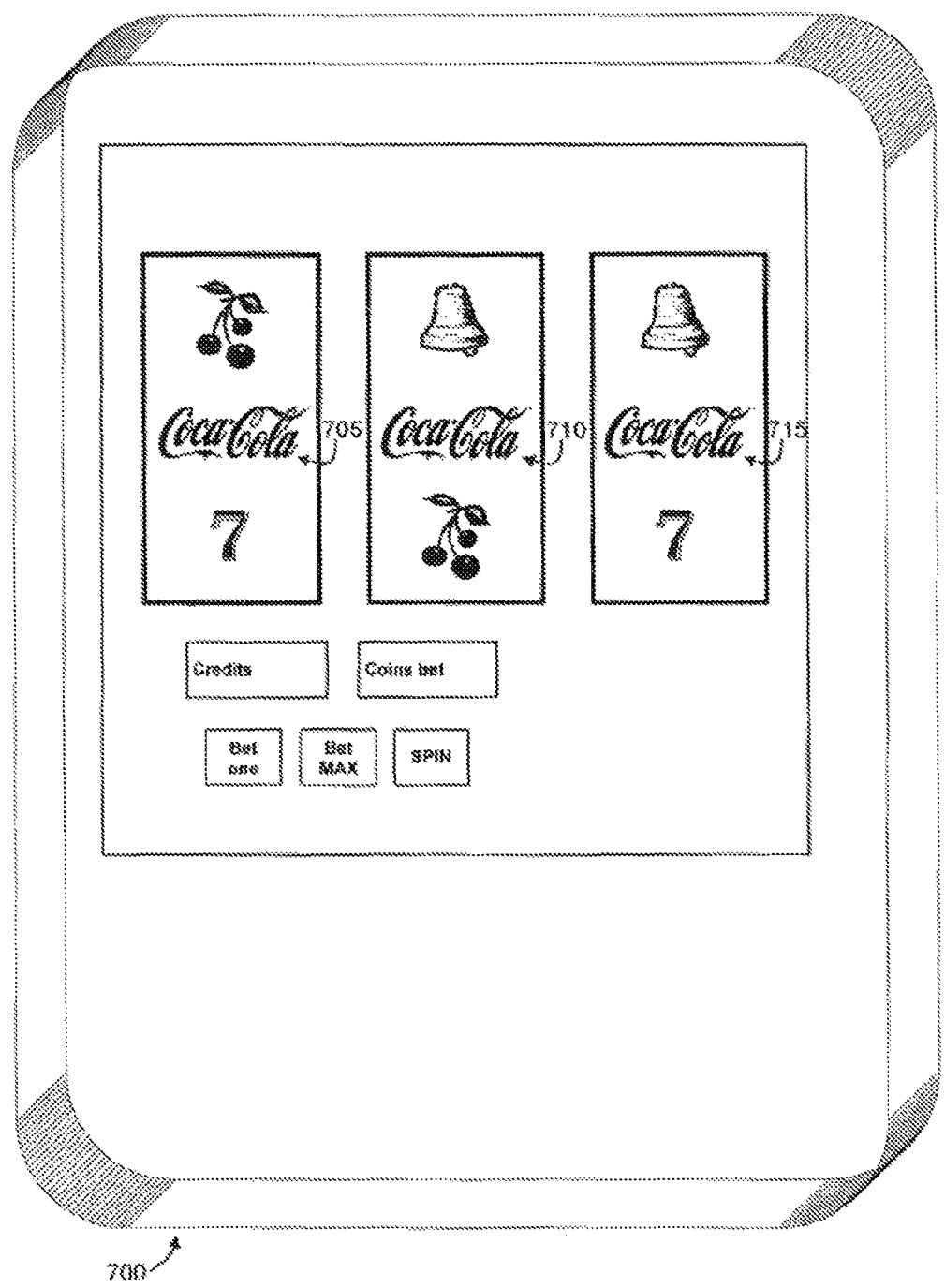
FIG. 28 shows a mobile gaming device with promotional content according to some embodiments.

In various embodiments, a gaming system may include the ability to determine the location of the gaming communication device within a larger property, such as a casino complex. This may allow certain functionalities of the device to be enabled or disabled based upon the location of the device within the property. For example, government regulations may prohibit using the device to gamble from the guest rooms of a casino complex. Therefore, particular embodiments may include the ability to determine the location of the device within the property and then disable the gambling functionality of the device from a guest room, or other area where gambling is prohibited. FIG. 27 illustrates an example of a wireless gaming system in which the location of a gaming communication device 604 may be determined in accordance various embodiments.

As shown in FIG. 27, a wireless gaming system comprises a wireless network that at least partially covers casino complex 600 in which one or more gaming communication devices 604 may be used to participate in a variety of gaming activities. The wireless network may comprise at least three signal detection devices 602, although various embodiments may include fewer or greater than three signal detection. As shown in FIG. 27, the wireless network comprises four signal detection devices 602, each located at one corner of casino complex 600. In various embodiments, these signal detection devices may comprise wireless access points, wireless routers, wireless base stations, satellites, or any other suitable signal detection device. Furthermore, although signal detection devices 602 are illustrated as being located on the boundaries of casino complex 600, signal detection devices may be located anywhere inside or outside of casino complex 600, provided the signal detection devices are operable to receive signals originating from a gaming communication device 604 inside casino complex 600. In various embodiments, signal detection devices 602 may also be used to transmit, as well as receive, signals to gaming communication device 604.

In various embodiments, casino complex 600 may be divided into one or more zones 608, which represent different areas of the casino complex, such as the lobby, guest rooms, restaurants, shops, entertainment venues, and pool areas. For example, as shown in FIG. 27, zone 608a may correspond to the casino lobby, zone 608b may correspond to guest rooms, zone 608c may correspond to restaurants, and zone 608d may correspond to the gaming floor of the casino. Each zone 608 may be further divided into one or more sub-zones 606, each specifying a particular location within zone 608. Sub-zones 606 may be arranged in a grid formation, each sub-zone 606 having a uniform size. In some embodiments, each sub-zone may comprise 9 square feet (i.e., 3 feet by 3 feet). In some embodiments, each sub-zone may comprise 100 square feet (i.e., 10 feet by 10 feet). The choice of the size of an area covered by a sub-zone may depend on administrator preferences, technical limitations of the wireless network, and governmental regulations, as well as other considerations.

Particular embodiments may use this mapping of casino complex 600 into a plurality of zones 608 and sub-zones 606 to determine the location of gaming communication device 604 within the complex. These embodiments may utilize the signal received by signal detection devices 602 from gaming communication device 604 to determine the location of the device.

In various embodiments, the location of gaming communication device 604 may be determined based upon the strength of the signal received by each signal detection device 602 from device 604. In various embodiments, this may be accomplished using a Received Signal Strength Indication (RSSI) value or any other suitable indication of signal strength. Generally, the closer a sub-zone is to a signal detection device, the stronger the signal the signal detection device will receive from a gaming communication device located in that sub-zone. Therefore, given a plurality of signal strength readings taken from different points in the casino complex (i.e., signal detection devices 602), these different signal strength readings may be used to determine the location of the device.

With this in mind, each sub-zone 606 of casino complex 600 may be associated with a reference set of signal strengths received by the signal detection devices from a device located in that particular sub-zone. Typically, these values are generated, and periodically recalibrated, by taking a reference reading from a gaming communication device located that sub-zone. After each sub-zone is associated with a reference set of signal strengths, these reference signal strengths may be compared with the signal strengths received by the signal detection devices from a gaming communication device. Since each sub-zone has a unique set of signal strengths, this comparison may be used to identify the particular zone in which the gaming communication device is located.

In various embodiments, the location of gaming communication device 604 may be determined based upon an elapsed time between the transmission of the signal from device 604 and the receipt of the signal by each signal detection device 602. In various embodiments, this elapsed time may be determined based on a Time Difference of Arrival (TDOA), or any other suitable technology. As before in the case of signal strengths, each sub-zone 606 may be associated with a predetermined, or reference, set of elapsed times from transmission to receipt of a signal from a gaming communication device. This set of elapsed times will be different for each sub-zone of the casino complex, as the time it takes a signal to reach each signal detection device will depend on the proximity of the sub-zone to each base station. By comparing the time from transmission to receipt of a signal received by the signal detection devices from a gaming communication device, the sub-zone in which the device is located may be determined.

Once the location of the gaming communication device has been determined, particular embodiments may then enable and/or disable particular functions of the device based on this determination. For example, as mentioned previously, particular embodiments may disable the gaming communication device's gambling functionality from a user's guest room, while still allowing the user to use other device functions, such as purchasing merchandise or services, or buying tickets to an entertainment event. Once the user leaves his or her guest room, the gambling functionality of the gaming communication device may be enabled. Similarly, particular embodiments may prevent the gaming communication device from being used to make financial transactions from the casino floor. Once the user leaves the casino floor, such functionality may be enabled. Similarly, other functionalities of the gaming communication device may be enabled or disabled based upon the location of the device within the property in accordance with various embodiments.

In various embodiments, the various functionalities of the gaming communication device may be enabled or disabled based upon the zone 608 in which the device is located. In such embodiments, each zone 608 of the casino complex may be associated with a set of allowed activities. For example, the "lobby" zone 608a of the casino complex may have all activities allowed, while the "guest room" zone 608b of the property may have all activities allowed except gambling. Based upon the gaming communication device's location, the functionality of the gaming communication device may be limited to the set of allowed activities for the zone in which the device is located. As the gaming communication device travels from zone to zone, the location of the device may be re-determined, and the functionality of the device may be updated to reflect the set of allowed activities for the zone in which the device is now located.

Various embodiments may also use the location determination to send location-specific information to the gaming communication device. For example, a reminder that an entertainment event to which the user has tickets is about to begin may be sent to the user's device if the device (and therefore the user) is located in a different part of the casino complex. In another embodiment, a user may be alerted that the user's favorite dealer is on the casino floor if the user is located in his or her guest room.

In various embodiments, the location of the gaming communication device may be used to deliver goods and services purchased or ordered by the user of the device. For example, in various embodiments, the user may purchase food and beverages using the device. The location of the device may then be used to deliver the food and beverages to the user, even if the user relocates to another sub-zone after placing his or her order.

The determination of the gaming communication device's location may also be used to provide the user with directions to another part of the casino complex. For example, a user that is located on the casino floor that wishes to go to a specific restaurant within the complex may be given direction based upon his or her location. These directions may then be updated as the user progresses towards his or her desired location. In the event the user gets off-course, the location determination, which may be updated during the user's travel, may be used to alert the user that he/she has gotten off-course and then plot a new course to the desired destination.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

User Profiles

According to various embodiments, the wireless gaming system can incorporate a user profile element. One or more user profiles may be created, maintained, and modified, for example, on one or more of the servers of the gaming system. Generally, the user profiles include information relating to respective users. The information may be maintained in one or more databases. The information may be accessible to the gaming server and/or to one or more mobile devices. The devices which may access the information may, according to certain embodiments, include gaming devices or gaming management devices. Gaming management devices may include wireless devices used by casino staff to provide gaming services or gaming management services.

Various embodiments include software and/or hardware to enable the provision, modification, and maintenance of one or more user profiles. Thus, one or more user profiles may each comprise a set of data maintained in a data storage device. The data set(s) for each respective user profile may reflect any of a number of parameters or pieces of information, which relate to the particular user(s) corresponding to the profile(s). Although not intended to be exhaustive, such information may include, for example, gaming activity preferences, such as preferred game and/or game configuration, preferred screen configuration, betting preferences, gaming location preferences, dining and other service preferences, and so forth. The information may also include user identity information, such as name, home address, hotel name and room number, telephone numbers, social security numbers, user codes, and electronic files of fingerprint, voice, photograph, retina scan, or other biometric information. User profile information may also include information relating to the user, but not determined by the user or the user's activities. Such information may include any information associated with, or made part of, a profile. For example, an entity such as a casino, may include as part of a profile certain rules governing the distribution of promotions or offers to the user. User profile information can include any codes, account numbers, credit information, approvals, interfaces, applications, or any other information which may be associated with a user. Thus, user profile information may include any information that is particular to a given user. For example, profile information may include the location(s) at which a particular user has played, skill levels, success levels, types of games played, and betting styles, and trends of information relating to the user's activities.

In various embodiments, user profile information may include concierge or other service information that is associated with a user. Concierge services may include restaurant services, entertainment services, hotel services, money management services, or other appropriate services that may be offered to the user of a gaming device. For example, restaurant services may include, without limitation, services that allow the user to order drinks, order food, make reservations, or perform other restaurant related activities. As another example, entertainment services may include, without limitation, services that allow the user to purchase show tickets, arrange appointments or services, virtually shop, arrange transportation, or perform other entertainment related activities. Hotel services may include, for example, services that allow the user to check in, check out, make spa appointments, check messages, leave messages, review a hotel bill, or perform other guest-related activities. Money management services may include, for example, services that allow the user to transfer funds, pay bills, or perform other money management activities.

The gaming system may be configured to establish a new profile for any user who is using a gaming device for the first time. Alternatively, a new profile may be established for a prior user who has not played for a predetermined time period. The gaming system may set up the profile, monitor user activities, adjust the profile, and adjust information (such as graphics) displayed to the user. The gaming system may be configured to use the profile information to alter the presentation of gaming information to the user. For example, if a prior user has returned to the gaming system, the system may consult the profile for the user and determine that in the prior session of gaming the user lost money on craps but won money on blackjack. Based on this information, the system may adjust the default gaming screen and present a blackjack table for the user. As a further example, the profile information may indicate that the majority of the user's prior blackjack time was spent on $25 minimum tables. The system may, accordingly, make a further adjustment to the gaming environment and make the blackjack table being presented a $25 table. In this sense, the gaming system enables personalized wireless gaming based on one or more criteria maintained in a user profile.

The user profiles may be established, maintained, and periodically updated as necessary to enable a gaming provider to provide an enhanced, current, and/or customized gaming experience. Updates may be undertaken based on any suitable trigger, such as the occurrence of an event, the occurrence of a user activity, or the passage of a certain predetermined time period. Any or all of the profile information may be updated.

Alerts

In some embodiments, the gaming system may be configured to initiate one or more alerts to one or more users based on any number of criteria. For instance, an alert may be based on the location of a user. The system may also be configured to keep track of other non-location dependent parameters. The initiation of an alert may depend on a time parameter. Gaming alerts can also be based on this and/or other information maintained in a user profile. Alerts can be prioritized for presentation and the content and display of the alerts may be customized by the user or another entity. As a related concept, the system may be configured to provide directions and/or maps. Another related concept involves enabling a user to view a certain activity or area remotely. The alert may be generated in response to the existence of data within a user profile. Additionally, the content and presentation of the alert may be determined based on information in the user profile. Thus, when the alerts occur and what the alerts indicate may be customized or tailored according to user preferences (or any other information maintained about the user (e.g., in a user profile).

In some embodiments, an alert may be presented or displayed to the user in a format determined, at least in part, by any of the parameters described or contemplated herein. For example, if the user is located outdoors, the display may be automatically brightened in order to allow the user to more easily view the alert. The alert may be presented in any one or a combination of textual, visual, oral, or other information exchange formats. Alerts presented to users on the screen of a gaming communication device, for example, may be configured in any desirable manner. Preferably, the information is displayed in a way as to most effectively utilize the screen real estate to convey the alert message. Thus, different alerts of differing types, or having differing priorities, can be displayed differently on the gaming device. For example, a more important alert can be displayed as a popup while secondary alerts scroll at the bottom of the screen. The player can register for alerts and determine his own particular alert configuration preferences.

According to some embodiments, directional information may be provided to one or more users. The directional information may be associated with an alert. The directional information may be based on any of the parameters described herein (e.g., profiles, alerts, locations, changes in play or other activities, etc). Directions may be given to activities, locations, seats, tables, recreational spots, restaurants, change cages, information booths, casinos, hotels, sports venues, theaters, etc. For example directions may be given to a particular table or gaming area, a casino other than the one where the user is presently located or where another user is located, a restaurant that is specified in a user profile, a sports book area of a casino, a hotel room, etc.

The directions can be presented orally, textually, and/or graphically (e.g., as map with zoom capabilities). An example of how directions would be provided involves a user profile indicating that the user likes to play high-limit blackjack on Saturday nights, but that the user does not have a particular casino preference. If the user enters any casino for which the system is operable, the system provides the user with an alert inviting the player to the high-limit blackjack tables and directional information in the form of a visual route. Another example involves a user leaving a sports book in a casino and the user has indicated that he wants to play craps. The device gives walking directions to the craps tables. Another example involves a user that has a preferred list of dinner restaurants. At a predetermined time (e.g., 8:00 pm), the system presents the user with the list, lets the user make a selection and a reservation. The system then provides the user with verbal directions from the user's current location to the selected restaurant. The system may also be configured to provide ancillary information based, at least in part, on the alert, the profile, or the directional information being provided. For example, the system may notify a user that the user will need a cab, or will need to take the tram, or will need a jacket and tie, or will need an umbrella, etc. depending on where the user is going and the route he is taking.

According to various embodiments, the system enables a user to view a certain activity or area remotely. For example, cameras (or other viewing devices) may be disposed throughout a casino property (or other relevant area). At kiosks, or on the wireless gaming devices, users can "peek" into one or more selected areas to see the activity in the selected area(s). For example, from the pool, a user can tell if the craps tables have changed limits or are filling up with people. From the craps table, a user can see if the restaurant or bar is becoming crowded.

According to various embodiments, the operation of the alerts module and the alerts methods are integrated with various techniques for managing user profile information. An example of this aspect is that the system may be configured to recognize that a user has certain preferred dealers or stickmen when playing certain casino games. When those dealers or stickmen are on duty, and if the user is located in a certain area, or within a certain distance, an alert may be sent inviting the user to participate in the gaming activity at the particular table where the dealer or stickman is on duty.

Thus, when user profile information indicates that a one or more predetermined criteria are met, the system may send an alert to the corresponding user or to another user. For example, the system may "learn" that a player is a fan of certain sports teams. The system monitors information about upcoming events that involve those teams and, at a predetermined time, checks to see if the user has placed a bet on the event(s). If not, the system invites the user to visit a sports book to make a bet. As another example, the system knows a user prefers $10 minimum tables and alerts the user to the opening of a seat at such a table. As another example, the alerts can be triggered by information which is not directly related to or associated with the particular user (e.g., non-user specific information). For instance an alert might be triggered by a certain time or the occurrence of a certain event (e.g., the odds given on a certain sports event changing by a certain predetermined amount).

Service Applications

According to various embodiments, gaming services may be provided as an application add-on to a pre-existing communication or data service. Thus, gaming service applications may be made available to customers of a pre-existing communication or data service. For example, customers of a particular wireless telephone or data service may be offered any one or combination of the various gaming service applications discussed herein as an additional feature that is bundled with the telephone or data service. Although this document may refer to the communication service bundled with offered gaming service applications as including pre-existing communication services, it is recognized that the gaming services applications may be offered and accepted as part of a package with newly-activated communications service plan. In still other embodiments, the gaming service may be established first and the communication service may be added later.

The gaming service applications bundled with, or otherwise offered in conjunction with communication services, may be customized to meet the needs of the customers, service providers, or both. For example, a service provider may elect to make certain gaming service applications available to only a subset of the service providers' customers. Accordingly, not all customers associated with a service provider may be offered gaming services. As an another example of customized gaming service applications, a communication service may offer customers a number of gaming service plans which may provide different levels of service. For example, certain services such as advertisement services and/or promotional services may be free to customers of the communications service. Such levels of service may be customer-selected, service provider-selected, or both.

Customers may be billed separately for add-on gaming services, or in conjunction with the invoice the customer already receives for the pre-existing communications service. For instance, in certain embodiments, gaming services may be billed as an add-on in the same way that Caller ID services, call waiting services, and call messaging services result in fees that are in addition to the basic fees associated with communication services.

Peer-to-Peer Wireless Gaming

According to various embodiments, gaming services enable peer-to-peer wireless gaming. Specifically, the system may enable multiple players to participate in the same gaming activity at the same time from dispersed locations. This may be particularly desirable in the case of certain games such as, but without limitation, horse racing, poker, and blackjack. The system may also enable a single player to participate in multiple positions with respect to a particular game. For example, a user may be permitted to play multiple hands of blackjack. Particular aspects include such features as providing assistance to a user in finding a particular activity. For example, a first player may want to play poker at a six-person table. The gaming system may be used to identify such a poker table that has a position available for the first user's participation. Additionally or alternatively, a first player might want to play poker at the same table as a second player, and the system may be configured to assist the first player in finding a game in which the second player is already participating.

Location determination techniques may be incorporated to enable peer-to-peer gaming or related services. For example, a "buddy network" may be established to track members of a selected group. For example, a group of friends might all be in a gambling jurisdiction but be located at various dispersed places within that jurisdiction. The gaming system allows the establishment of a private buddy network of peers for this group of friends. The system enables one or more members of the group to track one or more other members of the group. In various embodiments, the system may also allow messages from and to one or more group members. For example, the system also allows members to invite other members to participate in certain wireless gaming activities. Additionally or alternatively, the system may allow members of the group to bet on the performance of another member of the group who is participating in a virtual or actual game.

Location determination techniques may also be incorporate to establish an "alert system." The alert system may be used to invite certain types of players to participate in a gaming activity. Criteria may then be used to identify users of gaming devices that meet the criteria. For example, a gaming participant may wish to initiate a gaming activity with other users of gaming devices that qualify as "high rollers" or "high stakes garners." As other examples, a celebrity user may wish to initiate a gaming activity with other celebrities, or a senior citizen may wish to initiate a gaming activity with other senior citizens. In each instance, the user may identify criteria that may then be used to identify other gaming participants that meet these criteria for the initiation of a peer-to-peer gaming event.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Gaming and Wireless System

Various embodiments include a gaming system including hand-held personal gaming devices. The gaming system is adapted to present one or more games to a user of one of the hand-held gaming devices.

In various embodiments, the gaming system includes a portable gaming device or interface. The portable gaming device has a display for displaying game information to a player, at least one input device for receiving input from the player and is capable of receiving and sending information to a remote device/location. The gaming system also includes a game server for generating game data, transmitting game data to the portable gaming device and receiving information, such as player input, from the portable gaming device. The gaming system further includes a payment transaction server for validating payment and establishing entitlement of a player to play a game via the portable gaming device as provided by the game server.

In various embodiments, the gaming system includes one or more stationary gaming machines or other devices capable of printing tickets having a value associated therewith. The portable gaming device includes a ticket reader for reading ticket information for use by the payment transaction server in verifying the associated value for permitting the player to play the game.

In one or more embodiments, the portable gaming devices communicate with other devices (such as the game server) via a wireless communication channel. Appropriate relays and transceivers are provided for permitting the wireless communication.

In one or more embodiments, the portable gaming device includes a plurality of interfaces for changing the configuration of the gaming device or interacting with one or more transaction servers. In some embodiments, a login interface is provided for receiving login information regarding a user of the device. In various embodiments, the number of interfaces or other functions or features displayed or permitted to be accessed are configured depending upon the user of the device. In the event a gaming representative identifies himself, interfaces permitting access to a variety of control functions may be provided. In the event a player identifies themselves, such control functions may not be accessible, but instead only consumer-related functions may be accessible such as game play.

In one or more embodiments the gaming system includes one or more transaction servers, such as a food transaction server. Using an interface of the portable gaming device a player or other user may request services from the food transaction server. For example, a player may request food, drink, a restaurant reservation or other service.

One or more embodiments comprise a method of playing a game via a portable gaming device associated with a gaming network. In some embodiments, a player obtains a portable gaming device, such as by checking out the device from the hostess station of a restaurant or the front desk of a hotel/casino. The player provides value to the gaming operator, such as a credit card or cash deposit. This value is associated with the server and matched with a ticket number, player tracking number or other identifier.

The game device is configured for player play using the login interface. The act of logging in may be performed by the player or the gaming operator. The player next establishes entitlement to obtain services, such as the playing of a game, by showing the existence of value. In some embodiments, the player scans his ticket using the ticket reader of the device. The scanned information is transmitted to the payment transaction server for verifying entitlement of the player to play a game or obtain other services. In the event the entitlement is verified, then the player is permitted to engage in the play of a game or request service.

In the event a player wishes to play a game, the player indicates such by selecting a particular game using a game play interface. Upon receipt of such an instruction, the game server generates game data and transmits it to the personal gaming device. The transmitted data may comprise sound and video data for use by the personal gaming device in presenting the game. The player is allowed to participate in the game by providing input to the game server through the personal gaming device. The game server determines if the outcome of the game is a winning or losing outcome. If the outcome is a winning outcome, an award may be given. This award may be cash value which is associated with the player's account at the payment transaction server. If the outcome is a losing outcome, then a bet or wager placed by the player may be lost, and that amount deducted from the player's account at the transaction server.

Figure 29:
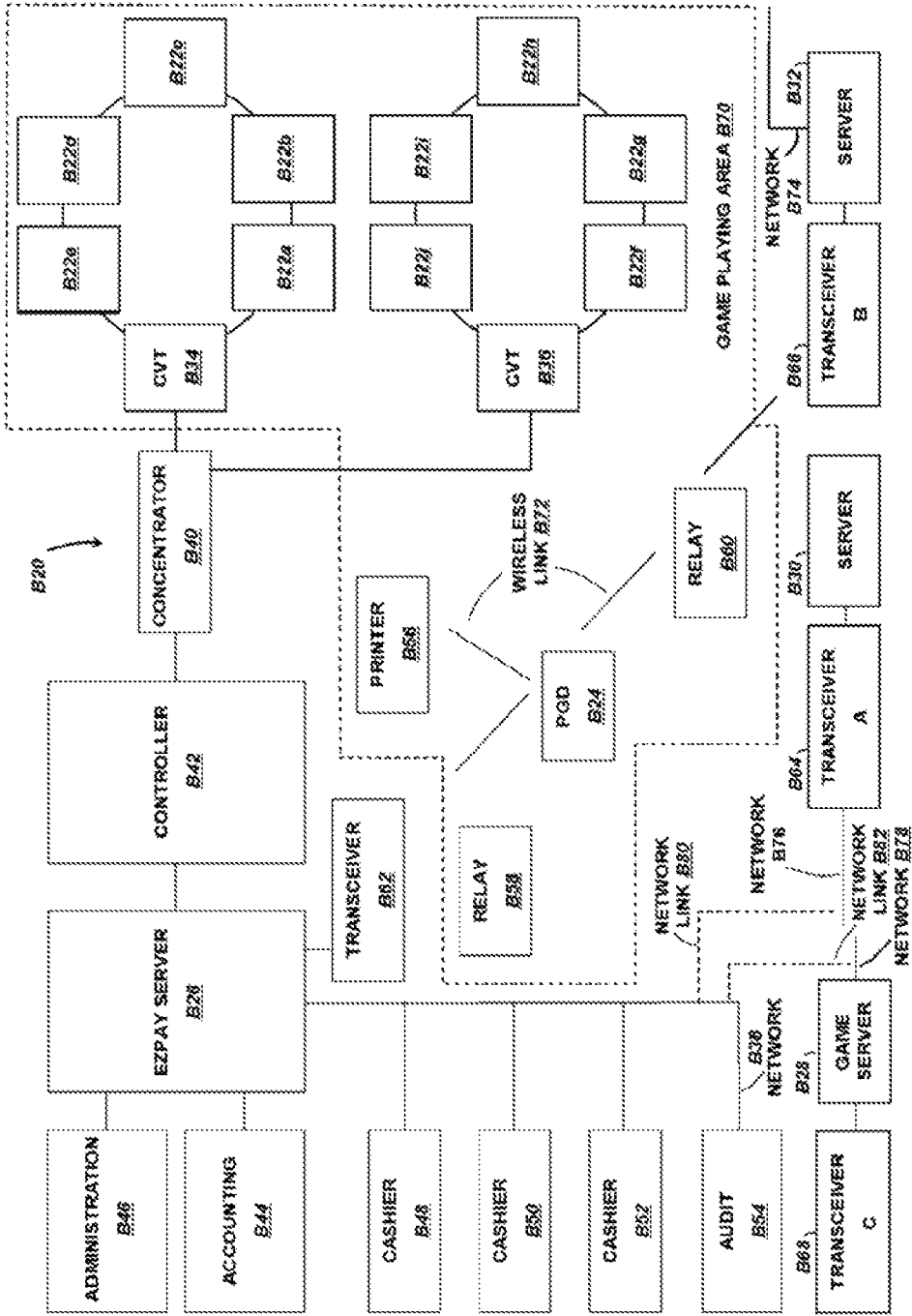
FIG. 29 is a block diagram of a gaming system in accordance with some embodiments.

FIG. 29 is a block diagram of a gaming system in accordance with various embodiments.

As illustrated, the gaming system B20 includes a plurality of gaming machines B22a, B22b, B22c, B22d, B22e, B22f, B22g, B22h, B22i, B22j. In some embodiments, these gaming machines B22a, B22b, B22c, B22d, B22e, B22f, B22g, B22h, B22i, B22j are of the stationary type. In general, the gaming machines B22a, B22b, B22c, B22d, B22e, B22f, B22g, B22h, B22i, B22j are arranged to present one or more games to a player. In various embodiments, the games are of the type requiring the placement of a wager or bet and are of the type by which a player receiving a winning outcome is provided an award, such as a monetary award. These devices may comprise for example, video poker and slot machines. In addition, the gaming system B20 includes one or more hand-held, portable gaming devices (PGDs) B24. The PGD B24 is also arranged to present one or more games to a player, and as described below, may be used as an access point for a variety of other services. The device referred to herein as a "personal gaming device" may be referred to by other terminology, such as a portable gaming interface, personal game unit or the like, but regardless of the name of the device, such may have one or more of the characteristics herein.

In addition, in various embodiments, the PGD B24 is in communication with at least one gaming server B28. As described below, in various embodiments, the one or more games which are presented via the PGD B24 to the player are provided by the gaming server B28.

The gaming machines B22a, B22b, B22c, B22d, B22e, B22f, B22g, B22h, B22i, B22j and each PGD B24 is in communication with a payment system referred to herein as the "EZ-Pay" system. This system includes a server B26 for receiving and transmitting information. In general, the EZ Pay system is utilized to accept payment from a player for the playing of games and obtaining of other goods and services, and for paying a player winnings or awards.

In the embodiments illustrated, the gaming system B20 includes other servers B30, B32 for transmitting and/or receiving other information. In some embodiments, one server B30 comprises a prize transaction server. Another server B32 comprises a food transaction server. In a some embodiments, information may be transmitted between the PGD B24 and these servers B30, B32.

The EZ Pay system, according to various embodiments, will now be described in more detail with reference to FIG. 30. The EZ Pay system may constitute an award ticket system which allows award ticket vouchers to be dispensed in lieu of the traditional coin awards or reimbursements when a player wins a game or wishes to cash out. These tickets may also be used by gaming machines and other devices for providing value, such as for payment of goods or services including as a bet or ante for playing a game.

Figure 30:
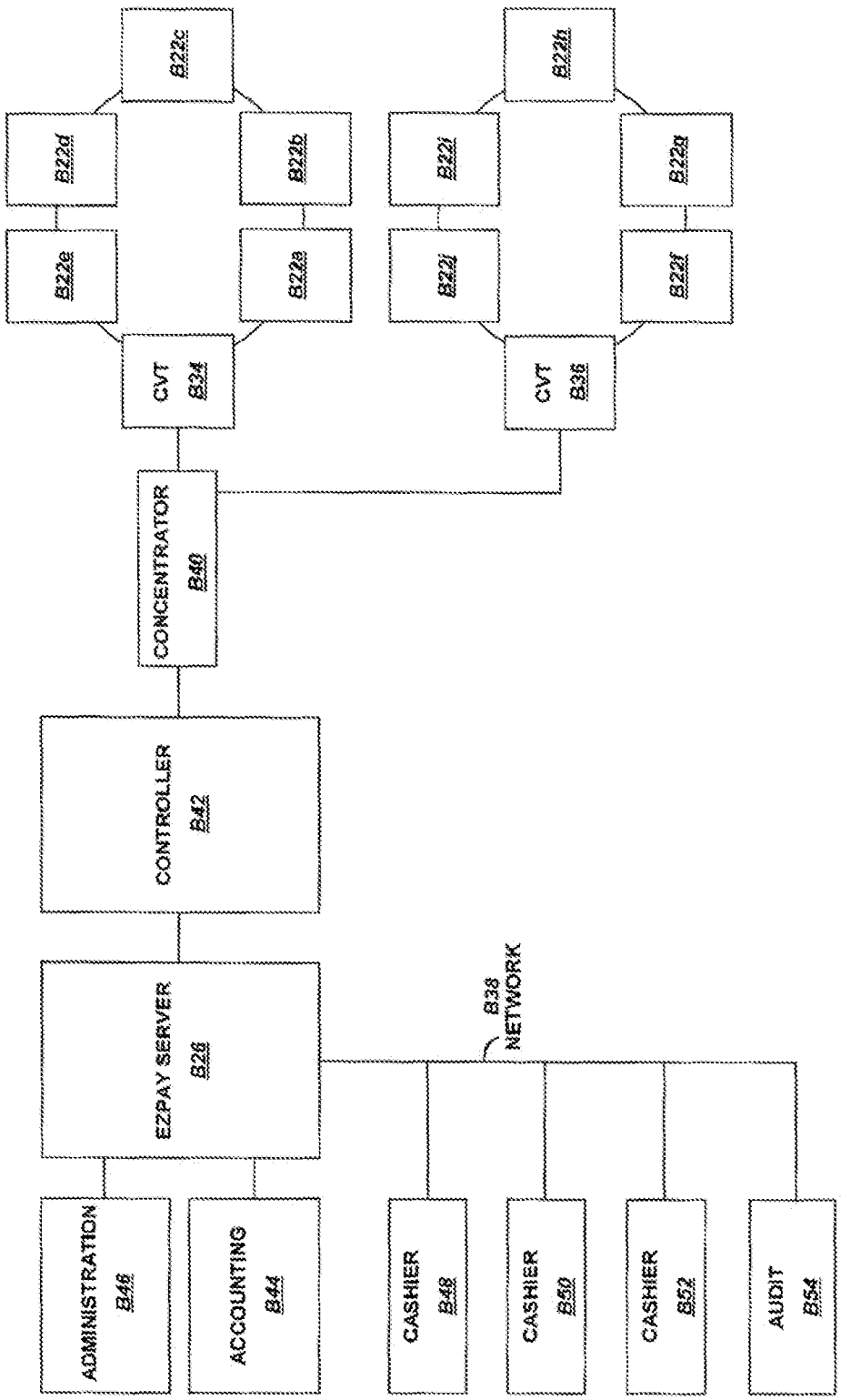
FIG. 30 is a block diagram of a payment system forming a part of the gaming system illustrated in FIG. 8, according to some embodiments.

FIG. 30 illustrates some embodiments of such a system in block diagram form. As illustrated, a first group of gaming machines B22a, B22b, B22c, B22d, and B22e is shown connected to a first clerk validation terminal (CVT) B34 and a second group of gaming machines B22f, B22g, B22h, B22i, and B22j is shown connected to a second CVT B36. All of the gaming machines print ticket vouchers which may be exchanged for cash or accepted as credit or indicia in other gaming machines. When the CVTs B34,B36 are not connected to one another, a ticket voucher printed from one gaming machine may only be used as indicia of credit in another gaming machine which is in a group of gaming machines connected to the same CVT. For example an award ticket printed from gaming machine B22a might be used as credit of indicia in gaming machines B22b, B22c, B22d, and B22e, which are connected to the common CVT B34, but may not be used in gaming machines B22f, B22g, B22h, B22i, and B22j since they are each connected to the CVT B36.

The CVTs B34,B36 store ticket voucher information corresponding to the outstanding ticket vouchers that are waiting for redemption. This information is used when the tickets are validated and cashed out. The CVTs B34,B36 store the information for the ticket vouchers printed by the gaming machines connected to the CVT. For example, CVT B34 stores ticket voucher information for ticket vouchers printed by gaming machines B22a, B22b, B22c, B22d, and B22e. When a player wishes to cash out a ticket voucher and the CVTs B34,B36 are not connected to one another, the player may redeem a voucher printed from a particular gaming machine at the CVT associated with the gaming machine. To cash out the ticket voucher, the ticket voucher is validated by comparing information obtained from the ticket with information stored with the CVT. After a ticket voucher has been cashed out, the CVT marks the ticket as paid in a database to prevent a ticket voucher with similar information from being cashed multiple times.

Multiple groups of gaming machines connected to the CVTs B34,B36 may be connected together in a cross validation network B38. The cross validation network typically comprises one or more concentrators B40 which accept input from two or more CVTs and enables communications to and from the two or more CVTs using one communication line. The concentrator B40 is connected to a front end controller B42 which may poll the CVTs B34,B36 for ticket voucher information. The front end controller B42 is connected to an EZ pay server B26 which may provide a variety of information services for the award ticket system including accounting B44 and administration B46.

The cross validation network allows ticket vouchers generated by any gaming machine connected to the cross validation network to be accepted by other gaming machines in the cross validation network B38. Additional, the cross validation network allows a cashier at a cashier station B48, B50, B52 to validate any ticket voucher generated from a gaming machine within the cross validation network B38. To cash out a ticket voucher, a player may present a ticket voucher at one of the cashier stations B48, B50, B52. Information obtained from the ticket voucher is used to validate the ticket by comparing information on the ticket with information stored on one of the CVTs B34,B36 connected to the cross validation network B38. As tickets are validated, this information may be sent to another computer B54 providing audit services.

As described above, the gaming system B20 may also include one or more hand-held PGDs B24. In various embodiments, the PGD B24 is a portable device capable of transmitting and receiving information via a wireless communication link/network.

Referring again to FIG. 29, the gaming system B20 may include a printer B56, wireless communication relays B58 and B60, and wireless transceivers B62, B64, B66 and B68 connected to the remote transaction servers B26, B28, B30 and B32. In various embodiments, a player may obtain the PGD B24, and after being provided with the appropriate authority, may play one or more games and/or obtain other services including food services or accommodation services.

Figure 31:
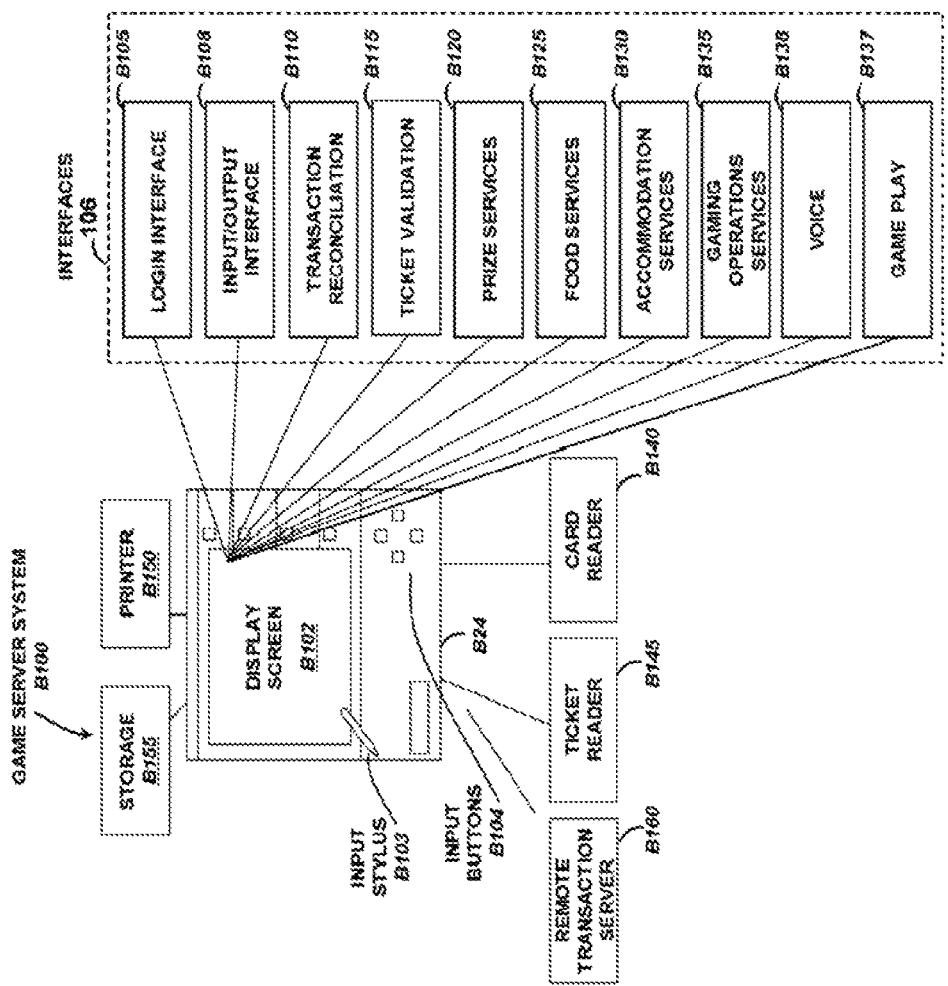
FIG. 31 is a schematic diagram of a portable gaming device of the gaming system illustrated in FIG. 8, according to some embodiments.
Figure 32:
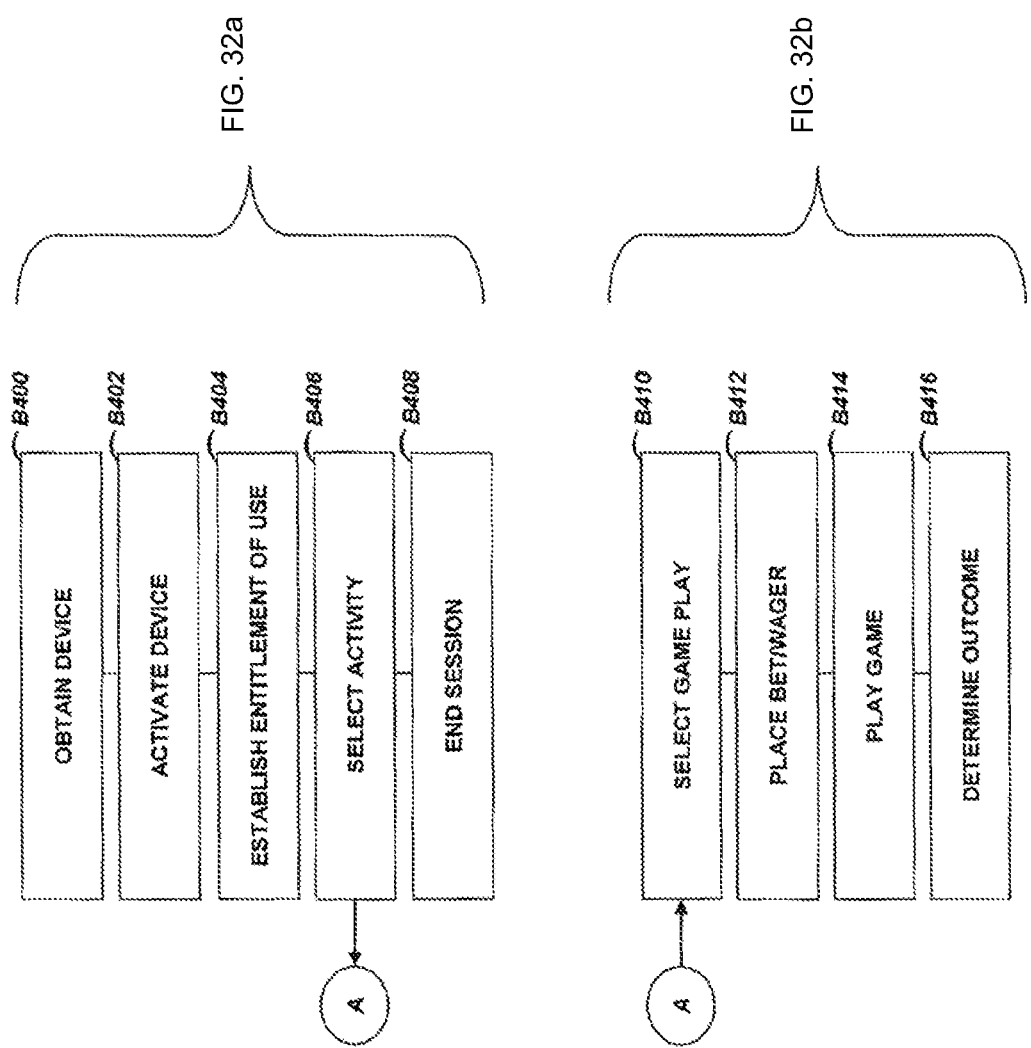
FIG. 32a is a flow diagram of a method of use of a portable gaming device by a player, according to some embodiments.
FIG. 32b is a flow diagram of a particular method of using the portable gaming device by a player, according to some embodiments.

FIG. 31 illustrates the PGD B24 and a block diagram of a game and service system which may be implemented by the gaming system B20 illustrated in FIG. 29. In various embodiments, the game and service system B100 is comprised of at least one PGD B24 and a number of input and output devices. The PGD B24 is generally comprised of a display screen B102 which may display a number of game service interfaces B106. These game service interfaces B106 are generated on the display screen B102 by a microprocessor of some type (not shown) within the PGD B24. Examples of a hand-held PGD B24 which may accommodate the game service interfaces B106 shown in FIG. 31 are manufactured by Symbol Technologies, Incorporated of Holtsville, N.Y. The interface or menu data may be stored in a local memory, or the data may be transmitted to the PGD B24 from a remote location (such as a data server). This reduces the memory requirement of the device.

The game service interfaces B106 may be used to provide a variety of game service transactions and gaming operations services, including the presentation for play by a user of one or more games. The game service interfaces B106, including a login interface B105, an input/output interface B108, a transaction reconciliation interface B110, a ticket validation interface B115, a prize services interface B120, a food services interface B125, an accommodation services interface B130, a gaming operations interface B135, and a game play interface B137 may be accessed via a main menu with a number of sub-menus that allow a game service representative or player to access the different display screens relating to the particular interface.

In one or more embodiments, some or all of the interfaces may be available to a user of the PGD B24. For example, in one or more embodiments, the PGD B24 may have a dual purpose of both being usable by a player to play games and engage in other activities, and also be used by gaming operations personnel for use in providing services to players and performing administrative functions. In various embodiments, certain PGDs B24 may be specially configured for use only by players, and other PGDs B24 may be specially configured for use only by gaming or other personnel. In such event, the interfaces B106 may be custom programmed.

In one or more embodiments, only certain interfaces B106 may be displayed, depending on the status of the user of the PGD B24. In some embodiments, the particular interfaces B106 which are displayed and thus accessible for use are determined by the status of the user as indicated through a login function. In various embodiment, when the PGD B24 is operable (such as when a power button is activated) the default status for the PGD B24 is the display of the login interface B105. Once a user of the PGD B24 has logged in, then the status of the PGD display is changed.

In one or more embodiments, the login interface B105 may allow a game service representative to enter a user identification of some type and verify the user identification with a password. When the display screen B102 is a touch screen, the user may enter the user/operator identification information on a display screen comprising the login interface B105 using an input stylus B103 and/or using one or more input buttons B104. Using a menu on the display screen of the login interface, the user may select other display screens relating to the login and registration process. For example, another display screen obtained via a menu on a display screen in the login interface may allow the PGD B24 to scan a finger print of the game service representative for identification purposes or scan the finger print of a game player.

In the event a user identifies themselves as a gaming operator or representative, then the PGD B24 may be arranged to display one or more other interfaces such as those listed above and described in detail below. In one or more embodiments, the default status or login may be a "player" mode login.

In various embodiments, the login interface B105 may allow a player to identify themselves to configure the PGD B24 to permit the player to access a plurality of player services, such as playing games and the like. In various embodiments, the login interface B105 includes a request that the user identify themselves as a "player" or "authorized personnel." In the event "authorized personnel" is selected, then the above-referenced user identification (including password) may be requested. If "player" is selected, then in various embodiments the player is requested to provide an EZ pay ticket. As described in more detail below, in various embodiments, a player who wishes to play one or more games or obtain other goods or services uses an EZ pay ticket to provide the credit or payment therefor. The ticket may be obtained from a cashier or by play of another gaming device (such as devices B22a, B22b, B22c, B22d, B22e, B22f, B22g, B22h, B22i, B22j in FIG. 29). The ticket may be verified through the EZ pay system described above.

In various embodiments, the PGD B24 includes a ticket reader B145 and a card reader B140. In some embodiments, the ticket reader B145 may be of a variety of types. In some embodiments, the reader comprises a bar-code reading optical scanner. In this arrangement, a user of the PGD B24 may simply pass the bar-coded ticket in front of the bar-code reader. In some embodiments, the card reader B140 comprises a magnetic-stripe card type reader for reading information associated with a magnetic stripe of a card, such as a player tracking card.

After having provided the appropriate authorization, access may be provided to the user of the PGD B24 of one or more of the following interfaces B106.

In one or more embodiments, an authorized user may be provided with access to the input/output interface B108. In a various embodiments, such access is only provided to a game service operator and not a player. In one or more embodiments, the input/output interface B108 permits a user to select, from a list of devices stored in memory on the PGD B24, a device from which the PGD may input game service transaction information or output game service transaction information. For example, the PGD B24 may communicate with the ticket reader B145. As another example, the PGD B24 may input information from the card reader B140. Such input may be useful, for example, if a game service operator wishes to verify the authenticity of a player tracking card or the like.

The PGD B24 may output game and service transaction information to a number of devices. For example, to print a receipt, the PGD B24 may output information to a printer B150. In this game service transaction, the PGD B24 may send a print request to the printer B150 and receive a print reply from the printer B150. The printer B150 may be a large device at some fixed location or a portable device carried by the game service representative. As another example, the output device may be the card reader B140 that is able to store information on a magnetic card or smart card. Other devices which may accept input or output from the PGD B24 are personal digital assistants, microphones, keyboard, storage devices, gaming machines and remote transaction servers.

The PGD B24 may communicate with the various input mechanisms and output mechanisms using both wire and wire-less communication interfaces. For example, the PGD B24 may be connected to the printer B150 by a wire connection of some type. However, the PGD B24 may communicate with a remote transaction server B160 via a wire-less communication interface including a spread spectrum cellular network communication interface. An example of a spread spectrum cellular network communication interface is Spectrum 24 offered by Symbol Technologies of Holtsville, N.Y., which operates between about 2.4 and 2.5 Gigahertz. The information communicated using the wireless communication interfaces may be encrypted to provide security for certain game service transactions such as validating a ticket for a cash pay out. Some devices may accommodate multiple communication interfaces. Such a spread spectrum network is but one possible communication scheme.

Another type of interface that may be stored on the PGD B24 is the award ticket validation interface B115. In some embodiments, this interface is only available to an authorized game service representative, and not a player. Some embodiments of the award ticket interface B115 may accommodate the EZ pay ticket voucher system and validate EZ pay tickets as previously described. However, when other ticket voucher systems are utilized, the award ticket validation interface B115 may be designed to interface with the other ticket voucher systems. Using the award ticket validation interface B115, a game service representative may read information from a ticket presented to the game service representative by a game player using the ticket reader and then validate and pay out an award indicated on the ticket.

In various embodiments, the award ticket contains game service transaction information which may be verified against information stored on a remote transaction server B160. To validate the ticket may require a number of game service transactions. For example, after obtaining game service transaction information from the award ticket, the PGD B24 may send a ticket validation request to the remote transaction server B160 using the spread spectrum communication interface and receive a ticket validation reply from the remote server B160. In particular, the validation reply and the validation request may be for an EZ pay ticket. After the award ticket has been validated, the PGD B24 may send a confirmation of the transaction to the remote server B160. Details of the game service transaction information validation process are described with the reference to FIG. 33. In various embodiments, the award ticket interface may be configured to validate award information from a smart card or some other portable information device or validate award information directly from a gaming machine.

As game and service transactions are completed, game and service transaction information may be stored on a storage device B155. The storage device B155 may be a remote storage device or a portable storage device. The storage device B155 may be used as a back-up for auditing purposes when the memory on the PGD B24 fails and may be removable from the PGD B24.

A type of game service interface that may be stored on the PGD B24 is the prize service interface B120. As an award on a gaming machine (i.e., machines B22a, B22b, B22c, B22d, B22e, B22f, B22g, B22h, B22i, B22j in FIG. 29) or while playing a game via the PGD B24, a game player may receive a ticket (such as issued by other machine) that is redeemable for merchandise including a bicycle, a computer or luggage or receive such an award directly (such as while playing the PGD B24 itself). Using the prize service interface B120, a game service representative or player may validate the prize service ticket and then check on the availability of certain prizes. For example, when the prize service ticket indicates the game player has won a bicycle, the game service representative may check whether the prize is available in a nearby prize distribution center. Alternatively, a player may be permitted to do the same thing. In some embodiments, a player may be awarded a prize of a particular level, there being one or more particular prizes on that level. In such events, the player may use the interface B120 to determine what prizes are currently available in the prize level just awarded. The PGD B24 may validate a prize ticket and check on the availability of certain prizes by communicating with a remote prize server. Further, the game service representative may have the prize shipped to a game player's home or send a request to have the prize sent to a prize distribution location. The game service transactions needed to validate the prize ticket including a prize validation request and a prize validation reply, to check on the availability of prizes and to order or ship a prize may be implemented using various display screens located within the prize interface. The different prize screens in the prize service interface B120 may be accessed using a menu located on each screen of the prize service interface. In some embodiments, the prize service interface B120 may be configured to validate prize information from a smart card or some other portable information device or validate award information directly from a gaming machine.

A type of game service interface that may be stored on the PGD B24 is the food service interface B125. As an award on a gaming machine or as compensation for a particular amount of game play, a game player may receive a free food or drink. Using the food service interface B125, the player may redeem the food or drink award, or a game service representative may validate such an award (for example, the award may be provided to a player of a gaming device B22a in the form of a ticket) and check on the availability of the award. For example, when the game player has received an award ticket valid for a free meal, the food service interface may be used to check on the availability of a dinner reservation and make a dinner reservation. As another example, the PGD B24 may be used to take a drink or food order by the player thereof. Such an order may be processed via the remote food server B32 (see also FIG. 29). The transactions needed to validate a food ticket or award, to check on the availability of food services, request a food service and receive a reply to the food service request may be implemented using various display screens located within the food service interface B125. These display screens may be accessed using a menu located on each screen of the food service interface. In some embodiments, the food service interface may be configured to validate food service information from a smart card or some other portable information device.

Another type of game service interface that may be stored on the PGD B24 is an accommodation service interface B130. As an award for game play or as compensation for a particular amount of game play, a game player may receive an award in the form of an accommodation service such as a room upgrade, a free night's stay or other accommodation prize. using the accommodation service interface B130, the player may check on the availability of certain accommodation prizes. For example, when the game player has received an award for a room upgrade, the accommodation service interface may be used to check on the availability of a room and to make a room reservation. Regardless of whether the player has won an accommodation award, the player may utilize the accommodation service interface B130 to reserve a room (such as an additional night's stay) or an upgrade to a room. In some embodiments, a player of a game may be issued a ticket (such as from a free-standing game device B22a, B22b, B22c, B22d, B22e, B22f, B22g, B22h, B22i, B22j in FIG. 29), and a gaming representative may use the accommodation service interface B130 in order to validate the player's award ticket and check on the availability of the award and institute the award. As another example, the PGD B24 may be used to order a taxi or some other form of transportation for a player at a gaming machine preparing to leave the game playing area. The game playing area may be a casino, a hotel, a restaurant, a bar or a store.

The PGD B24 may validate the accommodation service award and check on the availability of certain accommodation awards by communicating with a remote accommodation server. The transactions needed to validate the accommodation ticket, check on the availability of accommodation services, request an accommodation service and receive a reply to the accommodation service request may be implemented using various display screens located within the accommodation service interface. These display screens may be accessed using a menu located on each screen of the accommodation service interface. In some embodiments, the accommodation service interface may be configured to validate accommodation service information from a smart card or some other portable information device.

A type of game service interface that may be stored on the PGD B24 is a gaming operations service interface B135. Using the gaming service interface B135 on the PGD B24, a game service representative may perform a number of game service transactions relating to gaming operations. For example, when a game player has spilled a drink in the game playing area, a game service representative may send a request to maintenance to have someone clean up the accident and receive a reply from maintenance regarding their request. The maintenance request and maintenance reply may be sent and received via display screens selected via a menu on the screens of the gaming operations service interface. As another example, when a game service representative observes a damaged gaming machine such as a broken light, the game service representative may send a maintenance request for the gaming machine using the PGD B24. In one or more embodiments, a player may be permitted various options through the gaming service interface B135. For example, a player may be permitted to request a gaming service representative or attendant using the interface B135.

A type of game service interface that may be stored on the PGD B24 is a transaction reconciliation interface B110. In various embodiments, the PGD B24 contains a memory storing game service transaction information. The memory may record the type and time when a particular game service transaction is performed. At certain times, the records of the game service transactions stored within the PGD B24 may be compared with records stored at an alternate location. For example, for an award ticket validation, each time an award ticket is validated and paid out, a confirmation is sent to a remote server B160. Thus, information regarding the award tickets, which were validated and paid out using the PGD B24, should agree with the information regarding transactions by the PGD stored in the remote server B160. The transaction reconciliation process involves using the transaction reconciliation interface B110 to compare this information. In various embodiments, only a gaming service representative (and not a player) is permitted access to the transaction reconciliation interface B110.

A type of game service interface that may be stored on the PGD B24 is a voice interface B138. Using the spread spectrum cellular or other communication network incorporated into the PGD, a player and/or game service representative may use the PGD B24 as a voice communication device. This voice interface B138 may be used to supplement some of the interfaces previously described. For example, when a game player spills a drink the game service representative may send maintenance request and receive a maintenance reply using the voice interface B138 on the PGD B24. As another example, when a game player requests to validate a food service such as free meal, such a request may be made by the player or a game service representative at a restaurant or other location using the voice interface B138 on the PGD B24. In some embodiments, a player may be permitted to contact a player of another PGD B24, such as by inputting a code number assigned to the PGD B24 through which communication is desired. Such would permit, for example, a husband and wife using two different PGDs B24 to communicate with one another. The voice interface B138 may also permit a player to contact the front desk of a hotel/casino, an operator of a switchboard at the gaming location or the like.

A type of game service interface that may be stored on the PGD B24 is a game play interface B137. In various embodiments, a player is permitted to access the game play interface B137 in order to select from one or more games for play. The game play interface B137 may include a menu listing one or more games which the player may play via the PGD B24. In various embodiments, game play is facilitated with the game server B28 (see FIG. 29).

In one or more embodiments, the gaming control code is not resident at the PGD B24, but instead at a secure, remote server. Referring to FIG. 29, game play data is transmitted from the game server B28 to the PGD B24, and from the PGD B24 to the game server B28. Preferably, the PGD B24 is adapted to receive and process data, such as by receiving video data and processing the data to present the information on the display B102. Likewise, the PGD B24 is arranged to accept input and transmit that input or instruction to the game server B28. This arrangement has the benefit that nearly all aspects of the play of a game can be monitored, as it requires the game play data to pass to or from a remote location. This avoids, for example, storage of the gaming software at the PGD B24 where it might be tampered with, copied or the like.

In one or more embodiments, each PGD B24 has a unique identifier which is utilized to identify which PGD B24 data is transmitted from and to which data is to be transmitted to. In some embodiments, the game server B28 may thus be used to present the same or different games to a plurality of players using different PGDs B24, with the game data regarding a particular game being played at a particular PGD B24 being directed to that PGD B24 using its particular identifier.

As will be appreciated by those of skill in the art, the PGD B24 may have a variety of configurations. As stated above, the PGD B24 may be used in the gaming system B20 in which gaming code is not stored directly at the PGD. In such an embodiment, the PGD B24 may have a much more limited amount of data memory. In some embodiments, the PGD B24 includes a processor for executing control code, such as that necessary to operate the display B102, accept input from the stylus B103 or input buttons B104 or the like. In addition, the PGD B24 preferably includes a buffer memory for accepting data transmitted from the game server B28. This data may comprise data for displaying game information, such as video and sound content.

Various aspects of the use of the PGD B24 described above will now be described. In one or more embodiments, the PGD B24 may be used directly by a player. In various embodiments, a player may use the PGD B24 to play one or more games, and obtain products and services, such as food.

A method of use of the PGD B24, according to some embodiments, is illustrated in FIGS. 32(a) and 32(b). In general, a player must first obtain a PGD B24. For example, a player may check out a PGD B24 from a gaming operator. The player then establishes entitlement to use the PGD B24. In some embodiments, the player must indicate player status at the login interface, and obtain a valid ticket in order to activate the PGD B24. Once activated, the player is permitted to engage in a variety of transactions using the interfaces B106, such as playing a game, redeeming prizes and awards, placing food and drink orders, placing reservations, seeking gaming operator support and seeking a variety of other goods and services as described in more detail below.

One example of a method of use of the PGD B24 by a player will be described with reference to FIG. 32(a). In a first step B400, the player first obtains the PGD B24. In some embodiments, a gaming operator may have certain locations at which a player may obtain the PGD B24, such as the front desk of a hotel/casino, the hostess stand at a restaurant, from a gaming attendant or other location as desired. In some embodiments, a gaming operator may actually permit a player to retain the PGD B24, such as by renting, selling or giving the PGD B24 away to a player.

In a step B402, the PGD B24 is activated. In some embodiments, this step includes turning on the PGD B24 (such as with a power switch) and logging in. In some embodiments, when the PGD B24 is turned on, the login interface B105 is automatically displayed. The login interface B105 may include "player" and "authorized personnel" buttons which may be activated using the stylus B103. The player may indicate "player" status by selecting the player button with the stylus B103.

In some embodiments, the gaming operator may log the player in. For example, when a player obtains the PGD B24 from a hostess at a restaurant, the hostess may log in the player in player mode. In some embodiments, the gaming operator may have certain PGDs B24 which are for use by players and certain others which are for use by gaming personnel. In such event, the PGDs B24 which are configured for player status may automatically be configured for player mode after being turned on.

In a step B404, a player establishes entitlement to use the PGD B24. In some embodiments, this step comprises the player providing a valid ticket which is verifiable using the EZ pay portion of the gaming system B20. In some embodiments, a player may have obtained a ticket through play of a gaming machine, such as gaming machines B22a, B22b, B22c, B22d, B22e, B22f, B22g, B22h, B22i, B22j of the gaming system B20. In some embodiments, a player may be issued a ticket by a game service representative. For example, a player may provide credit at a cashier cage (such as with a credit card or cash) and be issued a ticket. A player may also pay cash or the like to a restaurant hostess and be issued a ticket.

Once the player has a ticket, the ticket may be scanned using the ticket reader B145 of the PGD B24. For example, the player may pass the ticket in front of the ticket reader B145. Once the information is read by the PGD B24, the data may be transmitted to the EZ pay server B26 for validation. Preferably, this validation confirms that the particular ticket is authorized, including the fact that it is outstanding and has value associated therewith.

In one or more embodiments, entitlement may be established in other manners. For example, in some embodiments, entitlement may be established with a player tracking or identification card which may be read using the card reader B140 of the PGD B24.

Establishing entitlement to use the PGD B24 may ensure that the player has funds for paying to obtain services and products available by use of the PGD B24. In one or more embodiments, however, this step may be eliminated. For example, in some embodiments, a player may be permitted to use the PGD B24 and then pay for goods or services in other manners. In some embodiments, a player may, for example, order food and then pay the server for the food using a room charge or cash at the time the food is delivered. In some embodiments, a player may use a credit card to pay to play games or to pay for food or the like. In such event, a credit card may be read by the card reader B140 at the time the services or products are to be provided or are ordered by the player.

In a step B406, the player is then permitted to select one or more selections from the interfaces B106. As stated above, a player may not be permitted access to all of the interfaces B106. In any event, a player may select, such as with the stylus B103, a service from the group of interfaces B106. An example of the engagement of a particular activity using the PGD B24 will be described below with reference to FIG. 32(b).

Once a player no longer desires to engage in any more activities using the PGD B24, the use session of the PGD B24 is ended in a step B408, and in one or more embodiments, the PGD B24 is returned to the gaming operator. In various embodiments, once a player no longer wishes to use the PGD B24, the player returns the PGD B24 to the gaming operator. At that time, the gaming operator may confirm that all transactions using the PGD B24 are closed or complete, and pay the player any winnings. In some embodiments, a player B24 is issued a new ticket representing the player's credit (including any payments made in order to first use the PGD B24, plus any winnings, less any expenditures).

An example of a method of using the PGD B24 wherein the player has selected the option of game play using the game play interface B137 will be described in detail with reference to FIG. 32(b). In a step B410 (which step comprises a particular embodiment of step B406 of FIG. 32(a)), a player has selected the event or service of "game play" using the game play interface B137.

In some embodiments, when a player has selected the game play interface B137, a menu may be displayed to the player of the one or more games which the player may be permitted to play. In some embodiments, when the player selects the game play interface B137, a signal is transmitted from the PGD B24 to the remote game server B28 instructing the game server B28 that the player wishes to play a game. In response, the game server B28 may send the latest game menu to the PGD B24 for display. In this arrangement, the menu of games which is available may be continuously updated at one or more central locations (such as the server B28) instead of at each PGD B24.

If the system B20 permits the player to select a game from a menu of games, then the method includes the step of the player selecting a particular game to be played. Once a game is selected, or if only a single game option is provided, then game play begins. In some embodiments, the game server B28 transmits data to the PGD B24 for use by the PGD B24 in presenting the game, such as video and audio content.

In some embodiments, in a step B412 a player is required to place a bet or ante to participate in a game. In some embodiments, the player may place the bet or ante using the EZ pay system. As stated above, the player preferably establishes entitlement to use the PGD B24 with an EZ pay ticket or other entitlement, which ticket demonstrates that the player has monies or credits on account which may be used to pay for goods and services. These services include game play services.

In some embodiments, when the player establishes entitlement to use the PGD B24, the value of the players credits or monies are displayed to the player so that the player is visually reminded of these amounts. When a player begins play of a game, the player may input a bet and ante which is no more than the value of the credits or monies which the player has on account. Once a player has placed a bet or ante, that information is transmitted to the EZ pay server B26 and is deducted from the players account. A new credit value is then displayed at the PGD B24 to the player.

In various embodiments, a player may provide credit for a bet or ante in other manners. For example, a player may swipe a credit card through the card reader B140 in order to provide the necessary credit for the bet or ante.

In a step B414, the player is then permitted to engage in the game. In some embodiments, game play comprises the game server B28 executing game code and transmitting information to the PGD B24 for presenting certain aspects of the game to the player. When necessary, the player is permitted to provide input, and the input data is transmitted from the PGD B24 to the game server B28.

As one example of a game, the game may comprise video poker. In this embodiment, the game server B28 executes code for randomly generating or selecting five cards. Data representing video images of the cards is transmitted to the PGD B24, where the images of the five dealt cards are displayed on the display screen B102.

The instruction "draw" or "stay" may be displayed to the player. At that time, the player may select one or more of the cards to hold or replace. In the event the player elects to replace any card, that instruction is transmitted to the game server B28 which then randomly generates or selects replacement cards. The replacement card data is transmitted to the PGD B24 and images of the replacement cards are displayed.

In the event the hand of five cards (including any replacement cards) is determined by the game server B28 to comprise a predetermined winning hand, then the player may be paid a winning amount. If not, then the player loses his bet or ante. This step comprises step B416 of the method, that of determining the outcome of the game.

If the outcome is a winning outcome, then the player may be paid a winning by crediting the players account through the EZ pay server B26. In that event, the players credits value as displayed is updated to reflect the players winnings.

A player may then elect to play the game again, play a different game, or select one or more other services offered. In some embodiments, a "return to main menu" button or the like may be displayed to the player at all times, permitting the player to return to a display including the various interfaces B106.

In some embodiments, when the player has completed use of the PGD B24, the player returns the PGD B24 to the gaming operator. For example, the player may return the PGD B24 to a cashier cage or a game service operator. In various embodiments, the game service operator or other party then issues the player a ticket for any credit or value which remains in the player's account. The PGD B24 may then be deactivated so that it readied for use by another player. In some embodiments, the PGD B24 may be deactivated by turning its power off. In some embodiments, a "logout" interface or option may be provided which causes the PGD B24 to return to a default state seeking the login of a player or user.

The PGD B24 may be used by a game service operator. Several examples of a method of such use are detailed below in conjunction with FIGS. 29 and 30.

When a game service representative contacts a game player seeking a game service in the game playing area B70 (see FIG. 29), the game service representative uses an appropriate game service interface on the display screen of the PGD B24, as described with reference to FIG. 31, to provide the game service requested by the game player. For example, when a game player requests an EZ pay ticket validation, the game service representative brings the EZ pay ticket validation interface onto the display screen of the PGD B24 using menus available on the display screen B102. Then, the game service representative scans the EZ pay ticket using a ticket reader connected to the PGD B24 to obtain unique ticket information. Next, the PGD B24 sends an EZ pay ticket validation request using the wire-less communication interface to the EZ pay server B26.

In various embodiments, the ticket validation request is composed of one or more information packets compatible with the wire-less communication standard being employed. Using a wireless link B72, the one or more information packets containing the ticket validation request are sent to the transceiver B62 connected to the EZ pay server. The transceiver B62 is designed to receive and send messages from the one or more PGDs B24 in the game playing area B70 in a communication format used by the PGDs. Depending on the location of the PGD B24 in the game playing area B70, the communication path for the information packets to and from the PGD B24 may be through one or more wire-less communication relays including B58 and B60. For example, when the PGD B24 is located near gaming machine B22a, the communication path for a message from the PGD B24 to the EZ pay server B26 may be from the PGD B24 to the relay B60, from the relay B60 to the relay B58, from the relay B58 to the transceiver B62 and from the transceiver B62 to the EZ pay server B26. As the location of the PGD B24 changes in the game playing area B70, the communication path between the PGD B24 and the EZ pay server B26 may change.

After receiving an EZ pay ticket validation reply from the EZ pay server B26, the EZ pay ticket may be validated using an appropriate display screen on the PGD B24. After cashing out the ticket, the game service representative may send a confirmation of the transaction to the EZ pay server B26 using the PGD B24. The transaction history for the PGD B24 may be stored on the PGD B24 as well as the EZ pay server B26. Next, a receipt for the transaction may be printed out. The receipt may be generated from a portable printer carried by the game server representative ad connected to the PGD B24 in some manner or the receipt may be generated from a printer B56 at a fixed location.

After providing a number of game services comprising a number of game service transactions to different game players in the game playing area B70 using the PGD B24, a game service representative may log-off of the PGD B24 and return it to location for secure storage. For example, at the end of a shift, the game service representative may check the PGD B24 at some of the locations, the device is unassigned to the particular game service representative and then may be assigned to another game service representative. However, before the PGD B24 is assigned to another game service representative, the transaction history stored on the PGD B24 may be reconciled with a separate transaction history stored on a transaction server such as the EZ pay server B26.

The assigning and unassigning of the PGD B24 to a game service representative and the transaction reconciliation are performed for security and auditing purposes. Another security measure which may be used on the PGD B24 is a fixed connection time between the PGD B24 and a transaction server. For example, after the PGD B24 has been assigned to a game service representative and the game service representative has logged on the PGD B24, the PGD B24 may establish a connection with one or more transaction servers including the EZ pay server B26, a server B28, a server B30, or a server B32. The connection between a transaction server and the PGD B24 allows the PGD B24 to send information to the transaction server and receive information from the transaction server. The length of this connection may be fixed such that after a certain amount of time the connection between the PGD B24 and the transaction server is automatically terminated. To reconnect to the transaction server, the login and registration process must be repeated on the PGD B24.

A transaction server may provide one or more game service transactions. However, the PGD B24 may connect with multiple transaction servers to obtain different game service transactions. For example, server B30 may be a prize transaction server allowing prize service transactions and server B415 may be a food transaction server allowing food service transactions. When a game service representative receives a prize service request from a game player, the PGD B24 may be used to contact the prize transaction server B30 using a wire-less communication link between the PGD B24 and a transceiver B64 connected to the prize transaction server B30. Similarly, when a game service representative receives a food service request from a game player, the PGD B24 may be used to contact the food transaction server B32 using a wire-less communication link between the PGD B24 and a transceiver B66 connected to the food transaction server B32.

The different transaction servers including the servers B26, B28, B30, B32 may be on separate networks or linked in some manner. For example, server B32 is connected to network B74, server B26 is connected to network B38, server B30 is connected to network B76, and server B28 is connected to network B78. In this embodiment, a network link B80 exists between network B76 and network B38. Thus, server B26 may communicate with server B30 via the network link B80. A communication link between different servers may allow the servers to share game service transaction information and allow different communication paths between the PGDs and the transaction servers. Likewise, a network link B82 exists between network B78 and network B38, permitting the game server to communicate with the EZ pay server B26.

Figure 33:
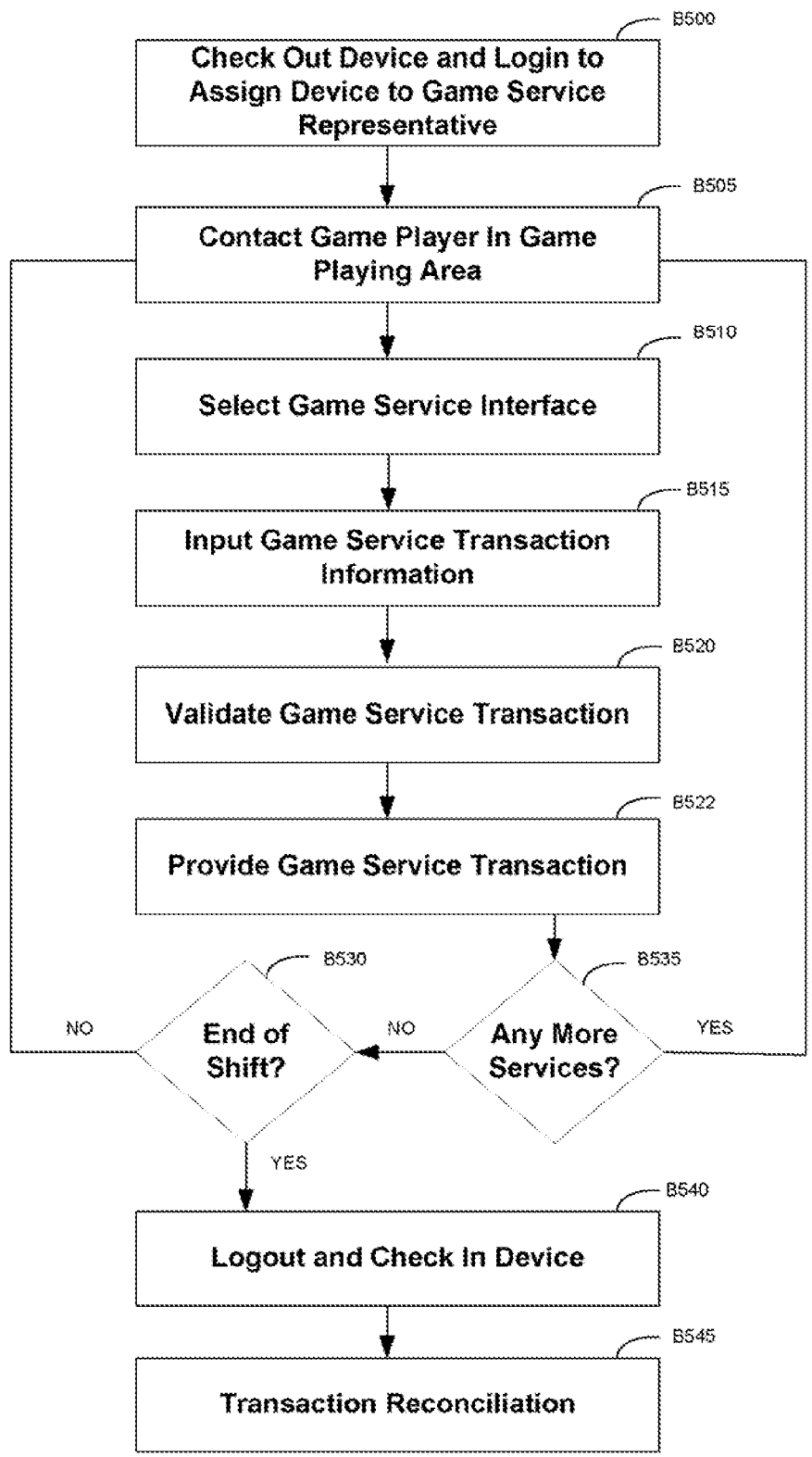
FIG. 33 is a flow diagram of a method of use of the portable gaming device by a gaming service operator, according to some embodiments.

FIG. 33 is a flow chart depicting a method for providing a game service using a hand-held device. In step B500, a game service representative receives the PGD B24 and logs in to the device to assign the device. The check out process and assign process are for security and auditing purposes. In a step B505, the game service representative contacts a game player in the game playing area requesting a game service of some type. In a step B510, the game service representative selects an appropriate interface on the PGD B24 using menus on the display screen B102 of the PGD that allow the game service representative to provide a requested game service. In a step B515, the game service representative inputs game service transaction information required to perform a game service transaction. For example, to validate an award ticket, the game service representative may read information from the ticket using a ticket reader. As another example, to provide a food service including dinner reservation, the game service representative may enter a game player's name to make the reservation.

In a step B520, the transaction information obtained in step B515 is validated as required. For example, when a player attempts to cash out an award ticket, the information from the award is validated to ensure the ticket is both genuine (e.g. the ticket may be counterfeit) and has not already been validated. The validation process requires a number of transfers of information packets between the PGD B24 and the transaction server. The details of the validation process for an award ticket validation are described with reference to FIG. 34. When the transaction information is valid, in a step B522, a game service transaction is provided. For example, a room reservation may be made for a player requesting an accommodation service. A confirmation of the game service transaction may be sent to the transaction server for transaction reconciliation in a step B545. In one or more embodiments, the method may include the step of generating a receipt regarding the game service transaction.

In a step B535, after providing the service, a game player may request another game service. When a game player requests an additional game service, the game service representative returns to step B510 and selects an appropriate interface for the game service. When a game player does not request an additional service and it is not the end of a shift, in a step B530, the game service representative returns to step B505 and contacts a new game player. In a step B540, when a shift has ended, the game service representative logs out of the PGD B24 and checks the device at a secure location so that the PGD may be assigned to a different game service representative. In step B545, before the PGD B24 is assigned to a different game service representative, a transaction history reconciliation is performed to ensure that the transaction history stored on the PGD is consistent with the transactions previously confirmed with a transaction server during the game service representative's shift. The transaction history on the PGD B24 may be stored on a removable memory storage device on the PGD. Thus, the memory may be removed from the device for transaction reconciliation and replaced with a new memory. Thus, the device with the new memory may be assigned to a new game service representative while the transaction history from the previous game service representative assigned to the device is reconciled.

Figure 34:
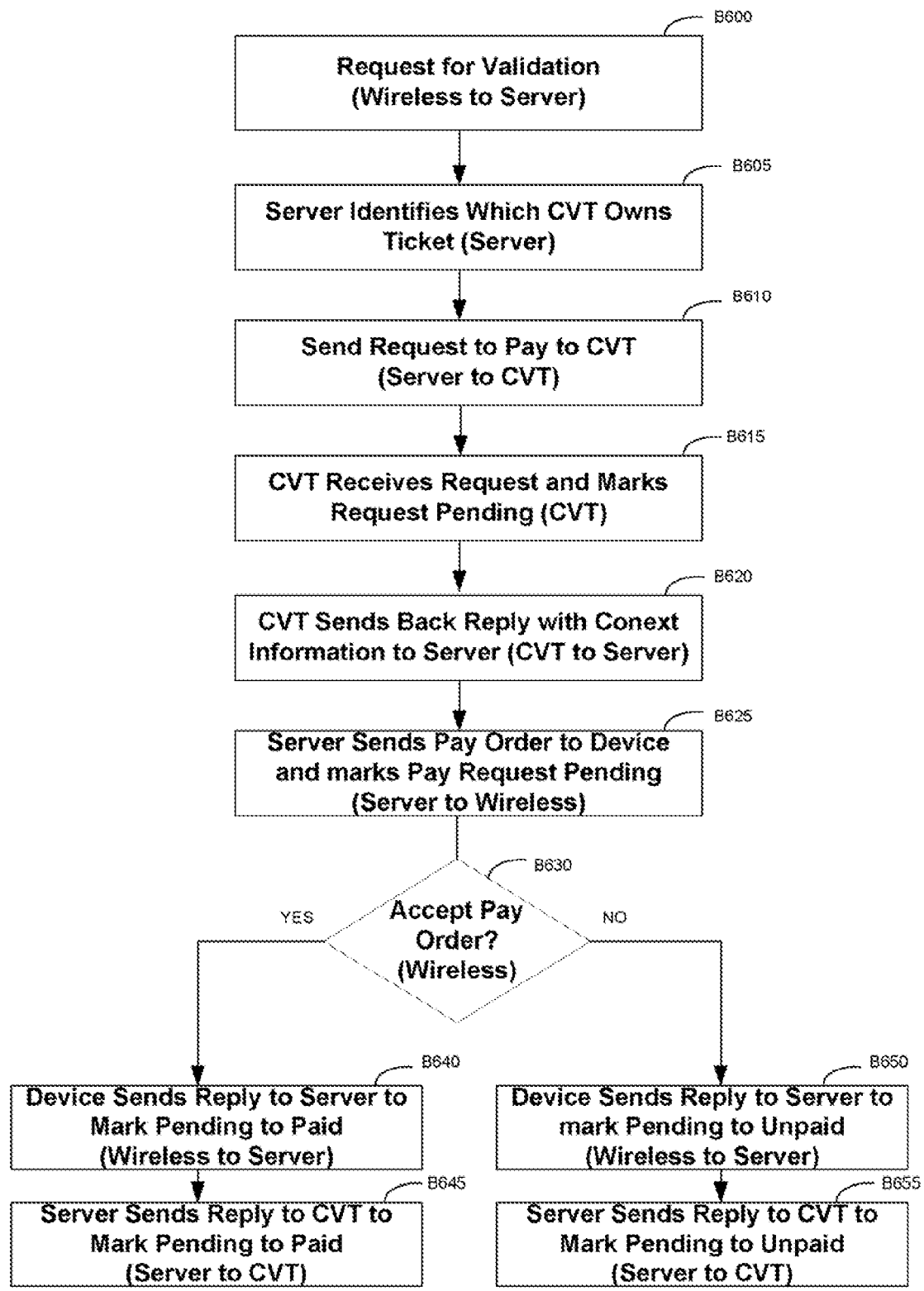
FIG. 34 is a flow diagram of a method of use of the portable gaming device according to some embodiments.

FIG. 34 is a flow chart depicting a method for validating information for providing a personal game service. In the embodiment shown in the figure, a ticket is validated in a manner consistent with an EZ pay ticket system. The EZ pay ticket is usually used for award tickets. However, the system may be adapted to provide tickets for other services include food services, prize services or accommodation services. In a step B600, a request for game service transaction information read from a ticket is sent via a wire-less communication interface on the PGD B24 to the appropriate transaction server as described with reference to FIG. 29. In a step B605, the server identifies which clerk validation ticket (CVT) B34,B36 owns the ticket. When a CVT owns a ticket, the CVT has stored information regarding the status of a particular ticket issued from a gaming machine connected to the CVT B34,B36. In a step B610, the server sends a request to pay the ticket to the CVT identified as the owner of the ticket. Typically, the pay request indicated a service on the ticket has been requested. For a cash ticket, a pay request means a request to cash out the ticket has been made. For a free meal, a pay request means a request to obtain the meal has been made. In a step B615, the CVT receives the pay request for the ticket and marks the ticket pending. While the ticket is pending, any attempts to validate a ticket with similar information is blocked by the CVT.

In a step B620, the CVT B34,B36 sends back a reply with context information to the server. As an example, the context information may be the time and place when the ticket was issued. The information from the CVT to the server may be sent as one or more data packets according to a communication standard shared by the CVT and server. In a step B625, after receiving the validation reply from the CVT, the server marks the pay request pending and sends a pay order to the PGD B24. While the pay request is pending, the server will not allow another ticket with the same information as the ticket with the pay request pending to be validated.

In a step B630, the game service representative may choose to accept or reject the pay order form the server. When the game service representative accepts the pay order from the server, in a step B640, the PGD B24 sends a reply to the transaction server confirming that the transaction has been performed. The transaction server marks the request paid which prevents another ticket with identical information from being validated. In a step B645, the server sends a confirmation to the CVT which allows the CVT to mark the request from pending to paid. When the game service representative rejects the pay order from the server, in a step B650, the PGD B24 sends a reply to the server to mark the pay request from pending to unpaid. When the ticket is marked unpaid, it may be validated by another PGD B24 or other validation device. In a step B655, the server sends the reply to the CVT to mark the pay request from pending to unpaid which allows the ticket to be validated.

In one or more embodiments, a ticket may be used to provide credit/value for establishing entitlement to a service or a good, such as the right to play a game or obtain food. The PGD B24 may include a card reader B140. In such an arrangement, a user of the PGD B24 may use a credit card or other magnetic stripe type card for providing credit/value. In various embodiments, the PGD B24 may include one or more other types of devices for obtaining/receiving information, such as a smart card reader. In such arrangements, the PGD B24 device may read information from the credit card, smart card or other device. These cards may comprise the well known credit or debit cards. This information may be used to provide the credit/value. In the example of a credit card, the user's account information may be read from the card and transmitted from the PGD B24 to the controller B42. Credit card/credit validation information may be associated with a credit card server (not shown). This credit card server may be associated with a bank or other entity remote from the casino or place of use of the PGD B24 and the controller B42. A communication link may be provided between the controller B42 and remote server for sending credit card information there over.

In some embodiments, when a player utilizes a smart card or credit card the amount of associated credit or value may be transmitted to the EZ Pay server B26, and then the credited amount may be treated in exactly the same manner as if the credit/value had been provided by a ticket. When a player wishes to cash out, the EZ Pay server B26 has a record of the original amount credited and the amounts of any awards, losses or payments, and may then issue the player a ticket representing the user's total credit.

In accordance with various embodiments, a gaming system is provided which includes one or more portable gaming devices. The portable gaming devices permit a player to play one or more games at a variety of locations, such as a hotel room, restaurant or other location. These locations may be remote from traditional gaming areas where free-standing, generally stationary gaming machines are located.

In one or more embodiments, a player may use the portable gaming device to not only play games, but obtain other products and services. In addition, in one or more embodiments, the portable gaming device may be used by game service representatives to perform a variety of functions and provide a variety of services to a player.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Wireless Interactive System

According to various embodiments, a wireless interactive gaming system includes one or more wireless gaming devices, a receiver, and a central processor. The wireless interactive gaming system may also include a terminal which is in communication with the central processor.

In a gaming environment that employs a wireless interactive gaming system, a player receives a wireless gaming device from a game official who represents a gaming establishment or the "house". The wireless gaming device is capable of receiving wager information as commands entered by the player and transmitting the received wager information along with identification information to the receiver by wireless transmission.

The wireless interactive gaming system may support a number of wireless gaming devices within one gaming establishment. The range for the wireless transmission from a wireless gaming device may be up to 100 feet.

According to various embodiments, a player inputs information into a wireless gaming device, e.g., by pressing push buttons or keys on the device. The wireless gaming device may include any number, e.g. from 5 to 20, of buttons in a keypad-type arrangement. Buttons may be marked with the digits 0 through 9 and may also include a "$" (dollar sign) key and an "enter" key, so that the player may easily input wager information. In various embodiments, the wireless gaming device includes at least eight player selection buttons (e.g., digits) and at least five special function buttons, (e.g., to request the player's balance). In various embodiments, the player can input some or all of the wager information into the wireless gaming device by swiping a smart card, which contains a microprocessor chip or a magnetic stripe with encoded information, through a smart card reader on the wireless gaming device.

In various embodiments, the wireless gaming device may include an identifier. The identifier may be, e.g., a series of alphanumeric characters, a bar code, or a magnetic stripe affixed to the device. In various embodiments, the identifier may be a digital code stored in a secure memory, e.g., an electronically erasable programmable read only memory (EEPROM). The identifier may thus be readable directly by the game official if it is a series of alphanumeric characters, or it may be read automatically by a bar code reader or a magnetic stripe reader. In various embodiments, the identifier may be programmed in EEPROM or read from EEPROM through an RS-232 port, which may be directly connected to encoder and decoder circuitry in a terminal.

A wireless gaming device may store an encryption key. The encryption key may be used to encrypt information that is transmitted to the receiver from the device. Encryption of the information transmitted to the receiver may limits tampering with the wireless gaming device and may prevent unauthorized or counterfeit devices from being used with the system.

In various embodiments, the encryption key may be stored in the EEPROM. The EEPROM may have the advantage of being a memory device which is difficult to access if the appropriate encoding circuitry is not available. Thus, it is contemplated that the encoding circuitry that downloads the encryption key into the device may be securely held by the game official.

Alternately, the encryption key stored in the EEPROM may be updated and changed for each player who receives a wireless gaming device by directly connecting the device to encoding and decoding circuitry in the terminal through a port at the time the wireless gaming device is delivered to the player. Moreover, other digital information related to the game being played may be downloaded from the terminal to the EEPROM through a direct connection with the wireless gaming device.

In various embodiments, a microprocessor controls the operation of a wireless gaming device. The microprocessor receives digital wager information entered by the player using buttons or keys of the wireless gaming device. The microprocessor stores an identification code associated with the wireless gaming device that is a digital equivalent of the identifier of the wireless gaming device. The microprocessor also executes software applications for encrypting the identification code and the player's wager information for transmission to the receiver. The software contains an algorithm that encrypts a data packet including the identification code and wager information using the encryption key.

In various embodiments, a wireless gaming device has a unique address, i.e. identification code, for communications with the receiver and stores a player identification that is programmed into the device by the central processor. The wireless gaming device may include a wager amount register, which is maintained and updated using the keys on the device. The value stored in the wager amount register may be included in transmissions from the device to the central processor. The value of the wager amount register may default to a predetermined value, e.g. $1, when the device is initialized, and can be further adjusted by the player. The wireless gaming device may also include an account balance register, which is maintained in the device and is updated by the central processor periodically. The value of the account balance register should default to $0 when the device is initialized.

The wireless gaming device may include player function keys. The player function keys may be used to accomplish the following functions:

1. Transmit a message to the receiver;
2. Request account balance information;
3. Adjust the state of the device;
4. Affect the data to be sent in the next transmitted message;
5. Increment the wager amount register by a predetermined amount, e.g., $10, $5 or $1;
6. Reset the wager amount register to the default value, e.g., $1.

The firmware of the wireless gaming device may only allow for one press of buttons or keys every 100 ms. In various embodiments, key presses are not queued; thus, when a key press message is queued to be sent, no other player input is accepted until the queued message has been sent.

The wireless gaming device may include a transmitter. The transmitter may receive encrypted digital information from the microprocessor and convert it to a signal for wireless transmission to the receiver. The transmitter transmits signals wirelessly, e.g., using radio frequency signals or infrared signals. Communications between the receiver and the wireless gaming device may be asynchronous at 2400 bits per second.

The wireless gaming device may include an identifying circuit that drives the transmitter to periodically send an identification signal to the receiver. The use of the identifying circuit permits the receiver and the central processor to be assured that the wireless gaming device is still active, functioning and present in the gaming establishment. Thus, if the wireless gaming device were removed from the gaming establishment, the receiver and central processor would no longer receive and detect the periodic identification signal sent by the identifying circuit and the transmitter, and the game official may be alerted that the wireless gaming device has been removed from the gaming establishment.

The wireless gaming device may contain a real-time clock that permits the microprocessor to monitor the current time and date. The clock may consist of a timing circuit. The microprocessor can use the time and date information obtained from clock to perform calculations and other functions based on the current time and date.

The wireless gaming device may also include a tag, such as an electronic or magnetic component, which activates an alarm when passed through a sensing apparatus located at the entrance and/or exit of the gaming establishment. Activation of the alarm by passing the wireless gaming device with the tag through the sensing apparatus notifies the game official of an attempted removal of the wireless gaming device from the gaming establishment.

The wireless gaming device may be powered by a battery source contained within the device. A portable power source such as battery source permits extended cordless operation of the wireless gaming device throughout a gaming environment. The battery source may be part of a removable, rechargeable battery pack that allows the device to be recharged when it is not in use.

In some embodiments, the wireless gaming device displays information such as game information on a device display, such as a liquid crystal display (LCD) with a back-light. The LCD can be used to display the values stored in the wager amount register and in the account balance register. The wireless gaming device may include a display receiver which receives digital information transmitted from the receiver or from the central processor.

The device may also include a bicolor light emitting diode (LED). The bicolor LED is capable of displaying at least two colors, e.g., red and green. The green light may flash each time the wireless gaming device sends a transmission to the receiver, for a period of time to ensure that it is visible to the player. The red light may illuminate when a key is pressed on the wireless gaming device, and remain lit until the transmission is received by the receiver; no additional key entry will be enabled when the red light is lit. The wireless gaming device may also include additional light emitting diodes, for example to indicate when the account balance register is being updated and the balance information is being displayed on the LCD.

The receiver is capable of receiving signals transmitted from the transmitter in the wireless gaming device. The receiver contains a decoder, which converts the received signals, e.g., into digital information. This digital information contains at least the identification code of the wireless gaming device and the players wager information. The receiver sends the digital information obtained by the decoder to the central processor. Communications between the central processor and the receiver may be by an RS-232 electrical interface data serial communications link, with communications being asynchronous at either 9600 or 19,200 bytes per second, in various embodiments.

The receiver may receive signals from many wireless devices either simultaneously or in rapid succession, e.g., using multiplexing techniques, so that many players can place wagers using their wireless gaming devices during a short time interval. The receiver differentiates signals received from the various devices by the identification codes which are present in the signals received by the receiver.

The central processor receives the identification code of a wireless gaming device and the player's wager information from the receiver. The central processor also decrypts this information using the encryption key. The central processor is capable of receiving data from multiple wireless gaming devices in an apparently simultaneous manner.

In various embodiments, an account for the player is stored in a database of the central processor. The database stores the monetary value of the balance of the account associated with the identifier of the wireless gaming device.

The central processor manages the players account in the database based on signals received from the player's wireless gaming device as the player places wagers and when prizes are awarded during play of the game. The central processor subtracts money from the player's account balance when the player places a wager. The players account balance may be automatically increased by the central processor when the player wins a game on which he has placed a wager.

The central processor also stores and is capable of executing software applications containing algorithms to calculate players' account balances, wagers, and winnings. The central processor should be able to execute all of the algorithms which define the actions performed on the players' accounts during the progress of the game, as wagers are entered, as winnings paid out, and when funds are added to the players' accounts.

Algorithms in the software in the central processor may also calculate odds and payouts for certain games, such as lottery-type games, during play of the game. The odds and payouts at a particular point in time may depend on the characteristics of the game being conducted by the central processor, and may change as the game progresses. These algorithms may be executed by the central processor to provide exact calculations of the odds of specific game events occurring and the associated prizes for a players correctly predicting the occurrence of one of those events. The algorithms may be executed continuously, so that real-time odds and payout can be calculated as the game progresses.

The central processor may perform various actions on players' accounts, resulting in various impacts on the accounts. For example, if the player wins a game, his account is credited for the payout based on his wager. If the player places a wager using the wireless gaming device, his account is debited by the amount of the wager. If the game official receives additional funds from the player, the balance of the players account is credited by the amount of the funds. If the game official closes the players account and disburses funds to him, the balance of the players account is debited by the amount disbursed.

The central processor may be located in the gaming establishment that houses the receiver. In various embodiments, the central processor may be located remotely from the receiver, communicating with the receiver via electronic digital telephone communication or wireless transmission, such as a serial communication link. Additionally, the central processor may perform a multitude of functions for various receivers in a variety of gaming environments.

In some embodiments, communication among the central processor, the receiver, and the wireless gaming device involves a polling scheme. Polling enables many wireless gaming devices to communicate with a receiver without interference between them. Such a polling scheme may include the transmission of digital signals in the form of strings of hexadecimal characters. Preferably, all communications between the central processor, the receiver and the wireless gaming device are encrypted.

In such a polling scheme, hexadecimal characters may be reserved for specific control protocols. For example, an attention character is a header character used to begin all transmissions from the central processor to the receiver, and serves to delineate messages and synchronize the receipt of messages in the receiver. The same function is implied when the attention character follows in response to a message transmission. An acknowledgement character is another header character which provides acknowledgement to the transmitting device that the previous message's data has been received and verified. The acknowledgement character can also function as an attention character to begin a subsequent message. An end of message character is used to indicate the end of a transmission. Also, a complement next byte character allows for use of reserved protocol characters within a normal transmission message by avoiding a false control signal when a message data byte matches one of the control characters. When a message byte that needs to be sent matches one of the protocol control characters, the complement next byte character is sent, followed by the one's complement of the matching message byte.

Verification of received data may be accomplished using a single byte checksum of the message information. This checksum may be the one's complement of the sum of the original message data, not including the header character. If the checksum results in a value equal to one of the protocol control characters, it will be treated in accordance with the function of the complement next byte character.

In the polling scheme described above, there are three different modes of communication over the link between the central processor and the receiver. First, the central processor may send messages intended for the receiver. Second, the central processor may send messages intended for the wireless gaming device. Third, the wireless gaming device may send messages intended for the central processor. In various embodiments, messages sent by the central processor may be in the form of a character string formatted with a header character, followed by the identification code of the intended device, the command or message, an end of message character, and a checksum character. Messages received by the receiver or the wireless gaming device may be acknowledged by transmission of an acknowledgement character, but the central processor need not acknowledge messages sent from the wireless gaming devices. Messages sent by the central processor to be received by the wireless gaming device may be broadcast to all of the wireless gaming devices. A device address may be reserved as a broadcast address for all of the wireless gaming devices, and all devices will receive messages sent to this address; in this case, no acknowledgement need be returned from any of the wireless gaming devices.

Each command or message may begin with a command code to signal how the information contained in the message is to be used. Command codes for messages sent by the central processor to the receiver and the wireless gaming device include the following:
1. Send a device address list to the receiver;
2. Send account balance information to the addressed device;
3. Send command to disable the addressed device;
4. Send command to enable the addressed device.

In various embodiments, messages sent between the receiver and the wireless gaming device may be in the form of a character string formatted with a header character, followed by the identification code of the intended device, the current wager amount, the request, command or data, an end of message character, and a checksum character. Command codes for requests, commands and data sent between the receiver and the wireless gaming device include the following:
1. Read user identification;
2. Read device address;
3. Read balance register;
4. Read wager amount register;
5. Provide device status;
6. Write user identification;
7. Write device address;
8. Write balance register;
9. Write wager amount;
10. Perform self test.

These command codes may be used to program the device addresses and user identification information into the wireless gaming devices, as well as to initialize the device to the default state, i.e., the player's account balance of $0. The account balance register and the user identification may each comprise two characters, the least significant byte and the most significant byte, allowing for the use a greater range of numbers for these values.

Various embodiments include methods by which the central processor communicates with a wireless gaming device. The central processor transmits a string of hexadecimal characters, including, e.g., a header character, followed by the device's identification code, followed by a request, command or data, followed by an end of message character, followed by a checksum character. After the central processor transmits the character string, the wireless gaming device receives the string, recognizes its identification code, and executes any instructions in the string. When the central processor sends an instruction to all wireless gaming devices simultaneously, all currently active devices receive and execute the instruction. The wireless gaming device does not send an acknowledgement message to the central processor, although the receiver may receive a transmission from the wireless gaming device that the instruction was received properly. The central processor also communicates with the receiver in a similar manner, except that the receiver may send an acknowledgement message to the central processor which includes the acknowledgement control protocol character.

Similarly, the wireless gaming device communicates with the receiver and the central processor using, e.g., hexadecimal character strings. The receiver regularly and periodically polls the active wireless gaming device for information requests or wagering requests. If the player has entered a request into the wireless gaming device since the last time the wireless gaming device was polled, then the players request will be transmitted to the receiver.

Various embodiments include methods by which the wireless gaming device receives and relays player requests to the central processor. First, the player enters a request into the wireless gaming device using buttons or keys. The player then presses a button labeled, e.g., "enter" or "send," instructing the wireless gaming device to send the request the next time the receiver polls the wireless gaming device. When this button has been pressed, the red light of the bicolor LED is illuminated, thereby informing the player that the request is waiting to be sent. The request is converted into a hexadecimal character string, including, e.g., a header character, an identification code (or, alternatively, a separate identification string reserved for a specific player), the current wager amount, the player's request (e.g., to change the wager amount or to send a balance update), an end of message character, and a checksum character. The next time the receiver polls the device, the transmitter of the device transmits the character string to the receiver. When the wireless gaming device is polled by the receiver, the green light of bicolor LED flashes, informing the player that the request has been transmitted. The receiver receives the request string, and transmits the string to the central processor. The central processor then acts on the players request.

Using the terminal, the game official may process wagering transactions and distribute wireless gaming devices. In various embodiments, the terminal may include a bar code reader and/or a magnetic stripe reader for rapid entry of the identifier of a wireless gaming device prior to delivering the wireless gaming device to the player. Reading devices provide information in the form of digital data to the terminal. The terminal includes a keyboard by which the game official can manually enter data to be sent to the central processor. Using either reading device, the keyboard, or a combination of these, the game official communicates with the central processor to establish a players account, increase the balance of the account when the player tenders funds to the game official, and decrease the balance of the account when the player seeks to collect the cash value of his account balance.

The player establishes a balance of the account associated with his wireless gaming device, identified by an identifier, when he receives the wireless gaming device from the game official. The player may increase the monetary value of the balance of the account by paying additional funds, in the form of cash or credit, to the game official, who accesses the account stored in the central processor through the terminal to increase the balance of the account.

The wireless gaming device is returned to the game official after the player has played one or more games. The readers may be used to read the identifier for closing out the players account stored in the database of the central processor. The terminal includes a terminal display which notifies the game official of the balance of the players account, so that the player may be paid the cash value of the remaining balance of his account.

In some embodiments, an account status display device is located in the gaming establishment to display players' account information. In various embodiments, the display device may be, e.g., a liquid crystal display or a cathode ray tube display. The display device is controlled by the central processor, which sends information to the display device for display to the players.

A player may look at the display device to confirm that wagers transmitted from the wireless gaming device were received by the receiver and sent to the central processor, to determine the monetary balance of the players account, and to verify that the player's winnings have been credited to his account. The display device displays key information necessary for a player to participate in a game. The information displayed for each player may include the account number, the players account balance, the players last wager, and the players last prize award or win.

The display device is divided into specific areas, e.g., a display area, each area showing the account information for one player. The size of the display area may be determined by the size of the display device and the number of players who possess wireless display devices. It is contemplated that only active accounts will be displayed on the display device. If additional display devices are required to display the information concerning a large number of accounts, the central processor may be configured to drive multiple similar display devices.

The display device may also be used to display the odds and payouts for game wagers. Alternately, a separate display device driven by the central processor may be used to display the odds and payout information. Further, the odds and payouts may be displayed on the device display 21.

Procedures for using the wireless interactive gaming system, according to some embodiments, are now described. In some embodiments, a player tenders money in the form of cash or credit, e.g., $100, to a game official in the gaming establishment to establish an account. The game official chooses a wireless gaming device and uses, e.g., the bar code reader on the terminal to enter the identifier of the wireless gaming device into the terminal. The game official also inputs the amount of money tendered, i.e. $100, into the terminal via keyboard. The game official hands the wireless gaming device to the player and tells the player that his account is, e.g., Account No. 12. Alternately, the player may identify his account number directly from the identifier on the wireless gaming device. The information entered by the game official into the terminal is sent to the central processor, which establishes an account record for the player in the database.

For this example, the central processor may be conducting a racing game in which players choose a winning racing element on which to place a wager for the next racing game to be displayed in the gaming establishment. To place a wager, the player presses buttons on the wireless gaming device.

In some embodiments, the player first presses the button that corresponds to the number assigned to the racing element that he chooses, e.g., "3", and then the wager amount, e.g., "$" and "5", for a $5 wager. The player then presses the "enter" key to transmit his wager to the central processor.

In an alternate embodiment, the game may be simplified so that all wagers are placed for a fixed amount, e.g., $1, by pressing a single button on the wireless gaming device. By pressing the button that corresponds to the number assigned to the chosen racing element, e.g., "3", the player places a $1 bet on racing element number 3. The player can then place a larger wager on racing element number 3, by pressing the "3" button the number of times corresponding to the number of $1 bets he desires to make, e.g., by pressing "3" five times to wager $5 on racing element number 3.

Each time the player enters a wager, the wireless gaming device forms a data packet containing the player's wager information and the identification code of the wireless gaming device. The data packet is encrypted and transmitted by the transmitter via wireless communication.

The decoder in the receiver receives the encrypted data packet transmitted by the transmitter. The encrypted data packet is sent to the central processor, where it is decrypted. The central processor uses the information it has obtained to update the player's account in the database by subtracting the wagered amount from the player's account balance and registers the player's wager on the game.

After the game has been played, the central processor awards prizes to winning players based on the wagers they have made and the odds associated with the winning outcome of the game. If the player in possession of the wireless gaming device is a winner, the central computer updates the player's account in the database by adding the monetary amount of the prize to the player's account balance. Otherwise, the player's account remains unchanged.

When the player has finished playing games in the gaming establishment, he returns the wireless gaming device to the game official. The game official again inputs the identifier of the wireless gaming device into the terminal, e.g., by using the bar code reader of the terminal. The terminal accesses the player's account information stored in the database of the central processor to obtain the player's remaining account balance. The terminal display displays the player's remaining account balance to the game official, who then tenders the monetary value of that amount to the player. The account is closed, and the transaction is recorded in the central processor.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Hand-Held Wireless Game Player

Various embodiments include a hand-held wireless game player for playing a game of chance. The hand-held wireless game player may be generally characterized as including: 1) a wire-less communication interface; 2) a display screen; 3) one or more input mechanisms; and 4) a microprocessor configured i) to present the game of chance on the display screen using operating instructions received via the wireless communication interface from a master gaming controller located on a gaming machine and ii) to send information from input signals generated from the one or more input mechanisms to the master gaming controller via the wireless communication interface. The wireless game player may be played in a plurality of venue locations physically separate from the location of the gaming machine where the plurality of venue locations are selected from the group consisting of a keno parlor, a bingo parlor, a restaurant, a sports book, a bar, a hotel, a pool area and a casino floor area. The game of chance played on the wireless game player may be selected from the group consisting of slot games, poker, pachinko, multiple hand poker games, pai-gow poker, black jack, keno, bingo, roulette, craps and a card game. Other games are also contemplated, in various embodiments.

In various embodiments, the wireless communication interface may use a wireless communication protocol selected from the group consisting of IEEE 802.11a, IEEE 802.11b, IEEE 802.11x, hyperlan/2, Bluetooth, and HomeRF. The wireless game player may also comprise a wire network interface for connecting the wireless game player to a wire network access point. In addition, the wireless game player may also comprise a peripheral interface for connecting to a peripheral gaming device where the peripheral interface is a serial interface, a parallel interface, a USB interface, a FireWire interface, an IEEE 1394 interface. The peripheral gaming device may be a printer, a card reader, a hard drive and a CD-DVD drive.

In various embodiments, the one or more inputs mechanisms on the wireless game player may be selected from the group consisting of a touch screen, an input switch, an input button and biometric input device where the biometric input device may be a finger print reader. The wireless game player may also include a detachable memory interface designed to receive a detachable memory where the detachable memory unit stores graphical programs for one or more games of chance played on the wireless game player. The wireless game player may also comprise one or more of the following: 1) an audio output interface for receiving a head phone jack, 2) an antenna, 3) a sound projection device, 4) a battery, 5) a power interface for supplying power to the wireless game player from an external power source and for charging the battery from the external power source, 6) a memory unit where the memory unit may store graphical programs for one or more games of chance played on the wireless game player, 7) an electronic key interface designed to receive an electronic key, and 8) a video graphics card for rendering images on the display screen where the video graphics card may be used to render 2-D graphics and 3-D graphics.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

INCORPORATION BY REFERENCE

The following are incorporated by reference herein:
U.S. Pat. No. 6,676,522;
U.S. Pat. No. 6,846,238;
U.S. Pat. No. 6,702,672.

Casino Electronic Games

Reference numerals below, until otherwise specified, refer only to FIGS. 35 through 40.

Play of the Game

Figure 35:
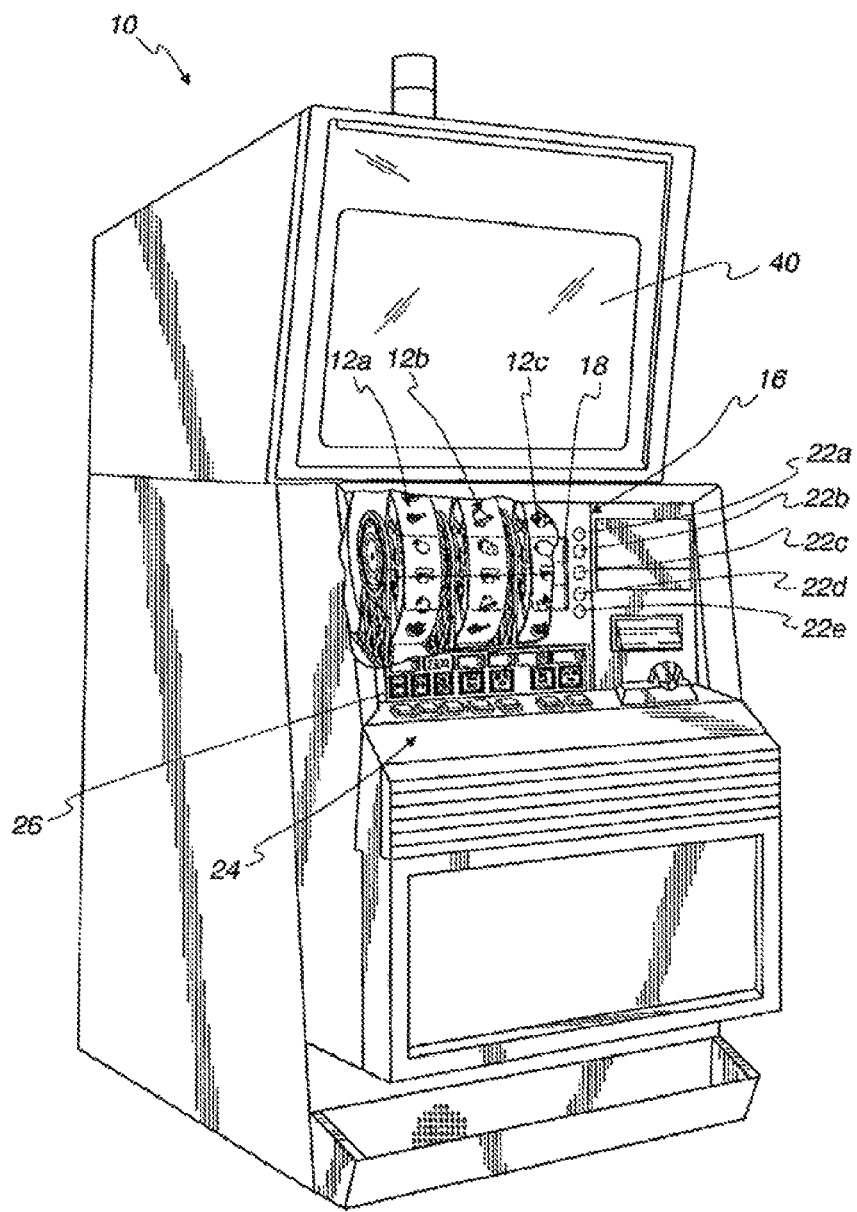
FIG. 35 shows an embodiment of a spinning reel slot machine.

FIG. 35 shows an embodiment of a spinning reel slot machine 10. The slot machine comprises a plurality of mechanical rotatable reels 12a, 12b, 12c and a video display (see FIGS. 36a and 36b). In response to a wager, the reels 12a, 12b, 12c are rotated and stopped to randomly place symbols on the reels in visual association with a display area 16. Payouts are awarded based on combinations and arrangements of the symbols appearing in the display area 16. The video display provides a video image 18 occupying the display area 16 and superimposed on the reels 12a, 12b, 12c. The video image 18 may be interactive with the reels 12a, 12b, 12c, may be static or dynamic, and may include such graphics as payout values, a pay table, pay lines, bonus game features, special effects, thematic scenery, and instructional information. In the illustrated embodiment, the slot machine 10 is an "upright" version in which the display area 16 is oriented vertically relative to the player. Alternatively, the slot machine 10 may be a "slant-top" version in which the display area 16 is slanted at about a thirty degree angle toward the player of the slot machine 10.

Figure 36A:
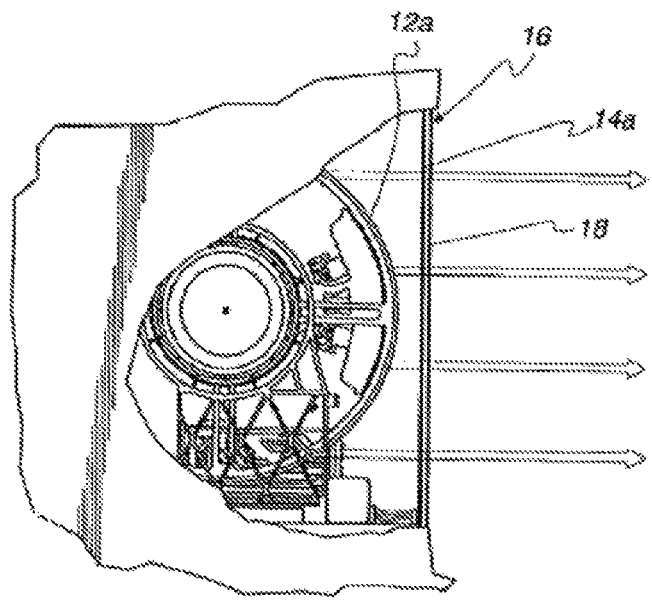
FIG. 36a shows a direct video image in a display area, according to some embodiments.
Figure 36B:
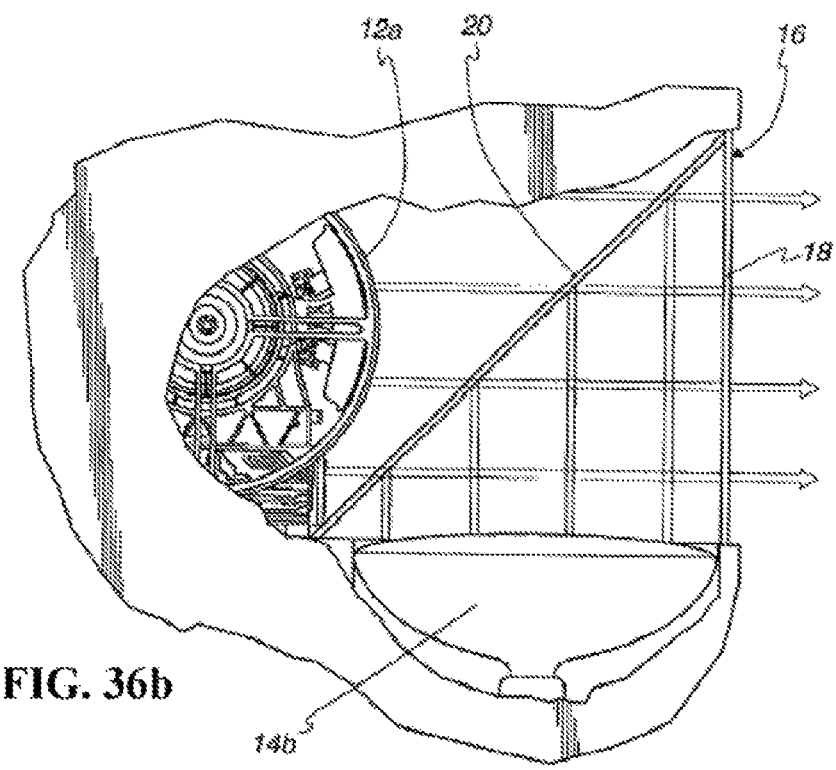
FIG. 36b shows a virtual video image in a display area, according to some embodiments.

Referring to FIGS. 36a and 36b, the video image 18 in the display area 16 may be either a direct image (FIG. 36a) or a virtual image (FIG. 36b), in various embodiments. If the video image 18 is a direct image, as in FIG. 36a, the direct image may be generated by a flat panel transmissive video display 14a positioned in front of the reels 12a, 12b, 12c. The transmissive display 14a may, for example, be a transmissive liquid crystal display (LCD) commercially available from LG Phillips LCD Co., Ltd., of Seoul, Korea. The transmissive display 14a may be outfitted with a touch screen mounted to a front surface of the display 14a. The touch screen contains soft touch keys denoted by the image on the underlying display 14a and used to operate the slot machine 10.

If the video image 18 is a virtual image, as in FIG. 36b, the virtual image is preferably generated by a projection arrangement including a video display 14b and a partially reflective mirror 20. The video display 14b and the partially reflective mirror 20 are relatively positioned to project the virtual image in front of the reels 12a, 12b, 12c between the reels and a player. The video display 14b may be mounted below the reels 12a, 12b, 12c and is generally perpendicular to the display area 16. The mirror 20 may be mounted in front of the reels 12a, 12b, 12c and is oriented at approximately a forty-five degree angle relative to both the video display 14b and the display area 16. The virtual image is generally parallel to the display area 16 and may, in fact, occupy the display area 16. Also, the virtual image may be three-dimensional. In the embodiment of FIG. 36b, the display area 16 includes a glass cover/window. This cover is optionally outfitted with a touch screen that contains soft touch keys denoted by the virtual image and used to operate the slot machine 10.

The video display 14b in FIG. 36b may be a CRT, LCD, dot matrix, LED, electro-luminescent, or other type of video display. Also, instead of mounting the video display 14b below the reels 12a, 12b, 12c, the display 14b may be mounted above the reels with the mirror 20 still oriented at approximately a forty-five degree angle relative to both the video display 14b and the display area 16.

Referring back to FIG. 35, the slot machine 10 is operable to play a basic slot game with the three mechanical spinning reels 12a, 12b, 12c and a bonus game triggered by a start-bonus outcome in the basic game. The number of mechanical reels may vary, for example, to include one or more additional reels. The mechanical reels may be mounted to a horizontal axis to spin vertically as shown or may, alternatively, be mounted to a vertical axis to spin horizontally. Also, instead of each column of symbols being associated with a single reel, each individual symbol may associated with a single reel such that a symbol array of nine symbols is associated with nine distinct reels. Each of five pay lines 22a, 22b, 22c, 22d, 22e extends through one symbol on each of the three mechanical reels. The number of pay lines may be more or less than five and may have various configurations.

Generally, game play is initiated by inserting a number of coins or playing a number of credits, causing a central processing unit to activate a number of pay lines corresponding to the number of coins or credits played. As shown in FIG. 37, the superimposed video image 18 may depict instructional information prompting the player to insert coins or play credits. The player selects the number of pay lines (e.g., between one and five) to play by pressing a "Select Lines" key on a button panel 24. The player then chooses the number of coins or credits to bet on the selected pay lines by pressing a "Bet Per Line" key on the button panel 24. As shown in FIG. 38, the superimposed video image 18 may depict the activated pay lines and the number of wagered credits per pay line.

After activation of the pay lines, the reels 12a, 12b, 12c may be set in motion by touching a "Spin Reels" key on the button panel 24 or, if the player wishes to bet the maximum amount per line, by using a "Max Bet Spin" key on the button panel 24. Alternatively, other mechanisms such as, for example, a lever may be used to set the reels in motion. The central processing unit uses a random number generator to select a game outcome (e.g., "basic" game outcome) corresponding to a particular set of reel "stop positions." The central processing unit then causes each of the mechanical reels to stop at the appropriate stop position. Symbols are printed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. As shown in FIG. 39, the superimposed video image 18 may depict the pay table in response to a command by the player (e.g., by pressing a "Pay Table" key on the button panel 24). A winning basic game outcome occurs when the symbols appearing on the reels 12a, 12b, 12c along an active pay line correspond to one of the winning combinations on the pay table. A winning combination, for example, could be three matching symbols along an active pay line. If the displayed symbols stop in a winning combination, the game credits the player an amount corresponding to the award in the pay table for that combination multiplied by the amount of credits bet on the winning pay line. As shown in FIG. 40, the superimposed video image 18 may highlight the winning combination(s) (e.g., "7," "7," "7") and its associated pay line (e.g., pay line 22c) and depict the award for that winning combination. The video image 18 may further include special effects such as flashing the winning pay line(s) and/or the award and providing explosions. The winning pay line(s) may flash, be accompanied by exploding flashes, and display a portion of the pay table. The player may collect the amount of accumulated credits by pressing a "Collect" key on the button panel 24. In one implementation, the winning combinations start from the first reel 12a (left to right) and span adjacent reels. In an alternative implementation, the winning combinations start from either the first reel 12a (left to right) or the third reel 12c (right to left) and span adjacent reels Pay Table A game may have a pay table that defines all possible outcomes of one play of the game that can result in awarding a prize to a player.

In various embodiments, each line of the pay table defines the number of coins required to be played, the criteria that defines a win, the odds of the win criteria resulting from one play of the game and the number of coins returned by the gaming device to the player when a win is registered. In addition, a pay line may include the ability to accept a progressive prize value from the system. In various progressive gaming systems and methods this allows the game's pay line to be linked to a system controlled progressive prize.

A pay table may include a list of payouts on a slot machine or a video poker machine. The table may show for each combination of symbols and the number of coins bet, how main coins the bettor will win.

On older machines and some newer reel machines, the pay table may be listed on the face of the machine, usually above and below the area containing the wheels.

Each machine may have a table that lists the number of credits the player will receive if the symbols listed on the pay table line up on the pay line of the machine. The pay table details where the symbols must be for the bettor to be paid. In general, the symbols must be centered directly under the pay line on the machine. Video slot machines generally will only display the pay line for lines that are winners.

Some machines offer symbols that are 'wild' and will pay if they are visible in any position, even if they are not on the pay line. These wild symbols may also count for any other symbol on the pay table.

Most video machines display the pay table when the player presses a "pay table" button or touches "pay table" on the screen; some have the pay table listed on the cabinet as well.

Progressive

Games of chance may be described as either progressive or non-progressive. In non-progressive games, such as traditional pull-tab, participants play for a chance to win a predetermined prize, i.e., one of the winning cards. Progressive games, in contrast, involve a jackpot or prize that grows during the play of the game. Many state numbers lotteries, for instance, fall into the progressive category because the prize increases over time as more players participate. During the operation of a progressive game, a portion of each player's purchase is dedicated to the prize. Thus, the prize grows until the winning numbers are selected and the game ends. Some slot machines also offer a progressive jackpot.

In various progressive gaming systems and methods a portion of each wager is used to fund an increment to the current prize value, fund the starting value of the next prize after a win occurs, and other uses. Commonly the portion used, usually known as contributions, is determined by control data related to percentages and the coin denomination.

For example, assume a prize starts at $1,000,000 with a contribution rate of 3.5% to fund the next prize's starting value of $1,000,000 and a 2.5% contribution rate to the growth of the current prize's value. Also assume it is linked to gaming devices requiring a $2.00 wager. This means each wager contributes $0.07 (2.00*0.035=0.07) to the next prize's starting value and $0.05 (2.00*0.025=0.05) to the increment of the current prize value. With these contribution percentages there must be about 14,285,715 handle pulls, or games played, between wins for the prize's $1,000,000 starting amount to be funded. (1,000,000/0.07=14,285,714.29). In essence the total wager amount made over the theoretical life cycle of one prize award would be $28,571,430.00 (14,285,715*2.00=28,571,430.00).

During this theoretical time period the prize value would increase by $714,285 (0.05*14,285,714.29=714,285.7145) to make the average prize value worth $1,714,285 for each theoretical win. Also assume that a marketing study has determined that to sustain player interest the prize should be won on average about once every month. This means there should be about 14,285,715 handle pulls, or games played, over a thirty day time span. If each gaming device were able to average about 5 games played each minute for 10 hours a day it would produce 3000 games played per day. If the prize were to be won every thirty days and each gaming device generates 90,000 handle pulls a month (5 games*60 minute/hour*10 hours*30 days=90,000), there would have to be at least 159 gaming devices attached to the prize (14,285,715/90,000=158.73 . . . ).

Linked Machines

Often machines are linked together in a way that allows a group of machines to offer a particularly large prize, or "jackpot". Each slot machine in the group contributes a small amount to this progressive jackpot, which is awarded to a player who gets (for example) a royal flush on a video poker machine, or a specific combination of symbols on a regular or 9 line slot machine. The amount paid for the progressive jackpot is usually far higher than any single slot machine could pay on its own.

In some cases multiple machines are linked across multiple casinos. In these cases, the machines may be owned by the machine maker who is responsible for paying the jackpot. The casinos lease the machines rather than owning them outright. Megabucks, including Megabucks Nevada and penny Megabucks, is an example of linked machines across multiple casinos.

Central Computer, Network, and Accounting

Various embodiments include networked gaming devices. Interconnecting a plurality of gaming devices such as slot machines via a computer network to a central computer may provide advantages. Some advantages of networked gaming devices may include the ability to extract accounting data from the individual gaming devices as well as providing player tracking. Various network systems allow the central host computer to monitor the usage and payout, collectively known as audit data, of the individual gaming devices. This audit data includes data related to the number of coins or tokens inserted into the device, the number of times the device has been played, the amount paid in raises, the number and the type of jackpots paid by the machine, the number of door openings, etc. The host computer can then compile an accounting report based on the audit data from each of the individual gaming devices. This report can then be used by management, for example, to assess the profitability of the individual gaming devices.

In some areas, regulations may encourage or require a relatively detailed accounting of each video gaming machine's activity to assure that the machine operates within regulated standards. Meters are often provided to track money input into and money dispensed from the machines. Because money may sometimes be inserted to a machine but not wagered, for example where a player inserts a certain amount of cash or credit but cashes out before betting the entire amount, the simple ratio of money in to money out does not necessarily accurately reflect the machine's operational activities. Accordingly, it may be helpful to also track the amount of money wagered and the amount of money or credits won by the player.

In larger facilities such as casinos, a central computer may monitor such information for a plurality of embedded system single player gaming machines through a "location controller." Each video gaming machine serially communicates with the location controller to provide appropriate information to the central computer. If the central computer detects an irregularity regarding a particular game, it instructs the location controller to deactivate the game. An exemplary system including a location controller and embedded system circuitry at a video gaming machine for providing information to the location controller is disclosed in U.S. Pat. Nos. 5,429,361 and 5,470,079, the entire disclosure of each of these patents being incorporated herein by reference for all purposes.

Reference numerals below, until otherwise specified, refer only to FIG. 41.

Figure 41:
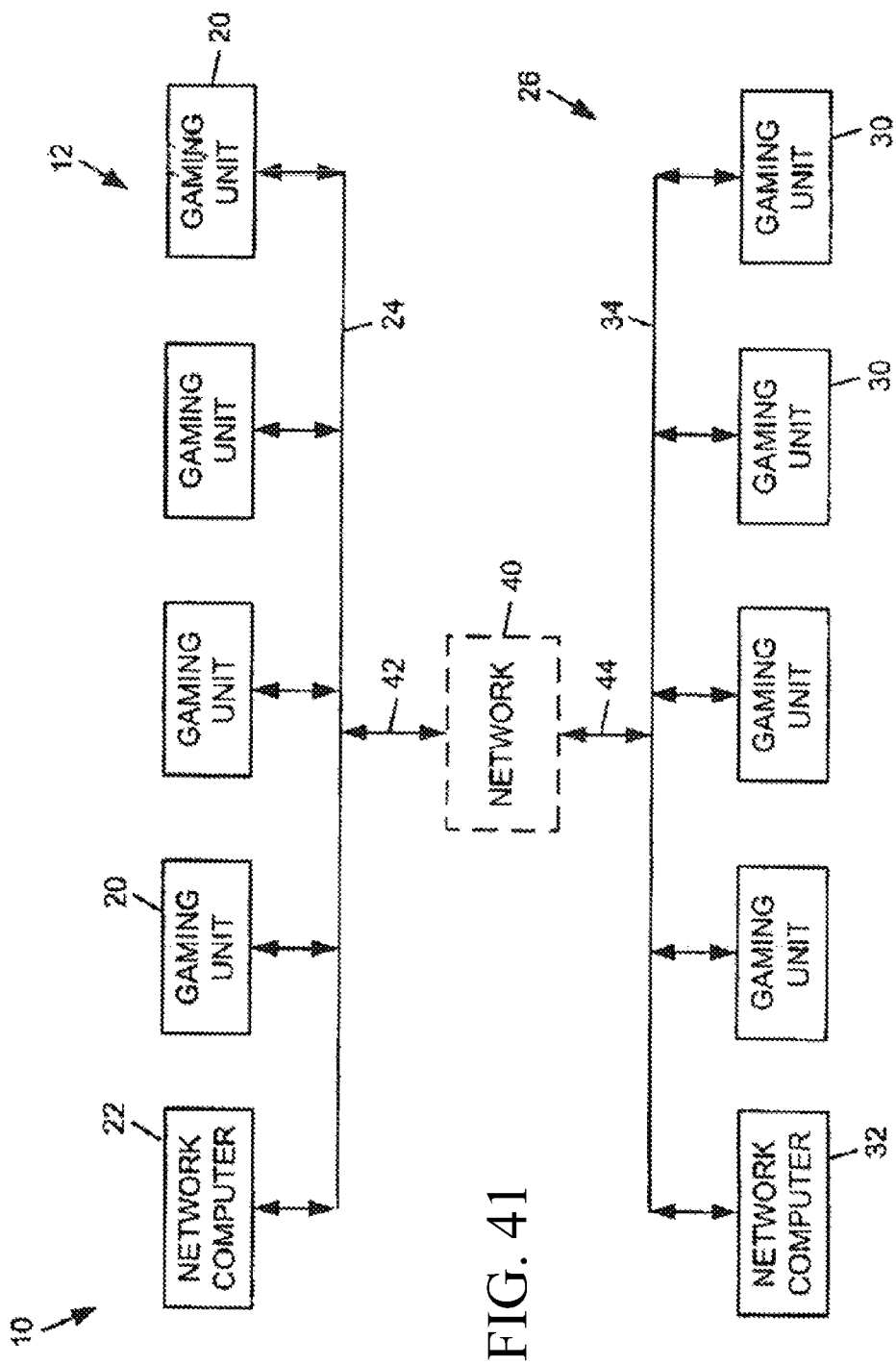
FIG. 41 illustrates an embodiment of a gaming system in accordance with some embodiments.

FIG. 41 illustrates an embodiment of a gaming system 10 in accordance with some embodiments. Referring to FIG. 41, the gaming system 10 may include a first group or network 12 of gaming units 20 operatively coupled to a network computer 22 via a network data link or bus 24. The gaming system 10 may include a second group or network 26 of gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino or facility, and the second network 26 of gaming units 30 may be provided in a second casino or facility located in a separate geographic location than the first facility. For example, the two facilities may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Various embodiments include a system for operating networked gaming devices. The system according to various embodiments allows a casino in which the system is installed to run promotions or bonuses on any properly equipped gaming machines while simultaneously gathering player tracking and accounting data from all machines. The system provides the capability for the casino to select which of the plurality of machines are used in any given promotion. The system further allows any number of different promotions to operate simultaneously.

The system includes a plurality of gaming devices or machines connected to an associated floor controller over a network. The system includes one or more of said floor controllers. The floor controllers are interconnected by a high-speed network, such as an Ethernet network, to a database where accounting and player tracking data is stored. The system can also include pit terminals and/or fill and jackpot processing terminals. Each promotion involves sending a reconfiguration command from the floor controller to a gaming device that has been selected to be part of a given promotion over the associated network. Upon receipt of the reconfiguration command, the gaming device reconfigures its payout schedule in accordance with the received reconfiguration command. In some embodiments, this reconfiguration includes activating a bonus payout schedule. A partial list of the promotions according may include, without limitation: a multiple jackpot wherein the gaming device reconfigures its payout to be a multiple of its default payout schedule; a bonus jackpot wherein the gaming device reconfigures its payout schedule to payout an additional bonus amount when certain conditions are met; and a progressive jackpot wherein two or more gaming devices are combined in a progressive jackpot having a progressive jackpot payout schedule. In addition to these, many other promotions are possible by the above-described system for controlling and monitoring a plurality of gaming devices.

The system may support player tracking, in some embodiments, by recording machine transactions including time of play, machine number, duration of play, coins in, coins out, hand paid jackpots and games played. The player tracking is conducted over the same network as the accounting data is extracted. This allows the provision of bonusing to certain individual players as well as during certain times. Various embodiments include a system which monitors and reports how many coins are played by each player. The system, according to various embodiments, includes the ability to record how long each player spends at each machine and the number of coins won, games played, and hand jackpots won by each player. All this information is stored on the database, which can be later analyzed for future targeted direct mailing campaigns. The player tracking according to various embodiments also allows the casino to schedule buses and other groups and measure their profitability. The system also allows for cashless play as well as advanced accounting and security features.

Bonus Game

Various embodiments include the concept of a "secondary" or "bonus" game that may be played in conjunction with a "basic" game. The bonus game may comprise any type of game, either similar to or completely different from the basic game, which is entered upon the occurrence of a selected event or outcome of the basic game.

Various embodiments comprise methods of playing games, gaming devices and table games utilizing a primary game, e.g., rotatable reels, and at least one discernible indicia of a secondary game, possibly comprising a payout indicator. The secondary game may be separate from the primary game either physically or temporally.

According to various embodiments, a bonus payout indicator is clearly visible to a player and is operable when primary reels of a primary game slot machine stop on certain predetermined indicia. According to some embodiments, a secondary payout indicator is in the form of a rotatable bonus wheel which can be caused to spin automatically or in response to some action by a player, e.g., the player pushing a button, when the primary game indicates one of a predetermined plurality of indicia. The wheel is caused to gradually reduce speed and when the wheel stops, a pointer indicates the payout to be awarded to the player.

Various embodiments further comprise a discernible multiplier which provides the ability to change either the payout from the primary gaming unit or the secondary payout indicator, or both. Various embodiments contemplate providing a payout from the primary gaming unit, a payout indicated by the secondary indicator only, a payout from the primary gaming unit or the secondary indicator as changed by the multiplier, or a separate, plurality of payouts from the primary gaming unit and the secondary indicator either with or without modification by a multiplier.

According to various embodiments, the mechanical bonus payout indicator is electronically operated and is linked to a random number generator which determines where the secondary indicator actually stops.

According to various embodiments, when the primary unit stops on one of a predetermined plurality of winning indicia sets, a second event actuator is placed in an active state. According to various embodiments, a person, such as the player, must actuate the actuator in order to operate the bonus indicator.

According to various embodiments, the bonus actuator requires operator intervention so that a player must involve a casino attendant who can activate the bonus indicator.

According to another various embodiments, the bonus indicator is connected to a drive mechanism which gradually reduces the rate of spin of the bonus wheel before the bonus wheel stops.

Various embodiments comprise gaming devices having electronic means for displaying indicia of rotatable reels such as a video screen and/or means for displaying indicia of a secondary payout indicator, such as a video screen. Various embodiments comprise methods for playing a game of chance. One method comprises the steps of displaying a first randomly selected combination of indicia, said displayed indicia selected from the group consisting of slot reels, indicia of at least one reel, indicia of at least one playing card, and combinations thereof; generating at least one signal corresponding to at least one select display of first indicia; providing at least one discernible indicia of a mechanical bonus indicator, said bonus indicator indicia indicating at least one of a plurality of possible payouts, wherein said bonus indicator indicia providing means is operatively connected to said first, standard gaming unit and actuatable in response to said signal. According to various embodiments, the discernable indicia of a mechanical bonus indicator gradually reduces the rate of movement of the mechanical bonus indicator for some period of time prior to actually providing the discernable indicia of a payout. According to another embodiment, a multiplier is provided to multiply at least one payout by a multiple which is most preferably indicated to a player. The multiple can preferably sequentially change as discernable indicia change. For example, a plurality of multiples can be synchronized with a plurality of discernable indicia on the mechanical bonus indicator such that the multiple changes as the payout indicated changes.

Various embodiments include a method of conducting a game of chance comprising the steps of providing a player with an opportunity to place a wager; displaying a randomly selected combination of indicia, said displayed indicia selected from the group consisting of reels, indicia of at least one and preferably a plurality of reels, indicia of at least one and preferably a plurality of playing cards, and combination thereof; generating at least one signal corresponding to at least one select display of said indicia; providing at least one discernible indicia of a mechanical bonus indicator, said bonus indicator indicia indicating at least one of a plurality of possible bonuses, wherein said bonus indicator indicia is in the form of a wheel or reel and is actuatable in response to said signal.

A bonus game may include another gaming machine or a random selection device which is enabled by a bonus qualifying signal from an underlying or primary gaming machine. A wide variety of bonus games, features, and devices are known some of which are set forth next.

The WHEEL OF GOLD™ and WHEEL OF FORTUNE™ slot casino games incorporate a single play bonus- ing feature. A rotating wheel is activated by the player depressing a bonus spin button when certain indicia appears on the reels of the slot game and is used to award bonus payouts in a spin of the wheel. A separate multiplier may be used to multiply the bonus payouts. After the bonus spin, play resumes in the underlying gaming machine.

In various embodiments, a bonus game involving multiple plays is presented for an underlying gaming machine such as a slot machine. Here a Bernoulli trial procedure is used to allow a player to repeatedly play a high odds bonus game (such as another slot game) and receive awards until a losing combination occurs (i.e., winning until losing). The hit rate in the bonus game is greater than 50% (possibly higher than 70%) which may result in a much lower hit rate in the underlying game. This hit rate difference causes the player to endure the low hit rate of the underlying slot game in order to qualify for the high hit rate of the bonus game. The length of the bonus game is longer when the hit rate for the bonus game is higher. This bonus feature allows a player to win each bonus game and collect winnings until the player receives a losing combination (i.e., losing until winning).

One slot machine main game is interconnected with a slot machine secondary game. The player has the option of pushing a button which debits his credit meter by the appropriate amount to play the secondary game such as another slot game. Hence, the player gambles an amount in order to play the bonus game.

Various embodiments include an electronic gaming apparatus and method therefore wherein each play in the bonus is the result of successive underlying game play. Included are an electronic primary gaming device such as a poker or a slot machine and an electronic secondary gaming device based on bingo. When a winning combination such as three queens appears in the primary game, a space in the bingo matrix is turned over to reveal a bingo symbol. Play continues on the primary game until a winning sequence occurs in the bingo game. The right to play the bingo secondary game does not occur unless the player inserts three or more coins into the primary game. Play continues until the game achieves a bingo in which case the player receives a prize.

Various embodiments include a slot machine having a jackpot feature whereby the prize value is transferred between separate jackpot displays as successive games are played. Some of the reel symbols are overprinted with a number and when that number lands on the payline, it is used to climb a ladder. The ladder enables the player to obtain one or all of the prizes in the upper portion of the slot machine. For example, if the overlaid number lands the player on a first playing level, then the player receives all three prizes. If the overlaid number lands the player on a second level, then the player can select which one of the three prizes to receive. If the player lands on a third level, then it becomes a game of skill to select which of the three prizes he selects. Finally, if the player lands on a fourth level, then the prize is randomly selected. The prize may also be randomly doubled.

Various embodiments include a plurality of slot machines interconnected to an electronic controller which displays a separate race game. Each time a particular predetermined combination of indicia appears in the display of a particular slot machine, a signal is generated from the slot machine which advances the racing element through a particular predetermined distance. If the player's horse reaches the finish line before a timer display times out, then the slot player wins an additional prize. The players are not racing against each other, but against a clock.

Various embodiments include a gaming machine including a processor operable in a basic mode and a bonus mode for controlling game play. In the basic mode, the processor operates to select a basic game outcome from among a plurality of possible basic game outcomes. The possible basic game outcomes include a start-bonus outcome the occurrence of which causes the processor to shift operation from the basic mode to the bonus mode. The processor is operable to define a plurality of player-selectable bonus game outcomes. In the bonus mode, a player selects one or more of the bonus game outcomes and credits are awarded based upon which ones of the bonus game outcomes are selected.

Various embodiments include a gaming machine including a processor operable to selecting a game outcome from among a number of possible game outcomes. A number of the possible game outcomes are identifiable according to a pay table as winning combinations, whereas a remaining number of the possible game outcomes are identified as apparent losing combinations. The gaming machine includes means for awarding credits upon occurrences of the winning combinations and upon occurrence of at least one of the apparent losing combinations.

Various embodiments include a gaming machine including a processor operable in a basic mode and a bonus mode for controlling game play. In the basic mode, the processor operates to select a basic game outcome from among a plurality of possible basic game outcomes. The possible basic game outcomes include one or more bonus-resource outcomes the occurrence of which causes the processor to generate a bonus game resource exercisable in a bonus game. The gaming machine includes means for shifting operation of the processor from the basic mode to the bonus mode. The processor is operable to define a plurality of possible bonus game outcomes. In the bonus mode, upon selection of a bonus game outcome, the bonus game resource(s) generated in the basic game may be exercised to affect the bonus game outcome. In one embodiment, where the bonus game outcome would otherwise cause the processor to end the bonus game, an exercise of a bonus game resource in conjunction with the bonus game outcome causes the processor to continue operation in the bonus mode, thereby allowing the player to continue playing the bonus game.

Reference numerals below, until otherwise specified, refer only to FIG. 42.

Figure 42:
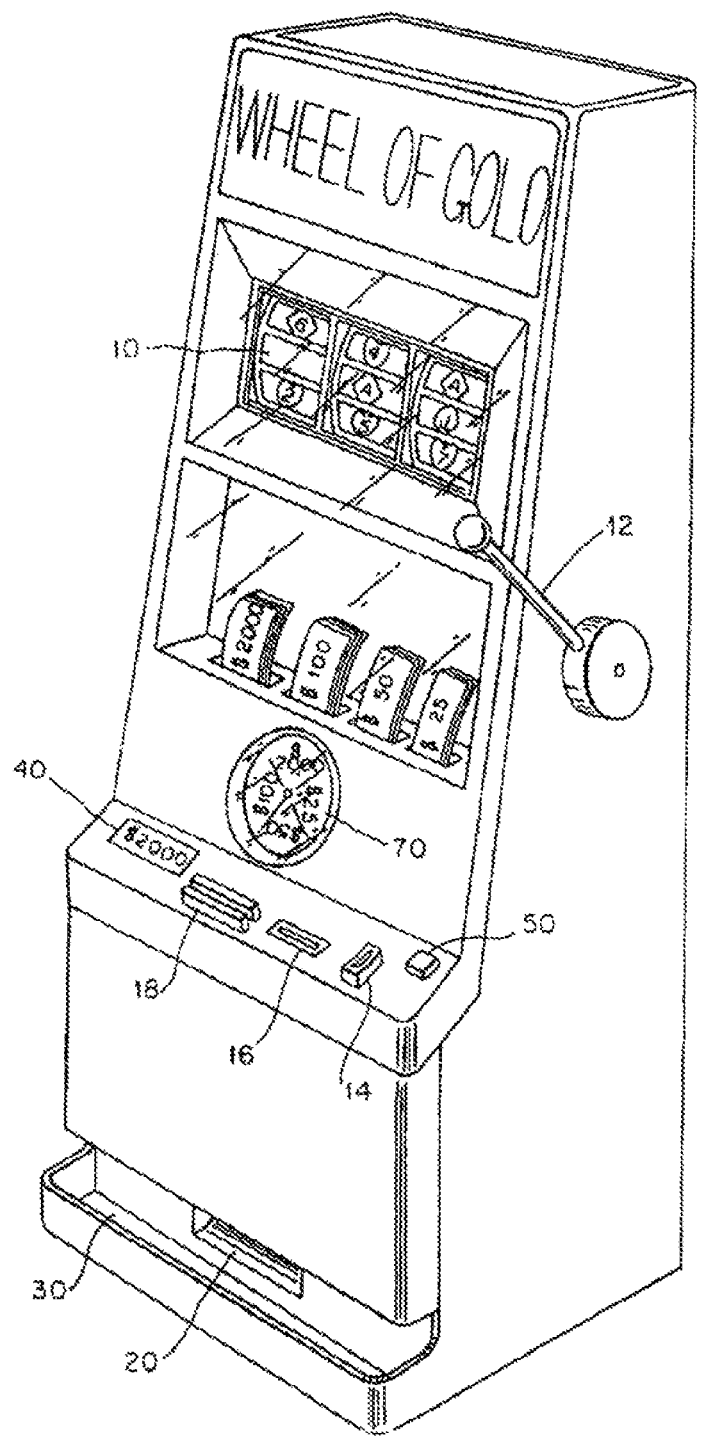
FIG. 42 is a perspective view of a slot machine 10.

FIG. 42 is a perspective view of a slot machine 10. A slot machine 10 may include rotatable reels 60, each having a plurality of symbols thereon that are randomly displayed when a mechanical lever 12 is pulled and the reels 60 are rotated. If the symbol displayed is a predefined symbol, or predefined combination of symbols, the player may receive a payout either through coin chute 20, which deposits winnings into coin trough 30, or by increasing the player's credits displayed in credit window 40. A slot machine 10 may also include a microprocessor, or other central processing unit as well as memory. In such a case, a display screen (not shown) (e.g., a cathode ray tube (CRT), plasma display, liquid crystal display (LCD), and/or a display based on light-emitting diodes (LED)) may be operably coupled to the computer to replace the reels 60 and provide a simulation of reels and their rotation, the output of a random number generator being used to direct the types and combinations of symbols displayed on the display screen.

A coin slot 14, currency validator 16 or card acceptor device 18 (to accept a credit card, gaming card, player card, smart card and the like) permits a player to activate a base game on the slot machine 10. A player may have a predefined chance, or odds, of winning a payout for the base game based on the mathematical odds that a winning symbol or combination of symbols will be randomly displayed on the indicia of the reels 60. The odds may be adjusted by changing the number of possible non-winning symbols or combination of non-winning symbols in relation to the number of possible winning symbols or combination of winning symbols. The odds of winning a payback and the amount to be awarded to a winning player in relation to the amount wagered may be defined in the form of a "pay table" or "par sheet."

Initiating a base game on a slot machine 10 may be done as simply as by inserting a coin, token or other type of currency equivalent (debit card or credit card) into a gaming device such as slot machine 10. Another example of a player action which may be taken in initiating a base game includes inserting an identification card, such as a "smart card," having a programmed microchip or a magnetic strip coded with a player's identification, credit totals and other relevant information. Such smart cards or "player cards" may be used in player tracking systems. Various embodiments include a card that contains information about the player which is pertinent to the gaming activity such as points awarded based upon the player's gaming activity. The player may insert the card in a gaming device at the time of play. When the player indicates that he or she has finished play on that gaming device, the card is updated with player activity information. The player can then insert the card into a different gaming device, which makes the player activity information stored on the card available to the player tracking system. In various embodiments a gaming device may accept preprinted coupons, or cash out slips, to initiate a base game and to print the cash out slips directly from the gaming device. In various embodiments, money may be transferred to a game through an electronic funds transfer process.

Gaming device displays may include multiple images representing various aspects of a game such as a game portion, a credit total portion and a wager amount portion. Other displays may include an additional bonus award portion to indicate an amount of a bonus award which may be won, typically through multiple or secondary games.

Internet Gaming

In various embodiments, it is also possible to participate in a game of chance via the Internet. This may accomplished through a casino or game host site offering displays similar to those found in conventional gaming devices. Generally, to play a game of chance via the Internet, a software file is downloaded to a player's computer or terminal, which may then be used to install the necessary software for the game and access the casino or game host Internet site. As with a conventional gaming device, Internet games may be accessed using an identification code or name to identify the specific player and retrieve that player's credit total or play history.

Bonus gaming may include employing a secondary game that will execute if the player achieves a predefined outcome associated with the base game. In many cases, the bonus game is a singular event in that the play changes to the bonus game when a certain base game outcome is achieved and the bonus game is then played to completion. For example, when the reels of a slot machine stop on certain predetermined indicia, a bonus game may be initiated by pressing a button and bonus indicator actuated to display a randomly determined bonus award. In various embodiments, the bonus game is a more sequential event in that progress through the bonus game is determined by continued play in the base game.

In some bonus game embodiments, the possible primary game outcomes include a special symbol combination that causes a computer processor to generate a bonus game resource exercisable in the bonus game. For example, one or more bonus game resources can be used to override the end-bonus outcome and thereby allow the play of the bonus game to continue.

Various embodiments allow the player to have further interaction in the bonus game by providing a touch screen where the player can select objects by touching the screen positions. Various values are then revealed to the player until an end-bonus outcome is encountered.

In various embodiments, bonus gaming may be conducted through a plurality of networked, or linked, gaming devices such that the secondary gaming activity might involve a plurality of players wagering on base games at separate gaming devices. Various bonus games may allow a player to compete with a plurality of other players for a secondary prize. In various embodiments, a bonus game may include one or more contestants in a race. In one embodiment, each player wagering at a primary gaming unit may be represented by a particular contestant in the race. The contestant representing a particular player advances in the race according to the represented player's gaming activity at the primary gaming unit. The race ends upon a contestant finishing or upon the expiration of a predetermined amount of time, whichever comes first.

Various embodiments include a system of linked gaming devices wherein the generation of certain symbols at each gaming device is used to build up a pooled bonus value. A bonus award is then awarded to the player that causes the accumulated bonus value to meet or exceed a predetermined value.

Various gaming systems may include progressive systems in which the bonus award amount increments as base games are played on individual or linked gaming devices. In various progressive systems, a game controller is connected to a plurality of machines. A win is generated approximately every one half minute (every eight handle pulls), adding to the progressive bonus pool. Accordingly, the value of the progressive bonus rapidly increments.

Various gaming systems and methods for providing a bonus game allow players to compete directly against another player or for the players to act in collaboration with one another to win a prize.

Virtual Reel A game apparatus having a plurality of reels mounted for rotation about an axis and which can be set into motion by the pulling of a lever. Indicia are fixed to the outer peripheries of these reels to indicate reel positions and a brake is operable to stop the reels at any randomly preselected position.

A random number generator is provided with electronic circuitry which computes the random stop position at which the reel should be stopped by the physical brake. This is done with an electronically random number selected from a group of numbers which exceeds the number of physical reel positions such that one physical reel position is represented by one or several positions on the virtual or electronically generated reel which is in affect, randomly stopped by the random number generator. In various embodiments, the physical reels are only used as a display of the random number generated result and are not the game itself as in standard slot machines. In this manner, a standard slot machine or gaming apparatus can be made to function at payout odds, independent of the limits set by the number of physical reels and their physical stop positions, by changing the random number generator.

Random Number Generators

In various embodiments, slot machines are computerized, so that the odds of various outcomes are whatever they are programmed to be. In various embodiments, the reels and lever may be present for historical and entertainment reasons. In various embodiments, the positions the reels will come to rest on are chosen by a random number generator (RNG) contained in the machine's software.

The RNG may be constantly generating random numbers, at a rate of thousands to millions per second. As soon as the lever is pulled or the "Play" button is pressed, the most recent random number may be used to determine the result. This means that the result may vary depending on exactly when the game is played. A fraction of a second earlier or later, and the result may be different. In various embodiments, the RNG may be a pseudorandom number generators Player Tracking A gaming device apparatus may include a player tracking card that may be disposed in the card reader. The player tracking card may comprise a data storage device that stores data representing the identification of a player. Additionally, the player tracking card may comprise a first card surface, a second card surface, and a light transmissive body portion extending between the first card surface and the second card surface. The player tracking card may be positioned in a card illumination position wherein the first card surface is disposed in the card reader so that the first card surface is positioned adjacent the light generating source associated with the card reader, and the second card surface of the player tracking card remains visible outside the card reader. Also, when said player tracking card is in the card illumination position, light generated by the light generating source may be transmitted into the first card surface of the player tracking card and then transmitted through the light transmissive body portion of the player tracking card so that light may be visible to the user through the second card surface.

Player tracking, as the name indicates, may involve tracking individual player usage of gaming devices. In various embodiments, the player is issued a player identification card which has encoded thereon a player identification number that uniquely identifies the player. The individual gaming devices are fitted with a card reader, into which the player inserts a player tracking card prior to playing the associated gaming device. The card reader reads the player identification number off the card and informs a central computer connected thereto of the player's subsequent gaming activity. By tracking the individual players, individual player usage can be monitored by associating certain of the audit data with the player identification numbers. This allows gaming establishments to target individual players with direct marketing techniques according to the individual's usage.

Reference numerals below, until otherwise specified, refer only to FIGS. 43-44A.

Figure 43:
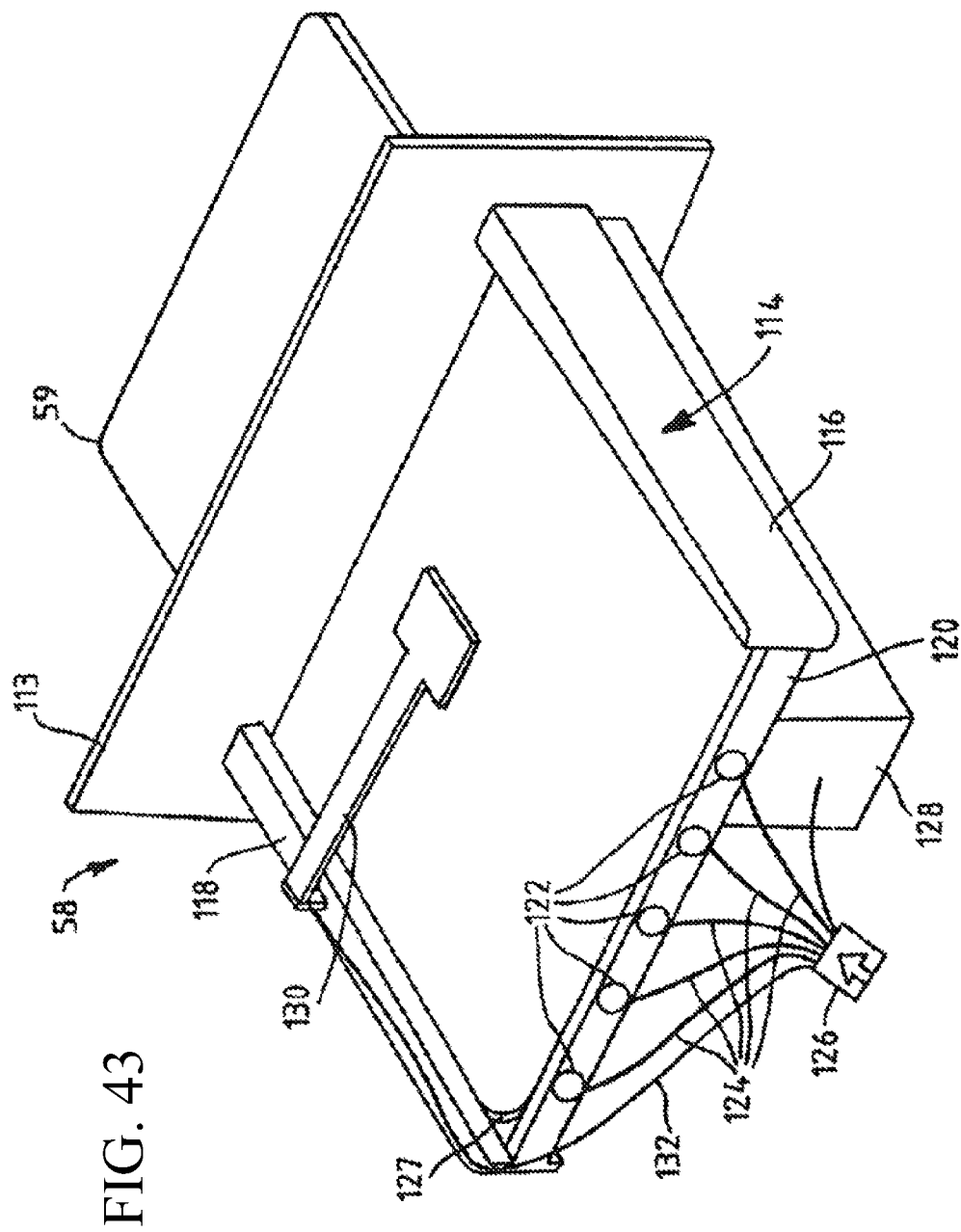
FIG. 43 illustrates schematically an embodiment of a player tracking card 59 disposed in a card reader 58

FIG. 43 illustrates schematically an embodiment of a player tracking card 59 disposed in a card reader 58. The player tracking card 59 is positioned in a card illumination position. The card reader 58 may include a mounting plate 113 to assist in securing the card reader 58 to the housing 50 of the gaming apparatus 20. The card reader 58 may also include a chassis 114 which may comprise a first side rail 116, a second side rail 118, and a back structure 120.

The card reader 58 of FIG. 43 may also include a number of light generating sources 122. The light generating sources 122 shown in FIG. 43 are fixed to the back structure 122 of the chassis 114, however the light generating sources 122 may also be secured directly to the housing 50 of the gaming apparatus 20 or any other structure within the housing 50 that is separate from the card reader 58. The light generating sources 122 may comprise LEDs, OLEDs, incandescent lamps, fluorescent lights, or any other device capable of generating light. If a plurality of the light generating sources 122 are used, they may produce light that is uniform in color or they may produce a plurality of different colors. The light generating sources 122 may be connected to the controller 100 through a plurality of corresponding conductors 124 to control the intensity and pattern of illumination of the light generating sources 122. The conductors 124 may be connected to a modular connector 126 for ease of installation into the gaming apparatus 20.

The player tracking card 59 may be positioned in the card illumination position when the card 59 is disposed in the card reader and a first card surface 127 is adjacent the light generating sources 122. In the embodiment shown in FIG. 43, the player tracking card 59 may rest on the side rails 116 and 118 and the first card surface 127 may abut the back structure 120 of the chassis 114 when the player tracking card 59 is in the card illumination position. Thus, when the player tracking card 59 is in the card illumination position, light generated by the light generating sources 122 is transmitted into the first card surface 127 of the player tracking card 59.

A data reading apparatus 128 may also be included in the gaming apparatus to read data from the player tracking card 59 that is disposed in the card reader 58. The data reading apparatus 128 may be attached to the chassis 114 so that it is in close proximity to the player tracking card 59 when the player tracking card 59 is disposed in the card reader 58 and in the card illumination position. The data reading apparatus 128 may read data from the player tracking card 59 in a variety of ways. For example, the data reading apparatus 128 may read data from a magnetic strip or from an optically readable material such as ink, both of which may be located on a surface of the player tracking card 59. Various embodiments may utilize multiple data reading apparatuses to read data from additional magnetic strips or optically readable materials located on the same surface or on different surfaces of the player tracking card 59. As another example, the data reading apparatus 128 may utilize an antenna to couple with a corresponding antenna in the player tracking card 59 so that data is thereby transmitted.

The data reading apparatus 128 may be interconnected to the controller 100 so that the data may be stored and possibly acted on, such as by energizing a light generating source 122. While not shown, a data writing apparatus may also be included to write new data to the player tracking card 59. This may be a separate component, or it may be combined with the data reading apparatus 128.

Types of Machines (Video, Mechanical)

A gaming apparatus, for example as maybe located in a casino, may allow a customer of the casino to play one or more games, such as poker, blackjack, slots, keno, and bingo. A customer may approach a gaming apparatus, and select a desired game from the games offered on the gaming apparatus. Upon selection of the desired game, that game may appear on the gaming apparatus, at which time the customer may be allowed to play.

During play, the customer may place a wager, and proceed with the selected game. For example, where the customer is playing slots, a lever may be pulled to spin the reels. The reels may then stop on various symbols, which may determine the customer's payout for that spin, after which the customer may place another wager and proceed as discussed above. Where the customer has selected to play blackjack or poker, the player may hit a "deal card" button to deal out the cards for the respective card game. The customer may alter his wager during the particular hand based on which cards are dealt, and in some card games, replace cards, or continue to request cards. After all replacements and/or requests are made, a payout may be determined, and the player may continue by placing another wager and playing a new hand.

An apparatus may comprise a gaming apparatus with a housing and a display unit that is associated with the housing and is capable of generating video images. The gaming apparatus may also include a value input device that is capable of allowing the player to deposit a medium of value. Additionally, the gaming apparatus may comprise a card reader having a light generating source that is associated with the card reader and a data reading apparatus that is also associated with the card reader. The gaming apparatus may also comprise a controller, wherein the controller is operatively coupled to the display unit, the value input device, and the card reader. The controller may have a processor and a memory operatively coupled to the processor. Additionally, the controller may be programmed to allow a person to make a wager and to cause a video image to be generated on the display unit after the value input device detects deposit of value by the person.

The video image may represent a game selected from the group of games consisting of video poker, video blackjack, video slots, video keno and video bingo, in which case the video image may comprise an image of at least five playing cards if the game comprises video poker. Likewise, the video image may comprise an image of a plurality of playing cards if the game comprises video blackjack. If the game selected by the player is video slots, the video image may comprise an image of a plurality of simulated slot machine reels. The video image may comprise an image of a plurality of keno numbers if the game comprises video keno, or the video image may comprise an image of a bingo grid if the game comprises video bingo. The controller may also be programmed to determine an outcome of the game represented by the video image and a value payout associated with the outcome of the game.

Figure 44:
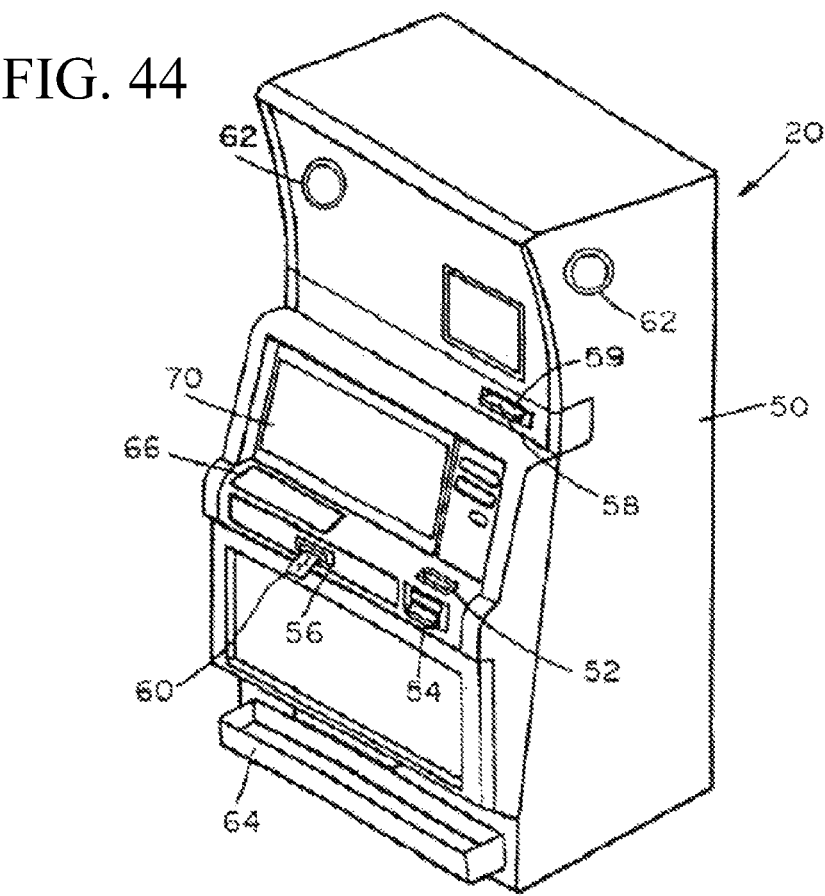
FIG. 44 is a perspective view of various possible embodiments a gaming unit.
Figure 44A:
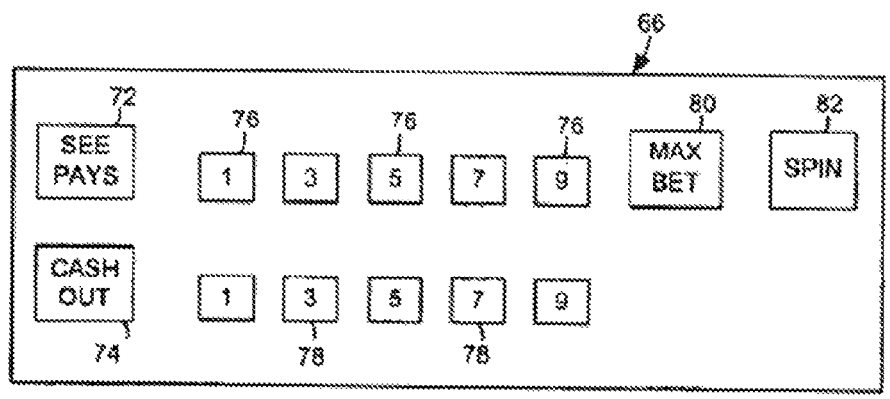
FIG. 44A illustrates an embodiment of a control panel for a gaming unit.

FIG. 44 is a perspective view of various possible embodiments of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of gaming unit and may have various different structures and methods of operation. For exemplary purposes, various designs of the gaming units 20 are described below, but it should be understood that numerous other designs may be utilized.

Referring to FIG. 44, the gaming unit 20 may include a housing or cabinet 50 and one or more input devices, which may include a coin slot or acceptor 52, a paper currency acceptor 54, a ticket reader/printer 56 and a card reader 58, which may be used for several purposes, as will be described in detail below. A value input device may include any device that can accept value from a customer. As used herein, the term "value" may encompass gaming tokens, coins, paper currency, ticket vouchers, credit or debit cards, and any other object representative of value.

Ticket Readers

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items or gaming data printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card 59. If provided for player tracking purposes, the card reader 58 may be used to read gaming data from, and/or write gaming data to, player tracking cards that are capable of storing data representing the identity of a player, the identity of a casino, the players gaming habits, etc. The card reader 58 may also include additional components that are described in conjunction with FIG. 43.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealers voice, music, announcements or any other audio related to a casino game. The input control panel 66 may be provided with a plurality of pushbuttons or touch-sensitive areas that may be pressed by a player to select games, make wagers, make gaming decisions, etc.

Reel Slot Machine

A reel spinning slot machine may comprise a plurality of mechanical rotatable reels controlled by a processor. In response to a wager, the processor randomly selects an outcome from a plurality of possible outcomes and then causes the reels to be rotated and stopped to display the selected outcome. The selected outcome is represented by certain symbols on the reels being in visual association with a display area. If the selected outcome corresponds to a winning outcome identified on a pay table, the processor instructs a payoff mechanism to award a payoff for that winning outcome to the player in the form of coins or credits.

In one embodiment, a slot machine comprises a CPU and a reel mechanism. The CPU operates the slot machine in response to a wager. The reel mechanism includes a motor, a symbol-bearing reel, and a reel driver. The motor includes a rotatable shaft, and the reel is mounted to the shaft. The reel driver includes a local microcontroller distinct from and coupled to the CPU. The reel driver is coupled to the motor to cause the motor to rotate the reel.

The CPU issues high-level commands to the reel driver related to rotation of the reel. The high-level commands may, for example, include a start spin command for starting rotation of the reel and a stop command for stopping the reel at a specified position. However, to free up the CPU for other tasks, the local microcontroller performs low-level reel driver operations related to the rotation of the reel. The low-level reel driver operations may, for example, include sampling a state of the reel in real time, performing calculations, and responding with control changes.

Fixed Pool Games

A fixed pool game may include a game in which a specified amount of money or prizes (the prizes having calculable monetary equivalents) are distributed into a set of individually purchasable and winnable units, where each individual unit has a known cost, and where the set further includes purchasable units having no prize. Thus, the total amount of prizes, the prize distribution (i.e., the number of prizes at each level), and the total return if all individually purchasable units are sold are known at the game's outset.

The individually purchasable units may be generated and distributed as tickets. Two forms of tickets may include pull tab tickets, which may be called pulltabs, and scratch-off tickets, which may be called scratchers. Pull tab tickets may be constructed from paper of various thickness, having two layers. The first layer may have some type of indication of the purchasers' winnings, if any, and the second layer may cover the first. The second layer may be glued to the first layer around three edges, covering the results. The fourth edge may have a small tab, allowing the purchaser to grab hold of it. The tab, upon being pulled, pulls the layers apart and reveals the purchasers' winnings, if any. Scratchers may use an opaque material that covers portions of the ticket, where the covered portions have the predetermined results on them. The purchaser scrapes off the opaque material, revealing any winnings.

The distribution of the total winnings, coupled with the cost of each individually purchasable unit, is determined by those making up the game. The exact mechanics and mathematics of each game pool depends on the goals of the issuer, including the target play audience (how much to charge per purchasable unit or ticket or play), the desired return on investment, and size of the pool, as well as other considerations. The tickets (individually purchasable units) for the entire game are then printed and distributed, and may be organized into decks with different decks sold to different locations. Players, by purchasing a ticket, are buying one individually purchasable unit from the overall ticket or game event pool.

This may be referred to as a fixed-pool lottery, meaning there is a fixed pool of tickets (or results) having a predetermined number of winners and losers, and a purchaser takes a chance on getting a winning result by entering the "lottery", meaning taking the chance they will buy a winning ticket from the pool.

Fixed-pool lottery based games may be displayed in many ways. For example, such games may be displayed as a poker hand, in order to mimic actual poker play.

The player may bet a certain amount to play the game. This corresponds to an individually purchasable unit (note that different betting amounts may participate in different fixed-pool lotteries) for the lottery being used. The game may then get the result of a random drawing from a central server or location having several operating pools. The result may be sent back to the game machine. The game machine may then represent the results as a game.

Video Wagering Games

Video wagering games may be set up to mimic a table game using adaptations of table games rules and cards.

Reference numerals below, until otherwise specified, refer only to FIGS. 45-47.

Gaming Devices

Figure 45:
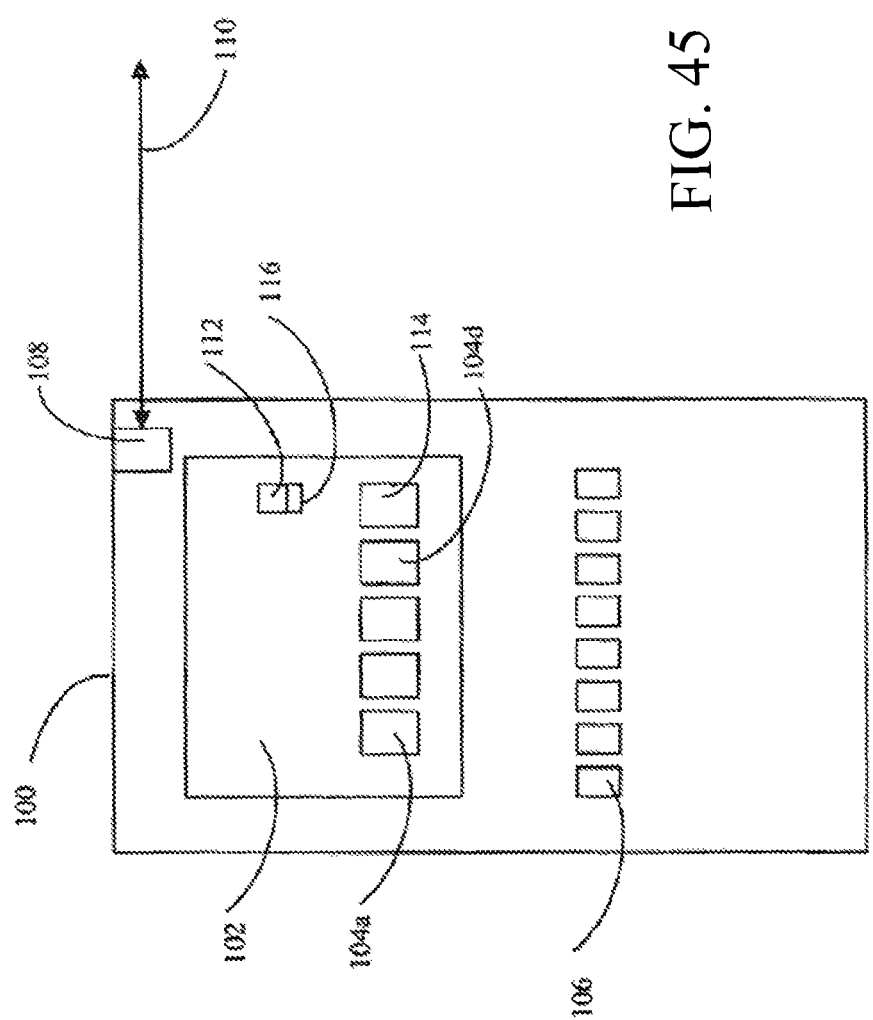
FIG. 45 shows a game device according to some embodiments.

FIG. 45 shows a game device according to some embodiments. The game device has a cabinet 100 enclosing a video display 102 and a set of standard game play buttons shown generally as buttons 106. The game device also comprises the internal hardware and software needed for gaming devices, including at least one processor, dynamic memory, non-volatile memory, system support circuitry such that the operating system of choice will run properly, and I/O connections including interfaces to the various player interfaces such as play buttons 106 and video 102 output, and an interface to an external network connection shown as SMIB (slot machine interface board) 108. Also included is the software needed to implement the specific game. The internals are not illustrated. SMIB 108 interfaces with a network connection 110, e.g., to an RGC (remote game controller, not shown). Alternatively, 108 may be an ethernet connection to an ethernet-based backbone network 110.

Apparatus for Playing Over a Communications System

Figure 46:
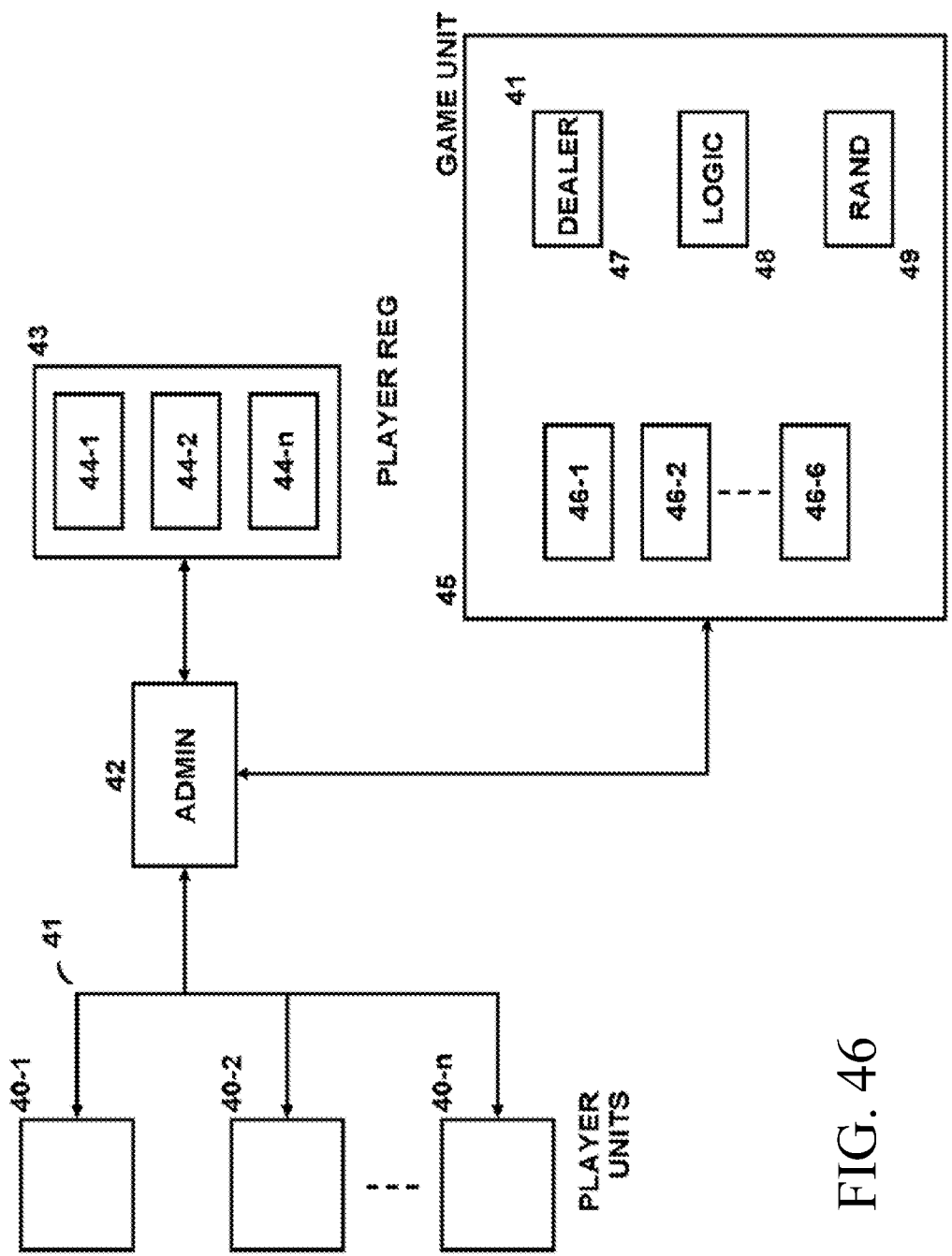
FIG. 46 shows an apparatus for playing a game, according to some embodiments.

FIG. 46 shows an apparatus for playing a game, according to some embodiments. There is a plurality of player units 40-1 to 40-*n* which are coupled via a communication system 41, such as the Internet, with a game playing system comprising an administration unit 42, a player register 43, and a game unit 45. Each unit 40 is typically a personal computer with a display unit and control means (a keyboard and a mouse).

When a player logs on to the game playing system, their unit 40 identifies itself to the administration unit. The system holds the details of the players in the register 43, which contains separate player register units 44-1 to 44-*n* for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e. the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

Server Based Gaming

In various embodiments, gaming devices such as electronically controlled slot, video and similar machines may include a central controller including a processor and a memory. The central controller controls the gaming machine, including the presentation of one or more games to a player at the gaming machine.

The processor of the gaming controller may execute code to control the operation of the gaming machine. This code is stored at the memory of the gaming controller. The control code, including specific game code, may be loaded into the memory when the gaming machine is manufactured.

In various embodiments, it may be desirable to change the control and/or game code associated with the gaming machine controller. For example, the operator may wish to change the "paytable" so that the gaming machine returns a higher percentage of bets wagered. The operator may also wish to update an older game with a newer, more desirable one.

Various embodiments include a gaming machine code download system and a method of managing or controlling the download of code to a gaming machine.

Various embodiments comprise a method of downloading code, information or data to a gaming machine from a remote device. In some embodiments, the method includes the step of storing gaming machine code at the remote device. A request for gaming machine code is generated, and the request is provided to the remote device. In accordance with some embodiments of the method, the gaming machine code is transmitted from the remote device to a first device of the gaming machine over a communication link in response to the request. The game code is processed, and all or a portion of the processed gaming code is provided to a gaming machine controller or other second device of the gaming machine for use.

In various embodiments, the method is implemented in an environment including a gaming machine, a communication network and at least one remote device. The gaming machine includes at least one gaming controller adapted to control the gaming machine, including for the purpose of presenting a game at the gaming machine. The gaming machine controller preferably includes a processor and a memory.

The gaming machine also includes a secondary device. The secondary device may comprise a player tracking controller. The player tracking controller includes a processor and a memory. One or more devices may be associated with the player tracking controller, such as a player tracking card reader and keypad.

In various embodiments, the player tracking controller includes a communication interface. The communication interface is associated with at least one network. In one embodiment, the network is a player tracking network including a player tracking host. The player tracking host includes a memory for storing player information, including information regarding a player's play at one or more gaming machines.

In various embodiments, a game code host is associated with the player tracking network. Game code is transferred from the game code host to the gaming machine via the player tracking network. Transmitted game code is preferably directed to the player tracking controller of a gaming machine, which processes the code and transmits it to the gaming machine controller.

A variety of systems or configurations of apparatus are contemplated for various embodiments. In some embodiments of a method, a request for gaming code is generated at the gaming machine and is transmitted to the game code host. The request may be generated by the gaming machine controller or player tracking controller/device. For example, in some embodiments, a request may be generated by the player tracking controller in response to the identification of a player by use of a player tracking card at a card reader of the player tracking device of the gaming machine.

Gaming code is transmitted from the game code host to the player tracking controller via the network or other communication link. In some embodiments, this link is part of a player tracking network which associates the player tracking device of the gaming machine with a player tracking host. In another embodiment, the link is a separate link from a link connecting the player tracking device of the gaming machine with the player tracking host, such as a wireless communication link to the game code host. The player tracking controller may process the gaming code in a variety of manners, including by storing all or a portion of the gaming code.

In various embodiments, a request for code is accompanied by information regarding the priority of the request. The method may include the step of queuing the code and transmitting it to the gaming machine at one or more particular times.

The gaming code may comprise a variety of information in a variety of forms. For example, the gaming code may comprise information used by the gaming machine controller for controlling or operating one or more peripheral devices of the gaming machine, such as a bill validator. The gaming code may also comprise a set of code permitting the gaming machine controller to present a particular game or games to a player.

INCORPORATION BY REFERENCE

The following are incorporated by reference herein:
U.S. Pat. Nos. 7,160,187; 7,033,271; 7,077,746; RE38812; 4,283,709; 6,921,337; 5,429,361; 5,470,079; 6,890,260; 7,112,136; 5,848,932; 6,059,289; 6,190,255; 6,869,361; 4,448,419; 6,729,956; 7,137,885; 7,128,645; 7,137,630; 5,823,874; 5,848,932; 5,393,057; 5,560,603; 5,769,716; 6,048,269; 5,902,983; 5,851,148; 5,911,418; 5,848,932; 6,190,255; 6,089,976; 5,779,544; 5,664,998; 5,560,603; 6,168,523; 4,837,728; 6,729,956 and U.S. patent application publications 20070026938; 20060183529.
Cards Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

Rules of Card Games
Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play. The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:
Draw Poker

Players each receive five—as in five-card draw—or more cards, all of which are hidden. They can then replace one or more of these cards a certain number of times.
Stud Poker Players receive cards one at a time, some being displayed to other players at the table. The key difference between stud and 'draw' poker is that players are not allowed to discard or replace any cards.
Community Card Poker Players combine individually dealt cards with a number of "community cards" dealt face up and shared by all players. Two or four individual cards may be dealt in the most popular variations, Texas hold'em and Omaha hold'em, respectively.
Poker Hand Rankings
Straight Flush A straight flush is a poker hand such as Q♣ J♣ 10♣ 9♣ 8♣, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

Examples

7♥ 6♥ 5♥ 4♥ 3♥ beats 5♠ 4♠ 3♠ 2♠ A♠
J♣ 10♣ 9♣ 8♣ 7♣ ties J♦ 10♦ 9♦ 8♦ 7♦
Four of a Kind Four of a kind, or quads, is a poker hand such as 9♣ 9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples

10♣ 10♦ 10♥ 10♠ 5♦ ("four tens" or "quad tens") defeats 6♦ 6♥ 6♠ 6♣ K♠ ("four sixes" or "quad sixes")
10♣ 10♦ 10♥ 10♠ Q♦ ("four tens, queen kicker") defeats 10♣ 10♦ 10♥ 10♠ 5♦ ("four tens with a five")
Full House A full house, also known as a boat or a full boat, is a poker hand such as 3♣ 3♠ 3♦ 6♠ 6▪, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥ 5♥ 3♥, ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

Examples

8♠ 7♠ 6♥ 5♥ 4♠ ("eight-high straight") defeats 6♦ 5♠ 4♦ 3♥ 2♣ ("six-high straight")

8♠ 7♠ 6♥ 5♥ 4♠ ties 8♥ 7♦ 6♠ 5♣ 4♥

A hand such as A♣ K♣ Q♦ J♠ 10♠ is an ace-high straight, and ranks above a king-high straight such as K♥ Q♠ J♥ 10♥ 9♦. But the ace may also be played as a 1-spot in a hand such as 5♠ 4♦ 3♦ 2♠ A♣, called a wheel or five-high straight, which ranks below the six-high straight 6♠ 5♠ 4♣ 3♥ 2♥. The ace may not "wrap around", or play both high and low in the same hand: 3♣ 2♦ A♠ K♠ Q♣ is not a straight, but just ace-high no pair.

Three of a Kind

Three of a kind, also called trips, set or a prile, is a poker hand such as 2♦ 2♠ 2♥K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples

8♣ 8♥ 8♦ 5♠ 3♣ ("three eights") defeats 5♣ 5♥ 5♦ Q♦ 10♣ ("three fives")

8♣ 8♥ 8♦ A♣ 2♦ ("three eights, ace kicker") defeats 8♣ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

Examples

K♥ K♦ 2♣ 2♦ J♥ ("kings up") defeats J♦ J♠ 10♠ 10♣ 9♠ ("jacks up")

9♣ 9♦ 7♦ 7♠ 6♥ ("nines and sevens") defeats 9♥ 9♣ 5♥ 5♦ K♣ ("nines and fives")

4♠ 4♣ 3♠ 3♥ K♦ ("fours and threes, king kicker") defeats 4♥ 4♦ 3 3 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples

10♣ 10♠ 6♠ 4♥ 2♥ ("pair of tens") defeats 9♥ 9♣ A♥ Q♦ 10♦ ("pair of nines")

10♥ 10♦ J♦3♦ 2♣ ("tens with jack kicker") defeats 10♣ 10♠ 6♠ 4♥ 2♥ ("tens with six kicker")

2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples

A♦ 10♦ 9♠ 5♣ 4♣ ("ace high") defeats K♣ Q♦ J♣ 8♥ 7♥ ("king high")

A♣ Q♣ 7♦ 5♥ 2♣ ("ace-queen") defeats A♦ 10♦ 9♠ 5♣ 4♣ ("ace-ten")

7♠ 6♣ 5♣ 4♦ 2♥ ("seven-six-five-four") defeats 7♣ 6♦ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealers turn, the player wins his original $10 bet, making a net profit of $5. In the same situation, if the dealer's hole card is not one with a value of ten, again the player will immediately lose their $5 Insurance bet, and if the dealers hand has a total value greater than the players at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the players point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural" (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

Tracking the Action at a Table

U.S. Pat. No. 6,579,181 generally describes, "a system for automatically monitoring playing and wagering of a game. In one illustrated embodiment, the system includes a card deck reader that automatically reads a respective symbol from each card in a deck of cards before a first one of the cards is removed from the deck. The symbol identifies a value of the card in terms of rank and suit, and can take the form of a machine-readable symbol, such as a bar code, area or matrix code or stacked code. In another aspect, the system does not decode the read symbol until the respective card is dealt, to ensure security.

"In another aspect, the system can include a chip tray reader that automatically images the contents of a chip tray. The system periodically determines the number and value of chips in the chip tray from the image, and compares the change in contents of the chip tray to the outcome of game play to verify that the proper amounts have been paid out and collected.

"In a further aspect, the system can include a table monitor that automatically images the activity or events occurring at a gaming table. The system periodically compares images of the gaming table to identify wagering, as well as the appearance, removal and position of cards and/or other objects on the gaming table. The table monitoring system can be unobtrusively located in the chip tray."

U.S. Pat. No. 6,579,181 generally describes "a drop box that automatically verifies an amount and authenticity of a deposit and reconciles the deposit with a change in the contents of the chip tray. The drop box can image different portions of the deposited item, selecting appropriate lighting and resolutions to examine security features in the deposited item.

"In another aspect, the system can employ some, or all of the components to monitor the gaming habits of players and the performance of employees. The system can detect suspect playing and wagering patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players."

Various embodiments include an apparatus, method and system which utilizes a card dispensing shoe with scanner and its associated software which enable the card dealer when dealing the game from a card dispensing shoe with scanner preferably placed on a game table where the twenty-one game to be evaluated by the software is being played, to use one or more keyboard(s) and/or LCD displays coupled to the shoe to identify for the computer program the number of the active players' seats, or active players, including the dealer's position relative thereto and their active play at the game table during each game round dealt from the shoe. These keyboards and LCD displays are also used to enter other data relevant to each sears, or player's, betting and/or decision strategies for each hand played. The data is analyzed by a computer software program designed to evaluate the strategy decisions and betting skills of casino twenty-one, or blackjack players playing the game of blackjack during real time. The evaluation software is coupled to a central processing unit (CPU) or host computer that is also coupled to the shoe's keyboard(s) and LCD displays. The dealer using one or more keyboard(s) attached to or carried by the shoe, or a keyboard(s) located near the dealer is able to see and record the exact amount bet by each player for each hand played for the game to be evaluated. The optical scanner coupled to the CPU reads the value of each card dealt to each players hand(s) and the dealers hand as each card is dealt to a specific hand, seat or position and converts the game card value of each card dealt from the shoe to the players and the dealer of the game to a card count system value for one or more card count systems programmed into the evaluation software. The CPU also records each players decision(s) to hit a hand, and the dealer's decision to hit or take another card when required by the rules of the game, as the hit card is removed from the shoe. The dealer uses one or more of the keyboards and LCD displays carried by the shoe to record each players decision(s) to Insure, Surrender, Stand, Double Down, or Split a hand. When the dealer has an Ace or a Ten as an up-card, he/she may use one or more of the keyboards to prompt the computer system's software, since the dealers second card, or hole-card, which is dealt face down, has been scanned and the game card value thereof has been imported into the computer systems software, to instantly inform the dealer, by means of one or more of the shoe's LCDs, if his/her game cards, or hand total, constitutes a two-card "21" or "Blackjack".

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe, for evaluating information relative to each players received playing cards and their values with information as to playing tactics used by each player relative to the values of the received playing cards, and for combining all of this information for identifying each player's playing strategy, and a playing table coupled to the card delivery shoe apparatus and having at least one keypad means located thereon for permitting at least one player to select various card playing options to wager upon.

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying such of the playing cards received by each player from the shoe apparatus, for evaluating information relative to each player's received playing cards and their values with information as to betting tactics used by each player relative to playing cards previously dealt out from the shoe apparatus providing card count information, and for combining all of this information for identifying each players card count strategy, and a playing table coupled to the card delivery shoe apparatus and having at least one keypad means located thereon for permitting the at least one player to select at least one of various card playing options to wager upon.

In various embodiments, a card playing system for playing a card game which includes a card delivery shoe apparatus for use in dealing playing cards to at least one player for the playing of a card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe apparatus, for evaluating information relative to each players received playing cards and their values with information as to playing tactics used by each player relative to the values of the received playing cards, for combining use of all of this information for identifying each players playing strategy, and for also identifying each players card count strategy based on each players betting tactics used by each player relative to playing cards previously dealt out from the shoe apparatus providing card count information, and a playing table coupled to the card delivery shoe apparatus and having at least one keypad means located thereon for permitting the at least one player to select at least one of various card playing options to wager upon.

In various embodiments, a secure game table system, adapted for multiple sites under a central control, allows for the monitoring of hands in a progressive live card game. A live card game has at least one deck, with each deck having a predetermined number of cards. Each game table in the system has a plurality of player positions with or without players at each position and a dealer at a dealer position.

In one embodiment, for providing additional security, a common identity code is located on each of the cards in each deck. Each deck has a different common identity code. A shuffler is used to shuffle the decks together and the shuffler has a circuit for counting of the cards from a previous hand that are inserted into the shuffler for reshuffling. The shuffler circuit counts each card inserted and reads the common identity code located on each card. The shuffler circuit issues a signal corresponding to the count and the common identity code read. The game control (e.g., the computer) located at each table receives this signal from the shuffler circuit and verifies that no cards have been withdrawn from the hand by a player (or the dealer) or that no new cards have been substituted. If the count is not proper or if a game card lacks an identity code or an identity code is mismatched, an alarm signal is generated indicating that a new deck of cards needs to be used and that the possibility of a breach in the security of the game has occurred.

In yet another embodiment of security, a unique code, such as a bar code, is placed on each card and as each card is dealt by the dealer from a shoe, a detector reads the code and issues a signal to the game control containing at least the value and the suit of each card dealt in the hand. The detector may also read a common identity deck code and issue that as a signal to the game control. The shoe may have an optical scanner for generating an image of each card as it is dealt from the shoe by the dealer in a hand. The game control stores this information in a memory so that a history of each card dealt from the shoe in a hand is recorded.

In yet another embodiment of security, an integrated shuffler/shoe obtains an optical image of each card dealt from the shoe for a hand and for each card inserted into the shuffler after a hand. These images are delivered to the game control where the images are counted and compared. When an irregular count or comparison occurs, an alarm is raised. The shuffler and shoe are integrated to provide security between the two units.

In another embodiment of security for a live card game, a game bet sensor is located near each of the plurality of player positions for sensing the presence of a game bet. The game bet sensor issues a signal counting the tokens placed. It is entirely possible that game bet sensors at some player positions do not have bets, and therefore, the game control that is receptive of these signals identifies which player positions have players placing game bets. This information is stored in memory and becomes part of the history of the game.

In another embodiment of security, a progressive bet sensor is located at each of the plurality of player positions and senses the presence of a progressive bet. The progressive bet sensor issues a signal that is received by the game control, which records in memory the progressive bets being placed at the respective player position sensed. If a progressive bet is sensed and a game bet is not, the game control issues an alarm signal indicating improper betting. At this point, the game control knows the identity of each player location having placed a game bet and, of those player positions having game bets placed, which player positions also have a progressive bet. This is stored in memory as part of the history of the hand.

In yet another embodiment of security, a card sensor is located near each player position and the dealer position. The card sensor issues a signal for each card received at the card sensor. The game control receives this issued signal and correlates those player positions having placed a game bet with the received cards. In the event a player position without a game bet receives a card or a player position with a game bet receives a card out of sequence, the game control issues an alarm. This information is added to the history of the game in memory, and the history contains the value and suit of each card delivered to each player position having a game bet.

A progressive jackpot display is located at each game table and may display one or more jackpot awards for one or more winning combinations of cards. In various embodiments, the game control at each table has stored in memory the winning combinations necessary to win the progressive jackpots. Since the game control accurately stores the suit and value of each card received at a particular player position, the game control can automatically detect a winning combination and issue an award signal for that player position. The dealer can then verify that that player at that position indeed has the correct combination of cards. The game control continuously updates the central control interconnected to all other game tables so that the central control can then inform all game tables of this win including, if desirable, the name of the winner and the amount won.

The central control communicates continuously with each game control and its associated progressive jackpot display may receive over a communication link all or part of the information stored in each game control.

Various embodiments include a card shoe with a device for automatic recognition and tracking of the value of each gaming card drawn out of the card shoe in a covered way (face down).

Various embodiments include a gaming table with a device for automatic recognition of played or not played boxes (hands), whereby it has to realize multiple bets on each hand and the use of insurance lines. Further more, the gaming table may include a device to recognize automatically the number of cards placed in front of each player and the dealer.

Various embodiments include the recognition, tracking, and storage of gaming chips.

In various embodiment, an electronic data processing (EDP) program may process the value of all bets on each box and associated insurance line, control the sequence of delivery of the cards, control the distribution of the gaming cards to each player and the dealer, may calculate and compare the total score of each hand and the dealers, and may evaluate the players' wins.

Gaming data may then be processed by means of the EDP program and shown simultaneously to the actual game at a special monitor or display. Same data may be recalled later on to monitor the total results whenever requested.

Various embodiments include:

a gaming table and a gaming table cloth arranged on the gaming table, the gaming table cloth provided with betting boxes and areas designated for placement of the gaming chips and other areas designated for placement of the playing cards;

a card shoe for storage of one or more decks of playing cards, this card shoe including means for drawing individual ones of the playing cards face down so that a card value imprint on the drawn card is not visible to a player of the game of chance;

card recognition means for recognizing this card value imprint on the drawn card from the card shoe, this card recognition means being located in the card shoe;

an occupation detector unit including means for registering a count of gaming chips placed on the designated areas and another count of playing cards placed on the other designated areas on the table cloth, this occupation detector unit being located under the table cloth and consisting of multiple single detectors allocated to each betting box, each area for chips and each other area for playing cards respectively;

a gaming bet detector for automatic recognition or manual input of gaming bets; and a computer including means for evaluating the play of the game of chance according to the rules of the game of chance, means for storing results of the play of the game of chance and means for displaying a course of the play of the game of chance and the results from electronic signals input from the gaming bet detector, the occupation detector unit and the card recognition means.

According to various embodiments, the card recognition means comprises an optical window arranged along a movement path of the card image imprint on the playing card drawn from the card shoe; a pulsed light source for illuminating a portion of the drawn playing card located opposite the optical window; a CCD image converter for the portion of the drawn playing card located opposite the optical window; an optical device for deflecting and transmitting a reflected image of the card value imprint from the drawn playing card to the CCD image converter from that portion of the drawn playing card when the drawn card is exactly in a correct drawn position opposite the optical window; and sensor means for detecting movement of the drawn card and for providing a correct timing for operation of the pulsed light source for transmission of the reflected image to the CCD image converter. The optical device for deflecting and transmitting the reflected image can comprise a mirror arranged to deflect the reflected image to the CCD image converter. Alternatively, the optical device for deflecting and transmitting the reflected image comprises a reflecting optical prism having two plane surfaces arranged at right angles to each other, one of which covers the optical window and another of which faces the CCD image converter and comprises a mirror, and the pulsed light source is arranged behind the latter plane surface so as to illuminate the drawn card when the drawn card is positioned over the optical window. Advantageously the sensor means for detecting movement of the drawn card and for providing a correct timing comprises a single sensor, preferably either a pressure sensor or a photoelectric threshold device, for sensing a front edge of the drawn card to determine whether or not the drawn card is being drawn and to activate the CCD image converter and the pulsed light source when a back edge of the drawn card passes the sensor means. Alternatively, the sensor means can include two electro-optical sensors, one of which is located beyond a movement path of the card image imprint on the drawn playing card and another of which is located in a movement path of the card image imprint on a drawn playing card. The latter electro-optical sensor can includes means for activating the pulsed light source by sensing a color trigger when the card value imprint passes over the optical window. In preferred embodiments of the card shoe the pulsed light source comprises a Xenon lamp.

In various embodiments of the gaming apparatus the single detectors of the occupation detector unit each comprise a light sensitive sensor for detection of chips or playing cards arranged on the table cloth over the respective single detector. Each single detector can be an infrared sensitive photodiode, preferably a silicon photodiode. Advantageously the single detectors can be arranged in the occupation detector unit so that the chips or playing cards placed over them on the table cloth are arrange over at least two single detectors.

The gaming apparatus may includes automatic means for discriminating colored markings or regions on the chips and for producing a bet output signal in accordance with the colored markings or regions and the number of chips having identical colored markings or regions.

The gaming bet detector may include automatic means for discriminating between chips of different value in the game of chance and means for producing a bet output signal in accordance with the different values of the chips when the chips are bet by a player. In various embodiments the gaming bet detector includes a radio frequency transmitting and receiving station and the chips are each provided with a transponder responding to the transmitting and receiving station so that the transponder transmits the values of the bet chips back to the transmitting and receiving station.

The connection between the individual units of the gaming apparatus and the computer can be either a wireless connection or a cable connection.

Following the Bets

Various embodiments include a smart card delivery shoe that reads the suit and rank of each card before it is delivered to the various positions where cards are to be dealt in the play of the casino table card game. The cards are then dealt according to the rules of the game to the required card positions. Different games have diverse card distribution positions, different card numbers, and different delivery sequences that the hand identifying system may encompass, in various embodiments. For example, in the most complex of card distribution games of blackjack, cards are usually dealt one at a time in sequence around a table, one card at a time to each player position and then to the dealer position. The one card at a time delivery sequence is again repeated so that each player position and the dealer position have an initial hand of exactly two cards. Complexity in hand development is introduced because players have essentially unlimited control over additional cards until point value in a hand exceeds a count of twenty-one. Players may stand with a count of 2 (two aces) or take a hit with a count of 21 if they are so inclined, so the knowledge of the count of a hand is no assurance of what a player will do. The dealer, on the other hand, is required to follow strict house rules on the play of the game according to the value of the dealer's hand. Small variances such as allowing or disallowing a hit on a "soft" seventeen count (e.g., an Ace and a 6) may exist, but the rules are otherwise very precise so that the house or dealer cannot exercise any strategy.

Other cards games may provide equal numbers of cards in batches. Variants of stud poker played against a dealer, for example, would usually provide hands of five cards, five at a time to each player position and if competing against a dealer, to the dealer position. This card hand distribution is quite simple to track as each sequence of five cards removed from the dealer shoe is a hand.

Other games may require cards to be dealt to players and other cards dealt to a flop or common card area. The system may also be programmable to cover this alternative if it is so desired.

Baccarat is closer to blackjack in card sequence of dealing, but has more rigid rules as to when hits may be taken by the player and the dealer, and each position may take a maximum of one card as a hit. The hand identification system according to various embodiments may be able to address the needs of identifying hands in each of these types of games and especially must be able to identify hands in the most complex situation, the play of blackjack.

In various embodiments, where cameras are used to read cards, the light sensitive system may be any image capture system, digital or analog, that is capable of identifying the suit and rank of a card.

In various embodiments, a first step in the operation is to provide a set of cards to the smart delivery shoe, the cards being those cards that are going to be used in the play of a casino table card game. The set of cards (usually one or more decks) is provided in an already randomized set, being taken out of a shuffler or having been shuffled by hand. A smart delivery shoe is described in U.S. patent application Ser. No. 10/622,321, titled SMART DELIVERY SHOE, which application is incorporated herein in its entirety by reference. Some delivery systems or shoes with reading capability include, but are not limited to those disclosed in U.S. Pat. Nos. 4,750,743; 5,779,546; 5,605,334; 6,361,044; 6,217,447; 5,941,769; 6,229,536; 6,460,848; 5,722,893; 6,039,650; and 6,126,166. In various embodiments, the cards are read in the smart card delivery shoe, such as one card at a time in sequence. Reading cards by edge markings and special codes (as in U.S. Pat. No. 6,460,848) may require special encoding and marking of the cards. The entire sequence of cards in the set of cards may thus be determined and stored in memory. Memory may be at least in part in the smart delivery shoe, but communication with a central processor is possible. The sequence would then also or solely be stored in the central computer.

In various embodiments, the cards are then dealt out of the smart delivery shoe, the delivery shoe registering how many cards are removed one-at-a-time. This may be accomplished by the above identified U.S. patent application Ser. No. 10/622,321 where cards are fed to the dealer removal area one at a time, so only one card can be removed by the dealer. As each card is removed, a signal is created indicating that a specific card (of rank and suit) has been dealt. The computer and system knows only that a first card has been dealt, and it is presumed to go to the first player. The remaining cards are dealt out to players and dealer. In the play of certain games (e.g., stud variants) where specific numbers of cards are known to be dealt to each position, the shoe may be programmed with the number of players at any time, so hands can be correlated even before they have been dealt. If the shoe is playing a stud variant where each player and the dealer gets three cards (Three Card Poker™ game), the system may know in advance of the deal what each player and the dealer will have as a hand. It is also possible that there be a signal available when the dealer has received either his first card (e.g., when cards are dealt in sequence, one-at-a-time) or has received his entire hand. The signal may be used to automatically determine the number of player positions active on the table at any given time. For example, if in a hand of blackjack the dealer receives the sixth card, the system may immediately know that there are five players at the table. The signal can be given manually (pressing a button at the dealer position or on the smart card delivery shoe) or can be provided automatically (a card presence sensor at the dealer's position, where a card can be placed over the sensor to provide a signal). Where an automatic signal is provided by a sensor, some physical protection of the sensor may be provided, such as a shield that would prevent accidental contact with the sensor or blockage of the sensor. An L-shaped cover may be used so a card could be slid under the arm of the L parallel to the table surface and cover the sensor under that branch of the L. The signal can also be given after all cards for the hand have been delivered, again indicating the number of players, For example, when the dealer's two cards are slid under the L-shaped cover to block or contact the sensor, the system may know the total number of cards dealt on the hand (e.g., 10 cards), know that the dealer has 2 cards, determine that players therefore have 8 cards, and know that each player has 2 cards each, thereby absolutely determining that there are four active player positions at the table (10−2=8 and then 8/2=4 players). This automatic determination may serve as an alternative to having dealers input the number of players each hand at a table or having to manually change the indicated number of players at a table each time the number changes.

Once all active positions have been dealt to, the system may now know what cards are initially present in each player's hand, the dealer's hand, and any flop or common hand. The system operation may now be simple when no more cards are provided to play the casino table game. All hands may then be known and all outcomes may be predicted. The complication of additional cards will be addressed with respect to the game of blackjack.

After dealing the initial set of two cards per hand, the system may not immediately know where each remaining card will be dealt. The system may know what cards are dealt, however. It is with this knowledge and a subsequent identification of discarded hands that the hands and cards from the smart delivery shoe can be reconciled or verified. Each hand is already identified by the presence of two specifically known cards. Hands are then played according to the rules of the game, and hands are discarded when play of a hand is exhausted. A hand is exhausted when 1) there is a blackjack, the hand is paid, and the cards are cleared; 2) a hand breaks with a count over twenty-one and the cards are cleared; and/or a round of the game is played to a conclusion, the dealers hand completed, all wagers are settled, and the cards are cleared. As is typically done in a casino to enable reconciling of hands manually, cards are picked up in a precise order from the table. The cards are usually cleared from the dealer's right to the dealer's left, and the cards at each position comprise the cards in the order that they were delivered, first card on the bottom, second card over the first card, third card over the second card, etc. maintaining the order or a close approximation of the order (e.g., the first two cards may be reversed) is important as the first two cards form an anchor, focus, basis, fence, end point or set edge for each hand. For example, if the third player position was known to have received the 10 of hearts (10H) and the 9 of spades (9S) for the first two card, and the fourth player was known to receive the 8 of diamonds (8D) and the 3 of clubs (3C) for the first two cards, the edges or anchors of the two hands are 9S/10H and 8D/3C. When the hands are swept at the conclusion of the game, the cards are sent to a smart discard rack (e.g., see U.S. patent application Ser. No. 10/622,388, which application is incorporated herein by reference in its entirety) and the hand with the 9S/10H was not already exhausted (e.g., broken or busted) and the swept cards consist of 9S, 10H, 8S, 8D and 3C (as read by the smart discard rack), the software of the processor may automatically know that the final hands in the third and fourth positions were a count of 19 (9S and 10H) for the third hand and 19 (8D and 3C originally plus the 8S hit) for the fourth hand. The analysis by the software specifically identifies the fourth hand as a count of 19 with the specific cards read by the smart discard shoe. The information from reading that now exhausted hand is compared with the original information collected from the smart delivery shoe. The smart delivery shoe information when combined with the smart discard rack information shall confirm the hands in each position, even though cards were not uniformly distributed (e.g., player one takes two hits for a total of four cards, player two takes three hits for a total of five cards, player three takes no hit for a total of two cards, player four takes one hit for a total of three cards, and the dealer takes two hits for a total of four cards).

The dealer's cards may be equally susceptible to analysis in a number of different formats. After the last card has been dealt to the last player, a signal may be easily and imperceptibly generated that the dealer's hand will now become active with possible hits. For example, with the sensor described above for sensing the presence of the first dealer card or the completion of the dealer's hand, the cards would be removed from beneath the L-shaped protective bridge. This type of movement is ordinarily done in blackjack where the dealer has at most a single card exposed and one card buried face down. In this case, the removal of the cards from over the sensor underneath the L-cover to display the hole card is a natural movement and then exposes the sensor. This can provide a signal to the central processor that the dealer's hand will be receiving all additional cards in that round of the game. The system at this point knows the two initial cards in the dealer's hand, knows the values of the next sequence of cards, and knows the rules by which a dealer must play. The system knows what cards the dealer will receive and what the final total of the dealer's hand will be because the dealer has no freedom of decision or movement in the play of the dealer's hand. When the dealer's hand is placed into the smart discard rack, the discard rack already knows the specifics of the dealer's hand even without having to use the first two cards as an anchor or basis for the dealer's hand. The cards may be treated in this manner in some embodiments.

When the hands are swept from the table, dealer's hand then players' hands from right to left (from the dealer's position or vice-versa if that is the manner of house play), the smart discard rack reads the shoes, identifies the anchors for each hand, knows that no hands swept at the conclusion can exceed a count of twenty-one, and the computer identifies the individual hands and reconciles them with the original data from the smart delivery shoe. The system thereby can identify each hand played and provide system assurance that the hand was played fairly and accurately.

If a lack of reconciling by the system occurs, a number of events can occur. A signal can be given directly to the dealer position, to the pit area, or to a security zone and the cards examined to determine the nature and cause of the error and inspect individual cards if necessary. When the hand and card data is being used for various statistical purposes, such as evaluating dealer efficiency, dealer win/loss events, player efficiency, player win/loss events, statistical habits of players, unusual play tactics or meaningful play tactics (e.g., indicative of card counting), and the like, the system may file the particular hand in a 'dump' file so that hand is not used in the statistical analysis, this is to assure that maximum benefits of the analysis are not tilted by erroneous or anomalous data.

Various embodiments may include date stamping of each card dealt (actual time and date defining sequence, with concept of specific identification of sequence identifier possibly being unique). The date stamping may also be replaced by specific sequence stamping or marking, such as a specific hand number, at a specific table, at a specific casino, with a specific number of players, etc. The records could indicate variations of indicators in the stored memory of the central computer of Lucky 777 Casino, Aug. 19, 1995, 8:12:17 a.m., Table 3, position 3, hand 7S/4D/9S, or simply identify something similar by alphanumeric code as L7C-819-95-3-3-073-7S/4D/9S (073 being the 73$^{rd}$ hand dealt). This date stamping of hands or even cards in memory can be used as an analytical search tool for security and to enhance hand identification.

Figure 47:
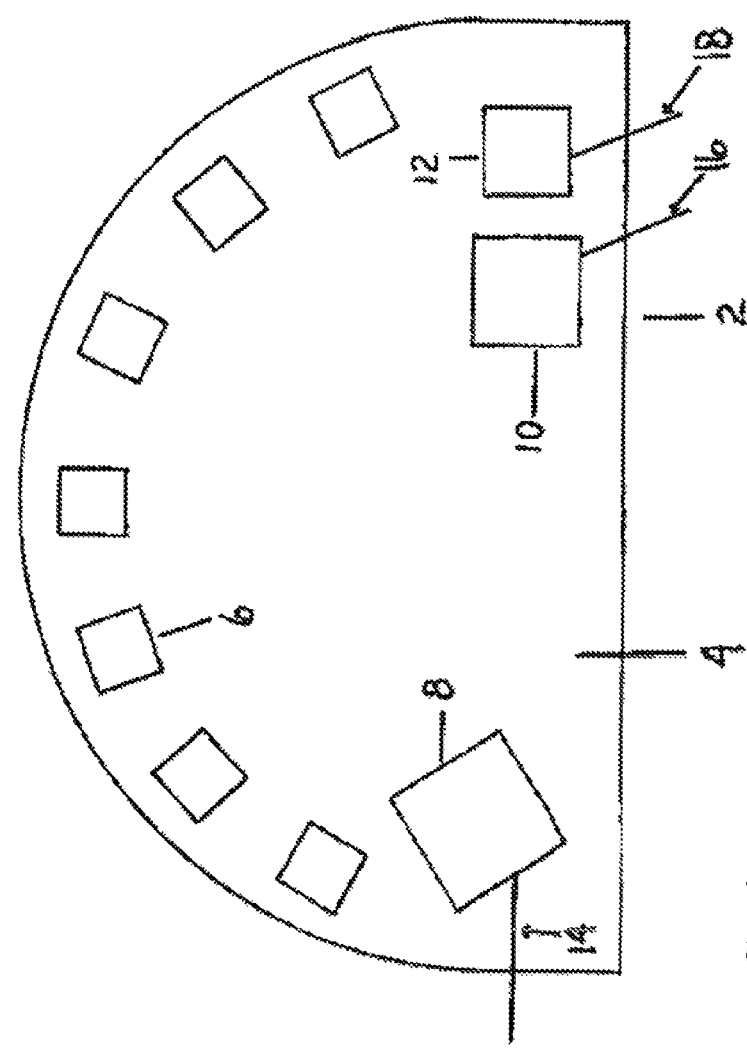
FIG. 47 shows a block diagram of components for a hand-reading system, according to some embodiments.
Figure 48:
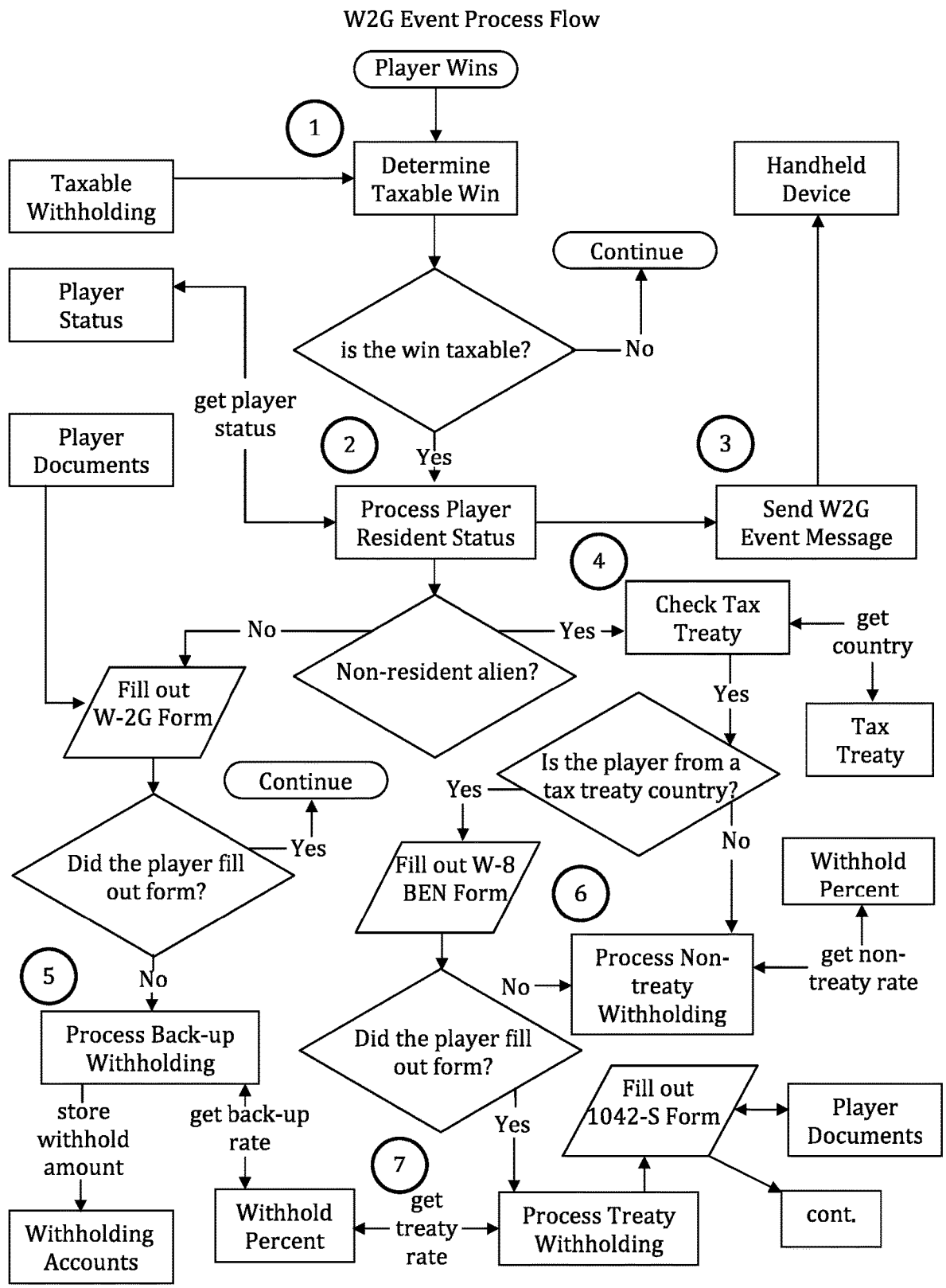
FIG. 48 shows a W-2G event process flow according to some embodiments.
Figure 49:
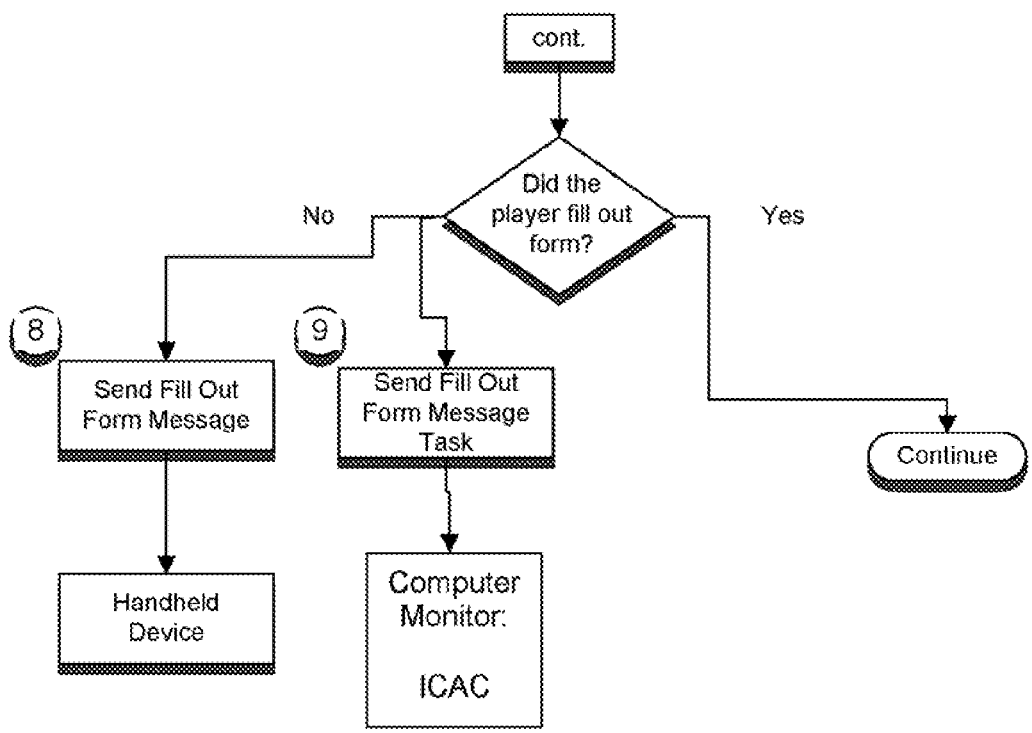
FIG. 49 shows a continued W-2G event process flow according to some embodiments.
Figure 50:
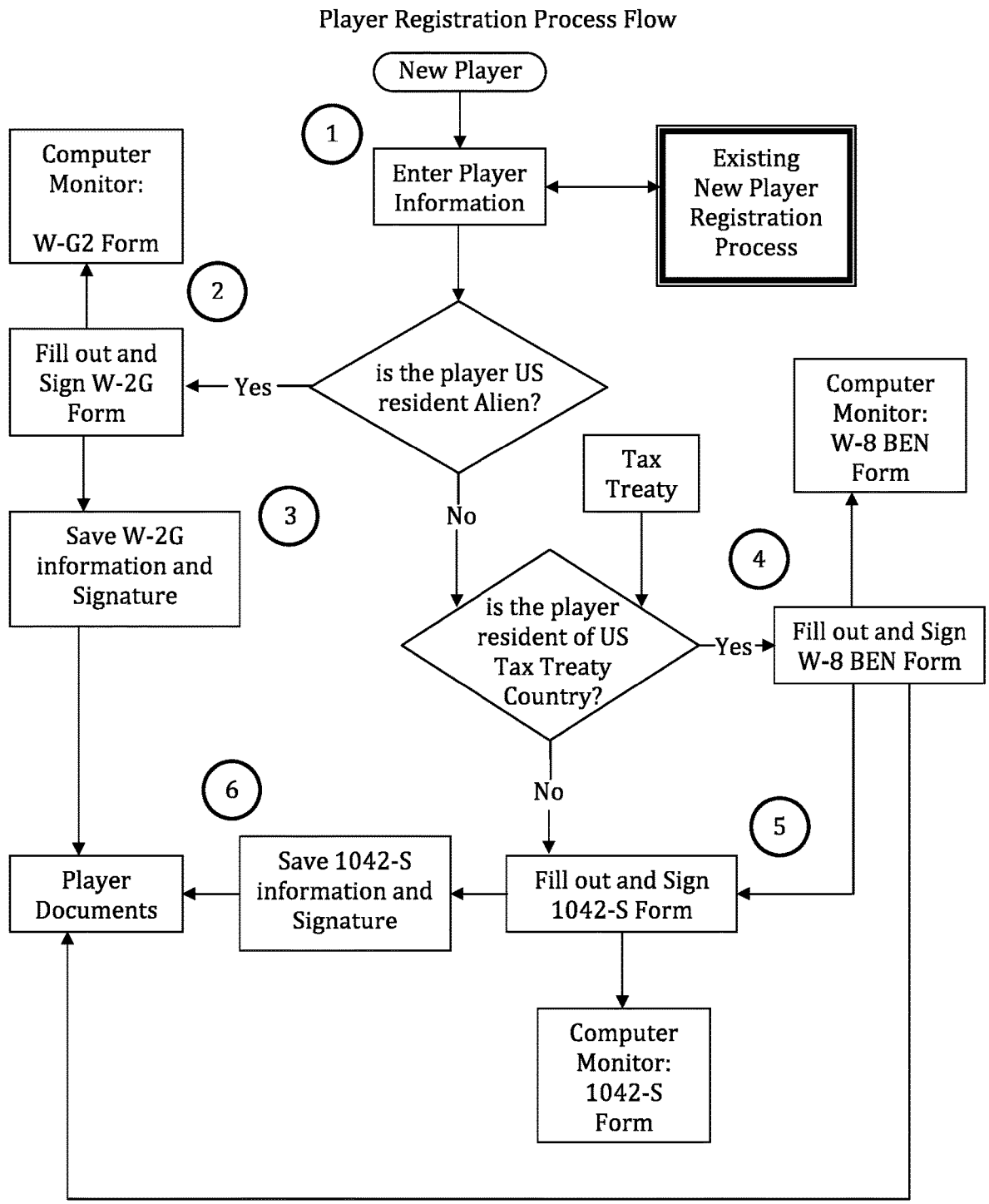
FIG. 50 shows a player registration process flow according to some embodiments.

FIG. 47 shows a block diagram of components for the hand-reading system on a table 4, including a smart card-reading delivery shoe 8 with output 14 and a smart card-reading discard rack 12 with output 18. Player positions 6 are shown, as is a dealer's hand position sensor 10 without output port 16.

The use of the discard rack acting to reconcile hands returned to the discard rack out-of-order (e.g., blackjack or bust) automatically may be advantageous, in some embodiments. The software as described above can be programmed to recognize hands removed out-of-dealing order on the basis of knowledge of the anchor cards (the first two cards) known to have been dealt to a specific hand. For example, the software will identify that when a blackjack was dealt to position three, that hand will be removed, the feed of the third hand into the smart card discard tray confirms this, and position three will essentially be ignored in future hand resolution. More importantly, when the anchor cards were, for example, 9S/5C in the second player position and an exhausted hand of 8D/9S/5C is placed into the smart discard rack, that hand will be identified as the hand from the second player position. If two identical hands happen to be dealt in the same round of play, the software will merely be alerted (it knows all of the hands) to specifically check the final order of cards placed into the smart discard rack to more carefully position the location of that exhausted hand. This is merely recognition software implementation once the concept is understood.

That the step of removal of cards from the dealers sensor or other initiated signal identifies that all further cards are going to the dealer may be useful in defining the edges of play between rounds and in identifying the dealers hand and the end of a round of play. When the dealers cards are deposited and read in the smart discard rack, the central computer knows that another round of play is to occur and a mark or note may be established that the following sequence will be a new round and the analytical cycle may begin all over again.

The discard rack indicates that a complete hand has been delivered by absence of additional cards in the Discard Rack in-feed tray. When cards are swept from an early exhausted hand (blackjack or a break), they are swept one at a time and inserted into the smart discard rack one at a time. When the smart discard rack in-feed tray is empty, the system understands that a complete hand has been identified, and the system can reconcile that specific hand with the information from the smart delivery shoe. The system can be hooked-up to feed strategy analysis software programs such as the SMI licensed proprietary Bloodhound™ analysis program.

Various embodiments include a casino or cardroom game modified to include a progressive jackpot component. During the play of a Twenty-One game, for example, in addition to this normal wager, a player will have the option of making an additional wager that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or cardroom game such as Draw Poker, Stud Poker, Lo-Ball Poker or Caribbean Stud™ Poker. Various embodiments include a gaming table, such as those used for Twenty-One or poker, modified with the addition of a coin acceptor that is electronically connected to a progressive jackpot meter. When player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

Card Shufflers

Various embodiments include an automatic card shuffler, including a card mixer for receiving cards to be shuffled in first and second trays. Sensors detect the presence of cards in these trays to automatically initiate a shuffling operation, in which the cards are conveyed from the trays to a card mixer, which randomly interleaves the cards delivered to the mixing mechanism and deposits the interleaved cards in a vertically aligned card compartment.

A carriage supporting an ejector is reciprocated back and forth in a vertical direction by a reversible linear drive while the cards are being mixed, to constantly move the card ejector along the card receiving compartment. The reversible linear drive is preferably activated upon activation of the mixing means and operates simultaneously with, but independently of, the mixing means. When the shuffling operation is terminated, the linear drive is deactivated thereby randomly positioning the card ejector at a vertical location along the card receiving compartment.

A sensor arranged within the card receiving compartment determines if the stack of cards has reached at least a predetermined vertical height. After the card ejector has stopped and, if the sensor in the compartment determines that the stack of cards has reached at least the aforesaid predetermined height, a mechanism including a motor drive, is activated to move the wedge-shaped card ejector into the card receiving compartment for ejecting a group of the cards in the stack, the group selected being determined by the vertical position attained by the wedge-shaped card ejector.

In various embodiments, the card ejector pushes the group of cards engaged by the ejector outwardly through the forward open end of the compartment, said group of cards being displaced from the remaining cards of the stack, but not being completely or fully ejected from the stack.

The card ejector, upon reaching the end of its ejection stroke, detected by a microswitch, is withdrawn from the card compartment and returned to its initial position in readiness for a subsequent shuffling and card selecting operation.

In various embodiments, a technique for randomly selecting the group of cards to be ejected from the card compartment utilizes solid state electronic circuit means, which may comprise either a group of discrete solid state circuits or a microprocessor, either of which techniques preferably employ a high frequency generator for stepping a N-stage counter during the shuffling operation. When the shuffling operation is completed, the stepping of the counter is terminated. The output of the counter is converted to a DC signal, which is compared against another DC signal representative of the vertical location of the card ejector along the card compartment.

In various embodiments, a random selection is made by incrementing the N-stage counter with a high frequency generator. The high frequency generator is disconnected from the N-stage counter upon termination of the shuffling operation. The N-stage counter is then incremented by a very low frequency generator until it reaches its capacity count and resets. The reciprocating movement of the card ejector is terminated after completion of a time interval of random length and extending from the time the high frequency generator is disconnected from the N-stage counter to the time that the counter is advanced to its capacity count and reset by the low frequency generator, triggering the energization of the reciprocating drive, at which time the card ejector carriage coasts to a stop.

In various embodiments, the card ejector partially ejects a group of cards from the stack in the compartment. The partially displaced group of cards is then manually removed from the compartment. In another preferred embodiment, the ejector fully ejects the group of cards from the compartment, the ejected cards being dropped into a chute, which delivers the cards directly to a dealing shoe. The pressure plate of the dealing shoe is initially withdrawn to a position enabling the cards passing through the delivery shoe to enter directly into the dealing shoe, and is thereafter returned to its original position at which it urges the cards towards the output end of the dealing shoe.

Various embodiments include a method and apparatus for automatically shuffling and cutting playing cards and delivering shuffled and cut playing cards to the dispensing shoe without any human intervention whatsoever once the playing cards are delivered to the shuffling apparatus. In addition, the shuffling operation may be performed as soon as the play of each game is completed, if desired, and simultaneously with the start of a new game, thus totally eliminating the need to shuffle all of the playing cards (which may include six or eight decks, for example) at one time. Preferably, the cards played are collected in a "dead box" and are drawn from the dead box when an adequate number of cards have been accumulated for shuffling and cutting using the methods according to various embodiments.

Various embodiments include a computer controlled shuffling and cutting system provided with a housing having at least one transparent wall making the shuffling and card delivery mechanism easily visible to all players and floor management in casino applications. The housing is provided with a reciprocally slidable playing card pusher which, in the first position, is located outside of said housing. A motor-operated transparent door selectively seals and uncovers an opening in the transparent wall to permit the slidably mounted card pusher to be moved from its aforementioned first position to a second position inside the housing whereupon the slidably mounted card pusher is then withdrawn to the first position, whereupon the playing cards have been deposited upon a motorized platform which moves vertically and selectively in the upward and downward directions.

The motor driven transparent door is lifted to the uncovered position responsive to the proper location of the motor driven platform, detected by suitable sensor means, as well as depression of a foot or hand-operated button accessible to the dealer.

The motor driven platform (or "elevator") lifts the stack of playing cards deposited therein upwardly toward a shuffling mechanism responsive to removal of the slidably mounted card pusher and closure of the transparent door whereupon the playing cards are driven by the shuffling mechanism in opposing directions and away from the stack to first and second card holding magazines positioned on opposing sides of the elevator, said shuffling mechanism comprising motor driven rollers rotatable upon a reciprocating mounting device, the reciprocating speed and roller rotating speed being adjustable. Alternatively, however, the reciprocating and rotating speeds may be fixed; if desired, employing motors having fixed output speeds, in place of the stepper motors employed in one preferred embodiment.

Upon completion of a shuffling operation, the platform is lowered and the stacks of cards in each of the aforementioned receiving compartments are sequentially pushed back onto the moving elevator by suitable motor-driven pushing mechanisms. The order of operation of the pushing mechanisms is made random by use of a random numbers generator employed in the operating computer for controlling the system. These operations can be repeated, if desired. Typically, new cards undergo these operations from two to four times.

Guide assemblies guide the movement of cards onto the platform, prevent shuffled cards from being prematurely returned to the elevator platform and align the cards as they fall into the card receiving regions as well as when they are pushed back onto the elevator platform by the motor-driven pushing mechanism.

Upon completion of the plurality of shuffling and cutting operations, the platform is again lowered, causing the shuffled and cut cards to be moved downwardly toward a movable guide plate having an inclined guide surface.

As the motor driven elevator moves downwardly between the guide plates, the stack of cards engages the inclined guide surface of a substantially U-shaped secondary block member causing the stack to be shifted from a horizontal orientation to a diagonal orientation. Substantially simultaneously therewith, a "drawbridge-like" assembly comprised of a pair of swingable arms pivotally mounted at their lower ends, are swung downwardly about their pivot pin from a vertical orientation to a diagonal orientation and serve as a diagonally aligned guide path. The diagonally aligned stack of cards slides downwardly along the inclined guide surfaces and onto the draw bridge-like arms and are moved downwardly therealong by the U-shaped secondary block member, under control of a stepper motor, to move cards toward and ultimately into the dealing shoe.

A primary block, with a paddle, then moves between the cut-away portion of the U-shaped secondary block, thus applying forward pressure to the stack of cards. The secondary block then retracts to the home position. The paddle is substantially rectangular-shaped and is aligned in a diagonal orientation. Upon initial set-up of the system the paddle is positioned above the path of movement of cards into the dealing shoe. The secondary block moves the cut and shuffled cards into the dealing shoe and the paddle is lowered to the path of movement of cards toward the dealing shoe and is moved against the rearwardmost card in the stack of cards delivered to the dealing shoe. When shuffling and cutting operations are performed subsequent to the initial set-up, the paddle rests against the rearwardmost card previously delivered to the dealing shoe. The shuffled and cut cards sliding along the guide surfaces of the diagonally aligned arms of the draw bridge-like mechanism come to rest upon the opposite surface of the paddle which serves to isolate the playing cards previously delivered to the dispensing shoe, as well as providing a slight pushing force urging the cards toward the outlet slot of the dispensing shoe thereby enabling the shuffling and delivering operations to be performed simultaneously with the dispensing of playing cards from the dispensing shoe.

After all of the newly shuffled playing cards have been delivered to the rear end of the dispensing shoe, by means of the U-shaped secondary block the paddle which is sandwiched between two groups of playing cards, is lifted to a position above and displaced from the playing cards. A movable paddle mounting assembly is then moved rearwardly by a motor to place the paddle to the rear of the rearmost playing card just delivered to the dispensing shoe; and the paddle is lowered to its home position, whereupon the motor controlling movement of the paddle assembly is then deenergized enabling the rollingly-mounted assembly supporting the paddle to move diagonally downwardly as playing cards are dispensed from the dispensing shoe to provide a force which is sufficient to urge the playing cards forwardly toward the playing card dispensing slot of the dealing shoe. The force acting upon the paddle assembly is the combination of gravity and a force exerted upon the paddle assembly by a constant tension spring assembly. Jogging (i.e., "dither") means cause the paddle to be jogged or reciprocated in opposing forward and rearward directions at periodic intervals to assure appropriate alignment, stacking and sliding movement of the stack of playing cards toward the card dispensing slot of the dealing shoe.

Upon completion of a game, the cards used in the completed game are typically collected by the dealer and placed in a dead box on the table. The collected cards are later placed within the reciprocally movable card pusher. The dealer has the option of inserting the cards within the reciprocally slidable card pusher into the shuffling mechanism or, alternatively, and preferably, may postpone a shuffling operation until a greater number of cards have been collected upon the reciprocally slidable card pusher. The shuffling and delivery operations may be performed as often or as infrequently as the dealer or casino management may choose. The shuffling and playing card delivery operations are fully automatic and are performed without human intervention as soon as cards are inserted within the machine on the elevator platform. The cards are always within the unobstructed view of the players to enable the players, as well as the dealer, to observe and thereby be assured that the shuffling, cutting and card delivery operations are being performed properly and without jamming and that the equipment is working properly as well. The shuffling and card delivery operations do not conflict or interfere with the dispensing of cards from the dispensing shoe, thereby permitting these operations to be performed substantially simultaneously, thus significantly reducing the amount of time devoted to shuffling and thereby greatly increasing the playing time, as well as providing a highly efficient random shuffling and cutting mechanism.

The system is controlled by a microcomputer programmed to control the operations of the card shuffling and cutting system. The computer controls stepper motors through motor drive circuits, intelligent controllers and an opto-isolator linking the intelligent controllers to the computer. The computer also monitors a plurality of sensors to assure proper operation of each of the mechanisms of the system.

Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

INCORPORATION BY REFERENCE

The following patents and patent applications are incorporated by reference herein for all purposes:
U.S. Pat. No. 6,579,181
U.S. Pat. No. 6,299,536
U.S. Pat. No. 6,093,103
U.S. Pat. No. 5,941,769
U.S. Pat. No. 7,114,718
US patent application publication 20050012269
U.S. Pat. No. 4,515,367
U.S. Pat. No. 5,000,453
U.S. Pat. No. 7,137,630
U.S. Pat. No. 7,137,629

What is claimed is:

1. An electronic gaming system comprising:
a computing device, in which the computing device includes at least one processor configured to control:
storing, in a memory of the electronic gaming system, registration information of a bettor, and
a record of funds of the bettor to be held in an account-based wagering account for the bettor for multiple wagering events;
receiving tax withholding form information of the bettor;
determining a tax-efficient betting strategy for suggestion to the bettor, in which:
the tax-efficient betting strategy being a betting strategy that attracts lower tax liability for the bettor, or increases a percentage of a pre-tax return that is realizable by the bettor after paying tax liability on pre-tax payout, in either case, relative to other possible betting strategies available to the bettor, and
the tax-efficient betting strategy is determined based on at least one of national status of the bettor, tax treaty status of the bettor, a gaming history of the bettor, an amount of taxes owed by the bettor, net gambling winning or loss position for the year of the bettor, or a bet size of a prior bet;
receiving a location determination signal from a mobile computing device of the bettor over a communication network indicating a current location of the mobile computing device, in which the location determination signal is from using at least one of network-based technology or satellite-based technology;
enabling and disabling a gaming activity using the mobile computing device, based on whether the current location of the mobile computing device determined from the location determination signal is within a predefined zone;
while the current location continues to be determined to be within the predefined zone, enabling the gaming activity using the mobile computing device, in which the gaming activity using the mobile computing device is disabled when the current location is determined to be outside the predefined zone;
displaying, over the communication network, on a display of the mobile computing device, the tax-efficient betting strategy as a suggestion to the bettor for the bettor to exercise at the mobile computing device;
receiving, over the communication network, a wager of the bettor from the mobile computing device against the wagering account, while the current location continues to be determined to be within the predefined zone;
determining a loss or winnings from the wager; and
paying out winnings to the bettor, less withholding payable to tax authorities, the withholding to be computed based at least in part on the winnings and on the tax withholding form information.

2. The electronic gaming system of claim 1,
in which the at least one processor is configured to control:
registering the bettor into an account of an account-based wagering system of the electronic gaming system, the registering to be completed to enable wagering in the electronic gaming system, the registering obtaining tax withholding residency classification and tax identification number of the bettor; and
when activity of the bettor triggers winnings through the electronic gaming system that are subject to tax-reportable status, gathering information from the bettor to complete data for preparation of a tax filing to report the winnings to a tax authority.

3. The electronic gaming system of claim 1, in which the at least one processor is configured to control:
computing an applicable tax withholding rate based on the bettor registering as a citizen of a country with a tax treaty agreement with the United States.

4. The electronic gaming system of claim 1, in which the at least one processor is configured to control:
computing an applicable tax withholding rate based on the bettor registering as a citizen of a country without a tax treaty agreement with the United States.

5. The electronic gaming system of claim 1, in which the at least one processor is configured to control:
computing an applicable tax withholding rate based on the bettor registering as a citizen of a specific state of the United States.

6. The electronic gaming system of claim 1, in which the at least one processor is configured to control:
computing applicable tax withholding rates based on taxable status of the bettor, the bettor to be registered in one of at least the following status categories:
as a citizen of a country without a tax treaty agreement with the United States;
as a citizen of a country with a tax treaty agreement with the United States; and
as a citizen of a specific state of the United States.

7. The electronic gaming system of claim 6, in which the at least one processor is configured to control:
computing an applicable tax withholding rate based at least in part on the bettor registering a taxpayer identification number.

8. The electronic gaming system of claim 6, in which the at least one processor is configured to control:
upon registering the bettor to play a device, receiving tax withholding information; and
when the electronic gaming system detects that the bettor is awarded a payout that triggers income tax reporting requirements, relying on the tax withholding information to calculate an applicable lower withholding rate.

9. The electronic gaming system of claim 1, in which the at least one processor is configured to control:
computing tax withholding based at least in part on at least one of an accumulated amount of money won or lost by the bettor for a tax period.

10. The electronic gaming system of claim 1,
in which the at least one processor is configured to control:
receiving the tax withholding form information of the bettor with the registration information.

11. The electronic gaming system of claim 1, in which the tax withholding form information is received after and in response to a wager payout that triggers tax liability or a tax reporting obligation of the bettor.

12. The electronic gaming system of claim 1, in which the tax withholding form information is received by a computer of the electronic gaming system operated by a casino or betting operator.

13. The electronic gaming system of claim 1, in which the at least one processor is configured to control:
when activity of the bettor in the electronic gaming system triggers winnings that are subject to tax-reportable status, issuing a command to the mobile computing device to issue an invitation to the bettor to provide tax withholding information,
in which the paying out of winnings reflects a high withholding rate when the tax withholding form information records the bettor not providing certain information.

14. The electronic gaming system of claim 1, in which the at least one processor is configured to control displaying, over the communication network, on the display of the mobile computing device, a payout of a gaming wager, the payout displayed in at least two forms including:
gross payout before taxes based on an outcome of the gaming wager, and
net payout of the gaming wager after taxes, in which a withholding rate is based on the national status and the tax treaty status of the bettor.

15. The electronic gaming system of claim 1, in which the at least one processor is configured to control:
registering the bettor into an account of an account-based wagering system, the registering to be completed to enable wagering, the registering obtaining tax withholding residency classification and tax identification number of the bettor; and
when activity of the bettor triggers winnings through the electronic gaming system that are subject to tax-reportable status, triggering gathering of information from the bettor to complete data for preparation of a tax filing to report the winnings to a tax authority.

16. The electronic gaming system of claim 1, in which:
an applicable tax withholding rate is based on the bettor registering as a citizen of a country with a tax treaty agreement with the United States.

17. The electronic gaming system of claim 1, in which the paying out of winnings reflects a high withholding rate when the tax withholding form information records the bettor not providing certain information, and
in which an applicable tax withholding rate is based on the bettor registering as a citizen of a country without a tax treaty agreement with the United States.

18. The electronic gaming system of claim 1, in which the paying out of winnings reflects a high withholding rate when the tax withholding form information records the bettor not providing certain information, and
in which an applicable tax withholding rate is based on the bettor registering as a citizen of a specific state of the United States.

19. The electronic gaming system of claim 1, in which the at least one processor is configured to control computing the withholding based at least in part on an accumulated amount of money won and/or lost by the bettor for a tax period.

20. A method for electronic gaming comprising:
controlling, by at least one processor,
storing, in a memory,
registration information of a bettor, and
a record of funds of the bettor to be held in an account-based wagering account for the bettor for multiple wagering events;
receiving tax withholding form information of the bettor;
determining a tax-efficient betting strategy for suggestion to the bettor, in which:
the tax-efficient betting strategy being a betting strategy that attracts lower tax liability for the bettor, or increases a percentage of a pre-tax return that is realizable by the bettor after paying tax liability on pre-tax payout, in either case, relative to other possible betting strategies available to the bettor, and
the tax-efficient betting strategy is determined based on at least one of national status of the bettor, tax treaty status of the bettor, a gaming history of the bettor, an amount of taxes owed by the bettor, net gambling winning or loss position for the year of the bettor, or a bet size of a prior bet;
receiving a location determination signal from a mobile computing device of the bettor over a communication network indicating a current location of the mobile computing device, in which the location determination signal is from using at least one of network-based technology or satellite-based technology;
enabling and disabling a gaming activity using the mobile computing device, based on whether the current location of the mobile computing device determined from the location determination signal is within a predefined zone;

while the current location continues to be determined to be within the predefined zone, enabling the gaming activity using the mobile computing device, in which the gaming activity using the mobile computing device is disabled when the current location is determined to be outside the predefined zone;

displaying, over the communication network, on a display of the mobile computing device, the tax-efficient betting strategy as a suggestion to the bettor for the bettor to exercise at the mobile computing device;

receiving, over the communication network, a wager of the bettor from the mobile computing device against the wagering account, while the current location continues to be determined to be within the predefined zone;

determining a loss or winnings from the wager; and paying out winnings to the bettor, less withholding payable to tax authorities, the withholding to be computed based at least in part on the winnings and on the tax withholding form information.

\* \* \* \* \*